United States Patent

Chuah et al.

(10) Patent No.: US 10,643,344 B1
(45) Date of Patent: May 5, 2020

(54) THREE-DIMENSIONAL ROOM MEASUREMENT PROCESS

(71) Applicant: Amazon Technologies, Inc., Seattle, WA (US)

(72) Inventors: Joonhao Chuah, Seattle, WA (US); Dillon Baker, Seattle, WA (US); Kristian Kane, Seattle, WA (US); Hai Quang Kim, Bellevue, WA (US); Brian Mount, Seattle, WA (US); Michael Thomas, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 16/298,980

(22) Filed: Mar. 11, 2019

(51) Int. Cl.
| G06K 9/00 | (2006.01) |
| G06T 19/00 | (2011.01) |
| G06T 7/70 | (2017.01) |
| G06T 7/60 | (2017.01) |
| G06T 7/13 | (2017.01) |
| G06T 7/73 | (2017.01) |
| G06T 7/55 | (2017.01) |
| H04N 5/232 | (2006.01) |

(52) U.S. Cl.
CPC ............. *G06T 7/60* (2013.01); *G06T 7/13* (2017.01); *G06T 7/55* (2017.01); *G06T 7/73* (2017.01); *H04N 5/23222* (2013.01); *H04N 5/232939* (2018.08); *G06T 2200/04* (2013.01); *G06T 2200/24* (2013.01); *G06T 2207/20092* (2013.01)

(58) Field of Classification Search
USPC ........................................................ 348/142
See application file for complete search history.

(56) References Cited

U.S. PATENT DOCUMENTS

| 9,787,904 | B2 | 10/2017 | Birkler et al. |
| 10,032,078 | B2 | 7/2018 | Schultz et al. |
| 10,341,568 | B2 | 7/2019 | Fischler et al. |
| 10,373,366 | B2 | 8/2019 | Forutanpour et al. |
| 2013/0187905 | A1 | 7/2013 | Vaddadi et al. |
| 2014/0368620 | A1 | 12/2014 | Li et al. |
| 2015/0116509 | A1 | 4/2015 | Birkler et al. |
| 2015/0227645 | A1 | 8/2015 | Childs et al. |
| 2015/0347854 | A1* | 12/2015 | Bare .................. G06T 19/006 345/633 |
| 2016/0335809 | A1 | 11/2016 | Forutanpour et al. |
| 2016/0353018 | A1 | 12/2016 | Anderson et al. |
| 2017/0324898 | A9 | 11/2017 | Karunamuni et al. |
| 2018/0103209 | A1 | 4/2018 | Fischler et al. |
| 2018/0144547 | A1 | 5/2018 | Shakib et al. |
| 2018/0260988 | A1 | 9/2018 | Huang et al. |
| 2018/0295282 | A1 | 10/2018 | Boyce et al. |
| 2019/0051054 | A1* | 2/2019 | Jovanovic ............... G06F 3/011 |
| 2019/0139310 | A1 | 5/2019 | Holzer et al. |

* cited by examiner

*Primary Examiner* — Hee-Yong Kim
(74) *Attorney, Agent, or Firm* — Athorus, PLLC

(57) ABSTRACT

Systems and methods related to a room measurement process may include determining a floor plane associated with a room, determining a plurality of wall planes associated with the room, and determining a ceiling plane associated with the room. The room measurements may be based on data received from an imaging sensor and position and orientation sensors associated with a user device. In addition, a three-dimensional geometric shell of the room may be generated based on the room measurements.

20 Claims, 51 Drawing Sheets

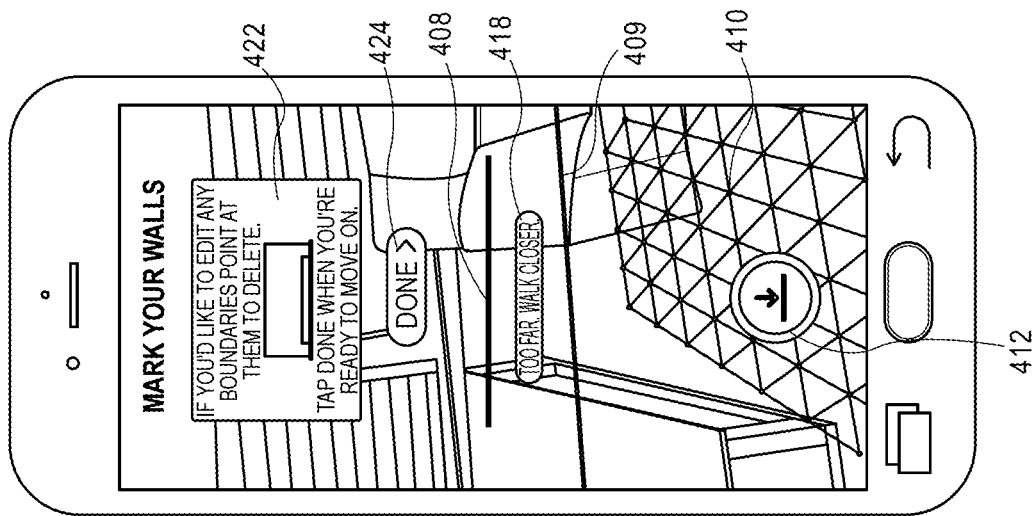
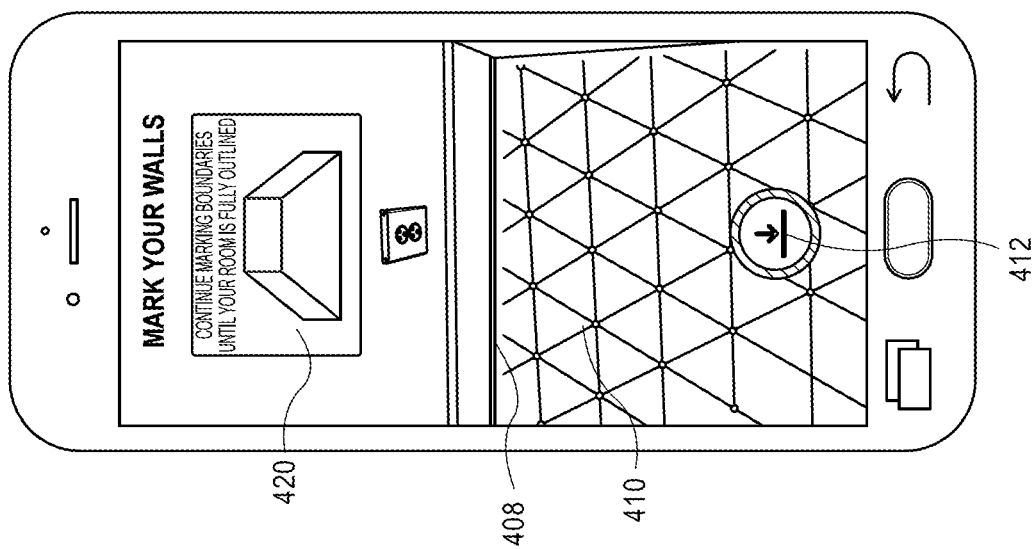
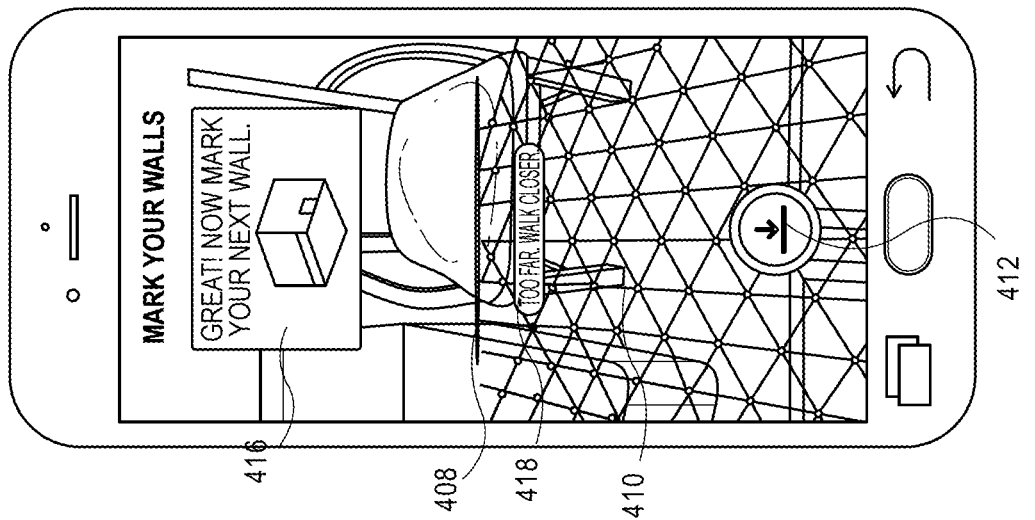

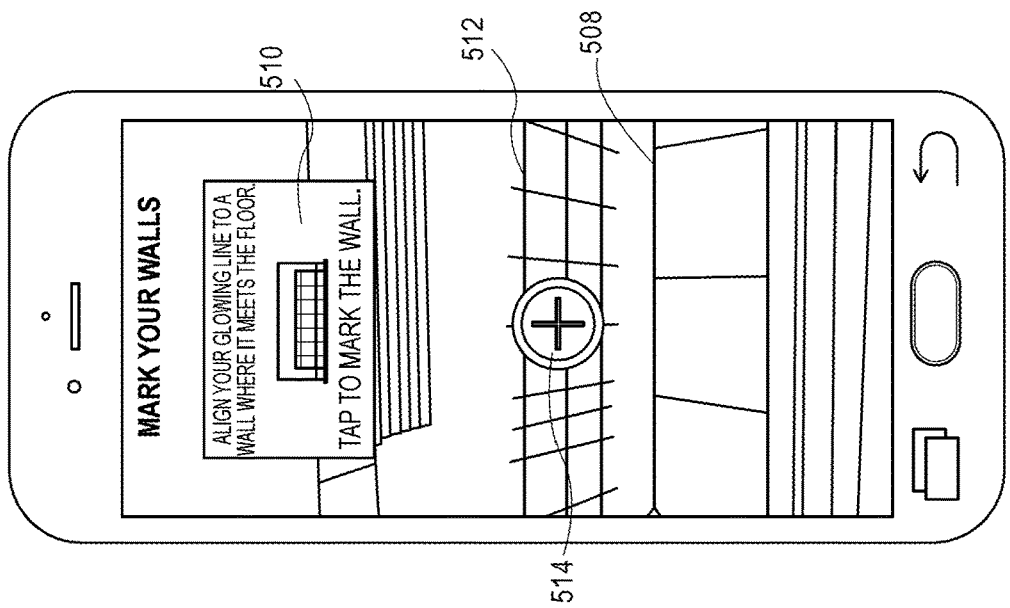
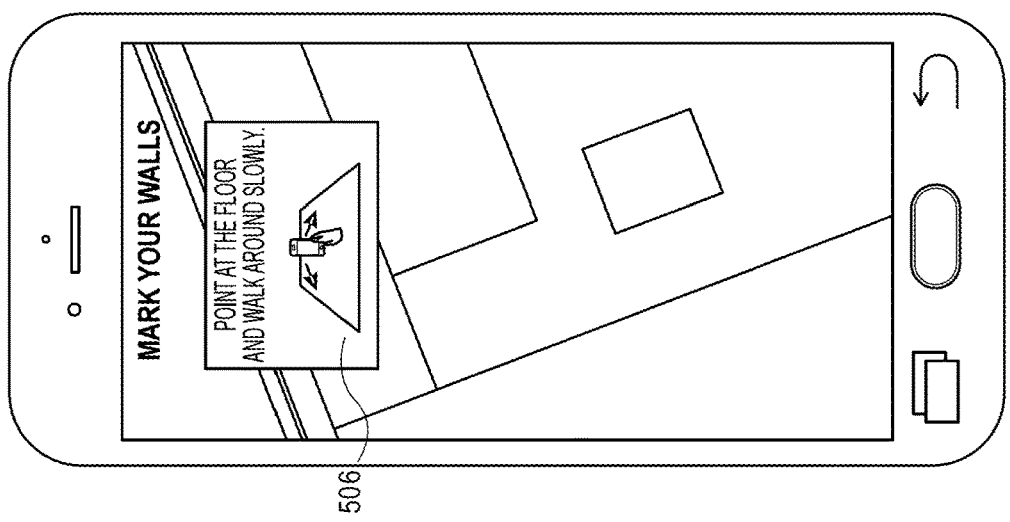
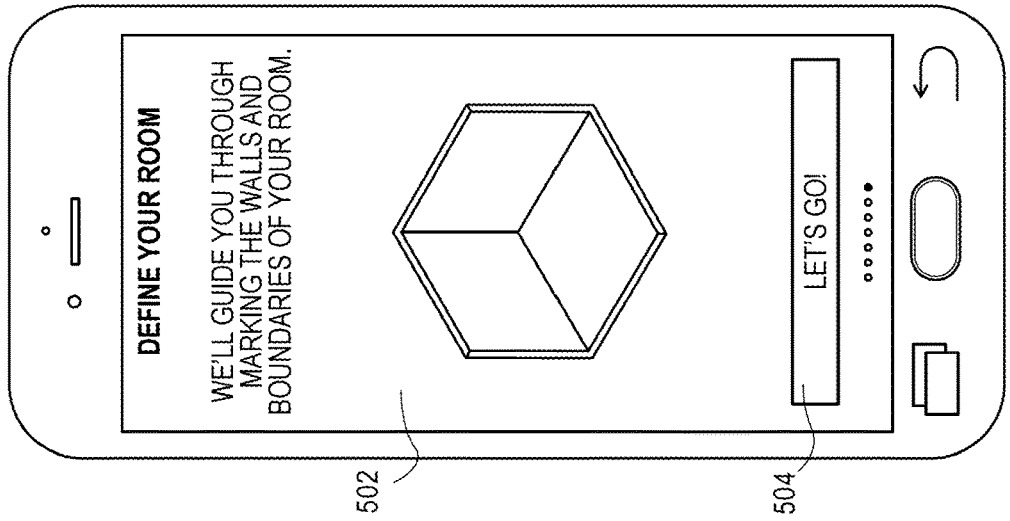
FIG. 5C
FIG. 5B
FIG. 5A

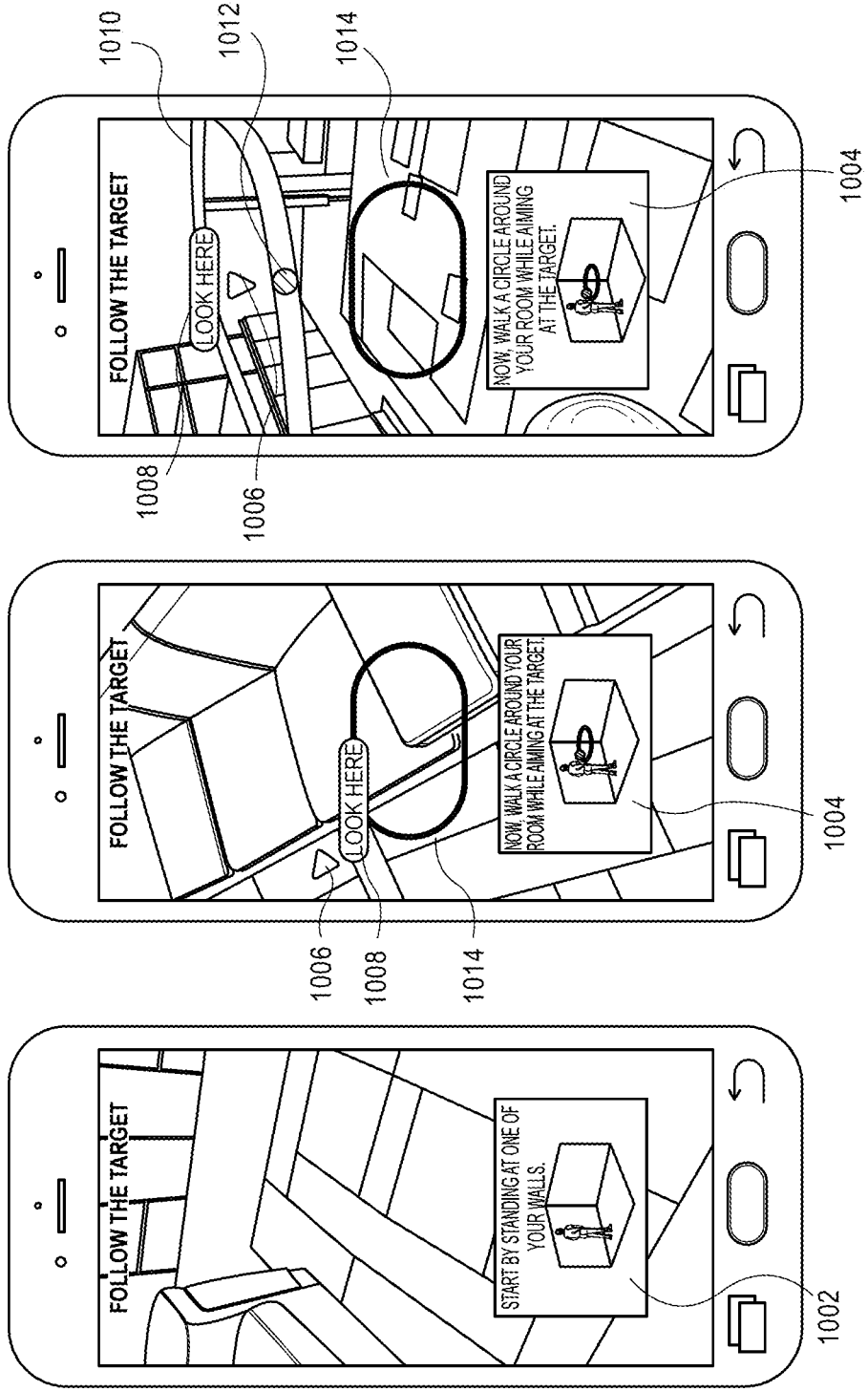

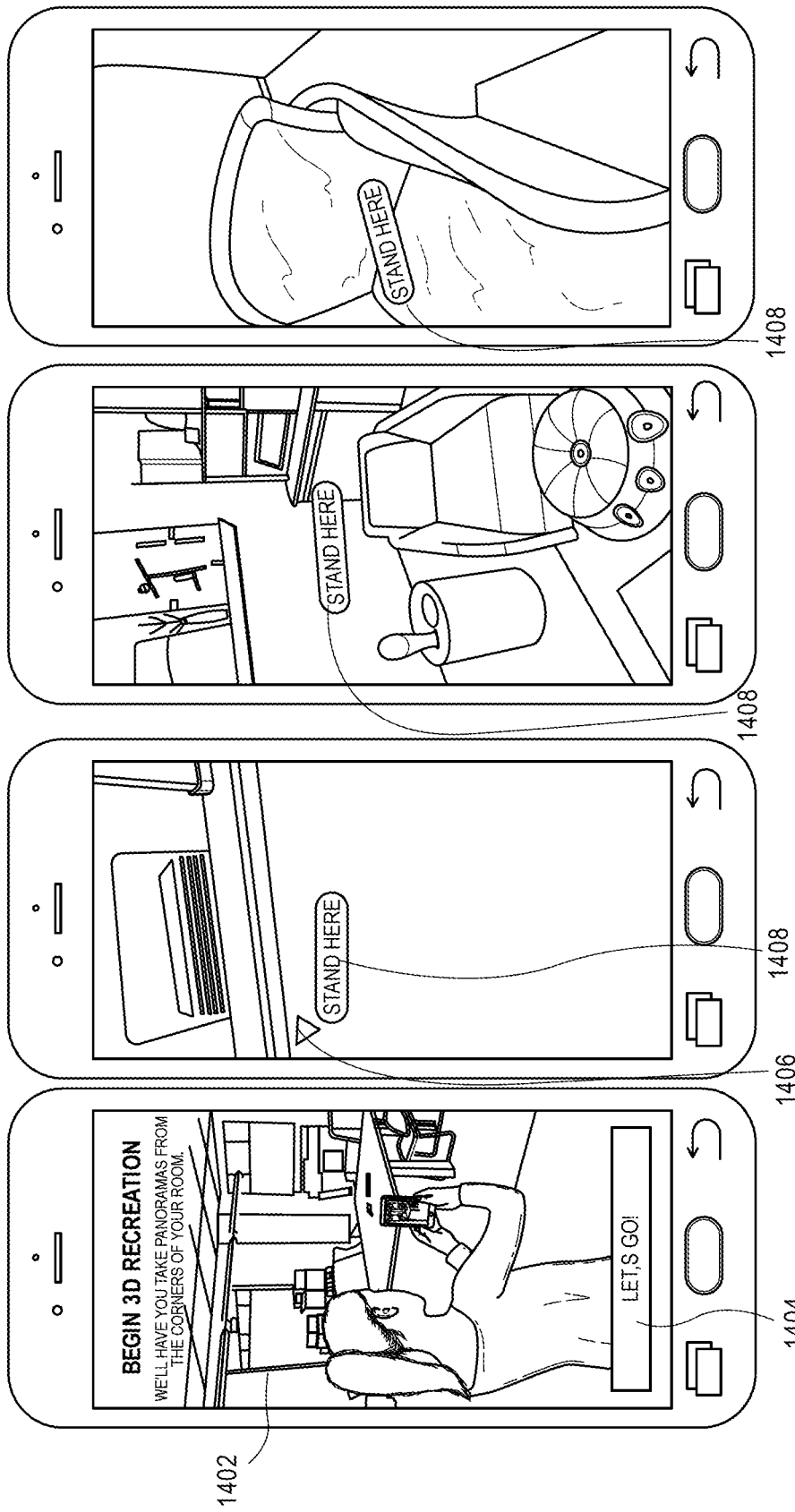

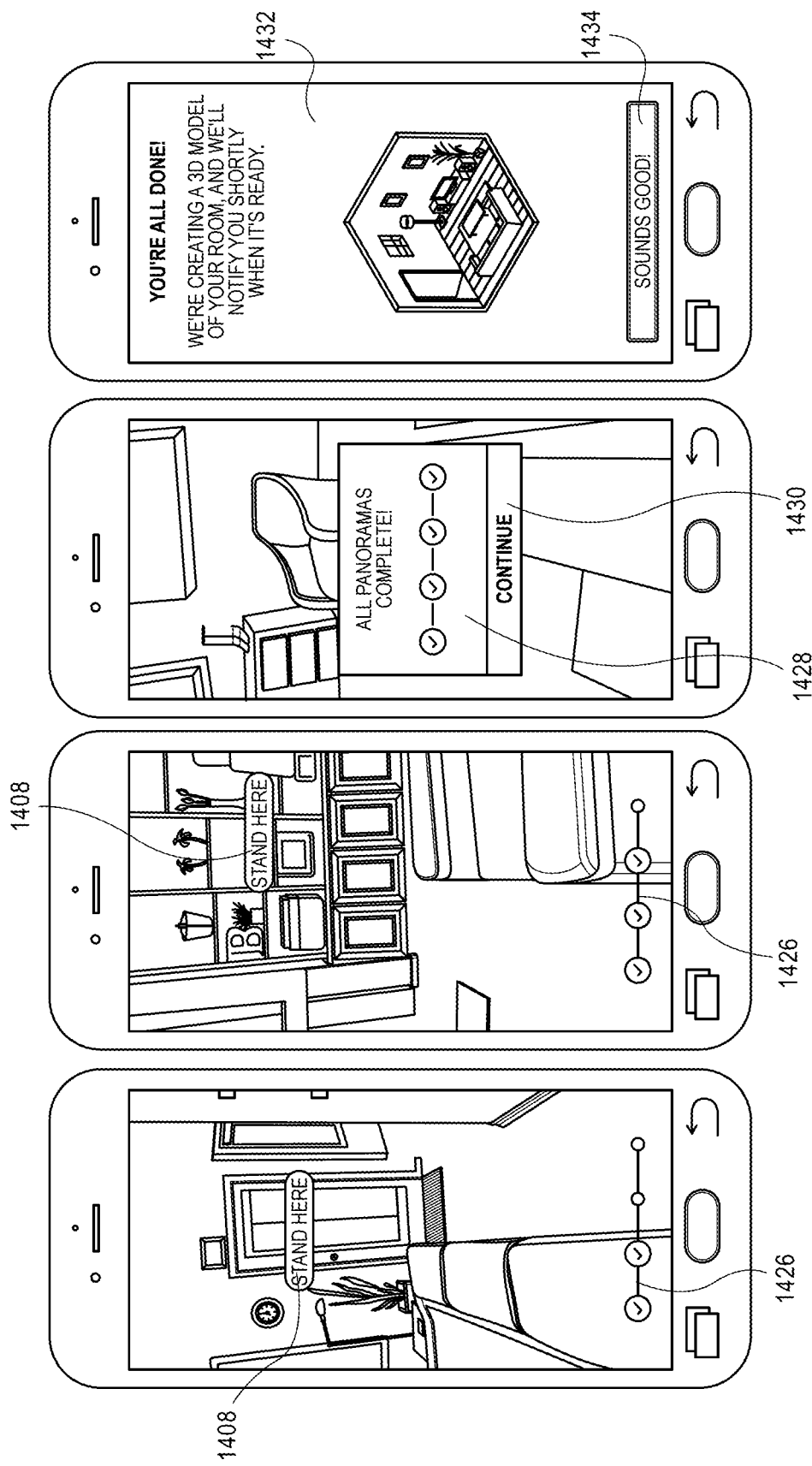

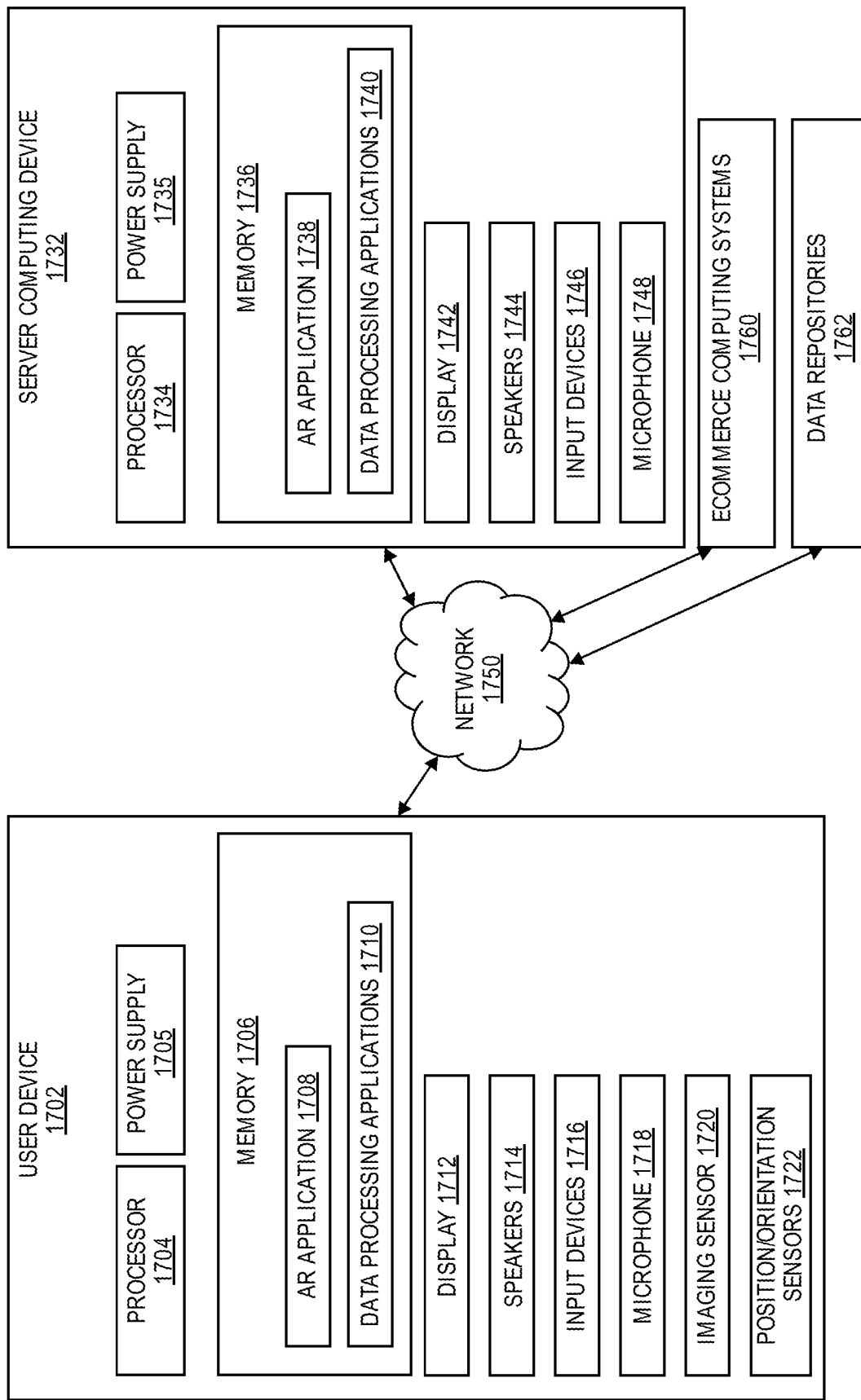

ically, there is a need for systems and methods to generate virtual reality, mixed reality, and/or augmented reality environments that simulate actual or real-world environments, with reduced time, cost, and/or specialized training and skills.

THREE-DIMENSIONAL ROOM MEASUREMENT PROCESS

BACKGROUND

Virtual reality, mixed reality, and augmented reality environments presented via various computing and display devices are increasing in use. For example, virtual reality, mixed reality, and augmented reality environments may be utilized for gaming, entertainment, tourism, shopping, or other purposes. However, generation of such virtual reality, mixed reality, and augmented reality environments can require much time, cost, and/or specialized training and skills. Further, many virtual reality, mixed reality, and augmented reality environments may be hypothetical or generic environments that have little or no connection to actual or real-world environments. Accordingly, there is a need for systems and methods to generate virtual reality, mixed reality, and/or augmented reality environments that simulate actual or real-world environments, with reduced time, cost, and/or specialized training and skills.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

FIGS. 4A-4K are example user interface screens illustrating steps of an example room measurement process with augmented reality guidance, in accordance with disclosed implementations.

FIGS. 5A-5H are example user interface screens illustrating steps of another example room measurement process with augmented reality guidance, in accordance with disclosed implementations.

FIGS. 10A-10M are example user interface screens illustrating steps of another example image capture process using ring paths with augmented reality guidance, in accordance with disclosed implementations.

FIG. 17 is a block diagram illustrating various components of a user device and server computing device configured for three-dimensional room model generation using photogrammetry, in accordance with disclosed implementations.

Figure 1:
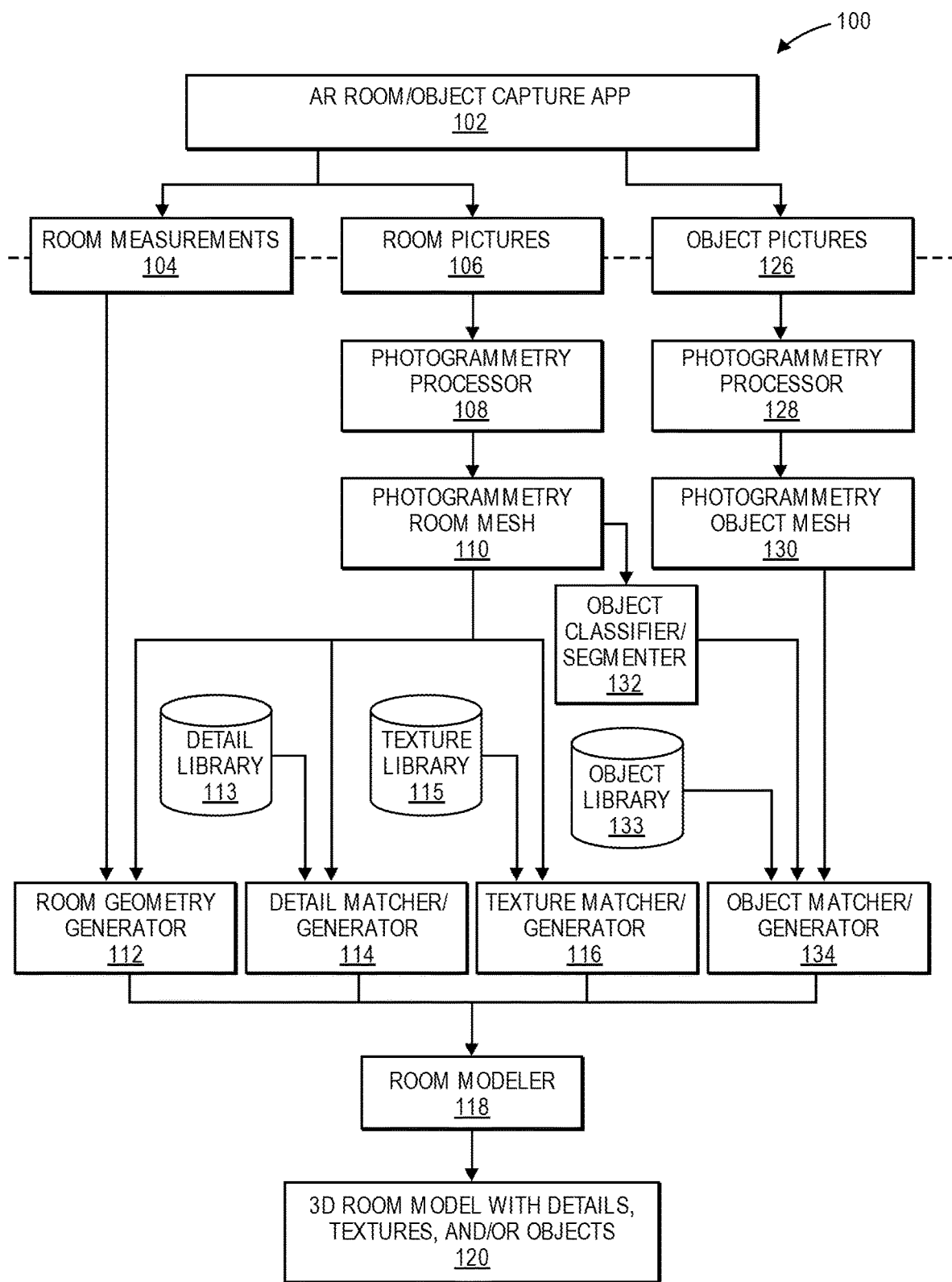
FIG. 1 is a schematic system diagram of an example three-dimensional room model generation using photogrammetry, in accordance with disclosed implementations.

While implementations are described herein by way of example, those skilled in the art will recognize that the implementations are not limited to the examples or drawings described. It should be understood that the drawings and detailed description thereto are not intended to limit implementations to the particular form disclosed but, on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION

Systems and methods described herein may relate to generation of a three-dimensional model of a room or space. For example, the three-dimensional model of the room or space may be generated based on measurements or dimensions of the room or space captured via a user device, such as a mobile phone. In addition, the three-dimensional model of the room or space may be generated based on images or pictures of the room or space captured via a user device. Further, the three-dimensional model of the room or space may be generated using various algorithms or techniques, such as photogrammetry, machine learning, image processing, geometric computer vision, and/or other algorithms or techniques.

Systems and methods described herein may also relate to determination of measurements or dimensions of a room or space using a user device. For example, an augmented reality room capture application may operate on the user device and facilitate determination of measurements or dimensions of the room or space. In addition, the determination of measurements or dimensions of a room or space may be based on imaging data detected by an imaging sensor of the user device, and/or based on position and orientation data detected by an inertial measurement unit of the user device. Further, the measurements or dimensions of the room or space may be determined using various algorithms or techniques, such as image processing, geometric computer vision, position and orientation tracking, geometric calculation, and/or other algorithms or techniques.

Systems and methods described herein may also relate to capture of images or pictures of a room or space using a user device traversing a path, such as a ring path. For example, the path may be determined based on dimensions or measurements of a room or space to be captured. An augmented reality room capture application may operate on the user device and facilitate capture of images or pictures of the room or space. In addition, the capture of images or pictures of a room or space may be based on imaging data detected by an imaging sensor during traversal around a ring path within the room or space, while maintaining a target along the ring path within a reticle displayed via the user device, and/or based on position and orientation data detected by an inertial measurement unit. Further, the images or pictures of the room or space may be processed using various algorithms or techniques, such as photogrammetry, machine learning, image processing, position and orientation tracking, geometric computer vision, and/or other algorithms or techniques, in order to generate a three-dimensional model of the room or space.

Systems and methods described herein may also relate to capture of images or pictures of a room or space using a user device traversing a plurality of image capture locations, e.g., associated with a panorama path. For example, the path may be determined based on dimensions or measurements of a room or space to be captured. An augmented reality room capture application may operate on the user device and facilitate capture of images or pictures of the room or space. In addition, the capture of images or pictures of a room or space may be based on imaging data detected by an imaging sensor during traversal among the plurality of locations within the room or space, and during sweeps at each location of the plurality of locations, and/or based on position and orientation data detected by an inertial measurement unit. Further, the images or pictures of the room or space may be processed using various algorithms or techniques, such as photogrammetry, machine learning, image processing, position and orientation tracking, geometric computer vision, and/or other algorithms or techniques, in order to generate a three-dimensional model of the room or space.

In example embodiments, the measurements or dimensions of a room or space may be determined by generating a local coordinate frame for tracking position and/or orientation within the room or space, by determining a floor plane or lower boundary of the room or space based on imaging data and/or position and orientation data, by determining one or more wall planes or vertical boundaries of the room or space based on the determined floor plane and/or position and orientation data, and by determining a ceiling plane or upper boundary of the room or space based on the determined floor plane or lower boundary, one or more determined wall planes or vertical boundaries, and/or position and orientation data.

In further example embodiments, an augmented reality room capture application operating on the user device to facilitate determination of measurements or dimensions of the room or space may present various indications, arrows, textual cues, colors, user interface elements, position, alignment, or orientation guides, floor placement guides or indicators, edge or wall placement guides or indicators, ceiling placement guides or indicators, progress indicators, instructions, guidances, or other visual indications. Further, the augmented reality room capture application may also utilize various algorithms or techniques, such as position and orientation tracking, image processing, edge detection, surface detection, feature detection, and/or other algorithms or techniques, to facilitate determination of measurements or dimensions of the room or space.

In example embodiments, the images or pictures of a room or space may be captured using a user device by generating a path, such as a ring path, based on measurements or dimensions of the room or space and/or position and orientation data, by generating a target along the ring path based on the ring path and/or position and orientation data, and by generating a reticle within a display of the user device. Further, the images or pictures of the room or space may be captured using the user device by traversing along the ring path while maintaining the target along the ring path within a field of view, e.g., within the reticle presented via the display of the user device, such that a field of view of an imaging sensor of the user device extends substantially across the room or space during traversal of the ring path.

In further example embodiments, an augmented reality room capture application operating on the user device to facilitate capture of images or pictures of the room or space may present various indications, arrows, textual cues, colors, user interface elements, position, alignment, or orientation guides, paths, ring paths, targets, reticles, progress indicators, instructions, guidances, or other visual indications. Further, the augmented reality room capture application may also utilize various algorithms or techniques, such as position and orientation tracking, image processing, edge detection, surface detection, feature detection, and/or other algorithms or techniques, to facilitate capture of images or pictures of the room or space.

In example embodiments, the images or pictures of a room or space may be captured using a user device by generating a plurality of image capture locations, e.g., associated with a panorama path, based on measurements or dimensions of the room or space and/or position and orientation data, by generating one or more image capture locations associated with the panorama path based on measurements or dimensions of the room or space and/or position and orientation data, by generating a defined direction or order of traversal of the one or more locations associated with the panorama path based on measurements or dimensions of the room or space and/or position and orientation data, and by generating a defined direction or order of image capture or sweep at each of the one or more locations associated with the panorama path based on measurements or dimensions of the room or space and/or position and orientation data. Further, the images or pictures of the room or space may be captured using the user device while traversing among the one or more locations associated with the panorama path in the defined order and while sweeping the user device at each of the one or more locations associated with the panorama path in the defined direction.

In further example embodiments, an augmented reality room capture application operating on the user device to facilitate capture of images or pictures of the room or space may present various indications, arrows, textual cues, colors, user interface elements, position, alignment, or orientation guides, traversal guides, sweep guides, progress indicators, instructions, guidances, or other visual indications. Further, the augmented reality room capture application may also utilize various algorithms or techniques, such as position and orientation tracking, image processing, edge detection, surface detection, feature detection, and/or other algorithms or techniques, to facilitate capture of images or pictures of the room or space.

In example embodiments, based at least in part on the determined measurements or dimensions of a room or space and the captured images or pictures of the room or space, a three-dimensional model of the room or space may be generated. For example, a three-dimensional geometric shell of the room or space may be generated based at least in part on the determined measurements or dimensions of the room or space, and a photogrammetry mesh of the room or space may be generated based at least in part on the captured images or pictures of the room or space. In addition, various details, textures, objects, furniture, or other aspects associated with the room or space may be identified, matched, or generated, e.g., using various image processing, machine learning, and/or other algorithms or techniques. Further, various objects or furniture associated with the room or space may be identified, matched, or generated, e.g., using various image capture processes described herein, and various image processing, machine learning, and/or other algorithms or techniques. Moreover, the three-dimensional model of the room or space may be generated, e.g., using various photogrammetry, machine learning, geometric computer vision, and/or other algorithms or techniques, by scaling the photogrammetry mesh based on the three-dimensional geometric shell of the room or space, and by incorporating various details, textures, objects, furniture, or other aspects associated with the room or space into the three-dimensional model of the room or space.

As one skilled in the art will appreciate in light of this disclosure, certain embodiments may be capable of achieving certain advantages, including some or all of the following: quickly and efficiently defining boundaries, dimensions, and measurements associated with a space, object, or environment, generating and presenting simplified user interfaces for definition of a space, object, or environment, generating and presenting guidance via user interfaces to facilitate intuitive definition of a space, object, or environment, quickly and efficiently capturing imaging data associated with a space, object, or environment, generating and presenting simplified user interfaces for image capture of a space, object, or environment, generating and presenting guidance via user interfaces to facilitate intuitive image capture of a space, object, or environment, generating and presenting a three-dimensional model of a space, object, or environment via various user interfaces, facilitating user placement, interaction, evaluation, and manipulation of items of interest within a three-dimensional model of a space or environment, etc.

The task of navigating a large electronic catalog of items (e.g., a catalog with millions or billions of items) to locate items of interest can be burdensome and time consuming for users, especially if the users do not know the names or generic descriptors of the desired items. Typically, the user can locate items by navigating a browse structure, commonly called a "browse tree," in which the items are arranged by category and subcategory. Typically, however, the browse tree includes several levels of categories, requiring the user to navigate through several levels of browse nodes or category pages to arrive at the subcategory of interest. Further, in many cases, the items of interest are not accurately or intuitively categorized, requiring the user to perform additional navigation or keyword searching. Thus, the user frequently has to perform numerous navigational steps to arrive at the catalog page or "item detail page" of interest. When the user arrives at the catalog page or "item detail page" of interest, the user may then need to perform additional navigational steps or perform additional searches to identify whether the desired item includes the desired features. For example, the user may need to click on and navigate to various product images to see what the product looks like from various angles. By way of another example, the user may need to scroll through numerous community provided content to see if the item is appropriate for a given environment (e.g., scrolling through hundreds of images from other users to see how the item looks in their environment—such as a how a chair looks in combination with other furniture and carpets). By way of still another example, the user may need to sift through hundreds or thousands of customer reviews and questions/answers to determine if the item includes desired features and compatibility characteristics.

Another technological advance of the present disclosure is that the definition of a space, object, or environment and capture of imaging data of a space, object, or environment enables the generation of a three-dimensional model of the space, object, or environment that may be presented via user interfaces, e.g., using virtual reality, mixed reality, augmented reality, or combinations thereof, and that may allow users to identify, select, place, move, rotate, manipulate, and evaluate items of interest with fewer clicks, scrolls, and/or page navigations that would otherwise be required to assess items and within a space or environment as desired or generated by users. For example, in the embodiments described herein, upon generation of a three-dimensional model of a space or environment, the user can easily navigate within the space or environment and may easily select, manipulate, review, or modify items of interest within the space or environment. In addition, using an accurate, three-dimensional model of a desired space or environment, the user may select, place, move, manipulate, review, or modify items of interest to gain a better understanding of how the items may actually appear or feel within the desired space or environment. Furthermore, for each item of interest, a reference or link may be included that allows the user to navigate directly to sources of additional information about the item or another item. Each reference or link thus serves as a programmatically selected navigational shortcut to the item's detail page or description, allowing the user to bypass the navigational structure of the browse tree. Beneficially, programmatically identifying items of interest and presenting the user with navigational shortcuts to these items can improve the speed of the user's navigation through the electronic catalog, rather than requiring the user to page through multiple other pages to locate the recommended items via the browse tree or via searching. This can be particularly true for computing devices with small screens, where fewer items can be displayed to the user at a time and thus navigation of larger volumes of items is more difficult.

FIG. 1 is a schematic system diagram 100 of an example three-dimensional room model generation using photogrammetry, in accordance with disclosed implementations.

Various portions of the system diagram of FIG. 1 may be associated with a user device, such as a personal computing device, mobile computing device, smartphone, tablet computing device, laptop computing device, wearable computing device, headset or head-mounted computing device, eyeglass or eyewear computing device, or other user computing device. For example, the user device may include a processor, a memory having various executable instructions and/or various applications, one or more output devices such as a display, monitor, stereoscopic display, head-mounted or eyeglass-mounted display, screen, speakers, or other outputs, one or more input devices such as buttons, a touchscreen, microphones, or other inputs, a power supply such as a battery or rechargeable battery, one or more imaging sensors configured to capture images within respective fields of view of the imaging sensors, and/or one or more sensors such as inertial measurement units, accelerometers, gyroscopes, magnetometers, depth sensors, or other position or orientation sensors configured to receive data associated with position and orientation of the user device. In addition, the various applications may include an augmented reality room or object capture application, and one or more applications comprising various algorithms or techniques, such as photogrammetry, machine learning, geometric computer vision, image processing, geometric calculation, position and orientation tracking, edge detection, surface detection, feature detection, and/or other algorithms and techniques.

Alternatively or in addition, various portions of the system diagram of FIG. 1 may be associated with a computing device other than the user device, such as a personal computing device, mobile computing device, smartphone, tablet computing device, laptop computing device, wearable computing device, headset or head-mounted computing device, eyeglass or eyewear computing device, desktop computing device, server computing device, remote or cloud computing device, or other computing device(s) or computing system(s). For example, the computing device may include a processor, a memory having various executable instructions and/or various applications, one or more output devices such as a display, monitor, stereoscopic display, head-mounted or eyeglass-mounted display, screen, speakers, or other outputs, one or more input devices such as buttons, a touchscreen, microphones, or other inputs, and/or a power supply such as a battery, rechargeable battery, wired power connection, or other power source. In addition, the various applications may include an augmented reality room or object capture application, and one or more applications comprising various algorithms or techniques, such as photogrammetry, machine learning, geometric computer vision, image processing, geometric calculation, position and orientation tracking, edge detection, surface detection, feature detection, and/or other algorithms and techniques.

In example embodiments, the augmented reality room or object capture application ("AR capture application") 102 may be executed by a processor of a user device, such as a smartphone or mobile computing device. The AR capture application 102 may comprise one or more applications that may be executed by a processor and provide outputs related to room measurements 104 and room pictures 106. As described further herein, the room measurements 104 may be determined based on a local coordinate frame designated by the user device, e.g., using position and orientation information via an inertial measurement unit of the user device. The room measurements 104 may include determinations of a floor plane, one or more wall planes, and a ceiling plane associated with the room, as well as various other movement data of the user device within the room. In addition, various dimensions or measurements of a room or space may be received from a user, e.g., by inputs received via a user device.

In addition, as described further herein, the room pictures 106 may be captured based on traversal of one or more paths within the room using an imaging sensor of the user device. The one or more paths may be determined based on the room measurements 104 and/or various other movement data of the user device within the room. The room pictures 106 may include images of portions of the floor plane, the one or more wall planes, and the ceiling plane, in which each image includes at least a threshold amount of overlap with at least one other image. Further, the room pictures 106 may be associated with position and orientation information of the user device at the time of capture via the inertial measurement unit of the user device.

In some example embodiments, the AR capture application 102 may be executed by a processor and memory associated with a user device, as described herein, and the outputs from the AR capture application 102, e.g., the room measurements 104, room pictures 106, and/or object pictures 126, may be provided as inputs to one or more computing devices other than the user device, as described herein, to perform the processes and operations described to generate a three-dimensional model of a room or space. In other example embodiments, some of the processes and operations described with respect to the AR capture application 102 may be performed by one or more computing devices other than the user device. Likewise, in other example embodiments, some of the processes and operations described with respect to other components shown in FIG. 1, e.g., photogrammetry processors 108, 128, room geometry generator 112, detail matcher/generator 114, texture matcher/generator 116, object classifier/segmenter 132, object matcher/generator 134, and/or room modeler 118, may be performed by one or more processors and memory associated with the user device.

The room pictures 106 may be provided as inputs to a photogrammetry processor 108, which may be an application executed on the user device or a computing device other than the user device. One example photogrammetry processor may include Photoscan available from Agisoft®. The photogrammetry processor 108 may also receive as inputs position and orientation information of the user device at the time of capture of the room pictures 106. Based at least in part on the room pictures 106 and the position and orientation information of the user device, the photogrammetry processor 108 may generate a photogrammetry mesh 110 of the room or space. The photogrammetry mesh 110 may comprise a three-dimensional, composite mesh of substantially all the room pictures 106 that have been combined, e.g., utilizing various image processing, feature detection, machine learning, geometric computer vision, and/or other algorithms and techniques.

The room measurements 104 and the photogrammetry mesh 110 may then be provided as inputs to a room geometry generator 112, which may be an application executed on the user device or a computing device other than the user device. The room geometry generator 112 may generate a three-dimensional geometric shell of the room or space based at least in part on the room measurements 104 and the photogrammetry mesh 110. For example, the room measurements 104 may provide information related to a size or scale of the room or space, such that the room geometry generator 112 may generate a three-dimensional geometric shell of the room or space. In addition, the room geometry generator 112 may process the room measurements 104 and the photogrammetry mesh 110 using various geometric calculation, geometric computer vision, image processing, position and orientation tracking, machine learning, edge detection, surface detection, feature detection, and/or other algorithms and techniques.

The photogrammetry mesh 110 may also be provided as inputs to a detail matcher/generator 114, which may be an application executed on the user device or a computing device other than the user device. The detail matcher/generator 114 may identify, match, and/or generate various details associated with the room or space, such as egresses, doors, windows, fireplaces, floorings, moldings, built-in furniture such as cabinets or shelves, switches, outlets, vents, or other details. In addition, various details may be received from a user, e.g., by inputs received via a user device. Further, the various details may be processed and compared with data stored within a detail library 113 to identify, match, and/or generate the details. In addition, the detail matcher/generator 114 may identify, match, and/or generate the various details using various machine learning, image processing, edge detection, surface detection, feature detection, and/or other algorithms and techniques. Outputs of the detail matcher/generator 114 may include details from the detail library 113 that may be identified as matches to details identified within the photogrammetry mesh 110, details identified within the photogrammetry mesh 110 that are modified based on matching details from the detail library 113, and/or details identified within the photogrammetry mesh 110 that are not substantially modified.

The photogrammetry mesh 110 may also be provided as inputs to a texture matcher/generator 116, which may be an application executed on the user device or a computing device other than the user device. The texture matcher/generator 116 may identify, match, and/or generate various textures associated with the room or space, such as materials, colors, shades, hues, smoothness, reflectivity, lighting effects, or other textures associated with a floor, walls, ceiling, objects, furniture, or other surfaces or aspects of the room or space. In addition, various textures may be received from a user, e.g., by inputs received via a user device. Further, the various textures may be processed and compared with data stored within a texture library 115 to identify, match, and/or generate the textures. In addition, the texture matcher/generator 116 may identify, match, and/or generate the various textures using various machine learning, image processing, edge detection, surface detection, feature detection, and/or other algorithms and techniques. Outputs of the texture matcher/generator 116 may include textures from the texture library 115 that may be identified as matches to textures identified within the photogrammetry mesh 110, textures identified within the photogrammetry mesh 110 that are modified based on matching textures from the texture library 115, and/or textures identified within the photogrammetry mesh 110 that are not substantially modified.

Outputs from the room geometry generator 112, the detail matcher/generator 114, and the texture matcher/generator 116 may then be provided as inputs to a room modeler 118, which may be an application executed on the user device or a computing device other than the user device. The room modeler 118 may generate a three-dimensional model of the room 120 based on the three-dimensional geometric shell of the room or space generated by the room geometry generator 112, and including the various details generated by the detail matcher/generator 114 and the various textures generated by the texture matcher/generator 116, e.g., utilizing various machine learning, geometric computer vision, image processing, geometric calculation, position and orientation tracking, edge detection, surface detection, feature detection, and/or other algorithms and techniques. Then, while viewing or using the three-dimensional model of the room 120, e.g., via a user device or other computing device, the user device or other computing device may communicate with various remote computing resources and/or other sources of data or information, including product catalogs or other repositories of items of interest, such that a user may identify, select, place, move, manipulate, evaluate, or modify one or more items of interest with respect to the three-dimensional model of the room 120.

Additionally, the AR capture application 102 may include one or more applications that may be executed by a processor and provide outputs of object pictures 126. As described further herein, the object pictures 126 may be captured based on traversal of one or more paths around objects using an imaging sensor of the user device. The one or more paths may be determined based on the dimensions of objects and/or various other movement data of the user device relative to objects. The object pictures 126 may include images of portions of the objects, in which each image includes at least a threshold amount of overlap with at least one other image. Further, the object pictures 126 may be associated with position and orientation information of the user device at the time of capture via the inertial measurement unit of the user device.

The object pictures 126 may be provided as inputs to a photogrammetry processor 128, which may be an application executed on the user device or a computing device other than the user device. One example photogrammetry processor may include Photoscan available from Agisoft®. The photogrammetry processor 128 may also receive as inputs position and orientation information of the user device at the time of capture of the object pictures 126. Based at least in part on the object pictures 126 and the position and orientation information of the user device, the photogrammetry processor 128 may generate a photogrammetry mesh 130 of objects. The photogrammetry mesh 130 may comprise a three-dimensional, composite mesh of substantially all the object pictures 126 that have been combined, e.g., utilizing various image processing, feature detection, machine learning, geometric computer vision, and/or other algorithms and techniques.

In addition, the photogrammetry mesh 110 of the room or space may be processed by an object classifier/segmenter 132, which may be an application executed on the user device or a computing device other than the user device. The object classifier/segmenter 132 may identify and/or generate various objects that were captured as part of the room pictures 106 and processed as part of the photogrammetry mesh 110 of the room or space, e.g., utilizing various machine learning, image processing, edge detection, surface detection, feature detection, and/or other algorithms and techniques.

The photogrammetry mesh 130 of objects and outputs of the object classifier/segmenter 132 may be provided as inputs to an object matcher/generator 134, which may be an application executed on the user device or a computing device other than the user device. The object matcher/generator 134 may identify, match, and/or generate various objects associated with the room or space, such as furniture, sofas, chairs, stools, tables, stands, lamps, lights, or other objects. In addition, various objects, or aspects thereof, may be received from a user, e.g., by inputs received via a user device. Further, the various objects may be processed and compared with data stored within an object library 133 to identify, match, and/or generate the objects. In addition, the object matcher/generator 134 may identify, match, and/or generate the various objects using various machine learning, image processing, edge detection, surface detection, feature detection, and/or other algorithms and techniques. Outputs of the object matcher/generator 134 may include objects from the object library 133 that may be identified as matches to objects identified within the photogrammetry mesh 130 or matches to objects identified by the object classifier/segmenter 132 within the photogrammetry mesh 110, objects identified within the photogrammetry meshes 110, 130 that are modified based on matching objects from the object library 133, and/or objects identified within the photogrammetry meshes 110, 130 that are not substantially modified.

Further, outputs from the object matcher/generator 134 may also be provided as inputs to the room modeler 118, which may be an application executed on the user device or a computing device other than the user device. The room modeler 118 may generate a three-dimensional model of the room 120 based on the three-dimensional geometric shell of the room or space generated by the room geometry generator 112, and including the various objects generated by the object matcher/generator 134, e.g., utilizing various machine learning, geometric computer vision, image processing, geometric calculation, position and orientation tracking, edge detection, surface detection, feature detection, and/or other algorithms and techniques.

In example embodiments, the room measurements 104, room pictures 106, photogrammetry room mesh 110, geometric shell generated by the room geometry generator 112, and the three-dimensional model of the room or space may be generally described herein in the context of enabling users to generate three-dimensional models of their rooms or spaces and subsequently designing and/or modifying such rooms or spaces using virtual reality, mixed reality, and/or augmented reality. For example, such three-dimensional models of rooms or spaces may allow rapid iterations of interior design and modification, and may enable more informed and satisfied purchase decisions based on such design and modification.

In other example embodiments, the various portions or outputs of the system diagram of FIG. 1 may be utilized for various other applications. For example, identifying dimensions or measurements of a room or space and generating three-dimensional models of rooms or spaces may enable users to set boundaries or usable space for other applications within virtual reality, mixed reality, or augmented reality environments, such as games, entertainment, or other applications. In addition, identifying dimensions or measurements of a room or space and generating three-dimensional models of rooms or spaces may enable users to set boundaries or limits related to operations of other semi-autonomous or autonomous systems, such as autonomous or driverless vehicles, autonomous or robotic delivery applications, robotic assistance applications such as robotic vacuum or cleaning applications, or various other connected home applications. Further, identifying dimensions or measurements of a room or space and generating three-dimensional models of rooms or spaces may enable users to set boundaries or limits related to operations of various security applications, such as setting acceptable camera viewing locations, acceptable camera sweep angles, or other parameters to maintain security and privacy.

Further, identifying dimensions or measurements of a room or space and generating three-dimensional models of rooms or spaces may enable various items, such as televisions, sofas, furniture, tables, paints, floor coverings, or other items, to be recommended to or identified for users to ensure acceptable fit and function. Moreover, identifying dimensions or measurements of a room or space and generating three-dimensional models of rooms or spaces may enable users to determine optimal placement and operation of various types of devices, such as lamps, lights, audio speakers, televisions, air purifiers, fans, air conditioners, heaters, network or WiFi access points, connected home devices, or other devices or systems.

Figure 2:
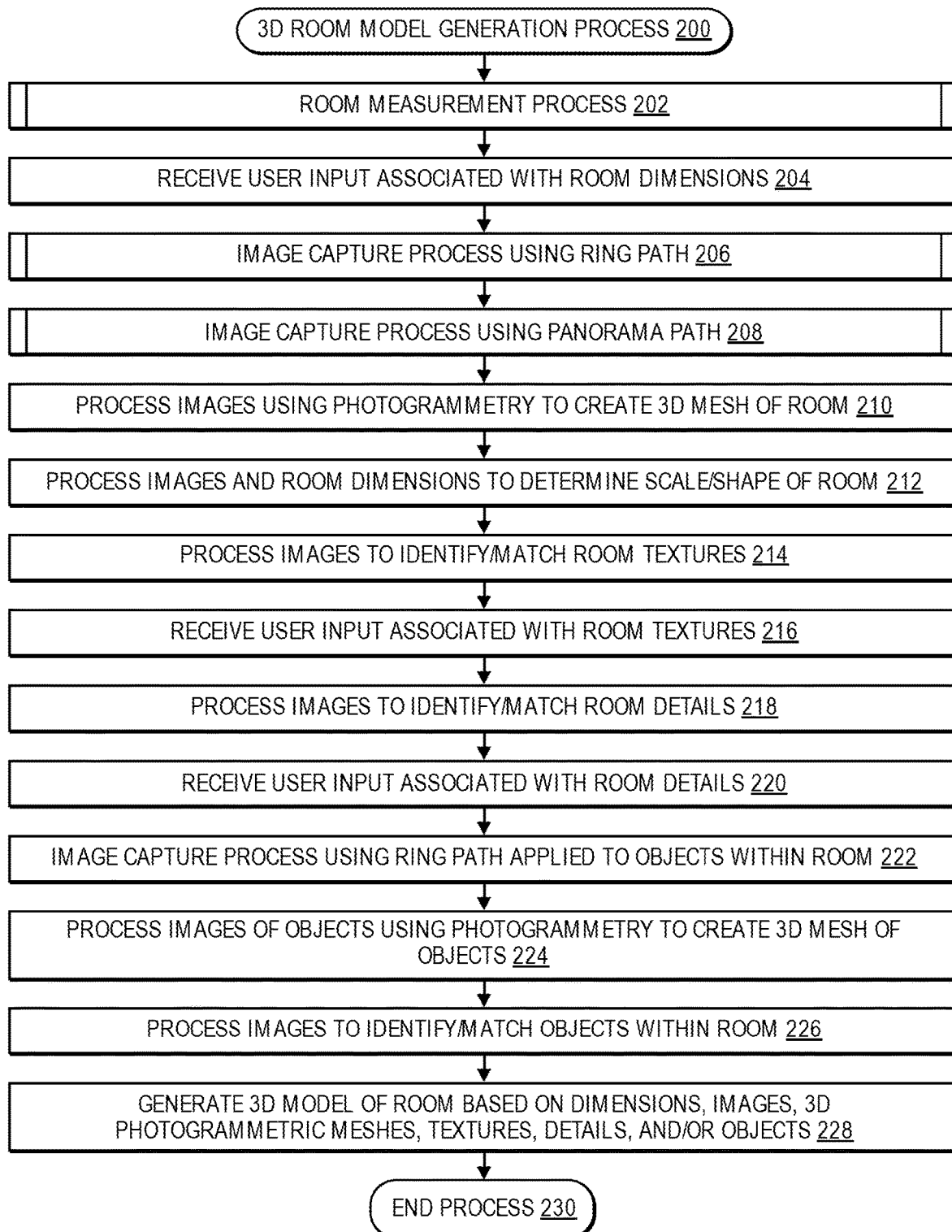
FIG. 2 is a flow diagram illustrating an example three-dimensional room model generation process, in accordance with disclosed implementations.

FIG. 2 is a flow diagram illustrating an example three-dimensional room model generation process 200, in accordance with disclosed implementations.

The process 200 may begin with a room measurement process, as at 202. As further described herein at least with respect to FIGS. 6A-6E, upon receiving user consent, the room measurement process may include generating a local coordinate frame for measuring a room or space using a user device, determining a floor plane of the room or space using the user device, determining one or more wall planes of the room or space using the user device, and determining a ceiling plane of the room or space using the user device. Various sensors of the user device may be utilized during the room measurement process, including an inertial measurement unit, an imaging sensor, and/or other sensors. In addition, the various data detected by the sensors may be processed, analyzed, or calculated to determine each of the floor plane, the one or more walls planes, and the ceiling plane of the room or space.

The process 200 may proceed, optionally, with receiving user input associated with room dimensions, as at 204. For example, a user may separately measure or identify one or more dimensions of a room or space, such as lengths of one or more walls, a ceiling height, or other dimensions. In addition, an electronic tape measure and/or a digital measurement application may be associated with the user device to measure or identify one or more dimensions of a room or space. Further, various documents or forms, such as building floor plans, appraisal reports, public land records, or others, may be provided, retrieved, scanned, or otherwise received by a user device to identify or determine one or more dimensions of a room or space. In some example embodiments, the user device may provide one or more prompts, fields, or forms that may be filled with such measured or identified dimensions. The room dimensions provided as user input may be used as additional inputs to the process, and/or may be used to validate other portions of the process.

The process 200 may then continue with an image capture process using ring paths, as at 206. As further described herein at least with respect to FIGS. 11A-11C, upon receiving user consent, the image capture process using ring paths may include generating a ring path within the room or space based at least in part on the room measurements and/or movement of the user device within the room, generating a target along the ring path, and generating a reticle within a display of the user device. For example, the ring path may be a scaled down version of the walls of the room and may be substantially centered within the room. In addition, the target may be placed on a portion of the ring path closest to a current position of the user device. Further, the user may be instructed to place the target within the reticle presented via the display and traverse around the ring path. In this manner, a field of view of an imaging sensor of the user device may extend substantially across the room or space during traversal of the user device around the ring path, and images of the room or space may be captured, upon receiving user consent, during the traversal of the user device. Further, during the image capture process, data associated with position and/or orientation of the user device may be captured upon receiving user consent, e.g., using an inertial measurement unit of the user device, and the position and/or orientation data may be associated with particular images captured at such positions and/or orientations.

Alternatively or in addition to step 206, the process 200 may then proceed with an image capture process using panorama paths, as at 208. As further described herein at least with respect to FIGS. 15A and 15B, upon receiving user consent, the image capture process using panorama paths may include generating a panorama path comprising one or more locations within the room or space based at least in part on the room measurements and/or movement of the user device within the room, generating a direction or order of traversal among the one or more locations of the panorama path, and generating a direction or order of sweep of the user device at each of the one or more locations of the panorama path. For example, the one or more locations of the panorama path may comprise locations associated with corners and/or edges of the room or space. In addition, the order of traversal among the one or more locations may be counterclockwise or clockwise, from a top-down view of the room or space. Further, the direction of sweep of the user device at each of the one or more locations may be left-to-right or right-to-left, from a top-down view of the room or space. Moreover, a user may be instructed to traverse the user device among the one or more locations of the panorama path, and the user may also be instructed to sweep the user device at each of the one or more locations of the panorama path. In this manner, an imaging sensor of the user device may capture images, upon receiving user consent, during traversal among the one or more locations, and the imaging sensor may also capture images, upon receiving user consent, during sweeps at each of the one or more locations, during which a field of view of the imaging sensor may sweep over an arc from one edge or end of the room or space to another edge or end of the room or space. Further, during the image capture process, data associated with position and/or orientation of the user device may be captured upon receiving user consent, e.g., using an inertial measurement unit of the user device, and the position and/or orientation data may be associated with particular images captured at such positions and/or orientations.

The process 200 may then continue by processing the images using photogrammetry to create a three-dimensional mesh of the room, as at 210. For example, various photogrammetry algorithms and techniques, such as photogrammetry processor 108, may be used to process the images captured using ring paths and/or panorama paths. Generally, an image that may be processed using photogrammetry may overlap at least approximately 30% with at least one other image to be processed. In other embodiments, the amount of overlap between at least two images to be processed using photogrammetry may be less, e.g., at least approximately 20%, or greater, e.g., at least approximately 50%, at least approximately 60%, or more. For example, a desired amount of overlap between images may be obtained by processing to determine an actual amount of overlap between images, adjusting a frame rate of an imaging sensor, providing guidance or cues related to a rate of movement of an imaging sensor, and/or providing guidance or cues related to capture of additional or supplemental imaging data. Further, the photogrammetry algorithms and techniques may utilize the position and/or orientation data associated with each particular image during the image capture process to expedite processing and/or reduce computational load associated with the creation of the three-dimensional photogrammetric mesh of the room or space, as the position and/or orientation data may facilitate the accurate positioning or placement of images relative to each other during photogrammetry processing.

The process 200 may then proceed by processing the images and room dimensions to determine scale and shape of the room, as at 212. For example, various geometry generator algorithms and techniques, such as room geometry generator 112, may be used to process the images and room dimensions or measurements to generate a three-dimensional geometric shell of the room or space. In some embodiments, the room dimensions or measurements may be used to generate the three-dimensional geometric shell of the room or space, and the photogrammetry mesh of the room or space may be stretched, shrunken, scaled, or otherwise modified to match the size, scale, and shape of the three-dimensional geometric shell of the room or space.

The process 200 may then continue, optionally, to process the images to identify or match room textures, as at 214. For example, various image processing and classification algorithms and techniques, such as a texture matcher/generator 116, may process the images and/or the photogrammetry mesh to identify various textures associated with the room or space, such as materials, colors, shades, hues, smoothness, reflectivity, lighting effects, or other textures. In addition, the identified textures may be matched with various known textures, and/or one or more textures may be generated based on the identified or matched textures. Further, in example embodiments in which the images are known to be associated with rooms or spaces having flat floors, walls, ceilings, or other surfaces, textures of such surfaces may be assumed to be relatively flat, thereby facilitating faster processing and less computational load. In addition, the process 200 may further proceed, optionally, to receive user input associated with room textures, as at 216. For example, a user may separately provide or identify one or more textures of a room or space. In some example embodiments, the user device may provide one or more prompts, fields, or forms that may be filled with such identified textures. The room textures provided as user input may be used as additional inputs to the process, and/or may be used to validate other portions of the process.

The process 200 may then continue, optionally, to process the images to identify or match room details, as at 218. For example, various image processing and classification algorithms and techniques, such as a detail matcher/generator 114, may process the images and/or the photogrammetry mesh to identify various details associated with the room or space, such as egresses, doors, windows, fireplaces, floorings, moldings, built-in furniture such as cabinets or shelves, switches, outlets, vents, or other details. In addition, the identified details may be matched with various known details, and/or one or more details may be generated based on the identified or matched details. In addition, the process 200 may further proceed, optionally, to receive user input associated with room details, as at 220. For example, a user may separately provide or identify one or more details of a room or space. In some example embodiments, the user device may provide one or more prompts, fields, or forms that may be filled with such identified details. The room details provided as user input may be used as additional inputs to the process, and/or may be used to validate other portions of the process.

The process 200 may then continue, optionally, to an image capture process using ring paths applied to objects within the room, as at 222. For example, as further described herein at least with respect to FIGS. 11A-11C, upon receiving user consent, the image capture process using ring paths may include generating a ring path around an object based at least in part on the object measurements and/or movement of the user device relative to the object, generating a target along the ring path, and generating a reticle within a display of the user device. For example, the ring path may be a scaled up version of the outer periphery of the object and may be substantially centered about the object. In addition, the target may be placed on a portion of the ring path closest to a current position of the user device. Further, the user may be instructed to place the target within the reticle presented via the display and traverse around the ring path. In this manner, a field of view of an imaging sensor of the user device may extend substantially directly toward the object during traversal of the user device around the ring path, and images of the object may be captured, upon receiving user consent, during the traversal of the user device. Further, during the image capture process, data associated with position and/or orientation of the user device may be captured upon receiving user consent, e.g., using an inertial measurement unit of the user device, and the position and/or orientation data may be associated with particular images captured at such positions and/or orientations.

The process 200 may then continue, optionally, by processing the images of objects using photogrammetry to create three-dimensional meshes of the objects, as at 224. For example, various photogrammetry algorithms and techniques, such as photogrammetry processor 108, may be used to process the images captured using ring paths. Generally, an image that may be processed using photogrammetry may overlap at least approximately 30% with at least one other image to be processed. In other embodiments, the amount of overlap between at least two images to be processed using photogrammetry may be less, e.g., at least approximately 20%, or greater, e.g., at least approximately 50%, at least approximately 60%, or more. For example, a desired amount of overlap between images may be obtained by processing to determine an actual amount of overlap between images, adjusting a frame rate of an imaging sensor, providing guidance or cues related to a rate of movement of an imaging sensor, and/or providing guidance or cues related to capture of additional or supplemental imaging data. Further, the photogrammetry algorithms and techniques may utilize the position and/or orientation data associated with each particular image during the image capture process to expedite processing and/or reduce computational load associated with the creation of the three-dimensional photogrammetric mesh of the object, as the position and/or orientation data may facilitate the accurate positioning or placement of images relative to each other during photogrammetry processing.

The process 200 may then continue, optionally, to process the images to identify or match room objects, as at 226. For example, various image processing and classification algorithms and techniques, such as an object matcher/generator 134, may process the images and/or the photogrammetry mesh to identify various objects associated with the room or space, such as furniture, sofas, chairs, stools, tables, stands, lamps, lights, or other objects. In addition, the identified objects may be matched with various known objects, and/or one or more objects may be generated based on the identified or matched objects. Further, in example embodiments in which the images are known to be associated with rooms or spaces having various furniture or objects, identified objects may be assumed to be in contact with the floor, walls, ceiling, or other surfaces, thereby facilitating faster processing and less computational load. In addition, user input associated with room objects or aspects thereof may, optionally, be received. For example, a user may separately provide or identify one or more objects or aspects thereof of a room or space. In some example embodiments, the user device may provide one or more prompts, fields, or forms that may be filled with such identified objects or aspects thereof. The room objects or aspects thereof provided as user input may be used as additional inputs to the process, and/or may be used to validate other portions of the process.

The process 200 may then proceed to generate a three-dimensional model of the room based on the dimensions, images, three-dimensional photogrammetric meshes, textures, details, and/or objects, as at 228. For example, various three-dimensional modeling algorithms or techniques, such as a room modeler 118, may receive and process the various data associated with the room or space, as described herein, and may generate a three-dimensional model of the room or space that accurately reflects various aspects of the actual, real-world room or space, including size, scale, shape, textures or surface features, details or fixtures, objects or furniture, and/or other aspects of the room or space. The three-dimensional model of the room or space may be generated with various levels or degrees of resolution. For example, depending on characteristics of the computing device and associated display that may render, display, or present the three-dimensional model, the three-dimensional model may be generated with a level of resolution high enough to enable photorealistic rendering of the model while also minimizing the computation load and processing time associated with the model. In some examples, embodiments, multiple three-dimensional models of a room or space at different levels of resolution may be generated, e.g., using remote or cloud computing device, and one of the multiple three-dimensional models may be selected for transmission to and presentation by a user computing device based on characteristics of the user computing device and associated display.

Figure 3A:
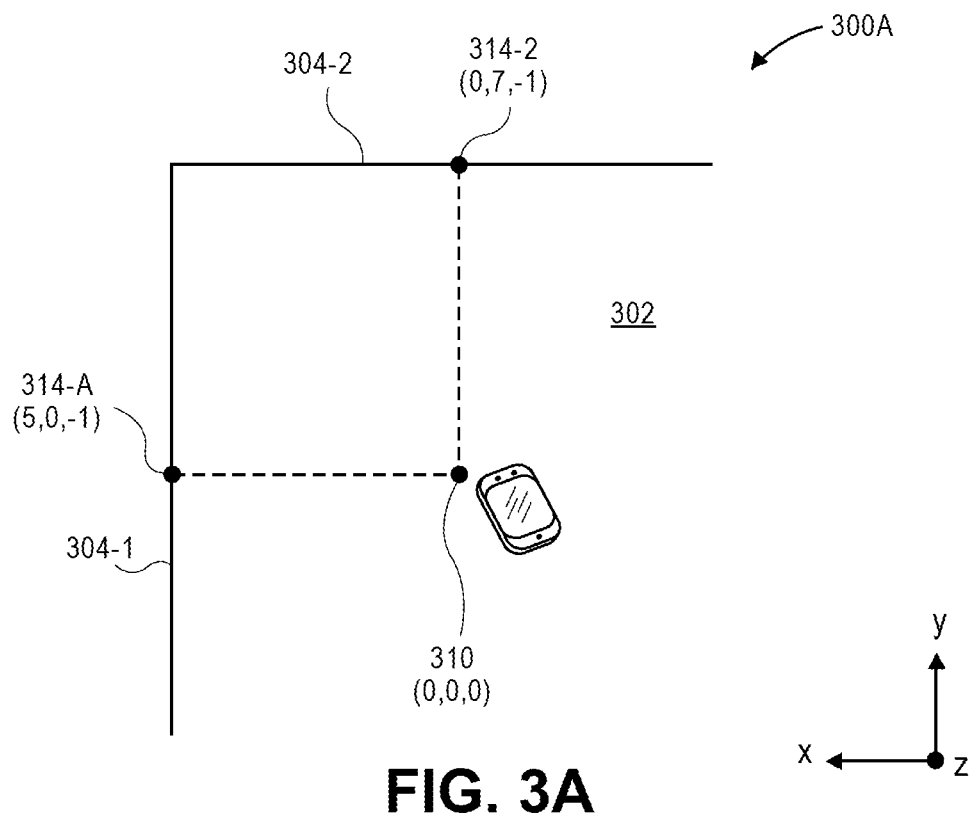
FIG. 3A is a schematic diagram of an example of local coordinate frame generation, in accordance with disclosed implementations.

FIG. 3A is a schematic diagram 300A of an example of local coordinate frame generation, in accordance with disclosed implementations.

FIG. 3A illustrates a schematic top-down view of an example user device 310 within a room or space. The user device 310 may be a mobile computing device, such as a smartphone, and may comprise a processor, a memory having executable instructions and one or more applications, one or more inputs such as buttons, a touchscreen, and/or microphones, one or more outputs such as a display and/or speakers, one or more sensors such as an inertial measurement unit, an imaging sensor, and/or other sensors, and/or any or all features described herein with respect to user devices. The room or space may be bounded by a floor 302 or lower, substantially horizontal boundary, at least two walls 304-1, 304-2 or substantially vertical boundaries, and a ceiling (not shown) or upper, substantially horizontal boundary.

During operation of the user device 310, e.g., during startup or initialization of the user device, the user device 310 may initialize one or more of its sensors, such as an inertial measurement unit, accelerometer, gyroscope, or magnetometer. In addition, the user device 310 may designate a local coordinate frame for position and orientation tracking of the user device, such as a local xyz coordinate frame. Further, the user device 310 may designate a current position within the local coordinate frame, as measured by one or more of the inertial measurement unit, accelerometer, gyroscope, or magnetometer, as a home or starting position. For example, the home or starting position may be designated with xyz coordinates of (0,0,0) in units of meters. As shown in FIG. 3A, the home position may be associated with a position within the bounds of the room at which a user is holding the user device 310 during operation, startup, or initialization. In other embodiments, the home or starting position may be designated with any other xyz coordinates using any other units of measure.

Then, during continued operation of the user device 310, movement of the user device 310 may be tracked, upon receiving user consent, within the local coordinate frame and with reference to the home or starting position. For example, as shown in FIG. 3A, position and orientation information of the user device 310 may be tracked by one or more of the inertial measurement unit, accelerometer, gyroscope, or magnetometer within the local xyz coordinate frame and with reference to the home position designated as (0,0,0).

Figure 3B:
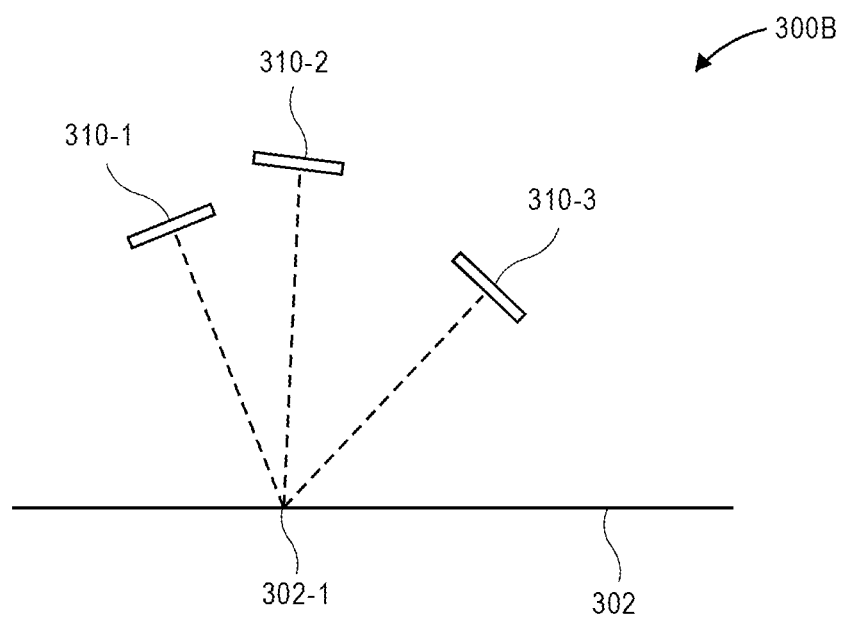
FIG. 3B is a schematic diagram of an example of floor plane determination, in accordance with disclosed implementations.
Figure 3C:
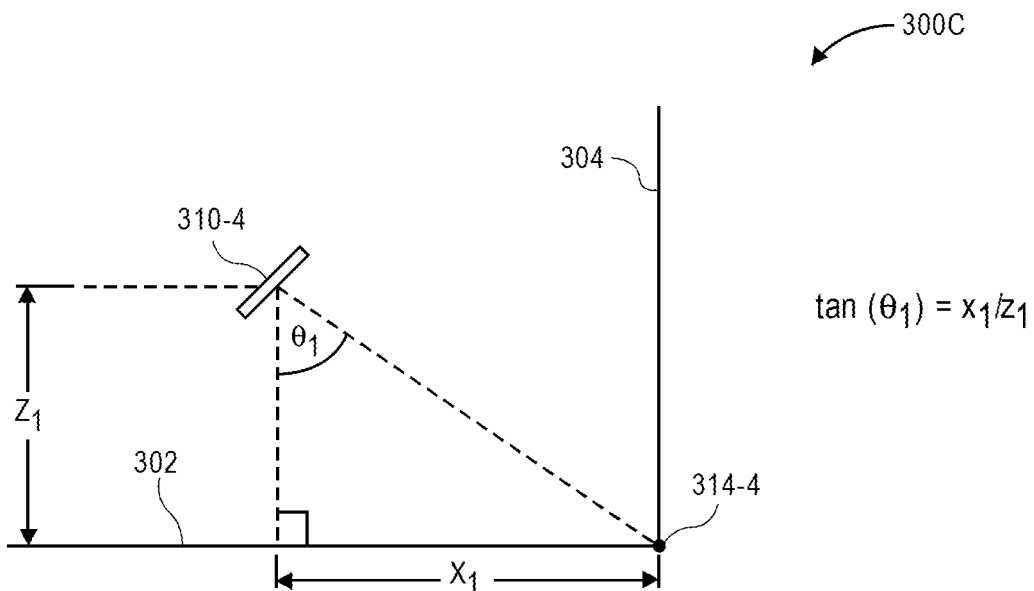
FIG. 3C is a schematic diagram of an example of wall plane determination, in accordance with disclosed implementations.

In the example shown in FIG. 3A, upon receiving an indication associated with a base 314-1 of wall 304-1, as described in greater detail with respect to at least FIG. 3C, the base 314-1 of the wall 304-1 may be identified as a point with coordinates (5,0,−1) within the local xyz coordinate frame and with reference to the home position having coordinates (0,0,0), which may mean that the base 314-1 of the wall 304-1 is five meters in the positive X direction relative to the home position, zero meters in either the positive or negative Y direction relative to the home position, and one meter in the negative Z direction (toward the floor 302) relative to the home position.

As another example, upon receiving an indication associated with a base 314-2 of wall 304-2, as described in greater detail with respect to at least FIG. 3C, the base 314-2 of the wall 304-2 may be identified as a point with coordinates (0,7,−1) within the local xyz coordinate frame and with reference to the home position having coordinates (0,0,0), which may mean that the base 314-2 of the wall 304-2 is zero meters in the positive or negative X direction relative to the home position, seven meters in the positive Y direction relative to the home position, and one meter in the negative Z direction (toward the floor 302) relative to the home position.

In this manner, position and orientation information or data of the user device 310 within a room or space may be continually tracked and stored, upon receiving user consent, such that dimensions or measurements of the room may be determined and size, scale, and shape of the room may also be determined upon identification of bounds, e.g., floor, walls, and ceiling, of the room within the local coordinate frame and with reference to the home or starting position. Further, the position and orientation information or data of the user device 310 may be associated with various other data, e.g., imaging data, other data, user inputs, or other inputs or indications, during movement of the user device 310 within the room and/or at the time of detection of such other data, inputs, or indications, in order to correlate the various other data with particular positions and/or orientations of the user device 310 during operation and/or movement.

FIG. 3B is a schematic diagram 300B of an example of floor plane determination, in accordance with disclosed implementations.

FIG. 3B illustrates a schematic side view of an example user device 310 within a room or space at three different points in time, e.g., user device 310-1 at time 1, user device 310-2 at time 2, and user device 310-3 at time 3. The user device 310 may be a mobile computing device, such as a smartphone, and may comprise any or all features described herein with respect to user devices. The room or space may be bounded by a floor 302 or lower, substantially horizontal boundary, walls (not shown) or substantially vertical boundaries, and a ceiling (not shown) or upper, substantially horizontal boundary.

In order to determine a floor plane associated with the floor 302, the user device 310 may be moved between various positions within the room or space, such as the three positions of the user device 310-1, 310-2, 310-3 illustrated in FIG. 3B. During movement of the user device 310, an imaging sensor of the user device 310 may have at least a portion of the floor 302 within a field of view, and various features of the floor 302 may be present within images captured by the imaging sensor. For example, various features, such as feature 302-1, on the floor 302 may be identified within each of the images captured at the three positions of the user device 310-1, 310-2, 310-3, e.g., using various image processing, feature detection, and/or other algorithms and techniques.

In addition, during movement of the user device and capture of images using the imaging sensor, position and orientation data associated with the user device may also be captured using an inertial measurement unit of the user device. Based at least in part on the identified features, such as feature 302-1, associated with the floor 302 and captured at the different positions of the user device 310-1, 310-2, 310-3, and position and orientation data associated with the user device at the time of capture of the identified features, such as feature 302-1, at the different positions of the user device 310-1, 310-2, 310-3, angles and distances between the identified features and different positions of the user device may be determined in order to triangulate positions of the identified features within the local coordinate frame. Upon identifying angles and distances between at least three features on the floor 302 and different positions of the user device at which the at least three features were captured using an imaging sensor, a floor plane associated with the floor 302 may be determined within the local coordinate frame. Additional identified features captured from different positions of the user device may further refine the determination of the floor plane associated with the floor 302 within the local coordinate frame. In other example embodiments, the user device may comprise a depth sensor that detects depth data that may further aid the determination of distances between the user device and various identified features of the floor.

In this manner, a floor plane associated with a floor of a room or space may be determined within a local coordinate frame using imaging data captured by an imaging sensor of a user device and position and orientation information or data detected by an inertial measurement unit of the user device, e.g., by identifying within imaging data various features associated with the floor using image processing, feature detection, and/or other algorithms or techniques, and by calculating and/or triangulating angles and distances between the identified features associated with the floor and positions and orientations of the user device relative to such identified features.

FIG. 3C is a schematic diagram 300C of an example of wall plane determination, in accordance with disclosed implementations.

FIG. 3C illustrates a schematic side view of an example user device 310-4 within a room or space. The user device 310-4 may be a mobile computing device, such as a smartphone, and may comprise any or all features described herein with respect to user devices. The room or space may be bounded by a floor 302 or lower, substantially horizontal boundary, at least one wall 304 or substantially vertical boundary, and a ceiling (not shown) or upper, substantially horizontal boundary.

In order to determine a wall plane associated with a wall 304, the user device 310-4 may be moved to a position to indicate a base 314-4 of the wall 304. For example, as further described herein, various visual cues or indications may be displayed via a display of the user device to enable a user to indicate the base 314-4 of the wall 304, overlaid or along with imaging data captured via an imaging sensor of the user device. One example visual cue may be a substantially horizontal line displayed at a known position, e.g., at a substantially constant position, within the display of the user device. Upon matching or lining up the visual cue displayed within the display of the user device with the base 314-4 of the wall 304 within the imaging data, the user may provide an indication via the user device to identify the base 314-4 of the wall 304. For example, the user may provide user input via a button, a user interface element via a touchscreen, an audible input, or various other inputs.

Responsive to or concurrently with receiving the user indication that identifies the base 314-4 of the wall 304, position and orientation data associated with the user device at the time of the user indication may be determined using an inertial measurement unit of the user device. Based on the position and orientation data of the user device and based on a previously determined or known floor plane position within the local coordinate frame, a distance between the user device and the floor plane may be determined at the time of the user indication. In addition, an orientation or angle of the imaging sensor of the user device at the time of the user indication relative to the floor plane may also be determined based on the position and orientation data of the user device. Further, based on the distance between the user device and the floor plane, and the orientation or angle of the imaging sensor relative to the floor plane, a distance between the user device and a wall plane associated with the wall 304 may be determined.

For example, as shown in FIG. 3C, the distance between the user device and the floor plane may be labeled as $z_1$, the orientation or angle of the imaging sensor relative to the floor plane may be labeled as $\Theta_1$, and the distance between the user device and the wall plane may be labeled as $x_1$. Then, because $z_1$ and $\Theta_1$ are previously determined or known, the following trigonometric equation may be solved to determine $x_1$.

$$\tan(\Theta_1) = x_1/z_1$$

Additional wall planes associated with one or more additional walls may also be determined in similar manner as described above using position and orientation data of the user device, a previously determined or known floor plane position, orientation data of an imaging sensor of the user device, and user indications of bases of such one or more additional walls. In other example embodiments, the user device may comprise a depth sensor that detects depth data that may further aid the determination of distances between the user device and the floor plane, the base of the wall, and/or the wall plane.

In this manner, one or more wall planes associated with walls that bound a room or space may be determined within a local coordinate frame using position and orientation data of a user device and a floor plane position, e.g., by calculating distances and angles between the user device and the floor plane position, in order to determine distances to the one or more wall planes within the local coordinate frame, e.g., by trigonometric calculation of such distances.

In some example embodiments, multiple points, e.g., corners or other points, along a base of a wall may be identified by user indications. Respective distances from the user device to each of the multiple points may be determined in order to determine a line that intersects each of the multiple points along the base of the wall, and then to determine a wall plane that coincides with the line (and the multiple points) along the base of the wall. In other example embodiments, a line (rather than individual points) along the base of the wall may be identified by a user indication. Then, the distance from the user device to any point along the line may be determined, and a wall plane may be determined that intersects the point (and coincides with the line) along the base of the wall. Further, in some example embodiments, edge, line, surface, or feature detection algorithms and techniques may be used to aid the user in aligning the visual cue or indication displayed via the display of the user device with one or more points or a line associated with a base of the wall.

Figure 3D:
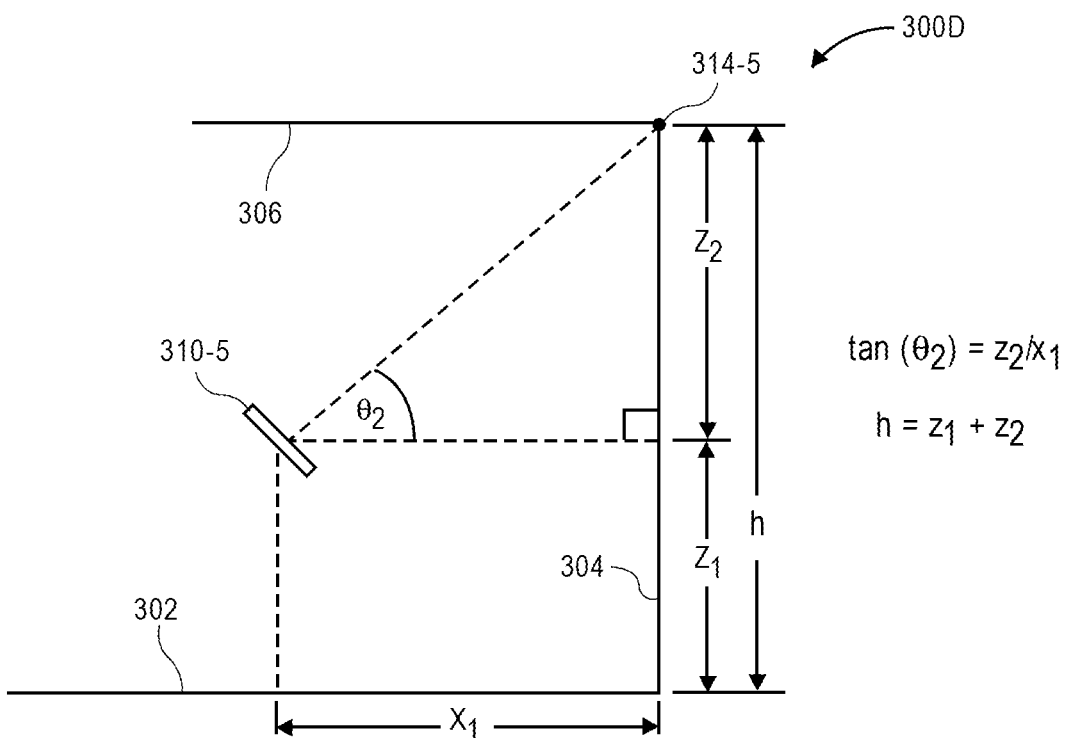
FIG. 3D is a schematic diagram of an example of ceiling plane determination, in accordance with disclosed implementations.

FIG. 3D is a schematic diagram of an example of ceiling plane determination, in accordance with disclosed implementations.

FIG. 3D illustrates a schematic side view of an example user device 310-5 within a room or space. The user device 310-5 may be a mobile computing device, such as a smartphone, and may comprise any or all features described herein with respect to user devices. The room or space may be bounded by a floor 302 or lower, substantially horizontal boundary, at least one wall 304 or substantially vertical boundary, and a ceiling 306 or upper, substantially horizontal boundary.

In order to determine a ceiling plane associated with a previously identified or known wall 304 of a room, the user device 310-5 may be moved to a position to indicate a top 314-5 of the wall 304. For example, as further described herein, various visual cues or indications may be displayed via a display of the user device to enable a user to indicate the top 314-5 of the wall 304, overlaid or along with imaging data captured via an imaging sensor of the user device. One example visual cue may be a substantially horizontal line displayed at a known position, e.g., at a substantially constant position, within the display of the user device. Upon matching or lining up the visual cue displayed within the display of the user device with the top 314-5 of the wall 304 within the imaging data, the user may provide an indication via the user device to identify the top 314-5 of the wall 304.

For example, the user may provide user input via a button, a user interface element via a touchscreen, an audible input, or various other inputs.

Responsive to or concurrently with receiving the user indication that identifies the top 314-5 of the wall 304, position and orientation data associated with the user device at the time of the user indication may be determined using an inertial measurement unit of the user device. Based on the position and orientation data of the user device and based on a previously determined or known floor plane position within the local coordinate frame, a distance between the user device and the floor plane may be determined at the time of the user indication. In addition, based on the position and orientation data of the user device and based on a previously determined or known wall plane position within the local coordinate frame, a distance between the user device and the wall plane associated with the wall 304 may be determined at the time of the user indication. Furthermore, an orientation or angle of the imaging sensor of the user device at the time of the user indication relative to the floor plane may also be determined based on the position and orientation data of the user device. Further, based on the distance between the user device and the floor plane, the distance between the user device and the wall plane, and the orientation or angle of the imaging sensor relative to the floor plane, a distance between the user device and a ceiling plane associated with the ceiling 306 may be determined, such that an overall height of the ceiling plane relative to the floor plane within the local coordinate frame may be determined.

For example, as shown in FIG. 3D, the distance between the user device and the floor plane may be labeled as $z_1$, the distance between the user device and the wall plane may be labeled as $x_1$, the orientation or angle of the imaging sensor relative to the floor plane may be labeled as $\Theta_2$, the distance between the user device and the ceiling plane may be labeled as $z_2$, and the overall height of the ceiling plane relative to the floor plane may be labeled as h. Then, because $x_1$ and $\Theta_2$ are previously determined or known, the following trigonometric equation may be solved to determine $z_2$.

$$\tan(\Theta_2) = z_2/x_1$$

Further, because $z_1$ is previously determined or known, the following equation may be solved to determine the overall height h of the ceiling plane relative to the floor plane.

$$h = z_1 + z_2$$

Additional portions or sections of the ceiling plane associated with one or more additional walls, e.g., gabled, angled, vaulted, or otherwise non-horizontal ceiling planes, may also be determined in similar manner as described above using position and orientation data of the user device, a previously determined or known floor plane position, a previously determined or known wall plane position, orientation data of an imaging sensor of the user device, and user indications of tops of such one or more additional wall planes. In other example embodiments, the user device may comprise a depth sensor that detects depth data that may further aid the determination of distances between the user device and the floor plane, the top of the wall, the wall planes, and/or the ceiling plane.

In this manner, a ceiling plane associated with walls that bound a room or space may be determined within a local coordinate frame using position and orientation data of a user device, a floor plane position, and a wall plane position, e.g., by calculating distances and angles between the user device and the floor plane position and between the user device and the wall plane position, in order to determine a distance to the ceiling plane within the local coordinate frame, e.g., by trigonometric calculation of such distance.

In some example embodiments, multiple points, e.g., corners or other points, along a top of a wall may be identified by user indications. Respective distances from the user device to each of the multiple points may be determined in order to determine a line that intersects each of the multiple points along the top of the wall, and then to determine a ceiling plane that coincides with the line (and the multiple points) along the top of the wall. In other example embodiments, a line (rather than individual points) along the top of the wall may be identified by a user indication. Then, the distance from the user device to any point along the line may be determined, and a ceiling plane may be determined that intersects the point (and coincides with the line) along the top of the wall. Further, in some example embodiments, edge, line, surface, or feature detection algorithms and techniques may be used to aid the user in aligning the visual cue or indication displayed via the display of the user device with one or more points or a line associated with a top of the wall.

Although FIGS. 3A-3D illustrate particular positions, orientations, or configurations of the user device and particular numbers of identified features, points, lines, edges, or surfaces of floors, walls, and/or ceilings, various other positions, orientations, and configurations of the user device, as well as various other numbers of identified features, points, lines, edges, or surfaces of floors, walls, and/or ceilings may be used to determine dimensions or measurements of a room or space. Further, in some example embodiments, a user may provide user input directly related to dimensions or measurements of a room or space, e.g., by filling in prompts or fields displayed via display of the user device with dimensions or measurements taken or previously known to the user. Such user input may be directly used as dimensions or measurements of the room, and/or may be used to validate the various processes and systems used to determine dimensions or measurements of a room as described herein.

Further, during any of the various operations or processes described herein with respect to determining dimensions or measurements of a room or space, an imaging sensor of the user device may capture images of the room or space, along with position and orientation data of the user device at the time of such capture, and the captured images and position and orientation data may be used as additional inputs to the photogrammetry processor to create a photogrammetry mesh of the room, as further described herein.

FIGS. 4A-4K are example user interface screens illustrating steps of an example room measurement process with augmented reality guidance, in accordance with disclosed implementations.

As described herein with respect to FIGS. 4A-4K, upon receiving user consent, a user device may initiate various sensors associated with the user device, may initialize position and orientation tracking using one or more sensors, may designate a local coordinate frame and/or a home position, and may initiate tracking of the position and orientation of the user device within the local coordinate frame. In addition, the user device may receive position and orientation data and may receive imaging data from an imaging sensor to identify features associated with a lower boundary and determine the lower boundary position within the local coordinate frame. Further, the user device may present, via a display, a visual guide overlaying a field of view of the imaging sensor, may receive an indication of a vertical boundary associated with the visual guide, and may receive position and orientation data to determine the vertical boundary position within the local coordinate frame. Moreover, the user device may present, via a display, a visual guide overlaying a field of view of the imaging sensor, may receive an indication of an upper boundary associated with the visual guide, and may receive position and orientation data to determine the upper boundary position within the local coordinate frame.

Figure 4C:
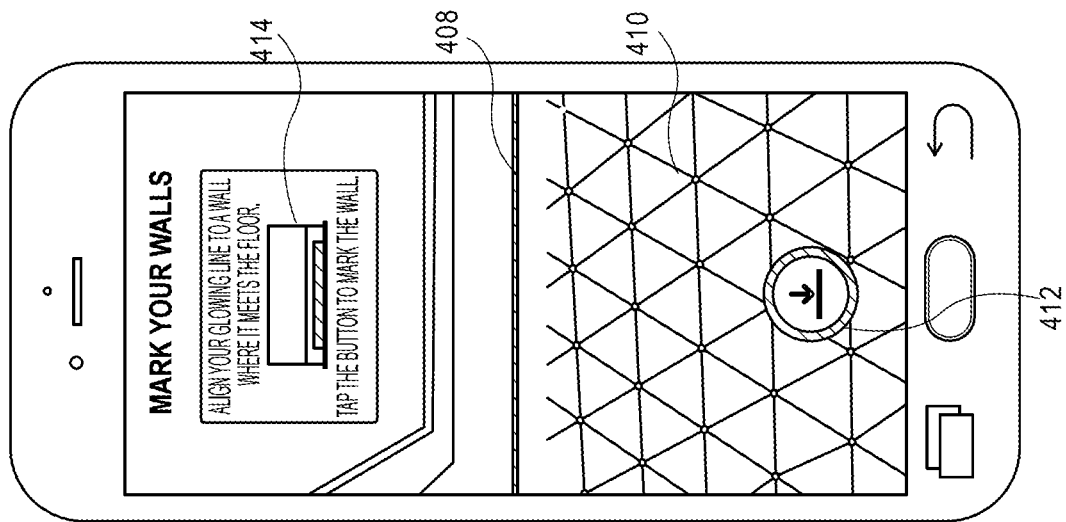
Figure 4B:
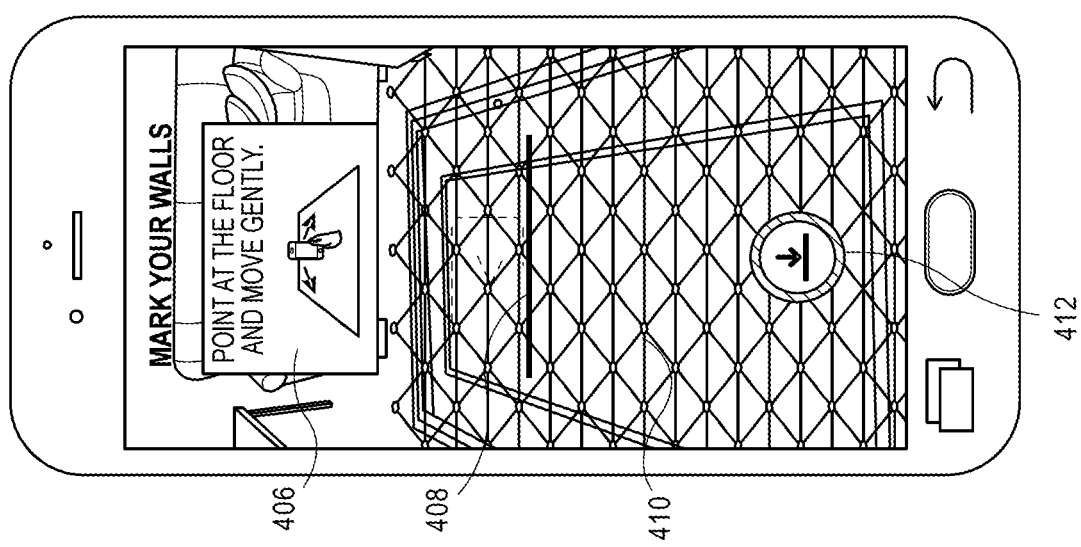
Figure 4A:
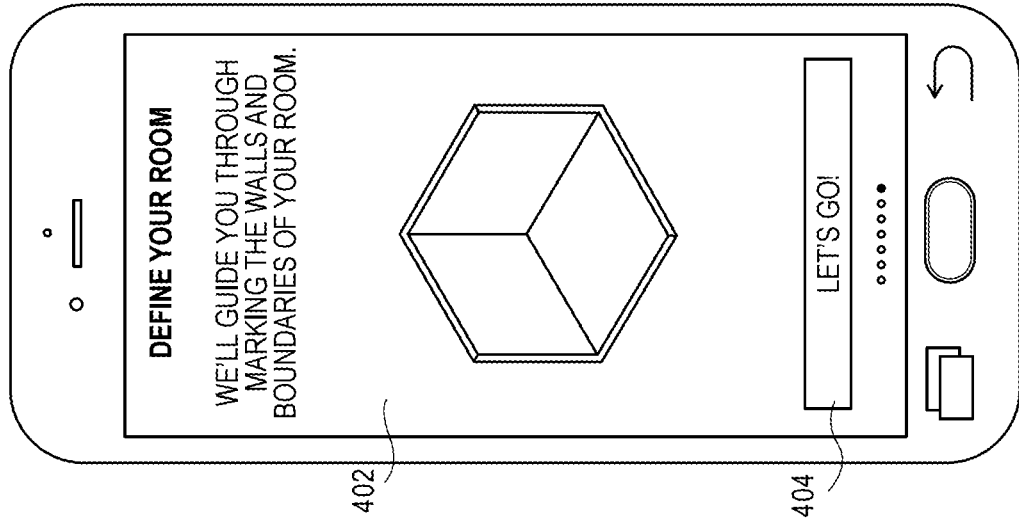

FIG. 4A illustrates an example user interface screen related to initiating the room measurement process. For example, the example user interface screen may include an indication 402 related to beginning the room measurement process, and may also include a confirmation user interface element 404. User input may be received via the confirmation user interface element 404 to begin the room measurement process, e.g., via a touchscreen, stylus, or other user input.

FIG. 4B illustrates an example user interface screen related to initializing one or more sensors of the user device, designating a local coordinate frame for operation of the user device, and determining a floor plane of the room using the user device. For example, the example user interface screen may include an indication 406 related to initializing the user device and determining a floor plane of the room, such as pointing the user device toward the floor such that a field of view of an imaging sensor of the user device includes at least a portion of the floor and moving the user device while maintaining at least a portion of the floor within the field of view of the imaging sensor. In addition, imaging data captured via an imaging sensor of the user device may be presented via a display of the user device.

During such movement of the user device, the user device may initialize one or more sensors, such as the imaging sensor, a depth sensor, an inertial measurement unit, other position or orientation sensors, or various other sensors. In addition, as described herein, the user device may designate a local coordinate frame for operation of the user device, and may determine a home or starting position within the local coordinate frame relative to which movement of the user device may be tracked, upon receiving user consent, within the local coordinate frame. Further, as described herein, the imaging sensor of the user device may capture images and/or identify various features associated with the floor and determine a floor plane position of the floor based at least in part on the identified features and position and orientation data of the user device with respect to the identified features.

Upon determining the floor plane position of the floor, the example user interface screen may also include a visual grid, overlay, or pattern 410 indicating the floor plane position, such as a triangular, rectangular, diamond, colored, solid, semi-transparent, or other grids, overlays, or patterns. The visual grid 410 may be presented as extending continuously in all directions, fading towards outer edges in all directions, stopping at identified bases of walls within the room, and/or fading towards edges prior to intersecting any identified bases of walls within the room. In addition, the visual grid 410 may be presented with semi-transparent points, lines, and/or colors or other similar visual effects, such that the overlay of the visual grid 410 on top of objects that may be separated or on top of a floor plane position within the imaging data does not cause confusion with users as to the actual location of the floor plane position indicated by the visual grid 410.

Moreover, the example user interface screen may also include a substantially horizontal line indication 408 that may be used in later portions of the process to mark or identify bases and/or tops of walls to determine one or more wall planes and/or a ceiling plane. The horizontal line indication 408 may be presented with a first size, length, thickness, color, transparency, and/or other visual characteristic, e.g., relatively small, short, thin, with a first color, and/or with greater transparency, when the indication 408 is not aligned with a line that is recognized within the imaging data, e.g., using computer vision, edge or line detection, and/or other algorithms and techniques. In addition, the horizontal line indication 408 may include various other shapes, sizes, or visual presentations, which may be selected by a user, such as one or more angled indicators to mark a corner, doorway, or other angled boundary of the room or space, and/or one or more arced or curved indicators to mark a curved wall or other arced boundary of the room or space. Then, the dimensions of the room or space may be determined using equations, which are modified as compared to those described herein, that take into account the angled indicators and/or arced or curved indicators and their various geometric properties.

Further, in some example embodiments, the horizontal line indication 408 may be generated and projected within three-dimensional space relative to imaging data that is presented via a display of the user device, and the horizontal line indication 408 may be projected onto a floor or floor plane of the room or space to facilitate identification of one or more walls or wall planes, and/or the horizontal line indication 408 may be projected onto a wall or wall plane of the room or space to facilitate identification of one or more ceilings or ceiling planes. In other example embodiments, the horizontal line indication 408 may be generated and presented in two-dimensional space within the display of the user device, and the horizontal line indication 408 may be aligned with bases or edges of one or more walls or wall planes to facilitate identification of one or more walls or wall planes, and/or the horizontal line indication 408 may be aligned with tops or edges of one or more walls or wall planes to facilitate identification of one or more ceilings or ceiling planes.

Further, the example user interface screen may also include a wall placement user interface element 412 configured to receive an identification of a base of a wall. User input may be received via the wall placement user interface element 412 responsive to the user aligning the horizontal line indication 408 with a base of a wall to identify the wall, e.g., via a touchscreen, stylus, or other user input.

FIG. 4C illustrates an example user interface screen related to marking or identifying a base of a wall using the user device, to identify the wall and/or the wall plane. For example, the example user interface screen may include an indication 414 related to aligning the horizontal line indication 408 with a base of a wall within the room. In addition, imaging data captured via an imaging sensor of the user device may be presented via a display of the user device. As described herein, the example user interface screen may also include a visual grid, overlay, or pattern 410 indicating the floor plane position. The visual grid 410 may be presented as extending continuously in all directions, fading towards outer edges in all directions, stopping at identified bases of walls within the room, and/or fading towards edges prior to intersecting any identified bases of walls within the room.

In addition, the example user interface screen may also include a substantially horizontal line indication 408 that may be used to mark or identify bases of walls to determine one or more wall planes. The horizontal line indication 408 may be presented with a first size, length, thickness, color, transparency, and/or other visual characteristic, e.g., relatively small, short, thin, with a first color, and/or with greater transparency, when the indication 408 is not aligned with a line that is recognized within the imaging data, e.g., using computer vision, edge or line detection, and/or other algorithms and techniques, and as shown in FIG. 4C, when the indication 408 is aligned with a recognized line within the imaging data, the horizontal line indication 408 may be presented with a second size, length, thickness, color, transparency, and/or other visual characteristic, e.g., larger, longer, thicker, with a different color, and/or with less transparency. Moreover, the horizontal line indication 408 may be presented substantially horizontal and at a relatively constant position within the display of the user device. However, responsive to substantially aligning the horizontal line indication 408 with a line that is recognized within the imaging data using computer vision, edge or line detection, and/or other algorithms and techniques, the horizontal line indication 408 may move or rotate to match or align with the recognized line. In some example embodiments, the horizontal line indication 408 may be substantially centered vertically within the display of the user device, and in other example embodiments, the horizontal line indication 408 may be at a substantially constant position within a lower half or lower third of the display of the user device. Further, the example user interface screen may also include a wall placement user interface element 412 configured to receive an identification of a base of a wall. User input may be received via the wall placement user interface element 412 responsive to the user aligning the horizontal line indication 408 with a base of a wall to identify the wall, e.g., via a touchscreen, stylus, or other user input.

FIG. 4D illustrates an example user interface screen related to marking or identifying a base of an additional wall using the user device, to identify the additional wall and/or the additional wall plane. For example, the example user interface screen may include an indication 416 related to aligning the horizontal line indication 408 with a base of an additional wall within the room. In addition, imaging data captured via an imaging sensor of the user device may be presented via a display of the user device. Further, the example user interface screen may also include an indication 418 that provides a textual cue or guidance to the user, such as guiding the user movement closer to walls to facilitate wall placement, which may be presented based on position and orientation data of the user device and/or outputs of computer vision, edge or line detection, and/or other algorithms and techniques that may be processing the imaging data to identify edges or lines associated with bases of walls.

As described herein, the example user interface screen may also include a visual grid, overlay, or pattern 410 indicating the floor plane position. The visual grid 410 may be presented as extending continuously in all directions, fading towards outer edges in all directions, stopping at identified bases of walls within the room, and/or fading towards edges prior to intersecting any identified bases of walls within the room. In addition, the example user interface screen may also include a substantially horizontal line indication 408 that may be used to mark or identify bases of walls to determine one or more wall planes. The horizontal line indication 408 may be presented with a first size, length, thickness, color, transparency, and/or other visual characteristic, e.g., relatively small, short, thin, with a first color, and/or with greater transparency, when the indication 408 is not aligned with a line that is recognized within the imaging data, e.g., using computer vision, edge or line detection, and/or other algorithms and techniques. Further, the example user interface screen may also include a wall placement user interface element 412 configured to receive an identification of a base of a wall. User input may be received via the wall placement user interface element 412 responsive to the user aligning the horizontal line indication 408 with a base of a wall to identify the wall, e.g., via a touchscreen, stylus, or other user input.

FIG. 4E illustrates an example user interface screen related to marking or identifying a base of a further wall using the user device, to identify the further wall and/or the further wall plane. For example, the example user interface screen may include an indication 420 related to aligning the horizontal line indication 408 with a base of a further wall within the room. In addition, imaging data captured via an imaging sensor of the user device may be presented via a display of the user device.

As described herein, the example user interface screen may also include a visual grid, overlay, or pattern 410 indicating the floor plane position. The visual grid 410 may be presented as extending continuously in all directions, fading towards outer edges in all directions, stopping at identified bases of walls within the room, and/or fading towards edges prior to intersecting any identified bases of walls within the room. In addition, the example user interface screen may also include a substantially horizontal line indication 408 that may be used to mark or identify bases of walls to determine one or more wall planes. The horizontal line indication 408 may be presented with a first size, length, thickness, color, transparency, and/or other visual characteristic, e.g., relatively small, short, thin, with a first color, and/or with greater transparency, when the indication 408 is not aligned with a line that is recognized within the imaging data, e.g., using computer vision, edge or line detection, and/or other algorithms and techniques. Further, the example user interface screen may also include a wall placement user interface element 412 configured to receive an identification of a base of a wall. User input may be received via the wall placement user interface element 412 responsive to the user aligning the horizontal line indication 408 with a base of a wall to identify the wall, e.g., via a touchscreen, stylus, or other user input.

FIG. 4F illustrates an example user interface screen related to completing the wall identification process, and/or editing or deleting an identified wall or wall plane using the user device. For example, the example user interface screen may include an indication 422 related to identifying a wall or wall plane to edit or delete by aligning the horizontal line indication 408 with a base of the wall or wall plane to be edited or deleted. In addition, imaging data captured via an imaging sensor of the user device may be presented via a display of the user device. Moreover, the example user interface screen may include a confirmation user interface element 424 to indicate completion of marking or identification of all walls or wall planes. User input may be received via the confirmation user interface element 424 to complete the wall marking or identification process, e.g., via a touchscreen, stylus, or other user input. Further, the example user interface screen may also include an indication 418 that provides a textual cue or guidance to the user, such as guiding the user movement closer to walls to facilitate wall editing or deletion, which may be presented based on position and orientation data of the user device and/or outputs of computer vision, edge or line detection, and/or other algorithms and techniques that may be processing the imaging data to identify edges or lines associated with bases of walls.

As described herein, the example user interface screen may also include a visual grid, overlay, or pattern 410 indicating the floor plane position. The visual grid 410 may be presented as extending continuously in all directions, fading towards outer edges in all directions, stopping at identified bases of walls within the room, and/or fading towards edges prior to intersecting any identified bases of walls within the room. In addition, the example user interface screen may also include a substantially horizontal line indication 408 that may be used to select or identify bases of walls to edit or delete one or more walls or wall planes. The horizontal line indication 408 may be presented with a first size, length, thickness, color, transparency, and/or other visual characteristic, e.g., relatively small, short, thin, with a first color, and/or with greater transparency, when the indication 408 is not aligned with a line that is recognized within the imaging data, e.g., using computer vision, edge or line detection, and/or other algorithms and techniques, and/or when the indication 408 is not aligned with a previously marked or identified wall or wall plane. Moreover, the example user interface screen may also include a wall base indication 409 to indicate one or more marked or identified walls or wall planes within the room. The wall base indication 409 may be presented with a second size, length, thickness, color, transparency, and/or other visual characteristic, e.g., larger, longer, thicker, with a different color, and/or with less transparency, as compared to the horizontal line indication 408 when not aligned with a recognized lined within the imaging data. In addition, a wall base indication 409 may be presented as extending continuously in both directions, fading towards outer ends in both directions, stopping at identified bases of other walls within the room, and/or fading towards outer ends prior to intersecting any identified bases of other walls within the room. Further, the example user interface screen may also include a wall placement user interface element 412 configured to receive an identification of a base of a wall. User input may be received via the wall placement user interface element 412 responsive to the user aligning the horizontal line indication 408 with a base of a wall to identify the wall, e.g., via a touchscreen, stylus, or other user input.

Figure 4I:
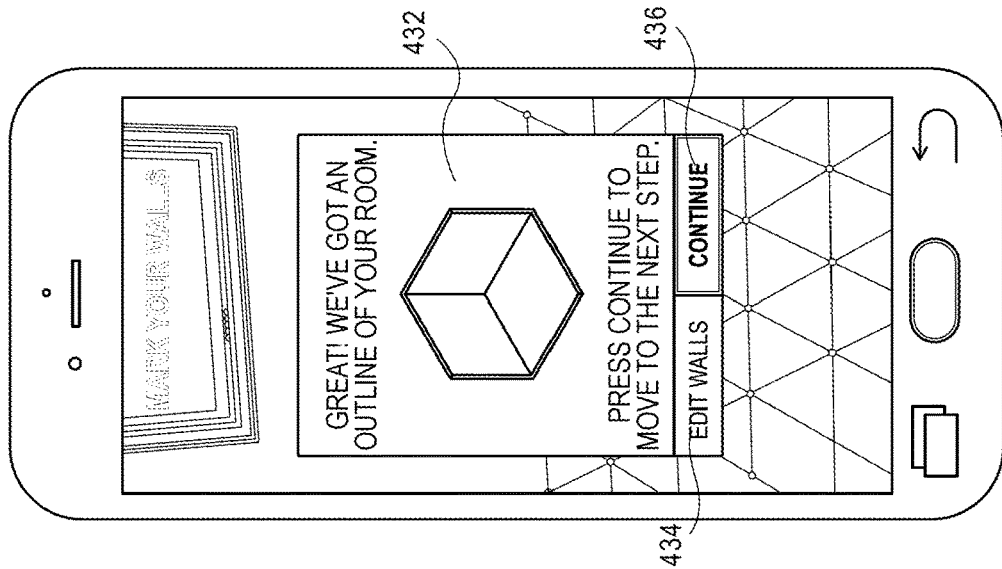
Figure 4H:
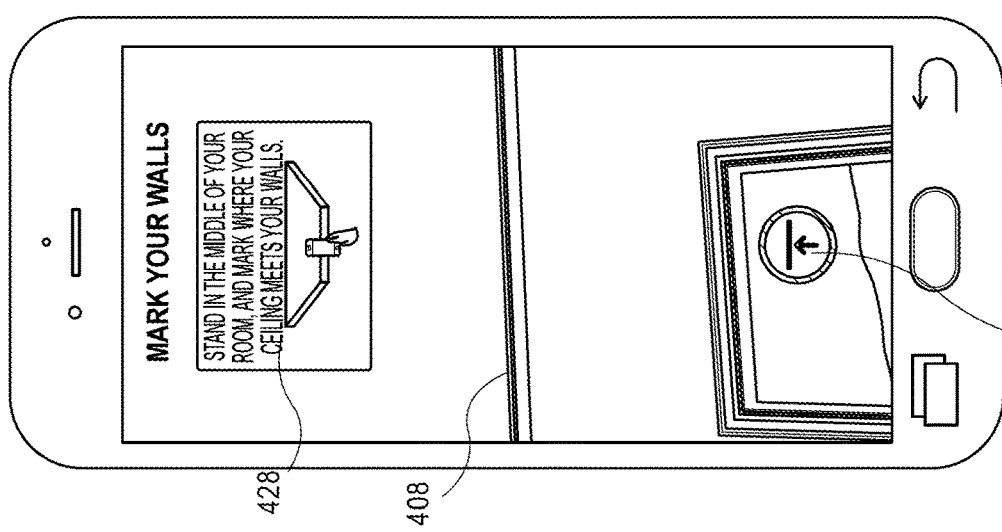
Figure 4G:
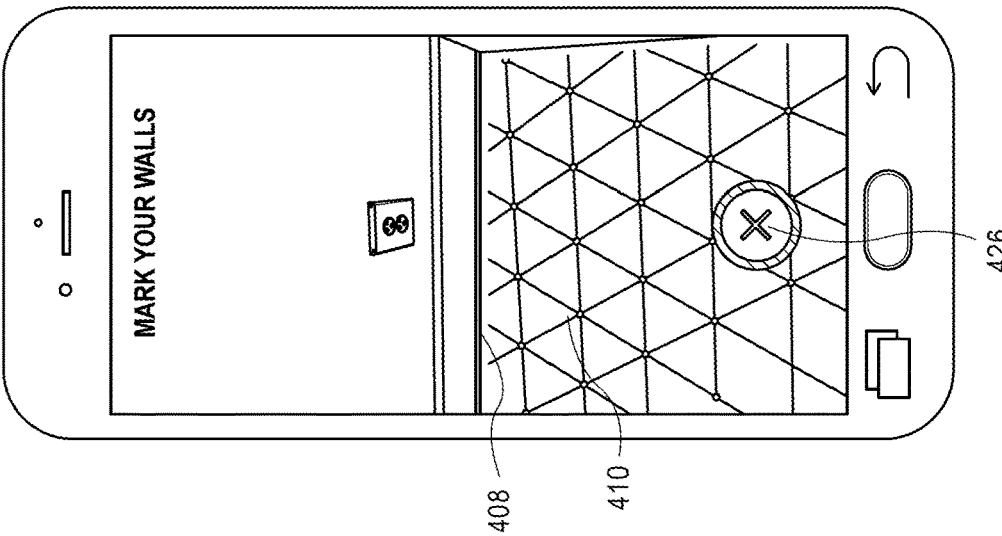

FIG. 4G illustrates an example user interface screen related to editing or deleting an identified wall or wall plane using the user device. For example, the example user interface screen may include a substantially horizontal line indication 408 that may be used to select or identify bases of walls to edit or delete one or more wall planes. The horizontal line indication 408 may be presented with a first size, length, thickness, color, transparency, and/or other visual characteristic, e.g., relatively small, short, thin, with a first color, and/or with greater transparency, when the indication 408 is not aligned with a line that is recognized within the imaging data, e.g., using computer vision, edge or line detection, and/or other algorithms and techniques, and may be presented with a second size, length, thickness, color, transparency, and/or other visual characteristic, e.g., larger, longer, thicker, with a different color, and/or with less transparency, when the indication 408 is aligned with a previously marked or identified wall or wall plane, such as wall base indication 409 in FIG. 4F. In addition, imaging data captured via an imaging sensor of the user device may be presented via a display of the user device.

Responsive to aligning the horizontal line indication 408 with a previously marked or identified wall or wall plane, e.g., based on image processing, edge or line detection, and/or other algorithms and techniques to detect aligning the indication 408 with a wall base indication, such as wall base indication 409 in FIG. 4F, the example user interface screen may include a wall removal user interface element 426 to indicate deletion of the identified wall or wall plane. User input may be received via the wall removal user interface element 426 to delete the identified wall or wall plane, e.g., via a touchscreen, stylus, or other user input. As described herein, the example user interface screen may also include a visual grid, overlay, or pattern 410 indicating the floor plane position. The visual grid 410 may be presented as extending continuously in all directions, fading towards outer edges in all directions, stopping at identified bases of walls within the room, and/or fading towards edges prior to intersecting any identified bases of walls within the room.

FIG. 4H illustrates an example user interface screen related to marking or identifying a top of a wall using the user device, to identify the ceiling and/or the ceiling plane. For example, the example user interface screen may include an indication 428 related to marking or identifying a top of a wall, e.g., by aligning a horizontal line indication 408 with a top of a wall within the room. In addition, imaging data captured via an imaging sensor of the user device may be presented via a display of the user device. Further, the example user interface screen may also include a substantially horizontal line indication 408 that may be used to mark or identify tops of walls to determine one or more ceiling planes. The horizontal line indication 408 may be presented with a first size, length, thickness, color, transparency, and/or other visual characteristic, e.g., relatively small, short, thin, with a first color, and/or with greater transparency, when the indication 408 is not aligned with a line that is recognized within the imaging data, e.g., using computer vision, edge or line detection, and/or other algorithms and techniques, and as shown in FIG. 4H, when the indication 408 is aligned with a recognized line within the imaging data, the horizontal line indication 408 may be presented with a second size, length, thickness, color, transparency, and/or other visual characteristic, e.g., larger, longer, thicker, with a different color, and/or with less transparency. Further, the example user interface screen may also include a ceiling placement user interface element 430 configured to receive an identification of a top of a wall. User input may be received via the ceiling placement user interface element 430 responsive to the user aligning the horizontal line indication 408 with a top of a wall to identify the ceiling, e.g., via a touchscreen, stylus, or other user input.

FIG. 4I illustrates an example user interface screen related to completing the floor, wall, and ceiling identification processes, and/or editing or deleting an identified wall, wall plane, ceiling, or ceiling plane using the user device. For example, the example user interface screen may include an indication 432 related to completion of marking or identification of all walls, wall planes, ceilings, and ceiling planes. In addition, imaging data captured via an imaging sensor of the user device may be presented via a display of the user device. Further, the example user interface screen may include a confirmation user interface element 436 to indicate completion of marking or identification of all walls, wall planes, ceilings, and ceiling planes. User input may be received via the confirmation user interface element 436 to complete the wall and ceiling marking or identification processes, e.g., via a touchscreen, stylus, or other user input. Further, the example user interface screen may also include an edit user interface element 434 related to editing or deleting of an identified wall, wall plane, ceiling, or ceiling plane. User input may be received via the edit user interface element 434 to edit or delete one or more walls, wall planes, ceilings, or ceiling planes, e.g., via a touchscreen, stylus, or other user input. For example, responsive to selection of the edit user interface element 434, the example user interface screen may return to one similar to that shown and described with respect to at least one of FIGS. 4C-4H, by which one or more marked or identified walls or ceilings may be marked or identified, and/or selected for editing or deletion. In addition, the example user interface screen may enable marking or identification of one or more additional walls or ceilings as described herein.

Figure 4K:
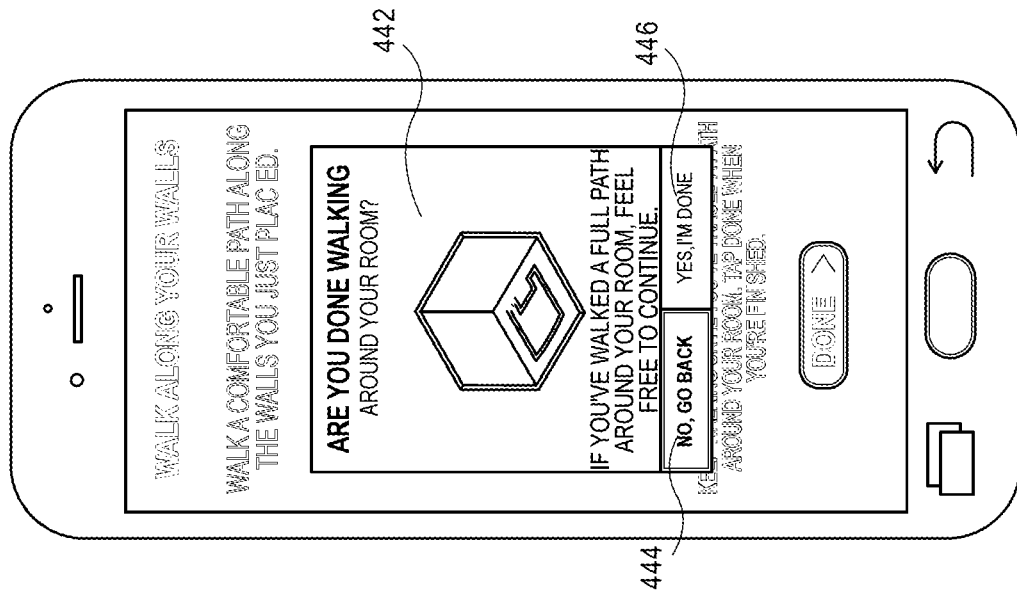
Figure 4J:
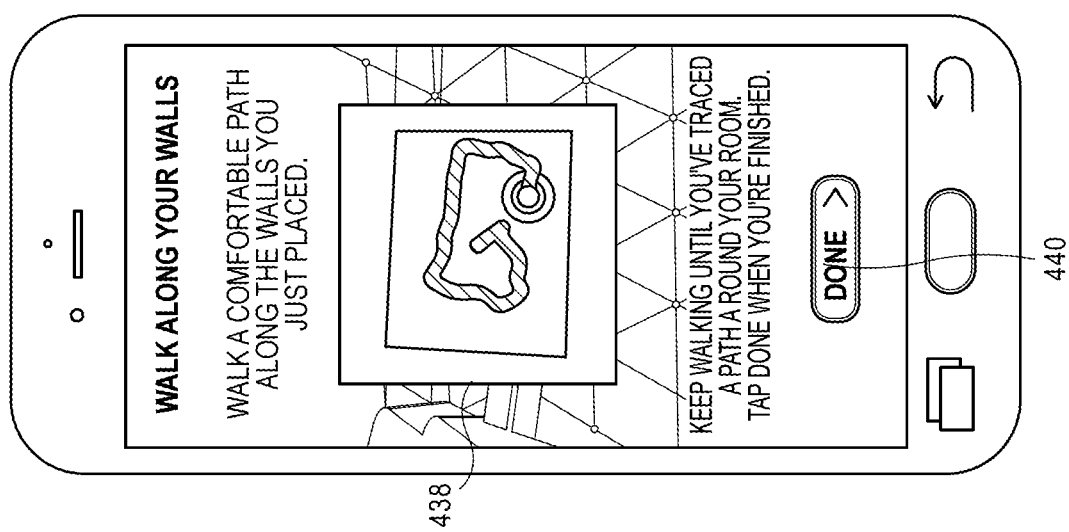

FIG. 4J illustrates an example user interface screen related to receiving movement data of the user device within the room or space. For example, the example user interface screen may include an indication 438 related to instructions for a user to move or walk within or around the room. The indication 438 may also include a top down view of the room and a marker associated with a position of the user device that moves within the top down view of the room, e.g., based on position and orientation data of the user device within the local coordinate frame and bounded by marked or identified walls or wall planes. In addition, imaging data captured via an imaging sensor of the user device may be presented via a display of the user device. Further, the example user interface screen may also include a confirmation user interface element 440 related to completion of movement of the user device within the room. User input may be received via the confirmation user interface element 440 to indicate completion of movement of the user device, e.g., via a touchscreen, stylus, or other user input.

FIG. 4K illustrates an example user interface screen related to completion of movement of the user device within the room or space. For example, the example user interface screen may include an indication 442 related to completion by a user of movement of the user device within or around the room. In addition, imaging data captured via an imaging sensor of the user device may be presented via a display of the user device. Further, the example user interface screen may also include a return user interface element 444 related to editing or returning to the movement of the user device within the room. User input may be received via the return user interface element 444 to indicate editing or returning to the movement of the user device, e.g., via a touchscreen, stylus, or other user input. Further, the example user interface screen may also include a confirmation user interface element 446 related to completion of movement of the user device within the room. User input may be received via the confirmation user interface element 446 to indicate completion of movement of the user device, e.g., via a touchscreen, stylus, or other user input.

FIGS. 5A-5H are example user interface screens illustrating steps of another example room measurement process with augmented reality guidance, in accordance with disclosed implementations.

As described herein with respect to FIGS. 5A-5H, upon receiving user consent, a user device may initiate various sensors associated with the user device, may initialize position and orientation tracking using one or more sensors, may designate a local coordinate frame and/or a home position, and may initiate tracking of the position and orientation of the user device within the local coordinate frame. In addition, the user device may receive position and orientation data and may receive imaging data from an imaging sensor to identify features associated with a lower boundary and determine the lower boundary position within the local coordinate frame. Further, the user device may present, via a display, a visual guide overlaying a field of view of the imaging sensor, may receive an indication of a vertical boundary associated with the visual guide, and may receive position and orientation data to determine the vertical boundary position within the local coordinate frame. Moreover, the user device may present, via a display, a visual guide overlaying a field of view of the imaging sensor, may receive an indication of an upper boundary associated with the visual guide, and may receive position and orientation data to determine the upper boundary position within the local coordinate frame.

FIG. 5A illustrates an example user interface screen related to initiating the room measurement process. For example, the example user interface screen may include an indication 502 related to beginning the room measurement process, and may also include a confirmation user interface element 504. User input may be received via the confirmation user interface element 504 to begin the room measurement process, e.g., via a touchscreen, stylus, or other user input.

FIG. 5B illustrates an example user interface screen related to initializing one or more sensors of the user device, designating a local coordinate frame for operation of the user device, and determining a floor plane of the room using the user device. For example, the example user interface screen may include an indication 506 related to initializing the user device and determining a floor plane of the room, such as pointing the user device toward the floor such that a field of view of an imaging sensor of the user device includes at least a portion of the floor and moving the user device while maintaining at least a portion of the floor within the field of view of the imaging sensor. In addition, imaging data captured via an imaging sensor of the user device may be presented via a display of the user device.

During such movement of the user device, the user device may initialize one or more sensors, such as the imaging sensor, a depth sensor, an inertial measurement unit, other position or orientation sensors, or various other sensors. In addition, as described herein, the user device may designate a local coordinate frame for operation of the user device, and may determine a home or starting position within the local coordinate frame relative to which movement of the user device may be tracked, upon receiving user consent, within the local coordinate frame. Further, as described herein, the imaging sensor of the user device may capture images and/or identify various features associated with the floor and determine a floor plane position of the floor based at least in part on the identified features and position and orientation data of the user device with respect to the identified features.

FIG. 5C illustrates an example user interface screen related to marking or identifying a base of a wall using the user device, to identify the wall and/or the wall plane. For example, the example user interface screen may include an indication 510 related to aligning a horizontal line indication 508 with a base of a wall within the room. In addition, imaging data captured via an imaging sensor of the user device may be presented via a display of the user device.

The example user interface screen may also include the substantially horizontal line indication 508 that may be used to mark or identify bases of walls to determine one or more wall planes. The horizontal line indication 508 may be presented with a first size, length, thickness, color, transparency, and/or other visual characteristic, e.g., relatively small, short, thin, with a first color, and/or with greater transparency, when the indication 508 is not aligned with a line that is recognized within the imaging data, e.g., using computer vision, edge or line detection, and/or other algorithms and techniques, and as shown in FIG. 5C, when the indication 508 is aligned with a recognized line within the imaging data, the horizontal line indication 508 may be presented with a second size, length, thickness, color, transparency, and/or other visual characteristic, e.g., larger, longer, thicker, with a different color, and/or with less transparency. Further, in some example embodiments, the horizontal line indication 508 may be generated and projected within three-dimensional space relative to imaging data that is presented via a display of the user device, and the horizontal line indication 508 may be projected onto a floor or floor plane of the room or space to facilitate identification of one or more walls or wall planes, and/or the horizontal line indication 508 may be projected onto a wall or wall plane of the room or space to facilitate identification of one or more ceilings or ceiling planes. In other example embodiments, the horizontal line indication 508 may be generated and presented in two-dimensional space within the display of the user device, and the horizontal line indication 508 may be aligned with bases or edges of one or more walls or wall planes to facilitate identification of one or more walls or wall planes, and/or the horizontal line indication 508 may be aligned with tops or edges of one or more walls or wall planes to facilitate identification of one or more ceilings or ceiling planes.

Moreover, the horizontal line indication 508 may be presented substantially horizontal and at a relatively constant position within or toward a bottom half or bottom third of the display of the user device. However, responsive to substantially aligning the horizontal line indication 508 with a line that is recognized within the imaging data using computer vision, edge or line detection, and/or other algorithms and techniques, the horizontal line indication 508 may move or rotate to match or align with the recognized line.

The example user interface screen may also include a visual grid, overlay, or pattern 512 indicating a wall plane position. The visual grid 512 may be presented as extending continuously in all directions, fading towards outer edges in all directions, stopping at identified bases of walls within the room, stopping at identified wall planes of other walls within the room, and/or fading towards edges prior to intersecting any identified bases of walls or identified wall planes of other walls within the room. In addition, the visual grid 512 may be presented with semi-transparent points, lines, and/or colors or other similar visual effects, such that the overlay of the visual grid 512 on top of objects that may be separated or in front of a wall plane position within the imaging data does not cause confusion with users as to the actual location of the wall plane position indicated by the visual grid 512. Further, the example user interface screen may also include a wall placement user interface element 514 configured to receive an identification of a base of a wall and a wall plane. The wall placement user interface element 514 may be presented within a portion of the visual grid 512 indicating the wall plane position, in order to indicate to a user that a wall plane is being identified rather than merely a base of a wall plane. User input may be received via the wall placement user interface element 514 responsive to the user aligning the horizontal line indication 508 with a base of a wall and a wall plane to identify the wall, e.g., via a touchscreen, stylus, or other user input. Moreover, after indication of a wall plane position, a wall base indication, such as indication 409 in FIG. 4F, may not be shown or presented via a display of the user device.

Figure 5F:
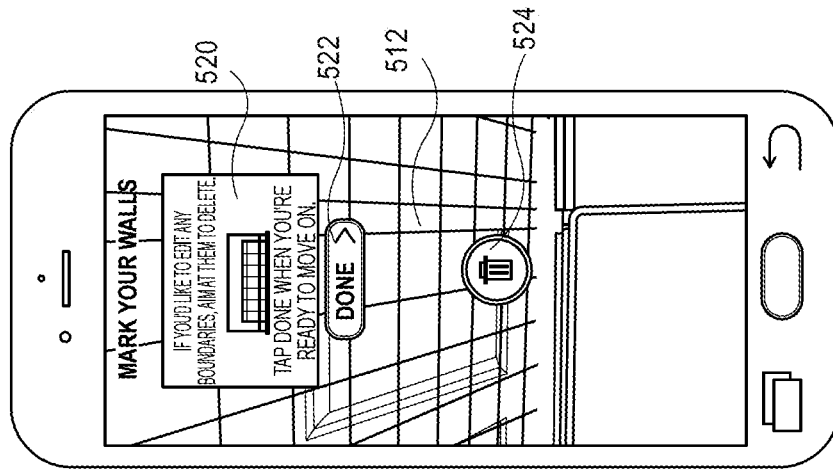
Figure 5E:
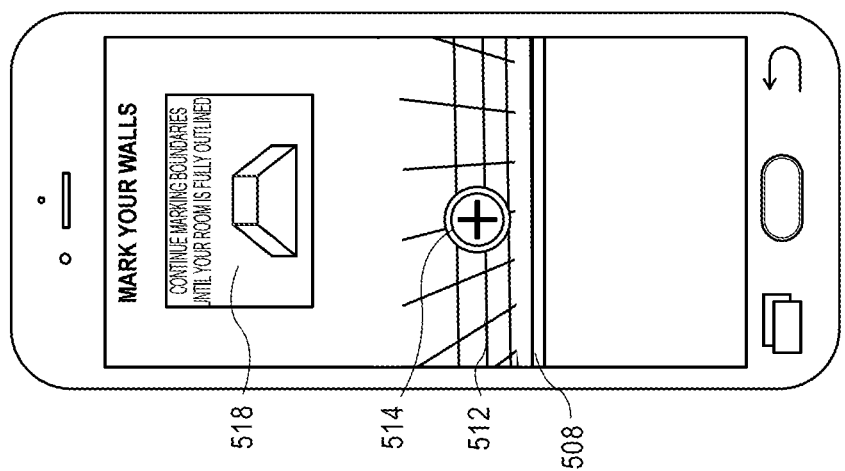
Figure 5D:
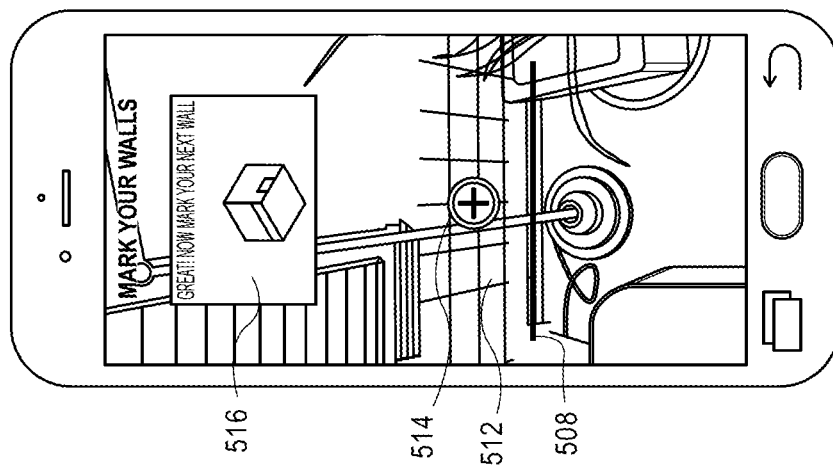

FIG. 5D illustrates an example user interface screen related to marking or identifying a base of an additional wall or additional wall plane using the user device, to identify the additional wall and/or the additional wall plane. For example, the example user interface screen may include an indication 516 related to aligning the horizontal line indication 508 with a base of an additional wall or additional wall plane within the room. In addition, imaging data captured via an imaging sensor of the user device may be presented via a display of the user device. The horizontal line indication 508 may be presented with a first size, length, thickness, color, transparency, and/or other visual characteristic, e.g., relatively small, short, thin, with a first color, and/or with greater transparency, when the indication 508 is not aligned with a line that is recognized within the imaging data, e.g., using computer vision, edge or line detection, and/or other algorithms and techniques, and as shown in FIG. 5D, when the indication 508 is aligned with a recognized line within the imaging data, the horizontal line indication 508 may be presented with a second size, length, thickness, color, transparency, and/or other visual characteristic, e.g., larger, longer, thicker, with a different color, and/or with less transparency. Moreover, the horizontal line indication 508 may be presented substantially horizontal toward a bottom third of the display of the user device. However, responsive to substantially aligning the horizontal line indication 508 with a line that is recognized within the imaging data using computer vision, edge or line detection, and/or other algorithms and techniques, the horizontal line indication 508 may move or rotate to match or align with the recognized line.

The example user interface screen may also include a visual grid, overlay, or pattern 512 indicating an additional wall plane position. The visual grid 512 may be presented as extending continuously in all directions, fading towards outer edges in all directions, stopping at identified bases of walls within the room, stopping at identified wall planes of other walls within the room, and/or fading towards edges prior to intersecting any identified bases of walls or identified wall planes of other walls within the room. Further, the example user interface screen may also include a wall placement user interface element 514 configured to receive an identification of a base of an additional wall and an additional wall plane. The wall placement user interface element 514 may be presented within a portion of the visual grid 512 indicating the additional wall plane position, in order to indicate to a user that an additional wall plane is being identified rather than merely a base of an additional wall plane. User input may be received via the wall placement user interface element 514 responsive to the user aligning the horizontal line indication 508 with a base of an additional wall and an additional wall plane to identify the additional wall, e.g., via a touchscreen, stylus, or other user input.

FIG. 5E illustrates an example user interface screen related to marking or identifying a base of a further wall and further wall plane using the user device, to identify the further wall and/or the further wall plane. For example, the example user interface screen may include an indication 518 related to aligning the horizontal line indication 508 with a base of a further wall and further wall plane within the room. In addition, imaging data captured via an imaging sensor of the user device may be presented via a display of the user device. The horizontal line indication 508 may be presented with a first size, length, thickness, color, transparency, and/or other visual characteristic, e.g., relatively small, short, thin, with a first color, and/or with greater transparency, when the indication 508 is not aligned with a line that is recognized within the imaging data, e.g., using computer vision, edge or line detection, and/or other algorithms and techniques, and as shown in FIG. 5E, when the indication 508 is aligned with a recognized line within the imaging data, the horizontal line indication 508 may be presented with a second size, length, thickness, color, transparency, and/or other visual characteristic, e.g., larger, longer, thicker, with a different color, and/or with less transparency. Moreover, the horizontal line indication 508 may be presented substantially horizontal toward a bottom third of the display of the user device. However, responsive to substantially aligning the horizontal line indication 508 with a line that is recognized within the imaging data using computer vision, edge or line detection, and/or other algorithms and techniques, the horizontal line indication 508 may move or rotate to match or align with the recognized line.

The example user interface screen may also include a visual grid, overlay, or pattern 512 indicating a further wall plane position. The visual grid 512 may be presented as extending continuously in all directions, fading towards outer edges in all directions, stopping at identified bases of walls within the room, stopping at identified wall planes of other walls within the room, and/or fading towards edges prior to intersecting any identified bases of walls or identified wall planes of other walls within the room. Further, the example user interface screen may also include a wall placement user interface element 514 configured to receive an identification of a base of a further wall and a further wall plane. The wall placement user interface element 514 may be presented within a portion of the visual grid 512 indicating the further wall plane position, in order to indicate to a user that a further wall plane is being identified rather than merely a base of a further wall plane. User input may be received via the wall placement user interface element 514 responsive to the user aligning the horizontal line indication 508 with a base of a further wall and a further wall plane to identify the further wall, e.g., via a touchscreen, stylus, or other user input.

FIG. 5F illustrates an example user interface screen related to completing the wall identification process, and/or editing or deleting an identified wall or wall plane using the user device. For example, the example user interface screen may include an indication 520 related to identifying a wall or wall plane to edit or delete by aligning the horizontal line indication 508 with a base of the wall to be edited or deleted, or by aligning the visual grid 512 with a wall plane to be edited or deleted. In addition, imaging data captured via an imaging sensor of the user device may be presented via a display of the user device. Further, the example user interface screen may include a confirmation user interface element 522 to indicate completion of marking or identification of all walls or wall planes. User input may be received via the confirmation user interface element 522 to complete the wall marking or identification process, e.g., via a touchscreen, stylus, or other user input.

Responsive to aligning the horizontal line indication 508 with a previously marked or identified base of a wall, or responsive to aligning the visual grid 512 with a previously marked or identified wall plane, e.g., based on image processing, edge or line detection, and/or other algorithms and techniques to detect aligning the indication 508 with a wall base indication or to detect aligning the visual grid 512 with a wall plane, the example user interface screen may include a wall removal user interface element 524 to indicate deletion of the identified wall or wall plane. User input may be received via the wall removal user interface element 524 to delete the identified wall or wall plane, e.g., via a touchscreen, stylus, or other user input.

Figure 5H:
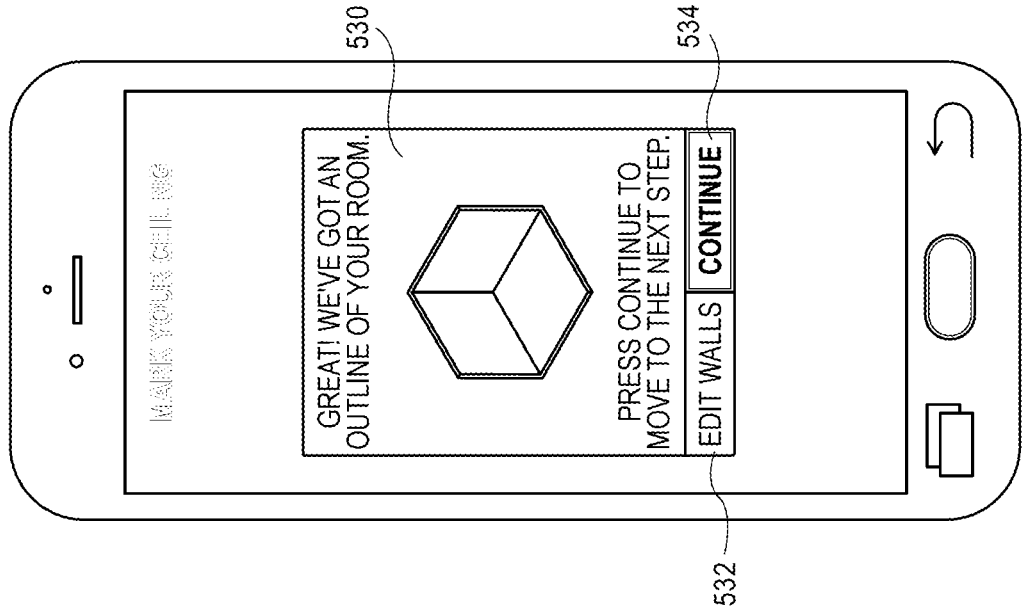
Figure 5G:
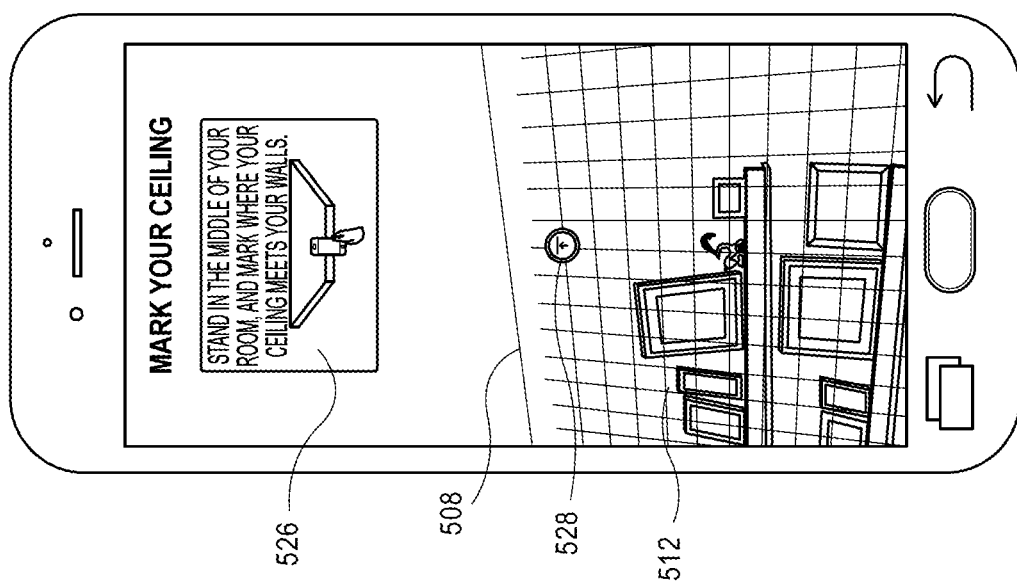

FIG. 5G illustrates an example user interface screen related to marking or identifying a top of a wall using the user device, to identify the ceiling and/or the ceiling plane. For example, the example user interface screen may include an indication 526 related to marking or identifying a top of a wall, e.g., by aligning a horizontal line indication 508 with a top of a wall within the room. In addition, imaging data captured via an imaging sensor of the user device may be presented via a display of the user device. Further, the example user interface screen may also include a substantially horizontal line indication 508 that may be used to mark or identify tops of walls to determine one or more ceiling planes. The horizontal line indication 508 may be presented with a first size, length, thickness, color, transparency, and/or other visual characteristic, e.g., relatively small, short, thin, with a first color, and/or with greater transparency, when the indication 508 is not aligned with a line that is recognized within the imaging data, e.g., using computer vision, edge or line detection, and/or other algorithms and techniques, and as shown in FIG. 5G, when the indication 508 is aligned with a recognized line within the imaging data, the horizontal line indication 508 may be presented with a second size, length, thickness, color, transparency, and/or other visual characteristic, e.g., larger, longer, thicker, with a different color, and/or with less transparency.

In addition, the example user interface screen may also include a visual grid, overlay, or pattern 512 indicating a wall plane position. The visual grid 512 may be presented as extending continuously in all directions, fading towards outer edges in all directions, stopping at identified bases or tops of walls within the room, stopping at identified wall planes of other walls within the room, and/or fading towards edges prior to intersecting any identified bases or tops of walls or identified wall planes of other walls within the room. Moreover, responsive to moving the horizontal line indication 508 vertically to identify the ceiling plane, the visual grid 512 may also move vertically with the movement of the horizontal line indication 508, e.g., upward movement of the indication 508 may appear to cause the visual grid 512 to grow vertically upward, and downward movement of the indication 508 may appear to cause the visual grid 512 to shrink vertically downward. Further, the example user interface screen may also include a ceiling placement user interface element 528 configured to receive an identification of a top of a wall and wall plane to determine a ceiling and ceiling plane. The ceiling placement user interface element 528 may also be presented within a portion of the visual grid 512 indicating the wall plane position, in order to indicate to a user that a further wall plane is being further defined. User input may be received via the ceiling placement user interface element 528 responsive to the user aligning the horizontal line indication 508 with a top of a wall and wall plane to identify the ceiling and ceiling plane, e.g., via a touchscreen, stylus, or other user input.

FIG. 5H illustrates an example user interface screen related to completing the floor, wall, and ceiling identification processes, and/or editing or deleting an identified wall, wall plane, ceiling, or ceiling plane using the user device. For example, the example user interface screen may include an indication 530 related to completion of marking or identification of all walls, wall planes, ceilings, and ceiling planes. In addition, imaging data captured via an imaging sensor of the user device may be presented via a display of the user device. Further, the example user interface screen may include a confirmation user interface element 534 to indicate completion of marking or identification of all walls, wall planes, ceilings, and ceiling planes. User input may be received via the confirmation user interface element 534 to complete the wall and ceiling marking or identification processes, e.g., via a touchscreen, stylus, or other user input.

Further, the example user interface screen may also include an edit user interface element 532 related to editing or deleting of an identified wall, wall plane, ceiling, or ceiling plane. User input may be received via the edit user interface element 532 to edit or delete one or more walls, wall planes, ceilings, or ceiling planes, e.g., via a touchscreen, stylus, or other user input. For example, responsive to selection of the edit user interface element 532, the example user interface screen may return to one similar to that shown and described with respect to at least one of FIGS. 5C-5G, by which one or more marked or identified walls or ceilings may be identified or marked and/or selected for editing or deletion. In addition, the example user interface screen may enable marking or identification of one or more additional walls or ceilings as described herein.

Further, the presentation of the various indications, cues, edges, lines, grids, overlay, and/or surfaces, such as edges or lines that fade toward outer ends, edges or lines that do not intersect with other edges or lines, edges or lines that are no longer presented after placement, grids, overlays, or surfaces that fade toward outer edges, grids, overlays, or surfaces that do not intersect with other edges, lines, grids, overlays, or surfaces, and/or other visual effects, may be utilized to prevent confusion or frustration with users that may result from tracking drift during movement and operation of the user device within the local coordinate frame. Generally, tracking drift may result from various errors associated with one or more sensors, such as imaging sensors, position and orientation sensors, or other sensors, of the user device. For example, a base of a wall that is placed by a user using a user device may appear to have moved or drifted to a different location after further movement or operation of the user device within the local coordinate frame, which may cause confusion and frustration with the room measurement process. Therefore, various visual effects described herein associated with the presentation of elements via the display of the user device may be implemented to mask or hide such tracking drift to prevent user confusion and frustration, while still determining dimensions and measurements of the room or space that are useful and accurate for the user and for various other applications of the dimensions and measurements of the room or space.

Figure 6A:
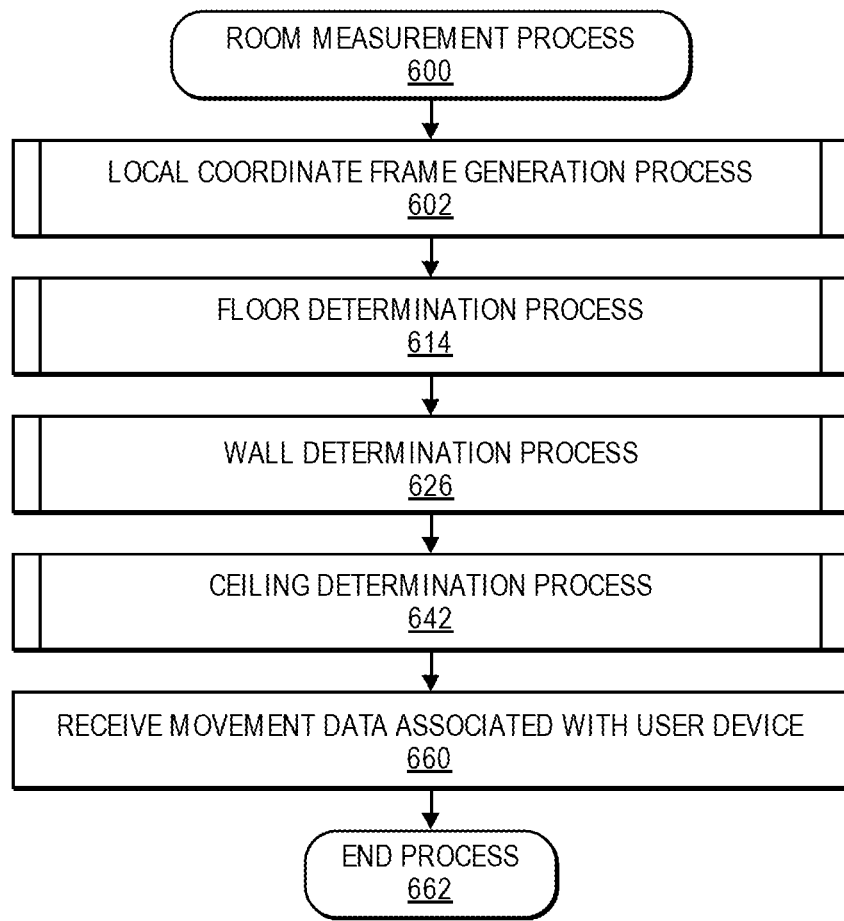
FIG. 6A is a flow diagram illustrating an example room measurement process, in accordance with disclosed implementations.

FIG. 6A is a flow diagram illustrating an example room measurement process 600, in accordance with disclosed implementations.

The process 600 may begin with the local coordinate frame generation process, as at 602. As described at least with respect to FIG. 6B, the local coordinate frame generation process may comprise initializing one or more components of a user device, designating a local coordinate frame for operation of the user device, and designating a home position relative to which movement of the user device may be tracked, upon receiving user consent.

The process 600 may then proceed with the floor determination process, as at 614. As described at least with respect to FIG. 6C, the floor determination process may comprise receiving position and orientation data of the user device, receiving imaging data from an imaging sensor of the user device having at least a portion of the floor within a field of view, identifying various features within the imaging data associated with the floor from multiple viewpoints, and determining a floor plane based on the position and orientation data and imaging data.

The process 600 may then continue to the wall determination process, as at 626. As described at least with respect to FIG. 6D, the wall determination process may comprise receiving an indication of a wall plane, receiving position and orientation data of the user device, receiving a floor plane, and determining a wall plane based on the position and orientation data and floor plane.

The process 600 may then proceed to the ceiling determination process, as at 642. As described at least with respect to FIG. 6E, the ceiling determination process may comprise receiving an indication of a ceiling plane, receiving position and orientation data of the user device, receiving a floor plane, receiving a wall plane, and determining a ceiling plane based on the position and orientation data, the floor plane, and the wall plane.

The process 600 may then continue to receive movement data associated with the user device, as at 660. For example, a user may be instructed to move the user device within the room or space. During such movement, upon receiving user consent, additional position and orientation data and/or additional imaging data may be received to further refine the determinations of the floor, walls, and ceiling. In addition, position and orientation data associated with the movement of the user device may inform later determinations of ring paths and/or panorama paths, as further described herein. Further, images captured during movement of the user device, upon receiving user consent, may be provided as additional inputs to a photogrammetry processor to generate a three-dimensional, photogrammetry mesh of the room or space.

Figure 6B:
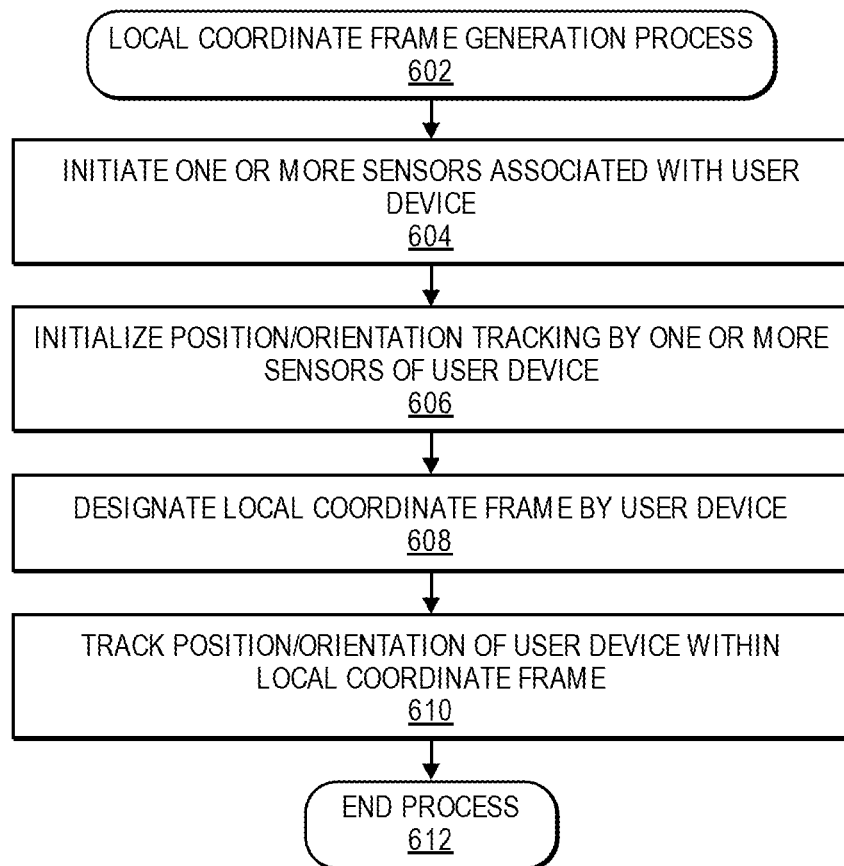
FIG. 6B is a flow diagram illustrating an example local coordinate frame generation process, in accordance with disclosed implementations.

FIG. 6B is a flow diagram illustrating an example local coordinate frame generation process 602, in accordance with disclosed implementations.

The process 602 may begin by initiating one or more sensors associated with the user device, as at 604. For example, an inertial measurement unit, accelerometer, gyroscope, magnetometer, or other position and orientation sensors associated with the user device may be initiated or started. In addition, an imaging sensor, a depth sensor, or other sensors associated with the user device may also be initiated or started. Further, various other components, such as a processor, memory, or other components, of the user device may also be initiated or started.

The process 602 may continue by initializing position and orientation tracking by one or more sensors of the user device, as at 606. For example, various position and orientation sensors, such as an inertial measurement unit, accelerometer, gyroscope, or magnetometer, of the user device may be initiated or started to track the position and orientation of the user device, upon receiving user consent.

The process 602 may then proceed to designate a local coordinate frame by the user device, as at 608. For example, the local coordinate frame may be a local xyz coordinate frame, or any other type of coordinate frame. In addition, a home or starting position may be designated by the user device, such as a home position having coordinates (0,0,0) within a local xyz coordinate frame.

The process 602 may then continue to track position and orientation data of the user device within the local coordinate frame, as at 610. For example, movement of the user device may be tracked, upon receiving user consent, within the local coordinate frame and with respect to the home position such that any position or orientation of the user device may be defined within the local coordinate frame relative to any other position or orientation of the user device. The process 602 may then end, as at 612.

Figure 6C:
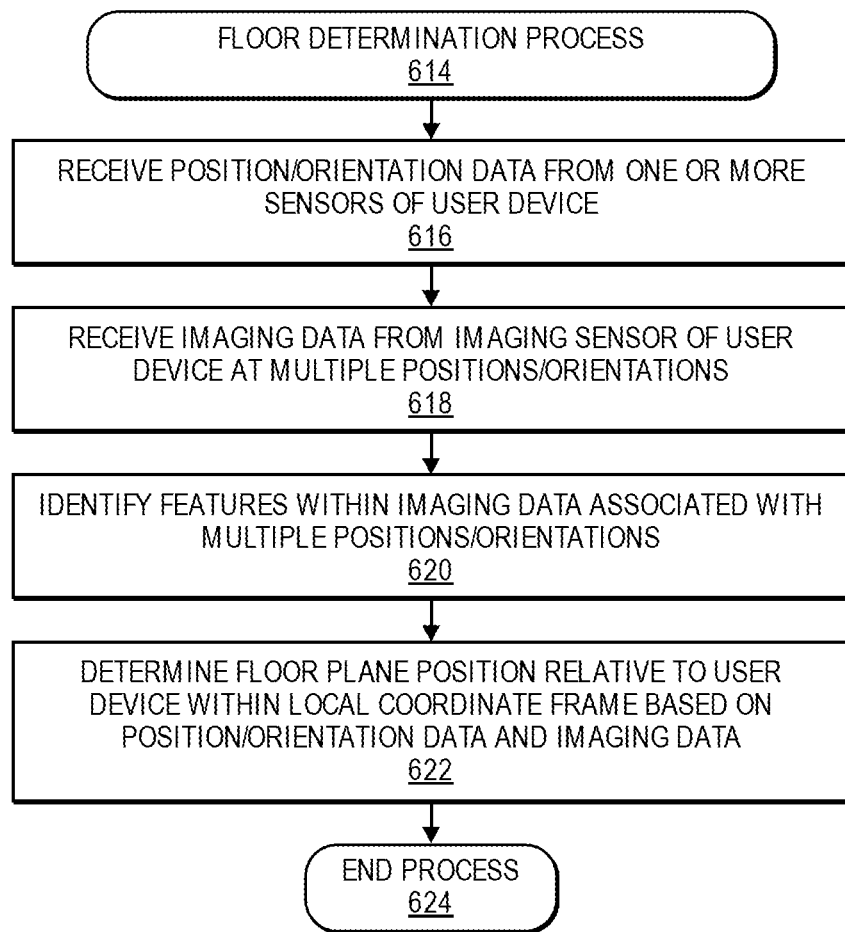
FIG. 6C is a flow diagram illustrating an example floor determination process, in accordance with disclosed implementations.

FIG. 6C is a flow diagram illustrating an example floor determination process 614, in accordance with disclosed implementations.

The process 614 may begin by receiving position and orientation data from one or more sensors of a user device, as at 616. For example, an inertial measurement unit, accelerometer, gyroscope, magnetometer, or other position and orientation sensors of a user device may determine position and orientation information of the user device within a local coordinate frame.

The process 614 may proceed by receiving imaging data from an imaging sensor of the user device at multiple positions and orientations, as at 618. For example, during movement of the user device, as at 616, and during image capture, as at 618, at least a portion of a floor of a room or space may be within a field of view of the imaging sensor. Various images including at least a portion of the floor may be captured from multiple positions and orientations by the user device.

The process 614 may then continue by identifying features within the imaging data associated with multiple positions and orientations, as at 620. For example, various features associated with the floor may be captured and identified, e.g., using image processing, feature detection, and/or other algorithms and techniques, in multiple images taken from multiple position and orientations.

The process 614 proceed to determine a floor plane position relative to the user device within the local coordinate frame based on position and orientation data and imaging data, as at 622. For example, based on the position and orientation data of the user device that is associated with particular images in which the various features associated with the floor have been identified, a floor plane position may be calculated and/or triangulated based on the identification of the same features in multiple images taken from multiple positions and orientations. The process may then end, as at 624.

Figure 6D:
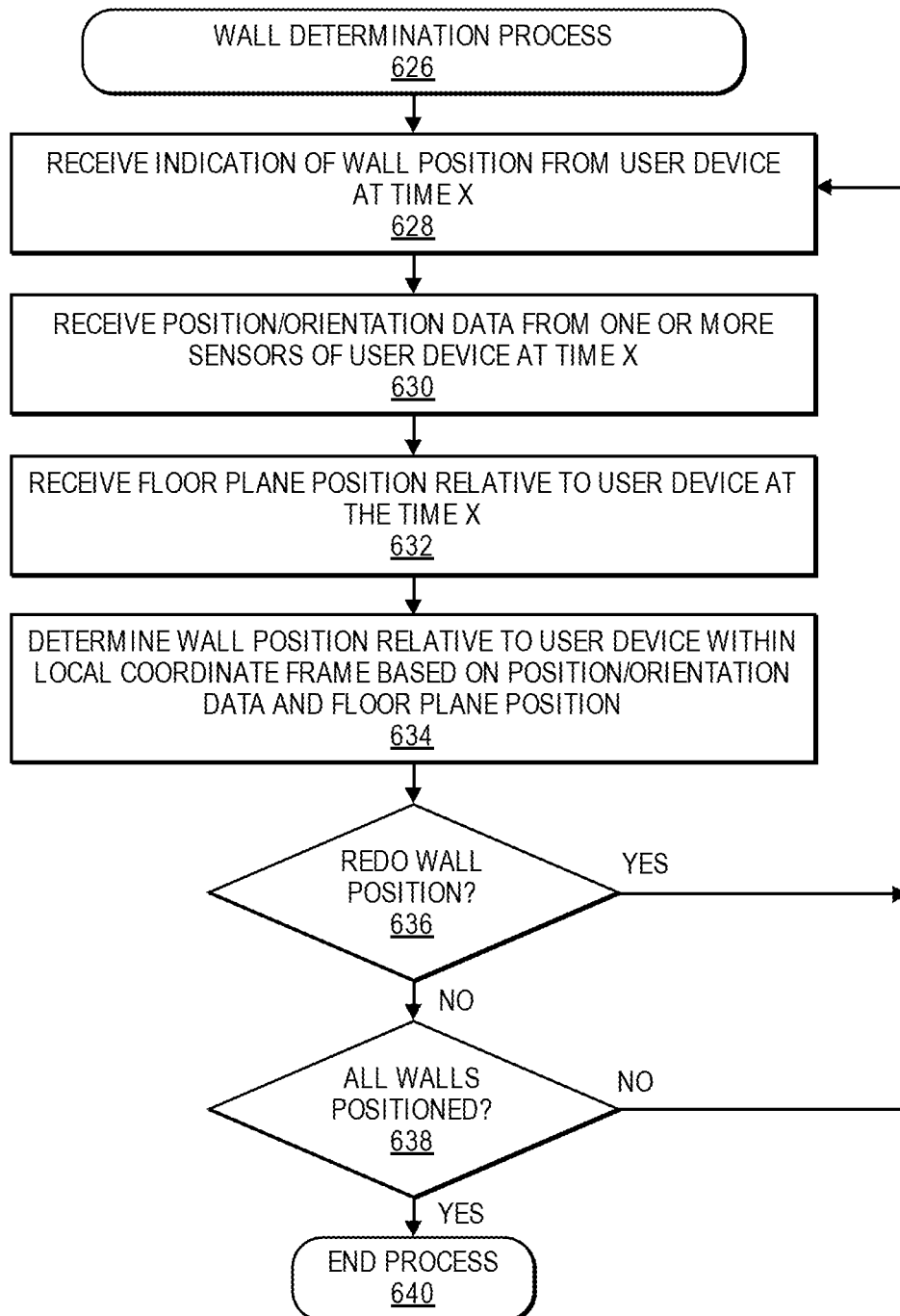
FIG. 6D is a flow diagram illustrating an example wall determination process, in accordance with disclosed implementations.

FIG. 6D is a flow diagram illustrating an example wall determination process 626, in accordance with disclosed implementations.

The process 626 may begin by receiving an indication of a wall position from a user device at time X, as at 628. For example, as described herein, user input associated with a wall placement user interface element presented via a display of a user device may be received that indicates a base of a wall or wall plane. The user input may be received via a button, touchscreen, stylus, audio input, or other inputs.

The process 626 may proceed by receiving position and orientation data from one or more sensors of the user device at the time X, as at 630. For example, responsive to receiving the user input via the wall placement user interface element, position and orientation data associated with the user device at the time of receipt of the user input may be received from one or more position and orientation sensors of the user device. The position and orientation data may include position within the local coordinate frame, e.g., xyz position within a local xyz coordinate frame, as well as an angle or orientation of the user device, e.g., with respect to horizontal, vertical, or some other known orientation.

The process 626 may continue by receiving a floor plane position relative to the user device at time X, as at 632. For example, responsive to receiving the user input via the wall placement user interface element, position and orientation data associated with the user device at the time of receipt of the user input may be received from one or more position and orientation sensors of the user device, and position and orientation of the user device relative to a previously determined floor plane position may be determined.

The process 626 may then proceed to determine a wall plane position relative to the user device within the local coordinate frame based on the position and orientation data and floor plane position, as at 634. For example, based on the position and orientation data of the user device at the time of receipt of the user input, and based on the floor plane position, a wall plane position may be calculated and/or determined, e.g., using trigonometric calculations, such that a position of the wall plane may be determined within the local coordinate frame.

The process 626 may then proceed to determine whether any wall plane positions should be redone, edited, or deleted, as at 636. If one or more wall plane positions are to be redone, edited, or deleted, the process 626 may return to step 628 to receive an indication of a different wall plane position. If, however, no wall plane positions are to be redone, edited, or deleted, the process 626 may continue to determine whether all wall plane positions have been determined, as at 638. If all wall plane positions have not been determined, the process 626 may return to step 628 to receive an indication of an additional wall plane position. If, however, all wall plane positions have been determined, then the process may then end, as at 640.

Figure 6E:
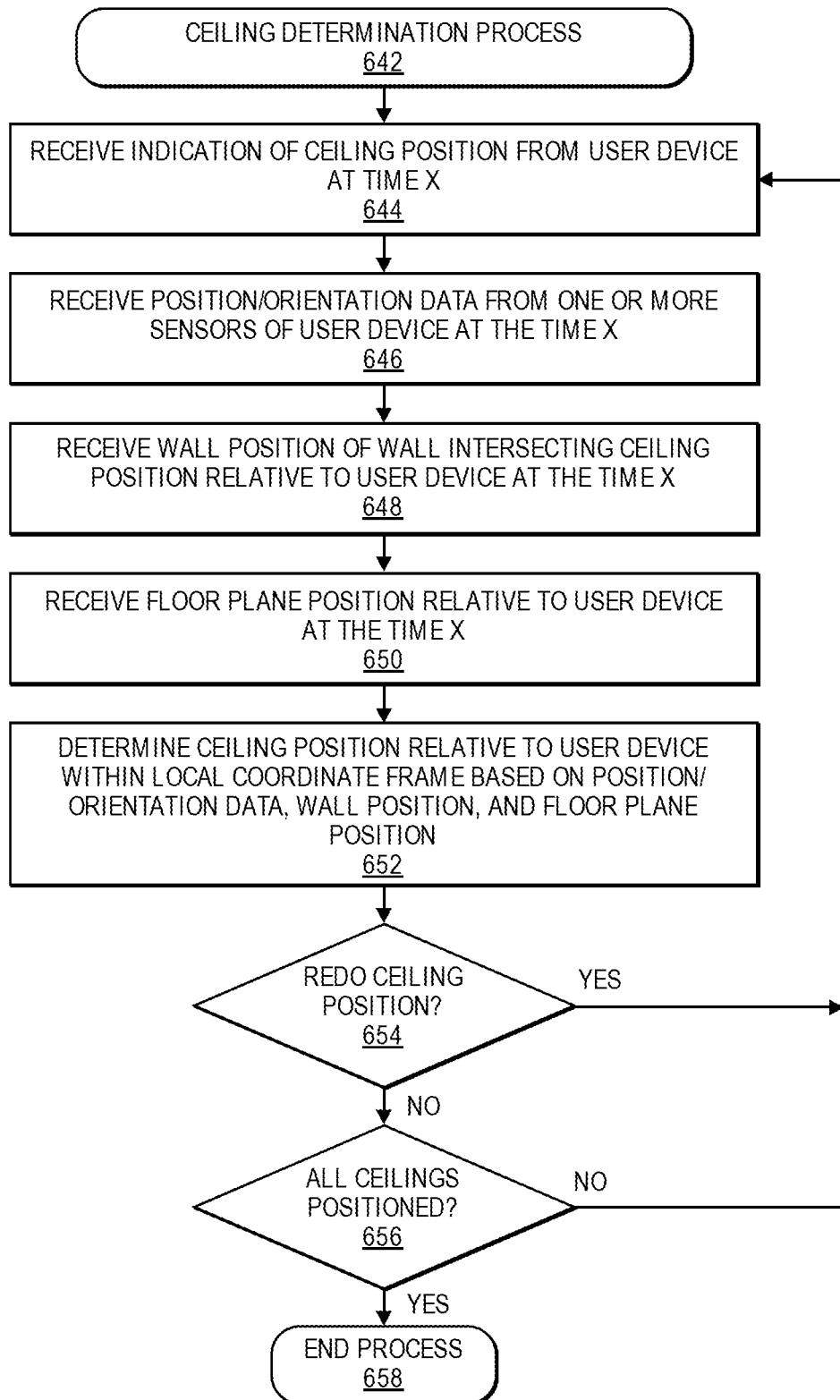
FIG. 6E is a flow diagram illustrating an example ceiling determination process, in accordance with disclosed implementations.

FIG. 6E is a flow diagram illustrating an example ceiling determination process 642, in accordance with disclosed implementations.

The process 642 may begin by receiving an indication of a ceiling position from a user device at time X, as at 644. For example, as described herein, user input associated with a ceiling placement user interface element presented via a display of a user device may be received that indicates a top of a wall or wall plane. The user input may be received via a button, touchscreen, stylus, audio input, or other inputs.

The process 642 may proceed by receiving position and orientation data from one or more sensors of the user device at the time X, as at 646. For example, responsive to receiving the user input via the ceiling placement user interface element, position and orientation data associated with the user device at the time of receipt of the user input may be received from one or more position and orientation sensors of the user device. The position and orientation data may include position within the local coordinate frame, e.g., xyz position within a local xyz coordinate frame, as well as an angle or orientation of the user device, e.g., with respect to horizontal, vertical, or some other known orientation.

The process 642 then proceeds to receive a wall plane position of the wall intersecting the ceiling position relative to the user device at time X, as at 648. For example, responsive to receiving the user input via the ceiling placement user interface element, position and orientation data associated with the user device at the time of receipt of the user input may be received from one or more position and orientation sensors of the user device, and position and orientation of the user device relative to a previously determined wall plane position that intersects the ceiling position may be determined. The previously determined wall plane position may be determined as a wall plane that is within a field of view of the imaging sensor of the user device, and/or a wall plane that is directly in front of the user device from a viewpoint of a user based on the position and orientation of the user device.

The process 642 may continue by receiving a floor plane position relative to the user device at time X, as at 650. For example, responsive to receiving the user input via the ceiling placement user interface element, position and orientation data associated with the user device at the time of receipt of the user input may be received from one or more position and orientation sensors of the user device, and position and orientation of the user device relative to a previously determined floor plane position may be determined.

The process 642 may then proceed to determine a ceiling plane position relative to the user device within the local coordinate frame based on the position and orientation data, wall plane position, and floor plane position, as at 652. For example, based on the position and orientation data of the user device at the time of receipt of the user input, based on the wall plane position, and based on the floor plane position, a ceiling plane position may be calculated and/or determined, e.g., using trigonometric calculations, such that a position of the ceiling plane may be determined within the local coordinate frame.

The process 642 may then proceed to determine whether any ceiling plane positions should be redone, edited, or deleted, as at 654. If one or more wall plane positions are to be redone, edited, or deleted, the process 642 may return to step 644 to receive an indication of a different ceiling plane position. If, however, no ceiling plane positions are to be redone, edited, or deleted, the process 642 may continue to determine whether all ceiling plane positions have been determined, as at 656. In some embodiments, a ceiling plane may be assumed to be substantially horizontal and parallel with the floor plane, such that only one ceiling plane position may need to be determined. In other embodiments, multiple ceiling planes may be received in order to determine dimensions and measurements of a room or space having different types of ceilings, such as gabled, angled, vaulted, or otherwise non-horizontal ceiling planes. If all ceiling plane positions have not been determined, the process 642 may return to step 644 to receive an indication of an additional ceiling plane position. If, however, all ceiling plane positions have been determined, then the process may then end, as at 658.

Figures 1, 7:
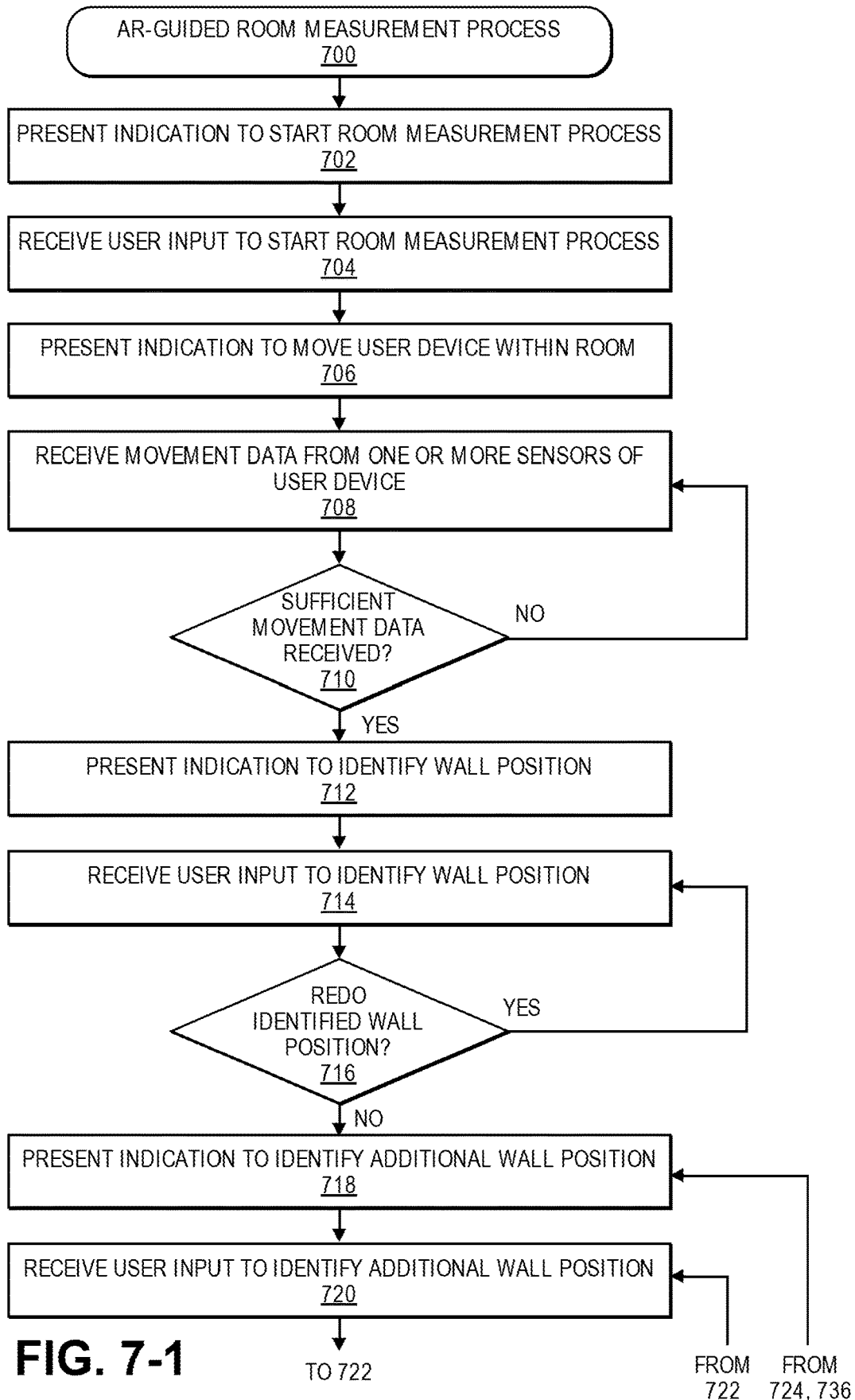
FIG. 7 (including partial FIGS. 7-1, 7-2, and 7-3) is a flow diagram illustrating an example room measurement process with augmented reality guidance, in accordance with disclosed implementations.
Figures 2, 7:
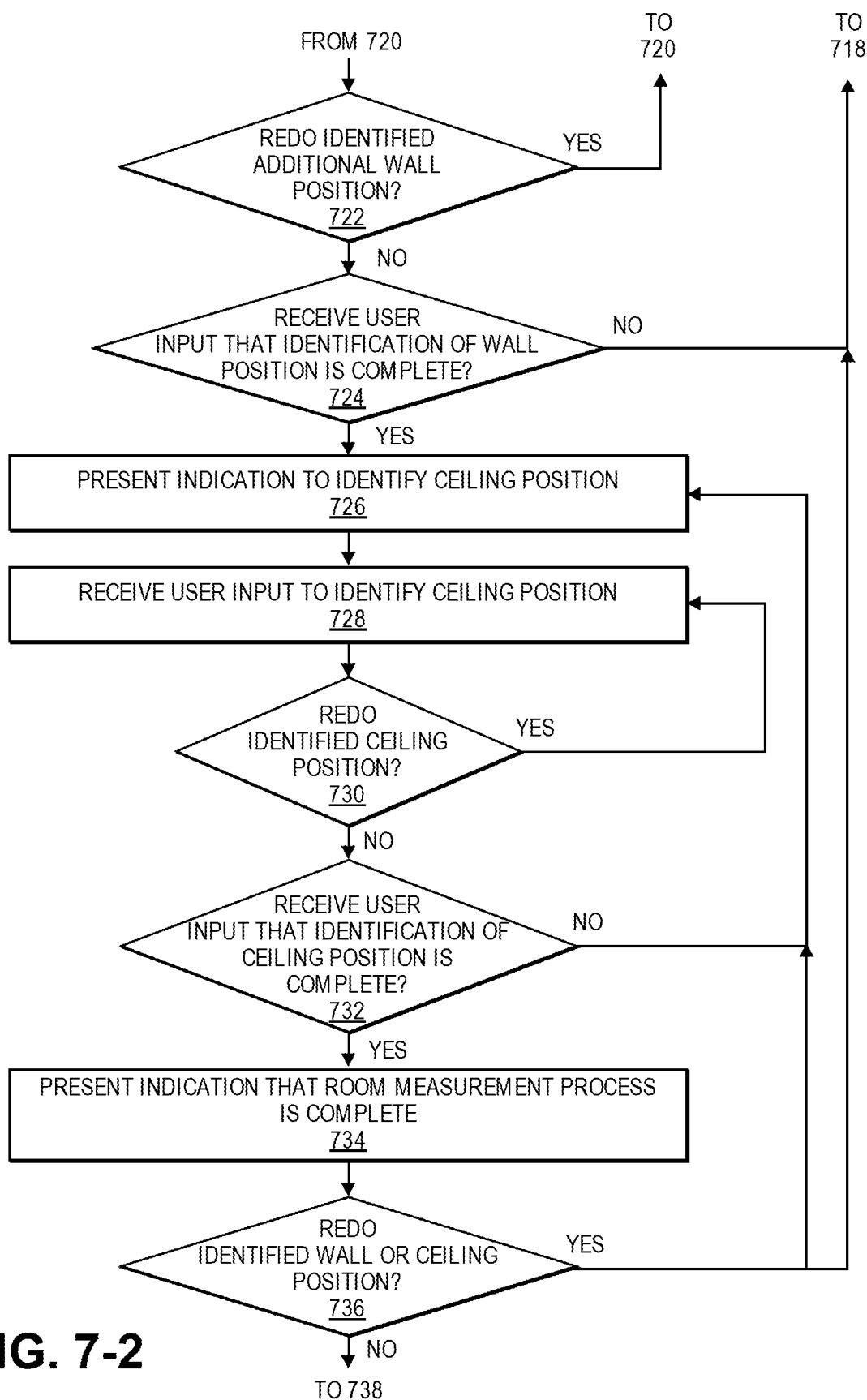
Figures 3, 7:
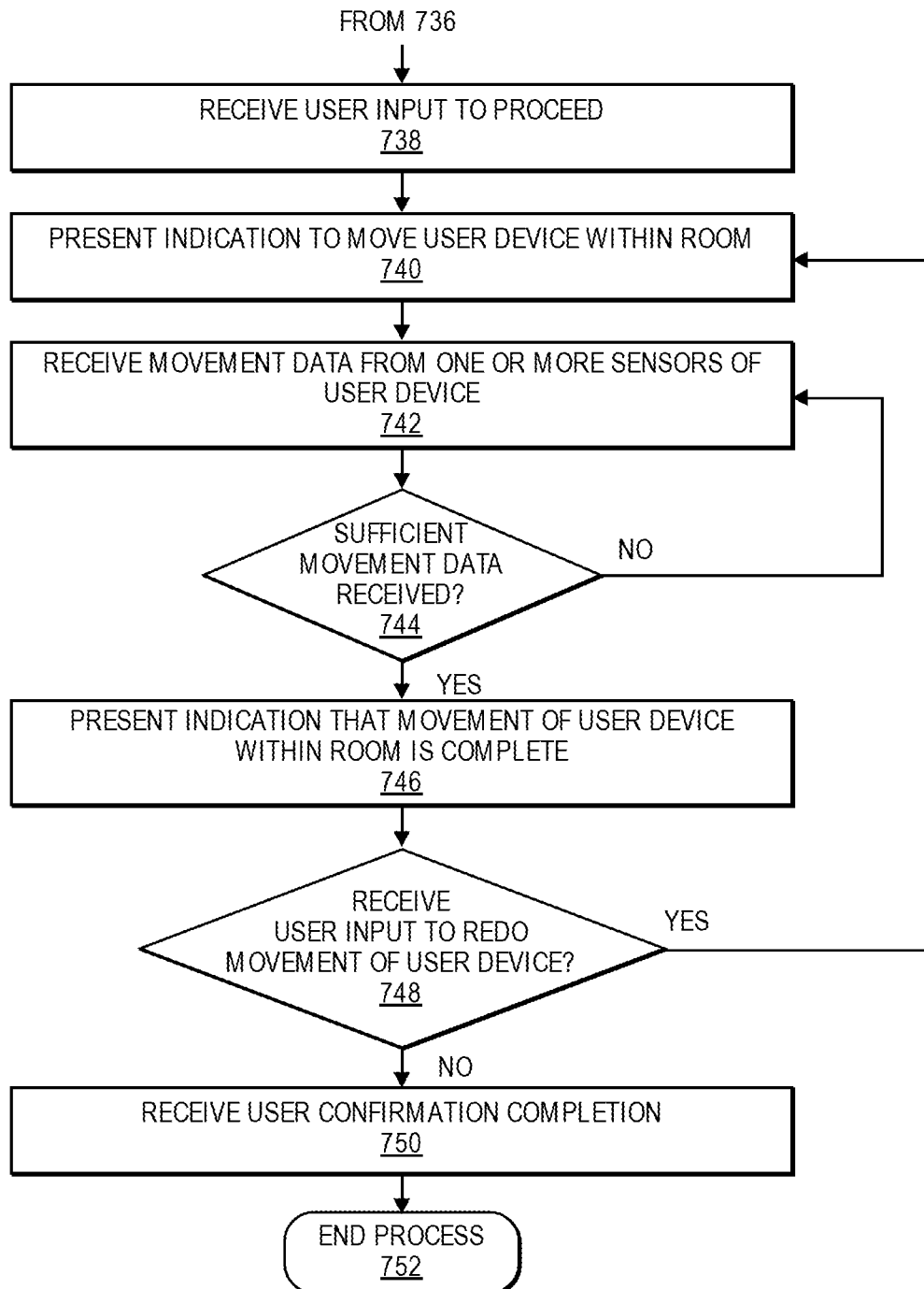

FIG. 7 is a flow diagram illustrating an example room measurement process with augmented reality guidance 700, in accordance with disclosed implementations.

The process 700 may begin by presenting an indication to start a room measurement process, as at 702. For example, the indication may comprise text and visual cues or indications related to the room measurement process, as well as a confirmation user interface element that may be selected by a user to proceed.

The process 700 may proceed by receiving user input to start the room measurement process, as at 704. For example, user input may be received via the confirmation user interface element, e.g., via a touchscreen, stylus, or other user input.

The process 700 may continue by presenting an indication to move the user device within the room or space, as at 706. For example, the indication may comprise text and visual cues or indications related to moving the user device within the room while keeping at least a portion of the floor within a field of view of the imaging sensor of the user device. Further, imaging data received via the imaging sensor of the user device may also be presented via the display of the user device.

The process 700 may then proceed to receiving movement data from one or more sensors of the user device, as at 708. For example, during movement of the user device within the room, as described herein, a local coordinate frame for operation of the user device may be designated, and a home position within the local coordinate frame may be designated. In addition, during movement of the user device within the room, as described herein, imaging data from the imaging sensor and position and orientation data of the user device may be received, and a floor plane position within the local coordinate frame may be determined based on various features identified within the imaging data and based on the position and orientation data of the user device during capture of the imaging data.

The process 700 may then continue to determine whether sufficient movement data has been received, as at 710. For example, if sufficient movement data and corresponding imaging data have not been received in order to determine a floor plane position within the local coordinate frame, then the process 700 may return to step 708 and continue to receive movement data from one or more sensors of the user device.

If, however, sufficient movement data and corresponding imaging data have been received such that a floor plane position has been determined, then the process 700 may proceed to present an indication to identify a wall position, as at 712. For example, the indication may comprise text and visual cues or indications related to identifying a base of a wall or a wall plane within the room, as well as a line guide with which to align the base of the wall, a floor plane visual grid to indicate the floor, and/or a wall plane visual grid to indicate the wall. In addition, the indication may comprise a wall placement user interface element that may be selected by a user to identify the base of the wall and the wall plane upon aligning the line guide with the base of the wall and/or upon aligning the wall plane visual grid with the wall.

The process 700 may then continue by receiving user input to identify the wall position, as at 714. For example, user input may be received via the wall placement user interface element, e.g., via a touchscreen, stylus, or other user input, upon aligning the line guide with the base of the wall and/or upon aligning the wall plane visual grid with the wall.

The process 700 may then proceed to determine whether to redo the identified wall position, as at 716. For example, an indication may be presented related to editing or deleting the identified wall plane position. The indication may comprise text and visual cues or indications related to editing or deleting an identified wall plane position within the room, as well as a line guide with which to align the base of the identified wall to be edited or deleted, a floor plane visual grid to indicate the floor, and/or a wall plane visual grid with which to align the wall to be edited or deleted. In addition, the indication may comprise a confirmation user interface element that may be selected by a user to indicate that no walls are to edited or deleted, and a wall removal user interface element that may be selected by a user to edit or delete an identified wall upon aligning the line guide with the base of the identified wall and/or upon aligning the wall plane visual grid with the identified wall. If it is determined to redo the identified wall position, then the process 700 may return to step 714 to receive user input to receive a different wall position.

If, however, it is determined that the identified wall position does not need to be redone, then the process 700 may continue by presenting an indication to identify an additional wall position, as at 718. For example, the indication may comprise text and visual cues or indications related to identifying a base of an additional wall or an additional wall plane within the room, as well as a line guide with which to align the base of an additional wall, a floor plane visual grid to indicate the floor, and/or a wall plane visual grid to indicate an additional wall. In addition, the indication may comprise a wall placement user interface element that may be selected by a user to identify the base of an additional wall and an additional wall plane upon aligning the line guide with the base of an additional wall and/or upon aligning the wall plane visual grid with an additional wall.

The process 700 may then continue by receiving user input to identify the additional wall position, as at 720. For example, user input may be received via the wall placement user interface element, e.g., via a touchscreen, stylus, or other user input, upon aligning the line guide with the base of an additional wall and/or upon aligning the wall plane visual grid with the additional wall.

The process 700 may then proceed to determine whether to redo the identified additional wall position, as at 722. For example, an indication may be presented related to editing or deleting the identified additional wall plane position. The indication may comprise text and visual cues or indications related to editing or deleting an identified additional wall plane position within the room, as well as a line guide with which to align the base of the identified additional wall to be edited or deleted, a floor plane visual grid to indicate the floor, and/or a wall plane visual grid with which to align the additional wall to be edited or deleted. In addition, the indication may comprise a confirmation user interface element that may be selected by a user to indicate that no additional walls are to be edited or deleted, and a wall removal user interface element that may be selected by a user to edit or delete an identified additional wall upon aligning the line guide with the base of the identified additional wall and/or upon aligning the wall plane visual grid with the identified additional wall. If it is determined to redo the identified additional wall position, then the process 700 may return to step 720 to receive user input to receive a different additional wall position.

If, however, it is determined that the identified additional wall position does not need to be redone, then the process 700 may continue by receiving user input that identification of wall positions is complete, as at 724. For example, an indication may be presented related to indicating completion of wall placement and/or identifying one or more additional wall positions. The indication may comprise text and visual cues or indications related to identifying one or more additional wall plane positions within the room, as well as a line guide with which to align the base of an additional wall to be identified, a floor plane visual grid to indicate the floor, and/or a wall plane visual grid with which to align the additional wall to be identified. In addition, the indication may comprise a confirmation user interface element that may be selected by a user to indicate that no additional walls are to be identified, and a wall placement user interface element that may be selected by a user to identify an additional wall upon aligning the line guide with the base of the additional wall and/or upon aligning the wall plane visual grid with the additional wall. If it is determined to identify one or more additional wall positions, then the process 700 may return to step 718 to present an indication to identify an additional wall position.

If, however, it is determined that identification of wall positions is complete, then the process 700 may proceed to presenting an indication to identify a ceiling position, as at 726. For example, the indication may comprise text and visual cues or indications related to identifying a top of a wall or wall plane within the room, as well as a line guide with which to align the top of the wall, and/or a wall plane visual grid to indicate the wall. In addition, the indication may comprise a ceiling placement user interface element that may be selected by a user to identify the top of a wall and wall plane upon aligning the line guide with the top of the wall.

The process 700 may then continue by receiving user input to identify the ceiling position, as at 728. For example, user input may be received via the ceiling placement user interface element, e.g., via a touchscreen, stylus, or other user input, upon aligning the line guide with the top of the wall.

The process 700 may then proceed to determine whether to redo the identified ceiling position, as at 730. For example, an indication may be presented related to editing or deleting the identified ceiling plane position. The indication may comprise text and visual cues or indications related to editing or deleting an identified ceiling plane position within the room, as well as a line guide with which to align the top of the wall that intersects with the ceiling position to be edited or deleted. In addition, the indication may comprise a confirmation user interface element that may be selected by a user to indicate that the ceiling position is not to be edited or deleted, and a ceiling removal user interface element that may be selected by a user to edit or delete an identified ceiling position upon aligning the line guide with the top of the wall that intersects the ceiling position. If it is determined to redo the identified ceiling position, then the process 700 may return to step 728 to receive user input to receive a different ceiling position.

If, however, it is determined that the ceiling position is not to be edited or deleted, then the process 700 may continue to receive user input that identification of the ceiling position is complete, as at 732. For example, user input may be received via the confirmation user interface element, e.g., via a touchscreen, stylus, or other user input. If user input related to confirmation that the identification of the ceiling position is not complete, then the process 700 may return to step 726 to present an indication to identify an additional ceiling position.

If, however, user input is received confirming that identification of the ceiling position is complete, then the process 700 may continue to present an indication that the room measurement process is complete, as at 734. For example, the indication may comprise text and visual cues or indications related to completion of the room measurement process. In addition, the indication may comprise a confirmation user interface element that may be selected by a user to indicate confirmation that the room measurement process is complete, and an edit user interface element that may be selected by a user to indicate that one or more aspects of the room measurement process is to be redone, edited, or deleted.

The process 700 may then proceed to determine whether one or more identified wall or ceiling positions is to be redone, as at 736. For example, user input may be received via the edit user interface element, e.g., via a touchscreen, stylus, or other user input, indicating that one or more wall or ceiling positions is to be redone, edited, or deleted. If it is determined that one or more identified wall or ceiling positions is to be redone, then the process 700 may return to step 718 and/or step 726 to present indications to identify additional wall and/or ceiling positions.

If, however, it is determined that no identified wall or ceiling positions is to be redone, then the process 700 may continue to receive user input to proceed, as at 738. For example, user input may be received via the confirmation user interface element, e.g., via a touchscreen, stylus, or other user input, to indicate completion of the room measurement process.

The process 700 may then proceed to present an indication to move the user device within the room, as at 740. For example, the indication may comprise text and visual cues or indications related to moving the user device within the bounds of the room defined during the room measurement process, and may also include a top down view of the room and a marker associated with a position of the user device that moves within the top down view of the room, e.g., based on position and orientation data of the user device within the local coordinate frame and bounded by marked or identified walls or wall planes. In addition, the indication may comprise a confirmation user interface element that may be selected by a user to indicate completion of movement of the user device within the room.

The process 700 may then continue by receiving movement data from one or more sensors of the user device, as at 742. For example, during movement of the user device within the room, as described herein, position and orientation data of the user device may be received, and/or imaging data may be captured by an imaging sensor of the user device. The position and orientation data may inform later determinations of ring paths and/or panorama paths, as further described herein, and the imaging data may be provided as additional inputs to a photogrammetry processor to generate a three-dimensional, photogrammetry mesh of the room or space.

The process 700 may then continue to determine whether sufficient movement data has been received, as at 744. For example, if sufficient movement data and corresponding imaging data have not been received in order to inform later determinations of ring paths and/or panorama paths, and/or to provide additional inputs to a photogrammetry processor, then the process 700 may return to step 742 and continue to receive movement data from one or more sensors of the user device.

If, however, sufficient movement data and corresponding imaging data have been received, then the process 700 may proceed to present an indication that movement of the user device within the room is complete, as at 746. For example, the indication may comprise text and visual cues or indications related to completion of movement of the user device within the bounds of the identified walls. In addition, the indication may comprise a confirmation user interface element that may be selected by a user to indicate confirmation that movement of the user device is complete, and a return user interface element that may be selected by a user to indicate that movement of the user device not complete.

The process 700 may then continue by determining whether user input to redo movement of the user device has been received, as at 748. For example, user input may be received via the return user interface element, e.g., via a touchscreen, stylus, or other user input, indicating that movement of the user device is not complete. If it is determined that movement of the user device is not complete, then the process 700 may return to step 740 to present an indication to move the user device within the room.

If, however, it is determined that movement of the user device is complete, then the process 700 may proceed to receive user confirmation of completion, as at 750. For example, user input may be received via the confirmation user interface element, e.g., via a touchscreen, stylus, or other user input, indicating that movement of the user device is complete. The process 700 may then end, as at 752.

Figure 8:
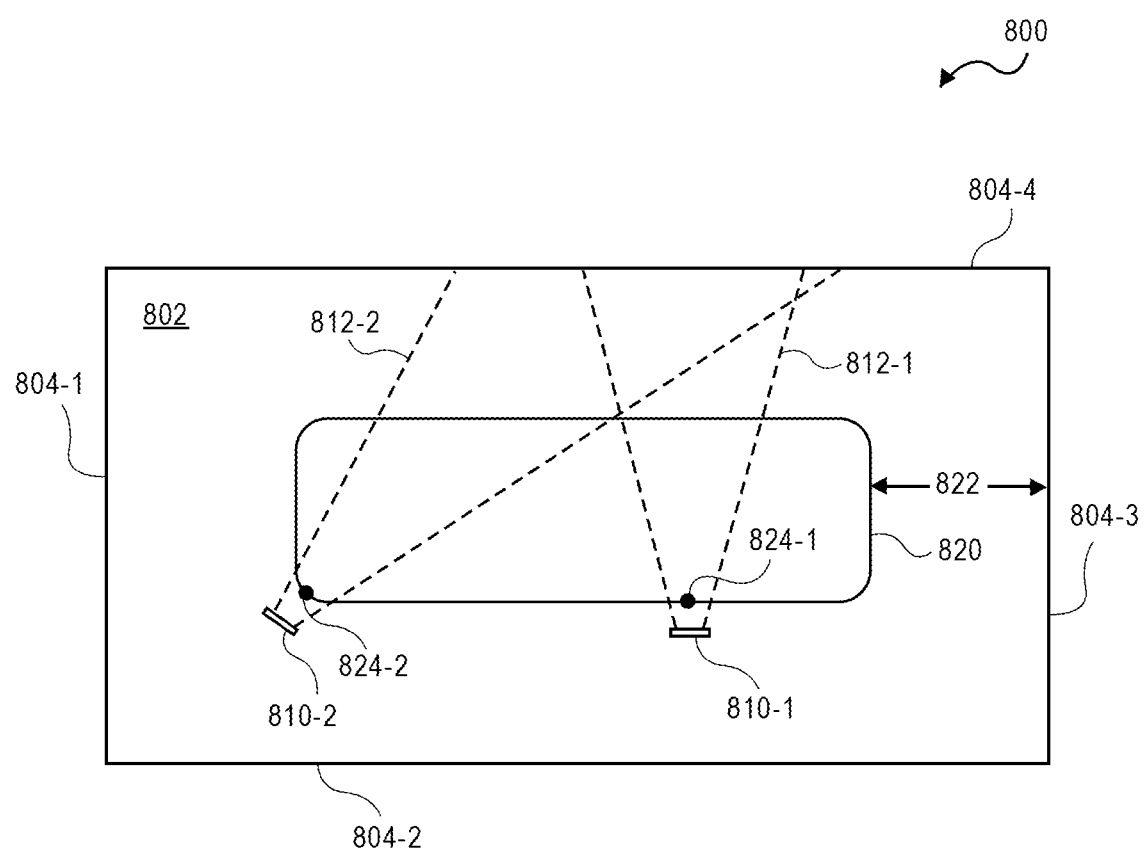
FIG. 8 is a schematic diagram of an example of ring path generation, in accordance with disclosed implementations.

FIG. 8 is a schematic diagram 800 of an example of ring path generation, in accordance with disclosed implementations.

FIG. 8 illustrates a schematic top-down view of an example room or space having a floor 802, walls 804-1, 804-2, 804-3, 804-4, and a ceiling (not shown), within which a ring path 820 may be generated for presentation via a display of a user device 810. The user device 810 may be a mobile computing device, such as a smartphone, and may comprise a processor, a memory having executable instructions and one or more applications, one or more inputs such as buttons, a touchscreen, and/or microphones, one or more outputs such as a display and/or speakers, one or more sensors such as an inertial measurement unit, an imaging sensor, and/or other sensors, and/or any or all features described herein with respect to user devices.

The ring path 820 may comprise a scaled-down, shrunken, or reduced version of the walls 804 of the room based at least in part on dimensions or measurements of the room and/or user movement data. The ring path 820 may be generated for presentation at particular locations or positions within the local coordinate frame of the room, and the ring path 820 may be presented via a display of the user device based on position and orientation data of the user device within the local coordinate frame of the room, as well as a field of view of an imaging sensor associated with the user device.

For example, portions of the ring path 820 may be separated from respective walls 804 of the room by an offset distance 822. In some example embodiments, the offset distance 822 may comprise an approximate distance, e.g., 1 meter, 2 meters, or other distances, or an approximate percentage, e.g., 20%, 30%, 50%, or other percentage, of the distance from the wall to a center of the room, or of the distance from one wall to an opposite wall. In other example embodiments, the offset distance 822 may comprise various other fixed, variable, minimum, and/or maximum numbers, values, distances, percentages, or other offsets from the walls of the room. In addition, the ring path 820 may be substantially centered within the room. Further, corners of the ring path 820 may be rounded in order to facilitate smooth image capture around all parts of the ring path 820, as further described herein.

Generally, the ring path 820 may have a convex shape or hull, such that no portions of the ring path are concave and such that no portions of the ring path intersect or overlap any other portions of the ring path. In addition, the ring path 820 may be generated at least partially based on user movement data within the room, e.g., to match or correspond to at least a portion of a path or loop traveled by a user with the user device within the room.

Further, based at least in part on dimensions of the room, multiple ring paths may be generated in order to capture sufficient images of all portions of the room, including the floor, walls, and ceiling. For example, for rooms with relatively larger dimensions, a single ring path that may be substantially centered within the room may capture sufficient images of all portions of the room. Likewise, for rooms with relatively smaller dimensions, multiple ring paths may be needed in order to capture sufficient images of all portions of the room, e.g., a center of the floor, a center of the ceiling, as well as all walls and corners of the room, such as a lower ring path closer to the floor and substantially centered within the room and a higher ring path closer to the ceiling and substantially centered with the room. Moreover, for rooms with shapes other than square or rectangular, such as L-shaped rooms or other oddly shaped rooms, multiple ring paths may be generated for multiple sections of the room, e.g., multiple rectangularly shaped sections of an L-shaped room, in order to capture sufficient images of all portions of the room without generating concave portions of the ring path. In addition to dimensions of a room, the number of ring paths needed to capture sufficient images of all portions of a room may further depend on characteristics associated with an imaging sensor of the user device, e.g., field of view, image resolution, image capture rate, imaging sensor movement rate, or other factors.

As illustrated schematically in FIG. 8, a user device 810 may traverse, e.g., be moved by a user, around the ring path 820 in order to capture images of the room during such traversal. To facilitate traversal of the user device 810 around the ring path, a target 824 may also be generated for presentation via a display of a user device. The target 824 may have various shapes, such as a two-dimensional shape, three-dimensional shape, a rod, a cone, a hollow cylinder, a sphere, a cube, or various other geometric, regular, irregular, and/or asymmetrical shapes. The target 824 may be generated for presentation at a location or position along the ring path 820 within the local coordinate frame of the room that is closest to a current position of the user device based on position and orientation data of the user device, and the target 824 may be presented via a display of the user device based on position and orientation data of the user device within the local coordinate frame of the room, as well as a field of view of an imaging sensor associated with the user device. In addition, responsive to movement of the user device relative to the ring path 820, the target 824 may modify its location or position along the ring path 820 within the local coordinate frame of the room such that the target 824 may continue to be presented closest to a current position of the user device based on position and orientation data of the user device.

To further facilitate traversal of the user device 810 around the ring path, a reticle (not shown) may also be generated for presentation via a display of a user device. For example, the reticle may function as a sight, scope, or other positioning aid, within which a user may be instructed to maintain the target 824 during traversal around the ring path 820. The reticle may have various shapes, such as a rectangle, square, circle, cross-hairs, oval, pill, or various other geometric, regular, irregular, and/or asymmetrical shapes. The reticle may be generated for presentation substantially centered within the display of the user device.

In addition, placement and movement of the target 824 within, outside, or otherwise relative to the reticle presented via the display of the user device may be determined using various processing techniques, such as image processing, edge detection, and/or other algorithms or techniques. Further, placement and movement of the target 824 within, outside, or otherwise relative to the reticle presented via the display of the user device may also be determined using position tracking techniques, including position and orientation data associated with the imaging sensor, e.g., a field of view of the imaging sensor, of the user device within the local coordinate frame, and position data associated with a target 824 on a ring path 820 that are generated for presentation at particular locations within the local coordinate frame. In example embodiments, movement of the target 824 outside the reticle may include movement of the target 824 completely outside the reticle, movement of the target 824 at least partially outside the reticle, movement of the target 824 such that it is larger than at least one dimension of the reticle (or a distance between the target 824 and reticle is below a minimum threshold, e.g., the target is too close to the reticle), and/or movement of the target 824 such that at least one dimension of the target 824 is smaller than a threshold size (or a distance between the target 824 and reticle is above a maximum threshold, e.g., the target is too far away from the reticle).

In order to maintain the target 824 within a reticle presented via a display of a user device while traversing around the ring path 820 within a room, a user and user device, as well as a field of view of an imaging sensor of the user device, may move in a strafing motion, or sideways motion, around the ring path 820. In addition, because the target 824 continues to update its location along the ring path 820 to maintain a location that is closest to a current position of the user device, the target 824 may appear to follow, or move together with, the user device during traversal around the ring path. Further, because the target 824 maintains a location that is closest to a current position of the user device, a field of view of the imaging sensor of the user device may generally extend across the room at portions of opposing walls and portions of the floor and/or the ceiling as long as the target 824 is maintained within the reticle presented via the display of the user device.

FIG. 8 illustrates two example positions of a user device 810 and corresponding target 824 during traversal around the ring path 820. For example, at a first position, a user device 810-1 may be traversing along a lower, straight portion of the ring path 820 while maintaining a target 824-1 within a reticle presented via a display of the user device. At this first position, a field of view 812-1 of an imaging sensor of the user device may extend substantially across the room and include portions of the wall 804-4, as well as portions of the floor 802 and/or the ceiling. In addition, at a second position, a user device 810-2 may be traversing along a curved portion of the ring path 820 while maintaining a target 824-2 within a reticle presented via a display of the user device. At this second position, a field of view 812-2 of an imaging sensor of the user device may also extend substantially across the room and include other portions of the wall 804-4, as well as other portions of the floor 802 and/or the ceiling. At various other positions around the ring path 802, a field of view of an imaging sensor of the user device may likewise extend substantially across the room and include various portions of the walls 804, as well as various portions of the floor 802 and/or the ceiling.

During traversal of the user device around the ring path 802 in the manner described, imaging data may be captured using an imaging sensor of the user device. In addition, position and orientation data from one or more position and orientation sensors of the user device may also be received and/or stored, and the position and orientation data may be associated with imaging data captured at such positions or orientations.

In example embodiments, the imaging data may be captured for later processing by a photogrammetry processor to generate a photogrammetric mesh of the room. In some embodiments, photogrammetry may require that each image of the imaging data includes at least approximately 30% overlap with at least one other image of the imaging data. In other embodiments, photogrammetry may require that each image of the imaging data include different percentages or amounts of overlap with at least one other image of the imaging data, e.g., at least approximately 20%, 40%, 50%, 60%, 80%, or other percentages or amounts of overlap. For example, a desired amount of overlap between images may be obtained by processing to determine an actual amount of overlap between images, adjusting a frame rate of an imaging sensor, providing guidance or cues related to a rate of movement of an imaging sensor, and/or providing guidance or cues related to capture of additional or supplemental imaging data. Further, the required amount of image overlap for photogrammetry meshes of rooms may depend on various factors, such as room dimensions, fields of view, image resolutions, image capture rates, imaging sensor movement rates, or other factors.

For example, the image capture rate of the imaging sensor of the user device may be determined or tuned to provide the required amount of image overlap between images for photogrammetry. In some example embodiments, the image capture rate may be a first defined capture rate along relatively straight portions of the ring path 820, and the image capture rate may be a second defined capture rate that is higher than the first defined capture rate along curved portions of the ring path 820. This may ensure that sufficient details within and numbers of images are captured during curved portions of the ring path 820 when corners of rooms may generally be within the field of view of the imaging sensor and when portions of rooms, e.g., corners, may be traversed across relatively more quickly than other portions of rooms, e.g., straight or flat walls.

Further, various pre-processing techniques may be implemented in order to determine the quality and/or sufficiency of imaging data for photogrammetry, such as image processing, feature detection, and/or other algorithms or techniques. Accordingly, during or shortly after capture of imaging data during traversal of a ring path using a user device, the imaging data may be pre-processed to determine whether additional imaging data should be captured to meet the general requirements of various photogrammetry processors.

Moreover, during any of the various operations or processes described herein with respect to capturing images of a room or space using ring paths, dimensions or measurements of the room or space may also be detected or determined, along with position and orientation data of the user device at the time of such determinations, and the determined dimensions or measurements and position and orientation data may be used as additional inputs to further refine the determined dimensions or measurements to generate a geometric shell of the room or space, as further described herein.

FIGS. 9A-9L are example user interface screens illustrating steps of an example image capture process using ring paths with augmented reality guidance, in accordance with disclosed implementations.

As described herein with respect to FIGS. 9A-9L, upon receiving user consent, a user device may generate and/or present, via a display, various visual guides to facilitate an image capture process based on dimensions or measurements of a room or space, movement data within the room or space, and/or position and orientation data of the user device. In addition, the various visual guides may be presented, via a display, as overlaying a field of view of an imaging sensor and may be presented, via a display, at determined locations within the field of view based on position and orientation data of the user device.

Figure 9C:
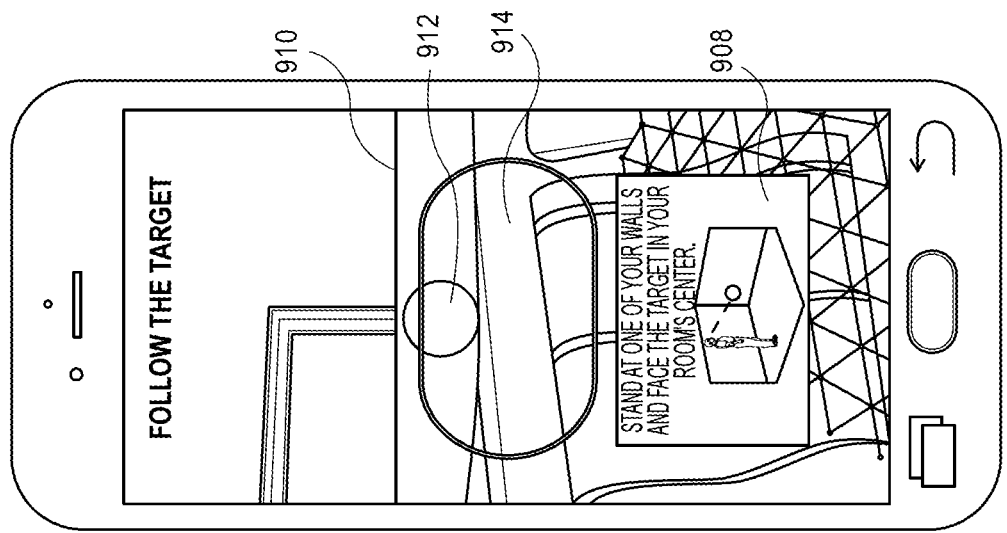
FIGS. 9A-9L are example user interface screens illustrating steps of an example image capture process using ring paths with augmented reality guidance, in accordance with disclosed implementations.
Figure 9B:
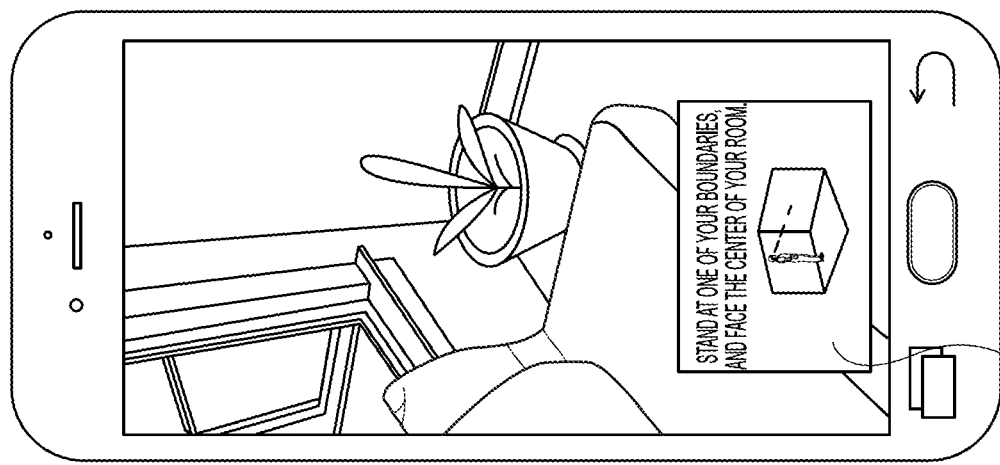
Figure 9A:
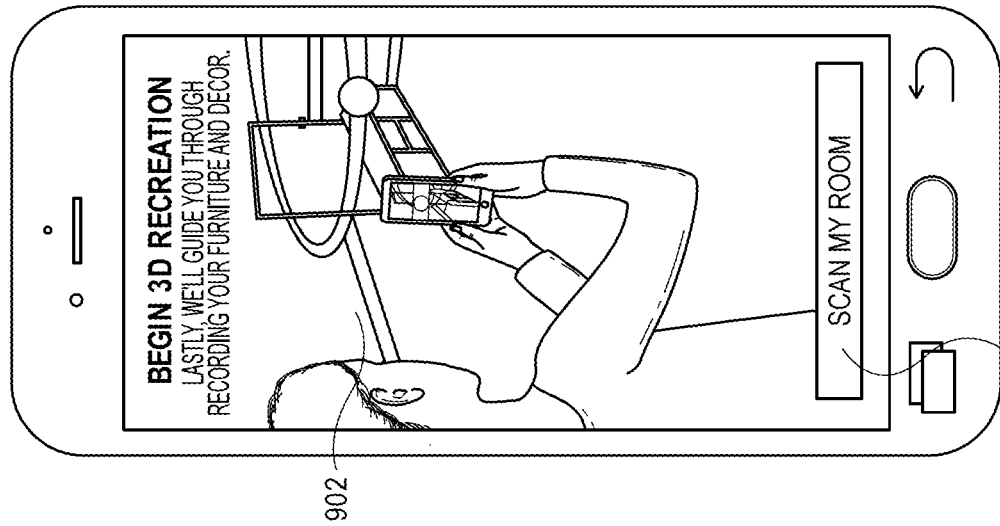

FIG. 9A illustrates an example user interface screen related to initiating the image capture process using ring paths, upon receiving user consent. For example, the example user interface screen may include an indication 902 related to initiating the image capture process using ring paths, and may also include a confirmation user interface element 904. User input may be received via the confirmation user interface element 904 to initiate the image capture process using ring paths, e.g., via a touchscreen, stylus, or other user input.

FIG. 9B illustrates an example user interface screen related to beginning the image capture process using ring paths, upon receiving user consent. For example, the example user interface screen may include an indication 906 related to moving the user device toward an edge, side, corner, or wall of the room and then facing towards a center of the room. In addition, imaging data captured via an imaging sensor of the user device may be presented via a display of the user device. During such movement of the user device, position and orientation data of the user device within the local coordinate frame may be tracked, upon receiving user consent, in order to determine whether the user device has moved toward an edge, side, corner, or wall of the room, as well as to determine a field of view of the imaging sensor of the user device.

FIG. 9C illustrates an example user interface screen related to facing toward a ring path within the room that is presented via the display of the device, and aligning a target along the ring path within a reticle that are also presented via the display of the user device. For example, the example user interface screen may include an indication 908 related to facing toward the ring path presented via the display of the user device, and aligning the target within the reticle presented via the display of the user device. In addition, imaging data captured via an imaging sensor of the user device may be presented via a display of the user device.

A ring path 910 may be generated for presentation at a particular location, including a particular height, within the local coordinate frame, e.g., substantially centered within the room. In addition, the ring path 910 may be presented with a first size, thickness, color, transparency, and/or other visual characteristic prior to traversal around any portions of the ring path 910, as shown in FIG. 9C. In other example embodiments, the path 910 may have a shape other than a ring path. Further, a target 912 may also be generated for presentation at a particular location along the ring path 910, e.g., at a location closest to a current location of the user device based on position and orientation data of the user device within the local coordinate frame. Moreover, a reticle 914 may also be generated for presentation at a particular position within the display of the user device, e.g., substantially centered within the display of the user device. In addition, the target 912 and/or the reticle 914 may be presented with a first size, shape, thickness, color, transparency, and/or other visual characteristic when the target 912 is not aligned within the reticle 914, as shown in FIG. 9C.

Figure 9F:
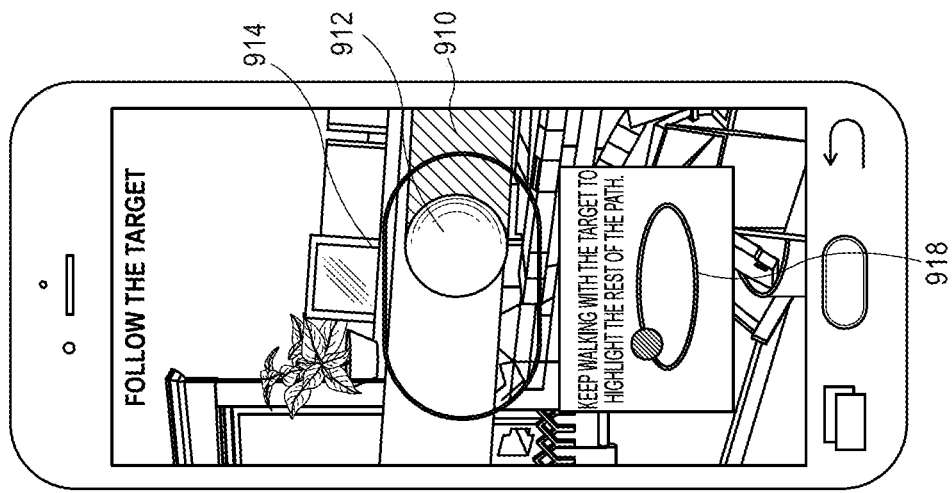
Figure 9E:
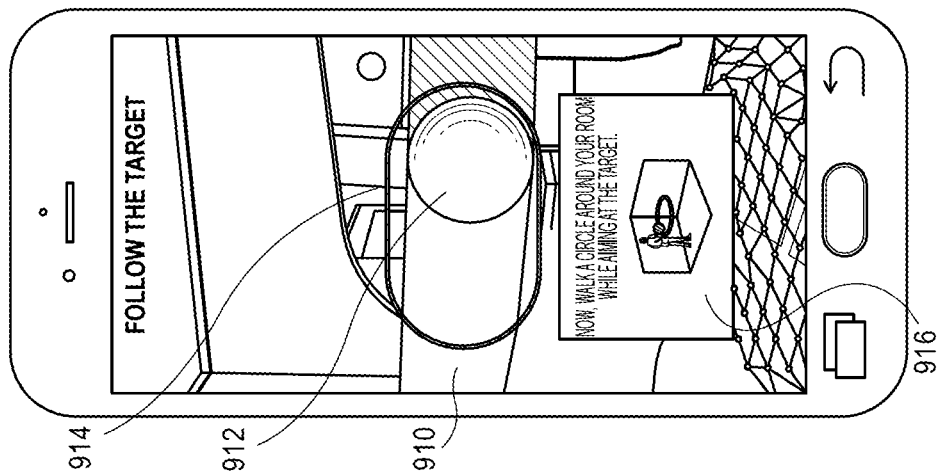
Figure 9D:
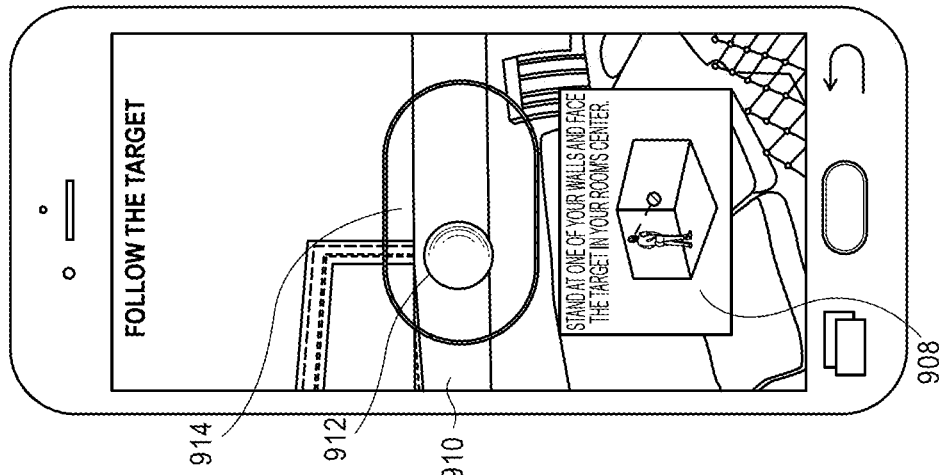

FIG. 9D illustrates another example user interface screen related to facing toward a ring path within the room that is presented via the display of the device, and aligning a target along the ring path within a reticle that are also presented via the display of the user device. For example, the example user interface screen may include an indication 908 related to facing toward the ring path presented via the display of the user device, and aligning the target within the reticle presented via the display of the user device. In addition, imaging data captured via an imaging sensor of the user device may be presented via a display of the user device.

A ring path 910 may be generated for presentation at a particular location, including a particular height, within the local coordinate frame, e.g., substantially centered within the room. In addition, the ring path 910 may be presented with a first size, thickness, color, transparency, and/or other visual characteristic prior to traversal around any portions of the ring path 910, as shown in FIG. 9D. Further, a target 912 may also be generated for presentation at a particular location along the ring path 910, e.g., at a location closest to a current location of the user device based on position and orientation data of the user device within the local coordinate frame. Moreover, a reticle 914 may also be generated for presentation at a particular position within the display of the user device, e.g., substantially centered within the display of the user device. In addition, the target 912 and/or the reticle 914 may be presented with a second size, shape, thickness, color, transparency, and/or other visual characteristic when the target 912 is aligned within the reticle 914, as shown in FIG. 9D.

FIG. 9E illustrates an example user interface screen related to traversing or moving around the ring path within the room that is presented via the display of the device, while maintaining alignment of the target along the ring path within the reticle that are also presented via the display of the user device. For example, the example user interface screen may include an indication 916 related to traversing around the ring path presented via the display of the user device, while maintaining alignment of the target within the reticle presented via the display of the user device. In addition, imaging data captured via an imaging sensor of the user device may be presented via a display of the user device. Further, position and orientation data of the user device may be received, tracked, and/or stored, upon receiving user consent, via position and orientation sensors of the user device during traversal or movement of the user device.

During traversal around the ring path 910, portions of the ring path 910 that have been traversed may be presented with a second size, thickness, color, transparency, and/or other visual characteristic after traversal around any portions of the ring path 910, as shown at the right side of FIG. 9E. In addition, the portions of the ring path 910 may be presented with the second size, thickness, color, transparency, and/or other visual characteristic after successful capture of imaging data, upon receiving user consent, via the imaging sensor of the user device during traversal around such portions of the ring path 910, which imaging data may be processed by a photogrammetry processor and/or used to generate a three-dimensional model of the room, as described herein. Further, during traversal around the ring path 910, a position of the target 912 may be continually generated and updated for presentation at a particular location along the ring path 910, e.g., at a location closest to a current location of the user device based on position and orientation data of the user device within the local coordinate frame. Moreover, the target 912 and the reticle 914 may also continue to be presented with the second size, shape, thickness, color, transparency, and/or other visual characteristic as long as the target 912 is maintained in alignment within the reticle 914, as shown in FIG. 9E.

FIG. 9F illustrates an example user interface screen related to continuing traversal or movement around the ring path within the room that is presented via the display of the device, while maintaining alignment of the target along the ring path within the reticle that are also presented via the display of the user device. For example, the example user interface screen may include an indication 918 related to continuing traversal around the ring path presented via the display of the user device, while maintaining alignment of the target within the reticle presented via the display of the user device. In addition, imaging data captured via an imaging sensor of the user device may be presented via a display of the user device. Further, position and orientation data of the user device may be received, tracked, and/or stored, upon receiving user consent, via position and orientation sensors of the user device during continuing traversal or movement of the user device.

During continuing traversal around the ring path 910, portions of the ring path 910 that have been traversed may be presented with a second size, thickness, color, transparency, and/or other visual characteristic after traversal around any portions of the ring path 910, as shown at the right side of FIG. 9F. In addition, the portions of the ring path 910 may be presented with the second size, thickness, color, transparency, and/or other visual characteristic after successful capture of imaging data, upon receiving user consent, via the imaging sensor of the user device during traversal around such portions of the ring path 910, which imaging data may be processed by a photogrammetry processor and/or used to generate a three-dimensional model of the room, as described herein. Further, during continuing traversal around the ring path 910, a position of the target 912 may be continually generated and updated for presentation at a particular location along the ring path 910, e.g., at a location closest to a current location of the user device based on position and orientation data of the user device within the local coordinate frame. Moreover, the target 912 and the reticle 914 may also continue to be presented with the second size, shape, thickness, color, transparency, and/or other visual characteristic as long as the target 912 is maintained in alignment within the reticle 914, as shown in FIG. 9F.

Figure 9I:
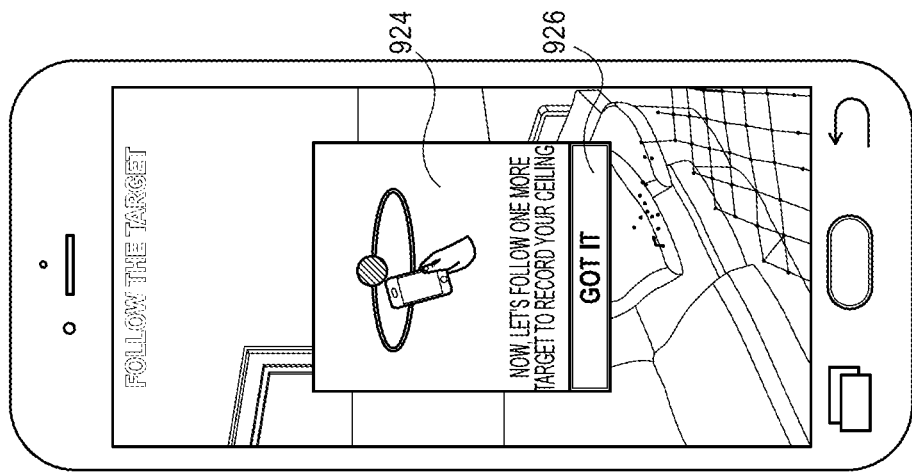
Figure 9H:
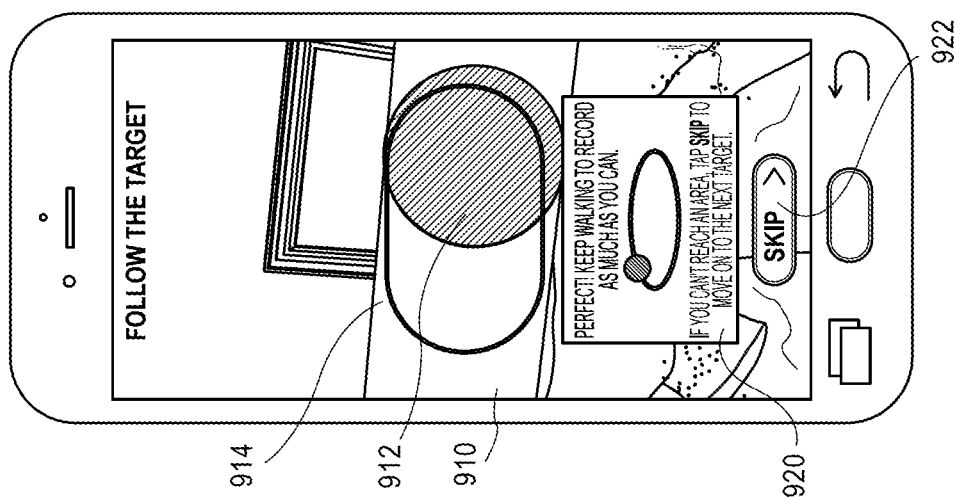
Figure 9G:
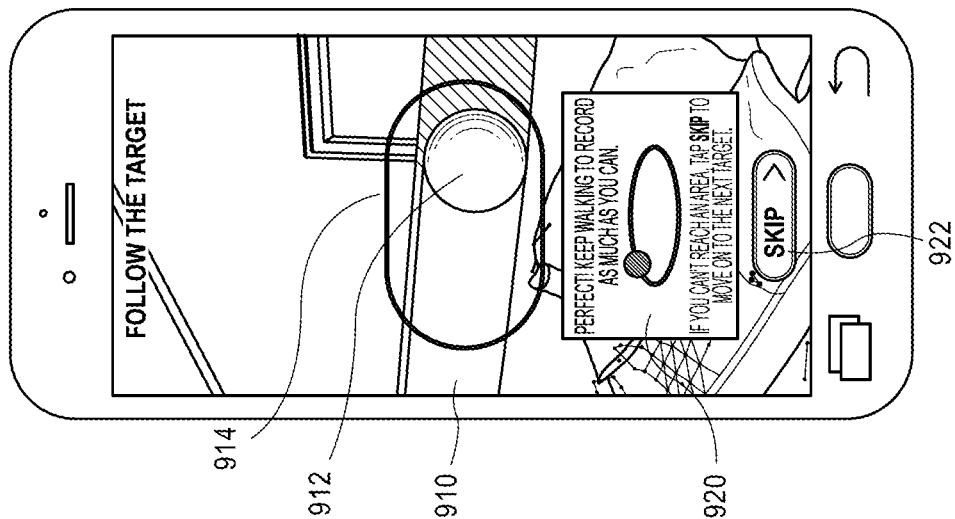

FIG. 9G illustrates an example user interface screen related to further continuing traversal or movement around the ring path within the room that is presented via the display of the device, while maintaining alignment of the target along the ring path within the reticle that are also presented via the display of the user device. For example, the example user interface screen may include an indication 920 related to further continuing traversal around the ring path presented via the display of the user device, while maintaining alignment of the target within the reticle presented via the display of the user device. In addition, imaging data captured via an imaging sensor of the user device may be presented via a display of the user device. Further, position and orientation data of the user device may be received, tracked, and/or stored, upon receiving user consent, via position and orientation sensors of the user device during continuing traversal or movement of the user device.

During further continuing traversal around the ring path 910, portions of the ring path 910 that have been traversed may be presented with a second size, thickness, color, transparency, and/or other visual characteristic after traversal around any portions of the ring path 910, as shown at the right side of FIG. 9G. In addition, the portions of the ring path 910 may be presented with the second size, thickness, color, transparency, and/or other visual characteristic after successful capture of imaging data, upon receiving user consent, via the imaging sensor of the user device during traversal around such portions of the ring path 910, which imaging data may be processed by a photogrammetry processor and/or used to generate a three-dimensional model of the room, as described herein. Further, during further continuing traversal around the ring path 910, a position of the target 912 may be continually generated and updated for presentation at a particular location along the ring path 910, e.g., at a location closest to a current location of the user device based on position and orientation data of the user device within the local coordinate frame. Moreover, the target 912 and the reticle 914 may also continue to be presented with the second size, shape, thickness, color, transparency, and/or other visual characteristic as long as the target 912 is maintained in alignment within the reticle 914, as shown in FIG. 9G.

Further, the example user interface screen may also include a skip user interface element 922 configured to receive an indication to skip or end traversal of a remainder of the ring path, as well as the image capture process during such traversal. User input may be received via the skip user interface element 922 to skip or end the traversal of the ring path and corresponding image capture process, e.g., via a touchscreen, stylus, or other user input. In other example embodiments, in addition to or alternatively to a skip user interface element 922 by which a user may provide an indication to skip or end traversal of a remainder or portion of a ring path, one or more portions of a ring path may be skipped during traversal of the user device around the ring path, e.g., intentionally or inadvertently, and traversal of a ring path may still be considered completed even with the presence of such one or more skipped portions of the ring path.

FIG. 9H illustrates an example user interface screen related to further continuing traversal or movement around the ring path within the room that is presented via the display of the device, while maintaining alignment of the target along the ring path within the reticle that are also presented via the display of the user device. For example, the example user interface screen may include an indication 920 related to further continuing traversal around the ring path presented via the display of the user device, while maintaining alignment of the target within the reticle presented via the display of the user device. In addition, imaging data captured via an imaging sensor of the user device may be presented via a display of the user device. Further, position and orientation data of the user device may be received, tracked, and/or stored, upon receiving user consent, via position and orientation sensors of the user device during continuing traversal or movement of the user device.

If, during traversal around the ring path 910, the target 912 is not maintained in alignment within the reticle 914, e.g., the target 912 moves completely outside the reticle 914, the target 912 moves at least partially outside the reticle 914, the target 912 moves too far away from the reticle 914, and/or the target 912 moves too close to the reticle 914 (as shown in FIG. 9H), then the portions of the ring path 910 during which the target 912 is not maintained in alignment within the reticle 914 may continue to be presented in the first size, thickness, color, transparency, and/or other visual characteristic, as shown at the right side of FIG. 9H, to indicate that such traversal and corresponding image capture may be incomplete or insufficient. Relative movement and alignment between the target 912 and the reticle 914 may be determined using image processing, feature detection, and/or other algorithms and techniques, e.g., based on the presentations of the target 912 and the reticle 914 via the display of the user device and their relative positions, intersections, overlaps, sizes, or other characteristics. In addition, relative movement and alignment between the target 912 and the reticle 914 may also be determined using position tracking techniques, e.g., based on position and orientation data associated with the imaging sensor, e.g., a field of view of the imaging sensor, of the user device within the local coordinate frame, position and orientation data of the reticle 914 that is generated for presentation at a particular position via the display of the user device, and/or position and orientation data associated with the target 912 on the ring path 910 that are generated for presentation at particular locations within the local coordinate frame.

During further continuing traversal around the ring path 910, a position of the target 912 may be continually generated and updated for presentation at a particular location along the ring path 910, e.g., at a location closest to a current location of the user device based on position and orientation data of the user device within the local coordinate frame. Further, if the target 912 is not maintained in alignment within the reticle 914, the target 912 and/or the reticle 914 may also be presented in the first size, shape, thickness, color, transparency, and/or other visual characteristic, as shown in FIG. 9H, to indicate that alignment of the target 912 within the reticle 914 should be corrected and that such traversal and corresponding image capture may be incomplete or insufficient.

Moreover, if the movement rate or speed of the user device during traversal exceeds a threshold rate or speed, based on position or orientation data of the user device over time, the ring path 910, the target 912, and/or the reticle 914 may also be presented in the first size, shape, thickness, color, transparency, and/or other visual characteristic to indicate that the movement rate should be corrected and that such traversal and corresponding image capture may be incomplete or insufficient.

Further, the example user interface screen may also include a skip user interface element 922 configured to receive an indication to skip or end traversal of a remainder of the ring path, as well as the image capture process during such traversal. User input may be received via the skip user interface element 922 to skip or end the traversal of the ring path and corresponding image capture process, e.g., via a touchscreen, stylus, or other user input. In other example embodiments, in addition to or alternatively to a skip user interface element 922 by which a user may provide an indication to skip or end traversal of a remainder or portion of a ring path, one or more portions of a ring path may be skipped during traversal of the user device around the ring path, e.g., intentionally or inadvertently, and traversal of a ring path may still be considered completed even with the presence of such one or more skipped portions of the ring path.

FIG. 9I illustrates an example user interface screen related to continuing the image capture process using additional ring paths, upon receiving user consent. For example, the example user interface screen may include an indication 924 related to continuing the image capture process using additional ring paths, and may also include a confirmation user interface element 926. User input may be received via the confirmation user interface element 926 to continue the image capture process using additional ring paths, e.g., via a touchscreen, stylus, or other user input. In addition, imaging data captured via an imaging sensor of the user device may be presented via a display of the user device.

Figure 9L:
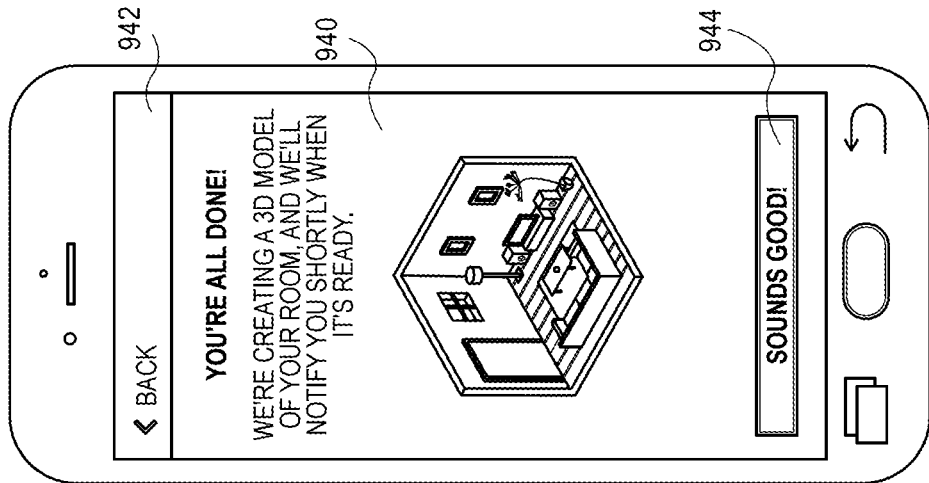
Figure 9K:
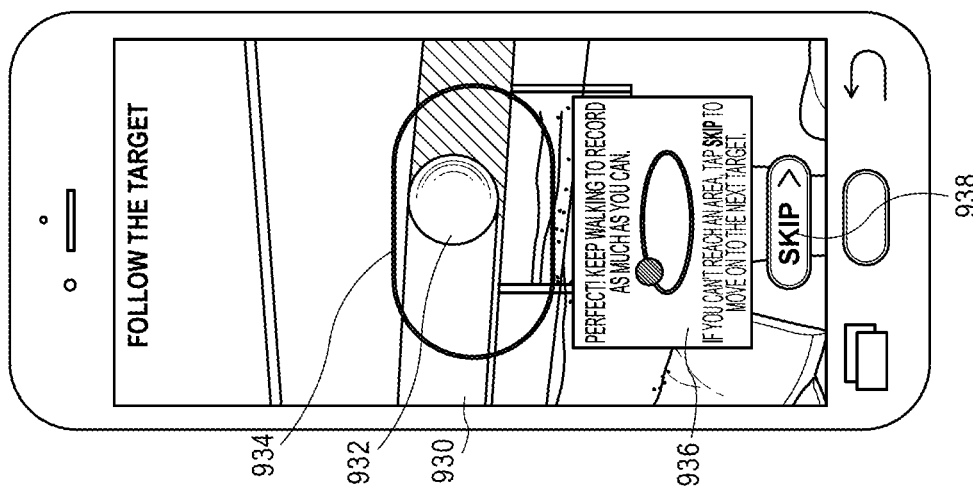
Figure 9J:
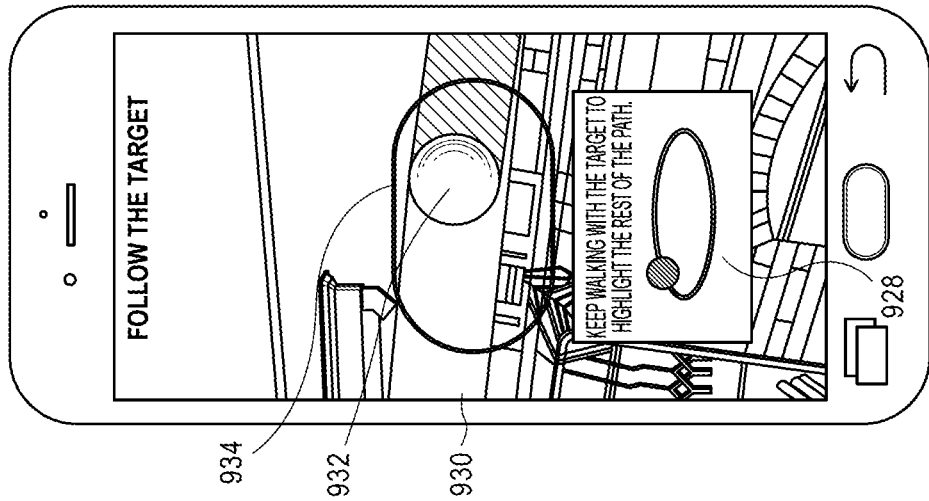

FIG. 9J illustrates an example user interface screen related to continuing traversal or movement around an additional ring path within the room that is presented via the display of the device, while maintaining alignment of the target along the additional ring path within the reticle that are also presented via the display of the user device. For example, the example user interface screen may include an indication 928 related to continuing traversal around the additional ring path presented via the display of the user device, while maintaining alignment of the target within the reticle presented via the display of the user device. In addition, imaging data captured via an imaging sensor of the user device may be presented via a display of the user device. Further, position and orientation data of the user device may be received, tracked, and/or stored, upon receiving user consent, via position and orientation sensors of the user device during continuing traversal or movement of the user device.

An additional ring path 930 may be generated for presentation at an additional particular location, including an additional particular height, within the local coordinate frame, e.g., substantially centered within the room and at a different height than the ring path 910. In addition, the additional ring path 930 may be presented with a first size, thickness, color, transparency, and/or other visual characteristic prior to traversal around any portions of the additional ring path 930, as shown at the left side of FIG. 9J, and may be presented with a second size, thickness, color, transparency, and/or other visual characteristic after traversal around any portions of the additional ring path 930, as shown at the right side of FIG. 9J. Further, the portions of the additional ring path 930 may be presented with the second size, thickness, color, transparency, and/or other visual characteristic after successful capture of imaging data, upon receiving user consent, via the imaging sensor of the user device during traversal around such portions of the additional ring path 930, which imaging data may be processed by a photogrammetry processor and/or used to generate a three-dimensional model of the room, as described herein. In other example embodiments, the path 930 may have a shape other than a ring path.

Further, a target 932 may also be continually generated and updated for presentation at a particular location along the additional ring path 930, e.g., at a location closest to a current location of the user device based on position and orientation data of the user device within the local coordinate frame. Moreover, a reticle 934 may also be generated for presentation at a particular position within the display of the user device, e.g., substantially centered within the display of the user device. In addition, the target 932 and/or the reticle 934 may be presented with a first size, shape, thickness, color, transparency, and/or other visual characteristic when the target 932 is not aligned within the reticle 934, and may be presented with a second size, shape, thickness, color, transparency, and/or other visual characteristic when the target 932 is aligned within the reticle 934, as shown in FIG. 9J.

FIG. 9K illustrates an example user interface screen related to further continuing traversal or movement around an additional ring path within the room that is presented via the display of the device, while maintaining alignment of the target along the additional ring path within the reticle that are also presented via the display of the user device. For example, the example user interface screen may include an indication 936 related to further continuing traversal around the additional ring path presented via the display of the user device, while maintaining alignment of the target within the reticle presented via the display of the user device. In addition, imaging data captured via an imaging sensor of the user device may be presented via a display of the user device. Further, position and orientation data of the user device may be received, tracked, and/or stored, upon receiving user consent, via position and orientation sensors of the user device during continuing traversal or movement of the user device.

During further continuing traversal around the additional ring path 930, portions of the ring path 930 that have been traversed may be presented with the second size, thickness, color, transparency, and/or other visual characteristic after traversal around any portions of the additional ring path 930, as shown at the right side of FIG. 9K. In addition, the portions of the additional ring path 930 may be presented with the second size, thickness, color, transparency, and/or other visual characteristic after successful capture of imaging data, upon receiving user consent, via the imaging sensor of the user device during traversal around such portions of the additional ring path 930, which imaging data may be processed by a photogrammetry processor and/or used to generate a three-dimensional model of the room, as described herein. Further, during further continuing traversal around the ring path 930, a position of the target 932 may be continually generated and updated for presentation at a particular location along the additional ring path 930, e.g., at a location closest to a current location of the user device based on position and orientation data of the user device within the local coordinate frame. Moreover, the target 932 and the reticle 934 may also continue to be presented with the second size, shape, thickness, color, transparency, and/or other visual characteristic as long as the target 932 is maintained in alignment within the reticle 934, as shown in FIG. 9K.

Further, the example user interface screen may also include a skip user interface element 938 configured to receive an indication to skip or end traversal of a remainder of the additional ring path, as well as the image capture process during such traversal. User input may be received via the skip user interface element 938 to skip or end the traversal of the ring path and corresponding image capture process, e.g., via a touchscreen, stylus, or other user input. In other example embodiments, in addition to or alternatively to a skip user interface element 938 by which a user may provide an indication to skip or end traversal of a remainder or portion of an additional ring path, one or more portions of an additional ring path may be skipped during traversal of the user device around the additional ring path, e.g., intentionally or inadvertently, and traversal of an additional ring path may still be considered completed even with the presence of such one or more skipped portions of the additional ring path.

FIG. 9L illustrates an example user interface screen related to completion of image capture process using ring paths within the room or space, upon receiving user consent. For example, the example user interface screen may include an indication 940 related to completion by a user of the image capture process using ring paths within the room. Further, the example user interface screen may also include a return user interface element 942 related to editing or returning to the image capture process using ring paths within the room. User input may be received via the return user interface element 942 to indicate editing or returning to the image capture process using ring paths, e.g., via a touchscreen, stylus, or other user input. Further, the example user interface screen may also include a confirmation user interface element 944 related to completion of the image capture process using ring paths within the room. User input may be received via the confirmation user interface element 944 to indicate completion of the image capture process using ring paths, e.g., via a touchscreen, stylus, or other user input.

FIGS. 10A-10M are example user interface screens illustrating steps of another example image capture process using ring paths with augmented reality guidance, in accordance with disclosed implementations.

As described herein with respect to FIGS. 10A-10M, upon receiving user consent, a user device may generate and/or present, via a display, various visual guides to facilitate an image capture process based on dimensions or measurements of a room or space, movement data within the room or space, and/or position and orientation data of the user device. In addition, the various visual guides may be presented, via a display, as overlaying a field of view of an imaging sensor and may be presented, via a display, at determined locations within the field of view based on position and orientation data of the user device.

FIG. 10A illustrates an example user interface screen related to beginning the image capture process using ring paths, upon receiving user consent. For example, the example user interface screen may include an indication 1002 related to moving the user device toward an edge, side, corner, or wall of the room. In addition, imaging data captured via an imaging sensor of the user device may be presented via a display of the user device. During such movement of the user device, position and orientation data of the user device within the local coordinate frame may be tracked, upon receiving user consent, in order to determine whether the user device has moved toward an edge, side, corner, or wall of the room. Further, based on the position and orientation data of the user device within the local coordinate frame, the imaging data presented via the display of the user device may be overlaid with a first semi-transparent color if the user device is not sufficiently close to an edge, side, corner, or wall of the room, e.g., not within a threshold distance of any wall, and the imaging data presented via the display of the user device may be overlaid with a second semi-transparent color if the user device is determined to be sufficiently close to an edge, side, corner, or wall of the room, e.g., within a threshold distance of a wall.

FIG. 10B illustrates an example user interface screen related to facing toward a ring path within the room that is presented via the display of the device, and aligning a target along the ring path within a reticle that are also presented via the display of the user device. For example, the example user interface screen may include an indication 1004 related to aligning the target within the reticle presented via the display of the user device, and traversing or moving around the ring path presented via the display of the user device. In addition, imaging data captured via an imaging sensor of the user device may be presented via a display of the user device.

Further, the example user interface screen may also include an arrow 1006 and a textual cue 1008 that are presented via the display of the user device to guide the user to orient a field of view of an imaging sensor of the user device toward the target along the ring path that are generated for presentation at particular locations within the local coordinate frame. For example, the arrow 1006 may be generated, presented, and updated to point in a particular direction, e.g., toward the target along the ring path, based on position and orientation data of the user device within the local coordinate frame, and particular locations or positions of the target and/or ring path within the local coordinate frame. Further, the textual cue 1008 may be generated, presented, and updated to follow or remain adjacent to the presented arrow 1006.

Moreover, a reticle 1014 may also be generated for presentation at a particular position within the display of the user device, e.g., substantially centered within the display of the user device. In addition, the reticle 1014 may be presented with a first size, shape, thickness, color, transparency, and/or other visual characteristic when a target is not aligned within the reticle 1014, as shown in FIG. 10B.

FIG. 10C illustrates an example user interface screen related to further facing toward a ring path within the room that is presented via the display of the device, and aligning a target along the ring path within a reticle that are also presented via the display of the user device. For example, the example user interface screen may include the indication 1004 related to aligning the target within the reticle presented via the display of the user device, and traversing or moving around the ring path presented via the display of the user device. In addition, imaging data captured via an imaging sensor of the user device may be presented via a display of the user device.

Further, the example user interface screen may also include an arrow 1006 and a textual cue 1008 that are presented via the display of the user device to guide the user to orient a field of view of an imaging sensor of the user device toward a target 1012 along a ring path 1010 that are generated for presentation at particular locations within the local coordinate frame. For example, the arrow 1006 may be generated, presented, and updated to point in a particular direction, e.g., toward the target 1012 along the ring path 1010, based on position and orientation data of the user device within the local coordinate frame, and particular locations or positions of the target 1012 and/or ring path 1010 within the local coordinate frame.

A ring path 1010 may be generated for presentation at a particular location, including a particular height, within the local coordinate frame, e.g., substantially centered within the room. In addition, the ring path 1010 may be presented with a first size, thickness, color, transparency, and/or other visual characteristic prior to traversal around any portions of the ring path 1010, as shown in FIG. 10C. In other example embodiments, the path 1010 may have a shape other than a ring path. Further, a target 1012 may also be generated for presentation at a particular location along the ring path 1010, e.g., at a location closest to a current location of the user device based on position and orientation data of the user device within the local coordinate frame. Moreover, a reticle 1014 may also be generated for presentation at a particular position within the display of the user device, e.g., substantially centered within the display of the user device. In addition, the target 1012 and/or the reticle 1014 may be presented with a first size, shape, thickness, color, transparency, and/or other visual characteristic when the target 1012 is not aligned within the reticle 1014, as shown in FIG. 10C.

As shown in FIG. 10C, when the target 1012 is within a field of view of the imaging sensor of the user device, the arrow 1006 may be generated and presented as pointing toward, e.g., pointing downward to, the target 1012 along the ring path 1010 that are presented via the display of the user device. Further, the textual cue 1008 may be generated and presented to follow or remain adjacent to the presented arrow 1006.

Figure 10F:
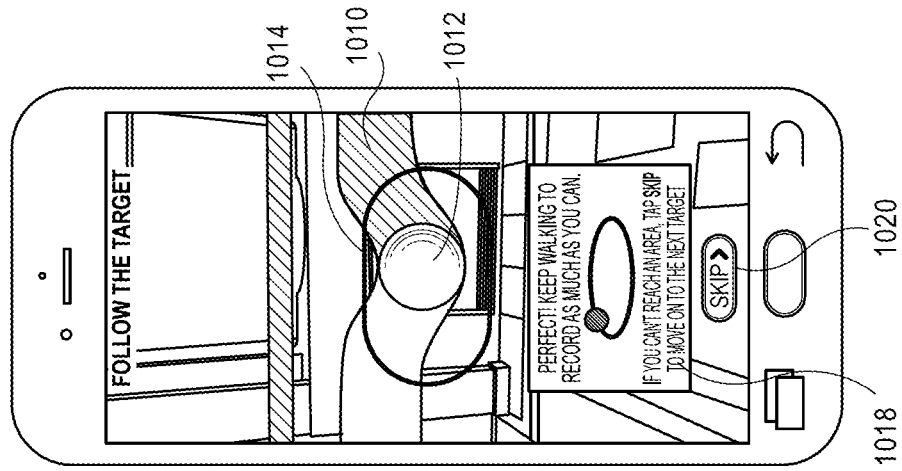
Figure 10E:
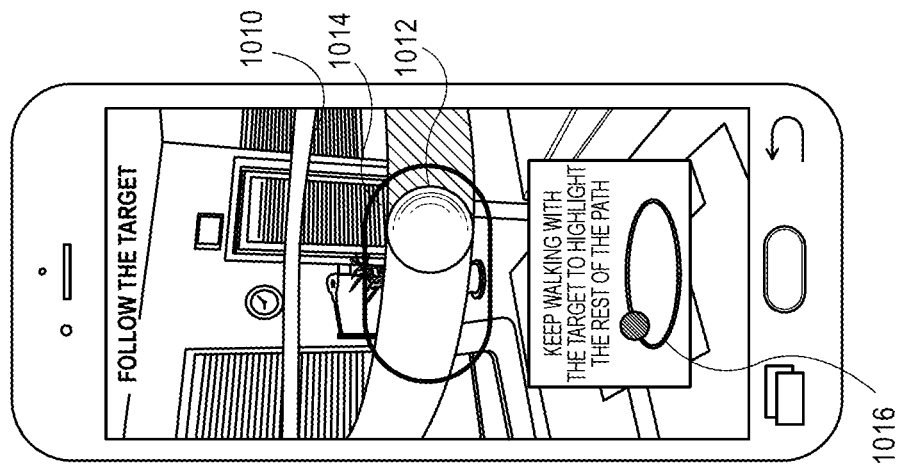
Figure 10D:
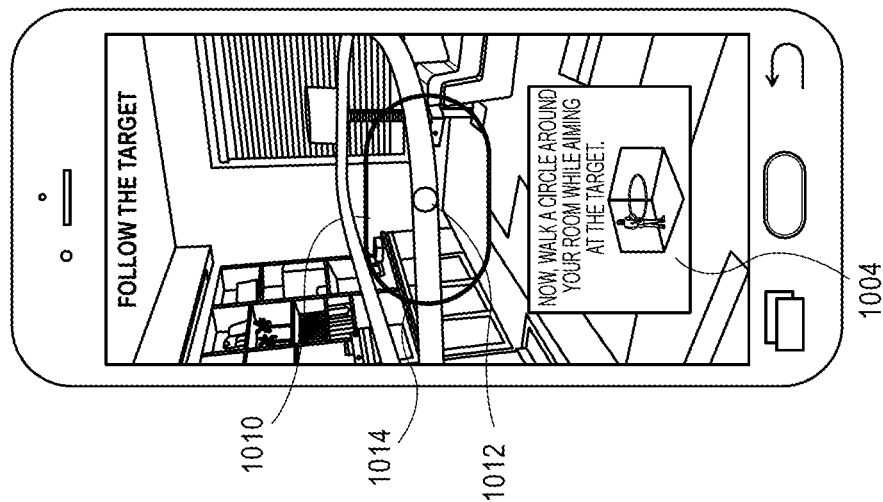

FIG. 10D illustrates an example user interface screen related to traversing or moving around the ring path within the room that is presented via the display of the device, while maintaining alignment of the target along the ring path within the reticle that are also presented via the display of the user device. For example, the example user interface screen may include the indication 1004 related to traversing or moving around the ring path presented via the display of the user device, while maintaining alignment of the target within the reticle presented via the display of the user device. In addition, imaging data captured via an imaging sensor of the user device may be presented via a display of the user device. Further, position and orientation data of the user device may be received, tracked, and/or stored, upon receiving user consent, via position and orientation sensors of the user device during traversal or movement of the user device.

During traversal around the ring path 1010, portions of the ring path 1010 that have been traversed may be presented with a second size, thickness, color, transparency, and/or other visual characteristic after traversal around any portions of the ring path 1010. In addition, the portions of the ring path 1010 may be presented with the second size, thickness, color, transparency, and/or other visual characteristic after successful capture of imaging data, upon receiving user consent, via the imaging sensor of the user device during traversal around such portions of the ring path 1010, which imaging data may be processed by a photogrammetry processor and/or used to generate a three-dimensional model of the room, as described herein. Further, during traversal around the ring path 1010, a position of the target 1012 may be continually generated and updated for presentation at a particular location along the ring path 1010, e.g., at a location closest to a current location of the user device based on position and orientation data of the user device within the local coordinate frame. Moreover, the target 1012 and the reticle 1014 may also be presented with a second size, shape, thickness, color, transparency, and/or other visual characteristic as long as the target 1012 is maintained in alignment within the reticle 1014, as shown in FIG. 10D.

FIG. 10E illustrates an example user interface screen related to continuing traversal or movement around the ring path within the room that is presented via the display of the device, while maintaining alignment of the target along the ring path within the reticle that are also presented via the display of the user device. For example, the example user interface screen may include an indication 1016 related to continuing traversal around the ring path presented via the display of the user device, while maintaining alignment of the target within the reticle presented via the display of the user device. In addition, imaging data captured via an imaging sensor of the user device may be presented via a display of the user device. Further, position and orientation data of the user device may be received, tracked, and/or stored, upon receiving user consent, via position and orientation sensors of the user device during continuing traversal or movement of the user device.

During continuing traversal around the ring path 1010, portions of the ring path 1010 that have been traversed may be presented with a second size, thickness, color, transparency, and/or other visual characteristic after traversal around any portions of the ring path 1010, as shown at the right side of FIG. 10E. In addition, the portions of the ring path 1010 may be presented with the second size, thickness, color, transparency, and/or other visual characteristic after successful capture of imaging data, upon receiving user consent, via the imaging sensor of the user device during traversal around such portions of the ring path 1010, which imaging data may be processed by a photogrammetry processor and/or used to generate a three-dimensional model of the room, as described herein. Further, during continuing traversal around the ring path 1010, a position of the target 1012 may be continually generated and updated for presentation at a particular location along the ring path 1010, e.g., at a location closest to a current location of the user device based on position and orientation data of the user device within the local coordinate frame. Moreover, the target 1012 and the reticle 1014 may also continue to be presented with the second size, shape, thickness, color, transparency, and/or other visual characteristic as long as the target 1012 is maintained in alignment within the reticle 1014, as shown in FIG. 10E.

FIG. 10F illustrates an example user interface screen related to further continuing traversal or movement around the ring path within the room that is presented via the display of the device, while maintaining alignment of the target along the ring path within the reticle that are also presented via the display of the user device. For example, the example user interface screen may include an indication 1018 related to further continuing traversal around the ring path presented via the display of the user device, while maintaining alignment of the target within the reticle presented via the display of the user device. In addition, imaging data captured via an imaging sensor of the user device may be presented via a display of the user device. Further, position and orientation data of the user device may be received, tracked, and/or stored, upon receiving user consent, via position and orientation sensors of the user device during continuing traversal or movement of the user device.

During further continuing traversal around the ring path 1010, portions of the ring path 1010 that have been traversed may be presented with a second size, thickness, color, transparency, and/or other visual characteristic after traversal around any portions of the ring path 1010, as shown at the right side of FIG. 10F. In addition, the portions of the ring path 1010 may be presented with the second size, thickness, color, transparency, and/or other visual characteristic after successful capture of imaging data, upon receiving user consent, via the imaging sensor of the user device during traversal around such portions of the ring path 1010, which imaging data may be processed by a photogrammetry processor and/or used to generate a three-dimensional model of the room, as described herein. Further, during further continuing traversal around the ring path 1010, a position of the target 1012 may be continually generated and updated for presentation at a particular location along the ring path 1010, e.g., at a location closest to a current location of the user device based on position and orientation data of the user device within the local coordinate frame. Moreover, the target 1012 and the reticle 1014 may also continue to be presented with the second size, shape, thickness, color, transparency, and/or other visual characteristic as long as the target 1012 is maintained in alignment within the reticle 1014, as shown in FIG. 10F.

Further, the example user interface screen may also include a skip user interface element 1020 configured to receive an indication to skip or end traversal of a remainder of the ring path, as well as the image capture process during such traversal. User input may be received via the skip user interface element 1020 to skip or end the traversal of the ring path and corresponding image capture process, e.g., via a touchscreen, stylus, or other user input. In other example embodiments, in addition to or alternatively to a skip user interface element 1020 by which a user may provide an indication to skip or end traversal of a remainder or portion of a ring path, one or more portions of a ring path may be skipped during traversal of the user device around the ring path, e.g., intentionally or inadvertently, and traversal of a ring path may still be considered completed even with the presence of such one or more skipped portions of the ring path.

Moreover, as shown in FIG. 10F, in various example embodiments, all or portions of the ring path 1010, or any other ring paths described herein, may adjust or modify their vertical positions as presented via the display of the user device, based on changes to position and orientation data of the user device during traversal around the ring path while the target is maintained within the reticle. For example, responsive to a change in vertical position and orientation of the user device during traversal, all or a portion of the ring path may correspondingly change its vertical position to maintain particular portions of opposing walls, floor, ceiling, or other surfaces within a field of view of the imaging sensor of the user device.

As an example, responsive to the user device being moved vertically lower and rotated to point the imaging sensor upward within the room and maintain the target within the reticle, all or a portion of the ring path may modify its vertical position to a lower position, as shown in FIG. 10F, in order to maintain particular portions of opposing walls, floor, ceiling, or other surfaces within a field of view of the imaging sensor of the user device. Likewise, responsive to the user device being moved vertically higher and rotated to point the imaging sensor downward within the room and maintain the target within the reticle, all or a portion of the ring path may also modify its vertical position to a higher position, in order to maintain particular portions of opposing walls, floor, ceiling, or other surfaces within a field of view of the imaging sensor of the user device.

In addition, the changes to vertical position of the portion of the ring path, as well as changes to other visual characteristics of all or the portion of the ring path including size, color, thickness, transparency, or others, may provide visual cues or indications to the user to adjust the vertical position and orientation of the user device to maintain a relatively flat or horizontal ring path and thereby capture imaging data of desired portions of opposing walls, floor, ceiling, or other surfaces. Furthermore, various textual cues or other indicators may be generated and presented via the display of the user device to instruct a user to adjust the vertical position and orientation of the user device during traversal around the ring path.

Figure 10I:
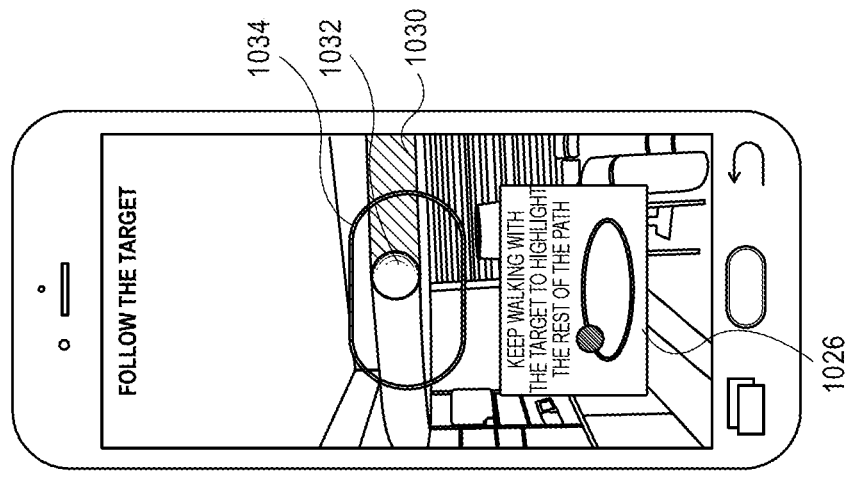
Figure 10H:
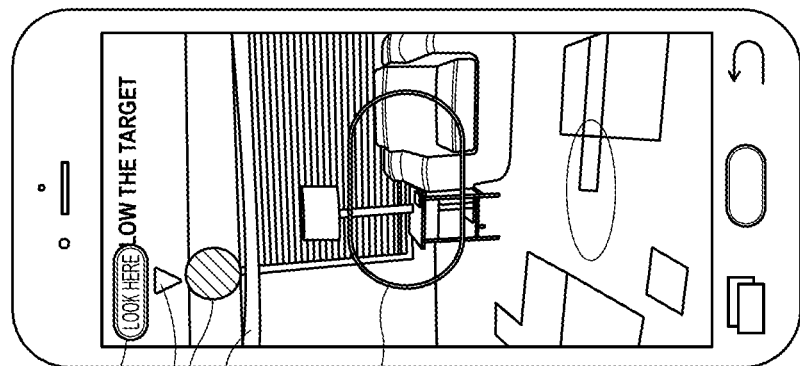
Figure 10G:
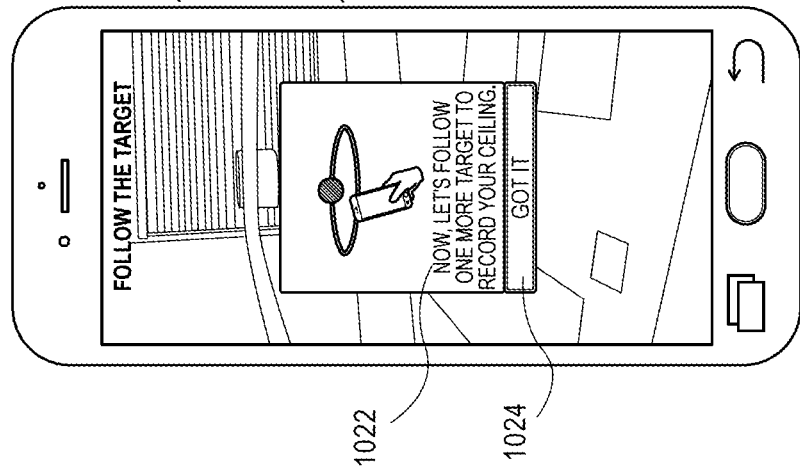

FIG. 10G illustrates an example user interface screen related to continuing the image capture process using additional ring paths, upon receiving user consent. For example, the example user interface screen may include an indication 1022 related to continuing the image capture process using additional ring paths, and may also include a confirmation user interface element 1024. User input may be received via the confirmation user interface element 1024 to continue the image capture process using additional ring paths, e.g., via a touchscreen, stylus, or other user input. In addition, imaging data captured via an imaging sensor of the user device may be presented via a display of the user device.

FIG. 10H illustrates an example user interface screen related to further facing toward an additional ring path within the room that is presented via the display of the device, and aligning a target along the additional ring path within a reticle that are also presented via the display of the user device. For example, the example user interface screen may include an indication related to aligning the target within the reticle presented via the display of the user device, and traversing or moving around the ring path presented via the display of the user device. In addition, imaging data captured via an imaging sensor of the user device may be presented via a display of the user device.

Further, the example user interface screen may also include an arrow 1006 and a textual cue 1008 that are presented via the display of the user device to guide the user to orient a field of view of an imaging sensor of the user device toward a target 1032 along an additional ring path 1030 that are generated for presentation at particular locations within the local coordinate frame. For example, the arrow 1006 may be generated, presented, and updated to point in a particular direction, e.g., toward the target 1032 along the additional ring path 1030, based on position and orientation data of the user device within the local coordinate frame, and particular locations or positions of the target 1032 and/or ring path 1030 within the local coordinate frame.

An additional ring path 1030 may be generated for presentation at an additional particular location, including an additional particular height, within the local coordinate frame, e.g., substantially centered within the room and at a different height than the ring path 1010. In addition, the additional ring path 1030 may be presented with a first size, thickness, color, transparency, and/or other visual characteristic prior to traversal around any portions of the additional ring path 1030, as shown in FIG. 10H. In other example embodiments, the path 1030 may have a shape other than a ring path. Further, a target 1032 may also be generated for presentation at a particular location along the additional ring path 1030, e.g., at a location closest to a current location of the user device based on position and orientation data of the user device within the local coordinate frame. Moreover, a reticle 1034 may also be generated for presentation at a particular position within the display of the user device, e.g., substantially centered within the display of the user device. In addition, the target 1032 and/or the reticle 1034 may be presented with a first size, shape, thickness, color, transparency, and/or other visual characteristic when the target 1032 is not aligned within the reticle 1034, as shown in FIG. 10H.

As shown in FIG. 10H, when the target 1032 is within a field of view of the imaging sensor of the user device, the arrow 1006 may be generated and presented as pointing toward, e.g., pointing downward to, the target 1032 along the additional ring path 1030 that are presented via the display of the user device. Further, the textual cue 1008 may be generated and presented to follow or remain adjacent to the presented arrow 1006.

FIG. 10I illustrates an example user interface screen related to continuing traversal or movement around the additional ring path within the room that is presented via the display of the device, while maintaining alignment of the target along the additional ring path within the reticle that are also presented via the display of the user device. For example, the example user interface screen may include an indication 1026 related to continuing traversal around the additional ring path presented via the display of the user device, while maintaining alignment of the target within the reticle presented via the display of the user device. In addition, imaging data captured via an imaging sensor of the user device may be presented via a display of the user device. Further, position and orientation data of the user device may be received, tracked, and/or stored, upon receiving user consent, via position and orientation sensors of the user device during continuing traversal or movement of the user device.

During continuing traversal around the additional ring path 1030, portions of the additional ring path 1030 that have been traversed may be presented with a second size, thickness, color, transparency, and/or other visual characteristic after traversal around any portions of the additional ring path 1030, as shown at the right side of FIG. 10I. In addition, the portions of the additional ring path 1030 may be presented with the second size, thickness, color, transparency, and/or other visual characteristic after successful capture of imaging data, upon receiving user consent, via the imaging sensor of the user device during traversal around such portions of the additional ring path 1030, which imaging data may be processed by a photogrammetry processor and/or used to generate a three-dimensional model of the room, as described herein. Further, during continuing traversal around the additional ring path 1030, a position of the target 1032 may be continually generated and updated for presentation at a particular location along the additional ring path 1030, e.g., at a location closest to a current location of the user device based on position and orientation data of the user device within the local coordinate frame. Moreover, the target 1032 and the reticle 1034 may also continue to be presented with the second size, shape, thickness, color, transparency, and/or other visual characteristic as long as the target 1032 is maintained in alignment within the reticle 1034, as shown in FIG. 10I.

Figure 10K:
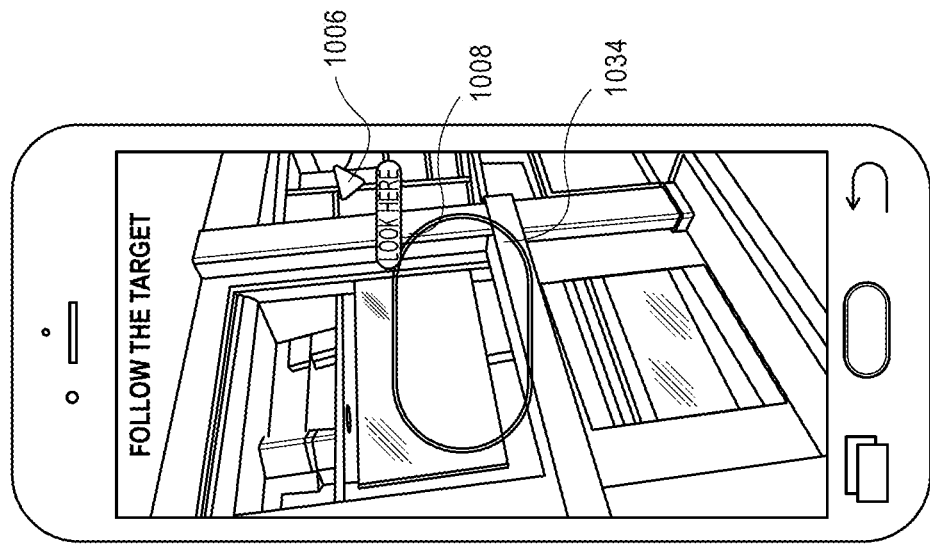
Figure 10J:
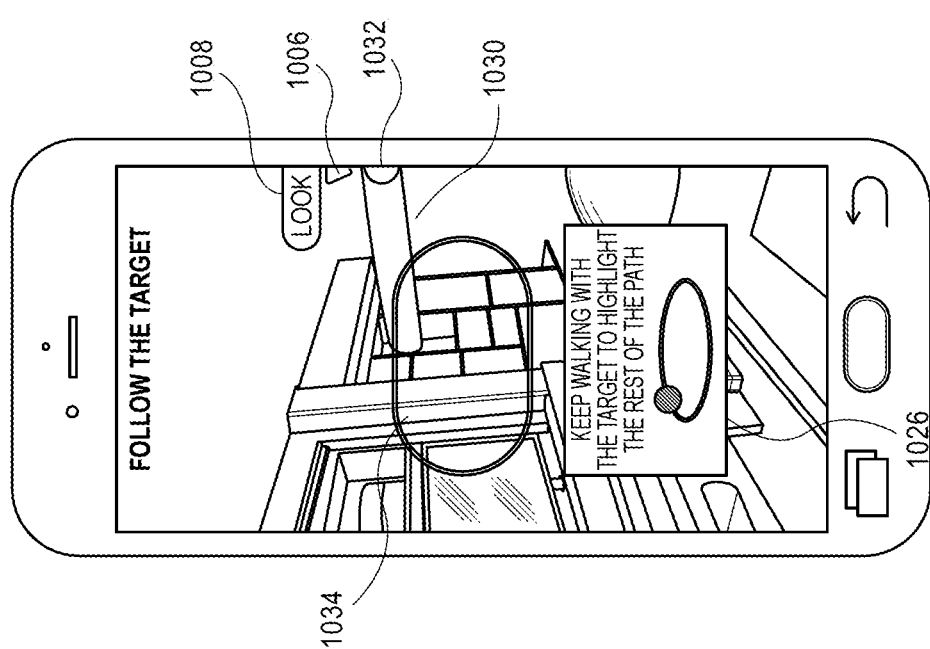

FIG. 10J illustrates an example user interface screen related to further continuing traversal or movement around the ring path within the room that is presented via the display of the device, while maintaining alignment of the target along the ring path within the reticle that are also presented via the display of the user device. For example, the example user interface screen may include the indication 1026 related to further continuing traversal around the ring path presented via the display of the user device, while maintaining alignment of the target within the reticle presented via the display of the user device. In addition, imaging data captured via an imaging sensor of the user device may be presented via a display of the user device. Further, position and orientation data of the user device may be received, tracked, and/or stored, upon receiving user consent, via position and orientation sensors of the user device during continuing traversal or movement of the user device.

If, during traversal around the additional ring path 1030 (or the ring path 1010), the target 1032 (or the target 1012) is not maintained in alignment within the reticle 1034 (or the reticle 1014), e.g., the target 1032 moves completely outside the reticle 1034 (as shown in FIG. 10J), the target 1032 moves at least partially outside the reticle 1034, the target 1032 moves too far away from the reticle 1034, and/or the target 1032 moves too close to the reticle 1034, then the portions of the additional ring path 1030 during which the target 1032 is not maintained in alignment within the reticle 1034 may continue to be presented in the first size, thickness, color, transparency, and/or other visual characteristic to indicate that such traversal and corresponding image capture may be incomplete or insufficient. Relative movement and alignment between the target 1032 and the reticle 1034 may be determined using image processing, feature detection, and/or other algorithms and techniques, e.g., based on the presentations of the target 1032 and the reticle 1034 via the display of the user device and their relative positions, intersections, overlaps, sizes, or other characteristics. In addition, relative movement and alignment between the target 1032 and the reticle 1034 may also be determined using position tracking techniques, e.g., based on position and orientation data associated with the imaging sensor, e.g., a field of view of the imaging sensor, of the user device within the local coordinate frame, position and orientation data of the reticle 1034 that is generated for presentation at a particular position via the display of the user device, and/or position and orientation data associated with the target 1032 on the additional ring path 1030 that are generated for presentation at particular locations within the local coordinate frame.

Further, as shown in FIG. 10J, if the target 1032 is not maintained in alignment within the reticle 1034 but the target 1032 is still within a field of view of the imaging sensor of the user device, an arrow 1006 may be generated and presented as pointing toward, e.g., pointing downward to, the target 1032 along the additional ring path 1030 that are presented via the display of the user device. Further, a textual cue 1008 may be generated and presented to follow or remain adjacent to the presented arrow 1006.

During further continuing traversal around the additional ring path 1030, a position of the target 1032 may be continually generated and updated for presentation at a particular location along the additional ring path 1030, e.g., at a location closest to a current location of the user device based on position and orientation data of the user device within the local coordinate frame. Further, if the target 1032 is not maintained in alignment within the reticle 1034, the target 1032 and/or the reticle 1034 may also be presented in the first size, shape, thickness, color, transparency, and/or other visual characteristic, as shown in FIG. 10J, to indicate that alignment of the target 1032 within the reticle 1034 should be corrected and that such traversal and corresponding image capture may be incomplete or insufficient.

Moreover, if the movement rate or speed of the user device during traversal exceeds a threshold rate or speed, based on position or orientation data of the user device over time, the ring path 1030, the target 1032, and/or the reticle 1034 may also be presented in the first size, shape, thickness, color, transparency, and/or other visual characteristic to indicate that the movement rate should be corrected and that such traversal and corresponding image capture may be incomplete or insufficient.

FIG. 10K illustrates another example user interface screen related to further continuing traversal or movement around the ring path within the room that is presented via the display of the device, while maintaining alignment of the target along the ring path within the reticle that are also presented via the display of the user device. In addition, imaging data captured via an imaging sensor of the user device may be presented via a display of the user device. Further, position and orientation data of the user device may be received, tracked, and/or stored, upon receiving user consent, via position and orientation sensors of the user device during continuing traversal or movement of the user device.

If, during traversal around the additional ring path 1030 (or the ring path 1010), the target 1032 (or the target 1012) is not maintained in alignment within the reticle 1034 (or the reticle 1014), e.g., the target 1032 moves completely outside the reticle 1034 (as shown in FIG. 10K), the target 1032 moves at least partially outside the reticle 1034, the target 1032 moves too far away from the reticle 1034, and/or the target 1032 moves too close to the reticle 1034, then the portions of the additional ring path 1030 during which the target 1032 is not maintained in alignment within the reticle 1034 may continue to be presented in the first size, thickness, color, transparency, and/or other visual characteristic to indicate that such traversal and corresponding image capture may be incomplete or insufficient. Relative movement and alignment between the target 1032 and the reticle 1034 may be determined using image processing, feature detection, and/or other algorithms and techniques, e.g., based on the presentations of the target 1032 and the reticle 1034 via the display of the user device and their relative positions, intersections, overlaps, sizes, or other characteristics. In addition, relative movement and alignment between the target 1032 and the reticle 1034 may also be determined using position tracking techniques, e.g., based on position and orientation data associated with the imaging sensor, e.g., a field of view of the imaging sensor, of the user device within the local coordinate frame, position and orientation data of the reticle 1034 that is generated for presentation at a particular position via the display of the user device, and/or position and orientation data associated with the target 1032 on the additional ring path 1030 that are generated for presentation at particular locations within the local coordinate frame.

Further, as shown in FIG. 10K, if the target 1032 is not maintained in alignment within the reticle 1034 and the target 1032 is no longer within a field of view of the imaging sensor of the user device, an arrow 1006 and a textual cue 1008 may be presented via the display of the user device to guide the user to orient a field of view of an imaging sensor of the user device toward the target along the ring path that are generated for presentation at particular locations within the local coordinate frame. For example, the arrow 1006 may be generated, presented, and updated to point in a particular direction, e.g., toward the target along the ring path, based on position and orientation data of the user device within the local coordinate frame, and particular locations or positions of the target and/or ring path within the local coordinate frame. Further, the textual cue 1008 may be generated, presented, and updated to follow or remain adjacent to the presented arrow 1006.

Figure 10M:
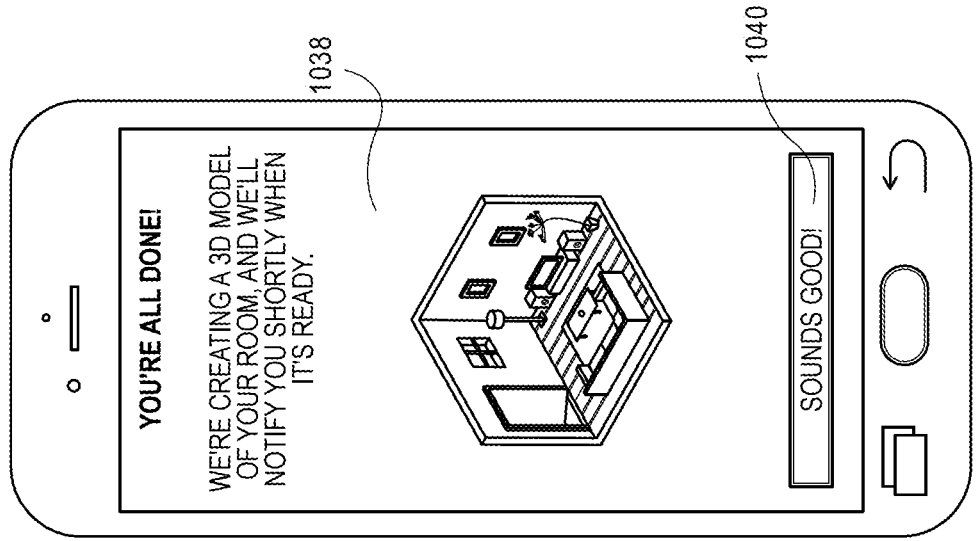
Figure 10L:
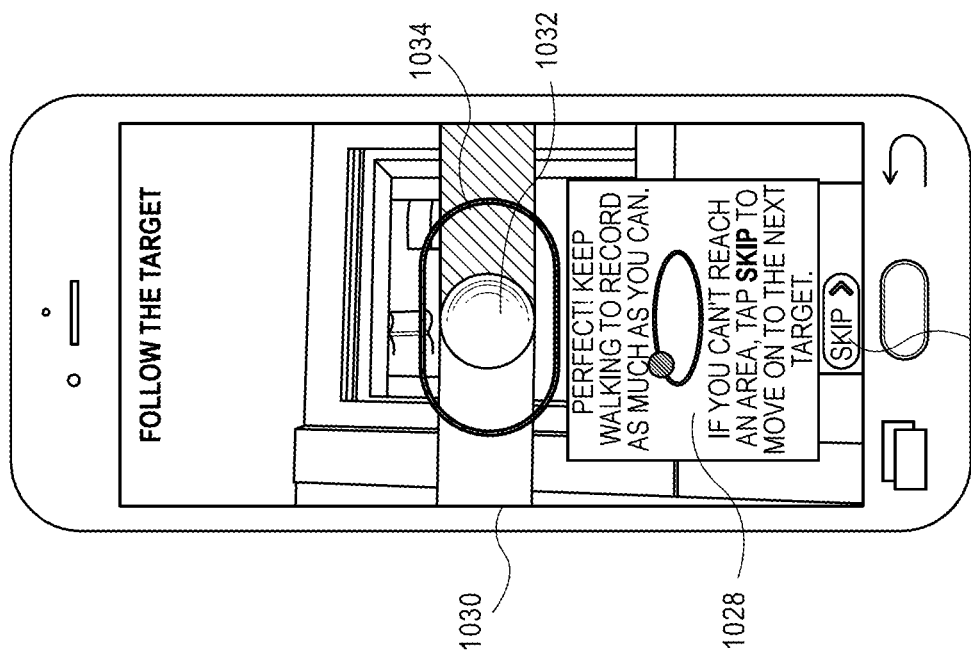

FIG. 10L illustrates an example user interface screen related to further continuing traversal or movement around the ring path within the room that is presented via the display of the device, while maintaining alignment of the target along the ring path within the reticle that are also presented via the display of the user device. For example, the example user interface screen may include an indication 1028 related to further continuing traversal around the ring path presented via the display of the user device, while maintaining alignment of the target within the reticle presented via the display of the user device. In addition, imaging data captured via an imaging sensor of the user device may be presented via a display of the user device. Further, position and orientation data of the user device may be received, tracked, and/or stored, upon receiving user consent, via position and orientation sensors of the user device during continuing traversal or movement of the user device.

During further continuing traversal around the additional ring path 1030, portions of the additional ring path 1030 that have been traversed may be presented with a second size, thickness, color, transparency, and/or other visual characteristic after traversal around any portions of the additional ring path 1030, as shown at the right side of FIG. 10L. In addition, the portions of the additional ring path 1030 may be presented with the second size, thickness, color, transparency, and/or other visual characteristic after successful capture of imaging data, upon receiving user consent, via the imaging sensor of the user device during traversal around such portions of the additional ring path 1030, which imaging data may be processed by a photogrammetry processor and/or used to generate a three-dimensional model of the room, as described herein. Further, during further continuing traversal around the additional ring path 1030, a position of the target 1032 may be continually generated and updated for presentation at a particular location along the additional ring path 1030, e.g., at a location closest to a current location of the user device based on position and orientation data of the user device within the local coordinate frame. Moreover, the target 1032 and the reticle 1034 may also continue to be presented with the second size, shape, thickness, color, transparency, and/or other visual characteristic as long as the target 1032 is maintained in alignment within the reticle 1034, as shown in FIG. 10L.

Further, the example user interface screen may also include a skip user interface element 1036 configured to receive an indication to skip or end traversal of a remainder of the additional ring path, as well as the image capture process during such traversal. User input may be received via the skip user interface element 1036 to skip or end the traversal of the additional ring path and corresponding image capture process, e.g., via a touchscreen, stylus, or other user input. In other example embodiments, in addition to or alternatively to a skip user interface element 1036 by which a user may provide an indication to skip or end traversal of a remainder or portion of an additional ring path, one or more portions of an additional ring path may be skipped during traversal of the user device around the additional ring path, e.g., intentionally or inadvertently, and traversal of an additional ring path may still be considered completed even with the presence of such one or more skipped portions of the additional ring path.

FIG. 10M illustrates an example user interface screen related to completion of image capture process using ring paths within the room or space, upon receiving user consent. For example, the example user interface screen may include an indication 1038 related to completion by a user of the image capture process using ring paths within the room. Further, the example user interface screen may also include a return user interface element related to editing or returning to the image capture process using ring paths within the room. User input may be received via the return user interface element to indicate editing or returning to the image capture process using ring paths, e.g., via a touchscreen, stylus, or other user input. Further, the example user interface screen may also include a confirmation user interface element 1040 related to completion of the image capture process using ring paths within the room. User input may be received via the confirmation user interface element 1040 to indicate completion of the image capture process using ring paths, e.g., via a touchscreen, stylus, or other user input.

Figures 1, 11A:
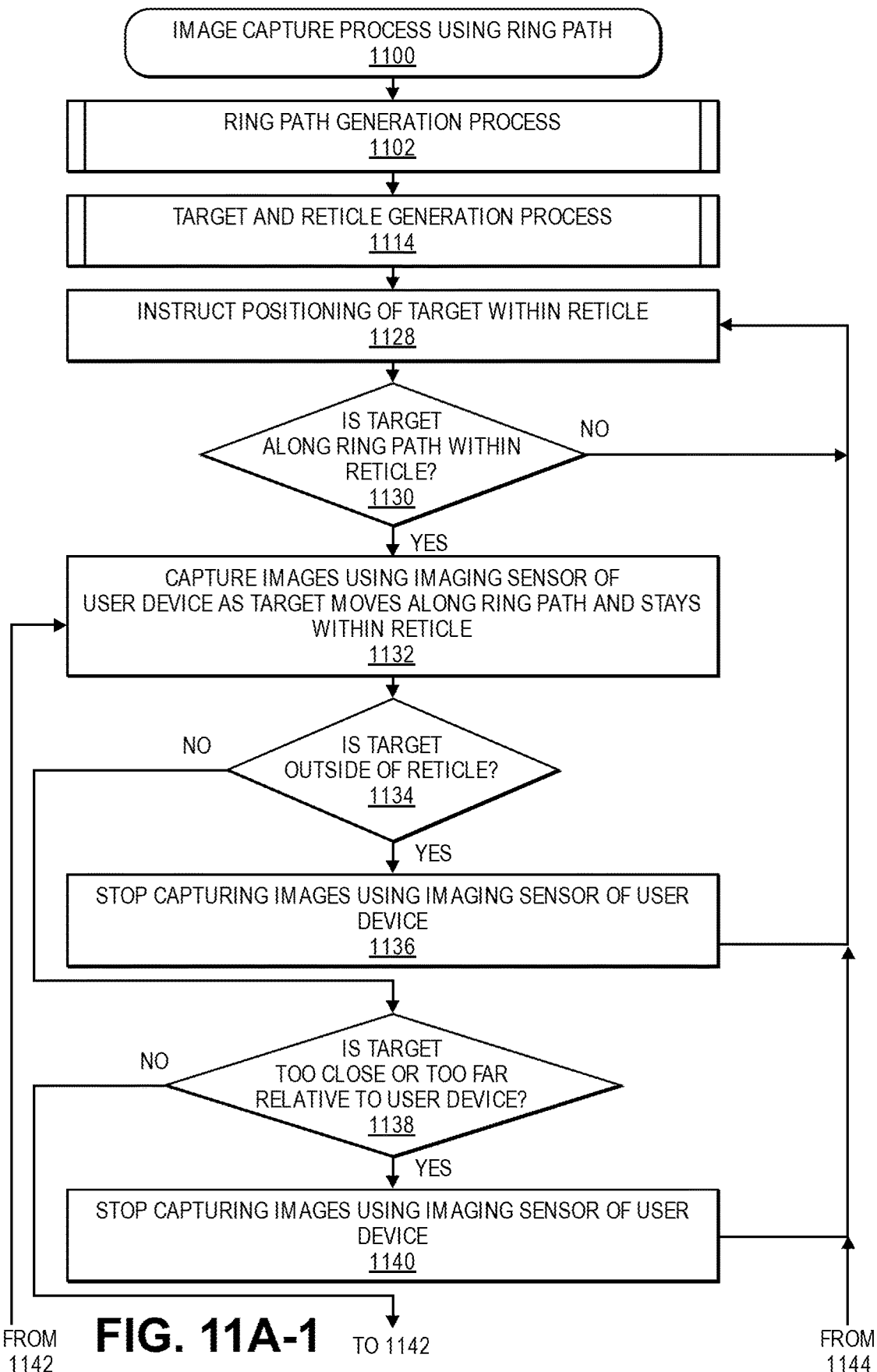
FIG. 11A (including partial FIGS. 11A-1 and 11A-2) is a flow diagram illustrating an example image capture process using ring paths, in accordance with disclosed implementations.
Figures 2, 11A:
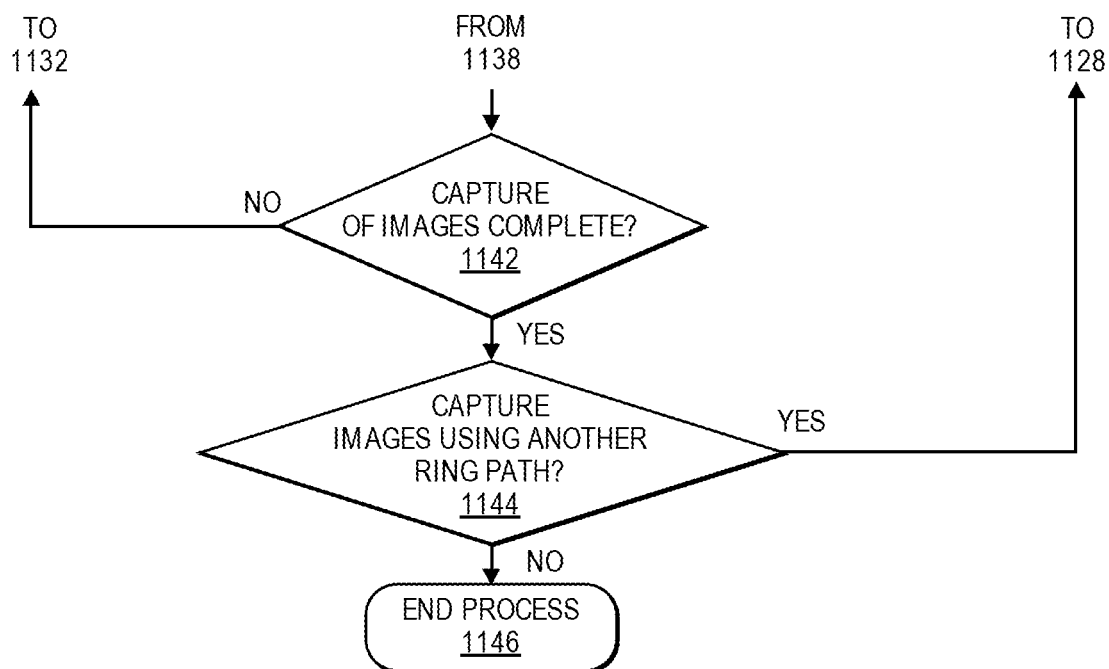

FIG. 11A is a flow diagram illustrating an example image capture process using ring paths 1100, in accordance with disclosed implementations.

The process 1100 may begin with the ring path generation process, as at 1102. As described at least with respect to FIG. 11B, the ring path generation process may comprise receiving room dimensions and measurements, receiving movement data for a user device, and generating one or more ring paths to be presented along which to capture images of the room based on the room dimensions and measurements and/or the movement data.

The process 1100 may proceed with the target and reticle generation process, as at 1114. As described at least with respect to FIG. 11C, the target and reticle generation process may comprise receiving one or more generated ring paths, receiving position and orientation data for a user device, generating one or more targets to be presented along the one or more ring paths based on the position and orientation data for the user device, and generating one or more reticles to be presented within a display of the user device.

The process 1100 may continue to instruct positioning of a target within a reticle, as at 1128. For example, a ring path may be generated to be presented at particular locations within a room based on the local coordinate frame, a target may be generated to be presented at a particular location along the ring path within the room based on the local coordinate frame, and a reticle may be generated to be presented within a display of the user device. Then, a user may be instructed to move and orient the user device such that a field of view of an imaging sensor of the user device includes the target that is generated to be presented along the ring path, such that the target may be aligned with the reticle that is also generated to be presented within a display of the user device.

The process 1100 may then proceed by determining whether the target along the ring path is positioned with the reticle, as at 1130. For example, alignment between the target to be presented along the ring path within the local coordinate frame and the reticle to be presented within the display of the user device may be determined using image processing, feature detection, and/or other algorithms or techniques, e.g., by determining relative positions, intersections, overlaps, sizes, or other characteristics of the target and reticle displayed via the display of the user device. In addition, alignment between the target to be presented along the ring path within the local coordinate frame and the reticle to be presented within the display of the user device may be determined using position tracking techniques, e.g., based on position and orientation data associated with the imaging sensor, e.g., a field of view of the imaging sensor, of the user device within the local coordinate frame, position and orientation data of the reticle that is generated for presentation at a particular position via the display of the user device, and/or position and orientation data associated with the target on the ring path that are generated for presentation at particular locations within the local coordinate frame.

If it is determined that the target is not positioned within the reticle, the process 1100 may return to step 1128 to instruct positioning of the target within the reticle. If, however, it is determined that the target is positioned within the reticle, the process 1100 may continue by capture images, upon receiving user consent, using an imaging sensor of the user device as the target moves along the ring path and stays within the reticle, as at 1132. For example, a user may be instructed to traverse around the ring path while orienting the user device such that a field of view of an imaging sensor of the user device maintains the target that is generated to be presented along the ring path aligned within the reticle that is also generated to be presented within a display of the user device, which may be similar to a strafing motion, or sideways motion, by the user and user device during traversal of the ring path. In this manner, a field of view of an imaging sensor may extend substantially across a room during traversal of the ring path, in order to capture images of portions of opposing walls, as well as portions of a floor and/or portions of a ceiling, and the imaging data captured in this manner may be processed by a photogrammetry processor and/or used to generate a three-dimensional model of the room, as described herein.

The process 1100 may then proceed to determine whether the target has moved outside the reticle, as at 1134. For example, using image processing techniques and/or position tracking techniques, upon receiving user consent, as described herein, it may be determined whether the target has moved completely outside the reticle, and/or the target has moved at least partially outside the reticle.

If it is determined that the target has moved outside the reticle, then the process 1100 may proceed to stop capturing images using the imaging sensor of the user device, as at 1136. Then, the process 1100 may return to step 1128 to instruct positioning of the target within the reticle.

If, however, it is determined that the target has not moved outside the reticle, then the process 1100 may continue to determine whether the target has moved too close or too far relative to the user device, as at 1138. For example, using image processing techniques and/or position tracking techniques, upon receiving user consent, as described herein, it may be determined whether the target has moved too close to the reticle, and/or the target has moved too far away from the reticle.

If it is determined that the target has moved too close or too far relative to the user device, then the process 1100 may proceed to stop capturing images using the imaging sensor of the user device, as at 1140. Then, the process 1100 may return to step 1128 to instruct positioning of the target within the reticle.

If, however, it is determined that the target has not moved too close or too far relative to the user device, then the process 1100 may continue to determine whether capture of images using the ring path, target, and reticle is complete, as at 1142. For example, the user device may have traversed around the entire ring path and corresponding captured images during such complete traversal. Alternatively, a portion of the ring path, e.g., a remainder of the ring path, may be skipped upon receiving user input via a skip user interface element to end or complete image capture during traversal of the ring path.

If it is determined that the capture of images is not complete, then the process 1100 may return to step 1132 to continue to capture images using an imaging sensor of the user device as the target moves along the ring path and stays within the reticle. If, however, it is determined that the capture of images is complete, then the process 1100 may proceed to determine whether to capture images using another ring path, as at 1144, upon receiving user consent. For example, one or more additional ring paths may be generated to be presented at particular locations within a room based on the local coordinate frame, one or more additional targets may be generated to be presented at a particular location along the one or more additional ring paths within the room based on the local coordinate frame, and one or more additional reticles may be generated to be presented within a display of the user device.

If it is determined that images are to be captured using another ring path, then the process 1100 may return to step 1128 to instruct positioning of an additional target along an additional ring path within an additional reticle that are generated to be presented via a display of a user device. If, however, it is determined that images are not be captured using another ring path, then the process 1100 may then end, as at 1146.

Figure 11B:
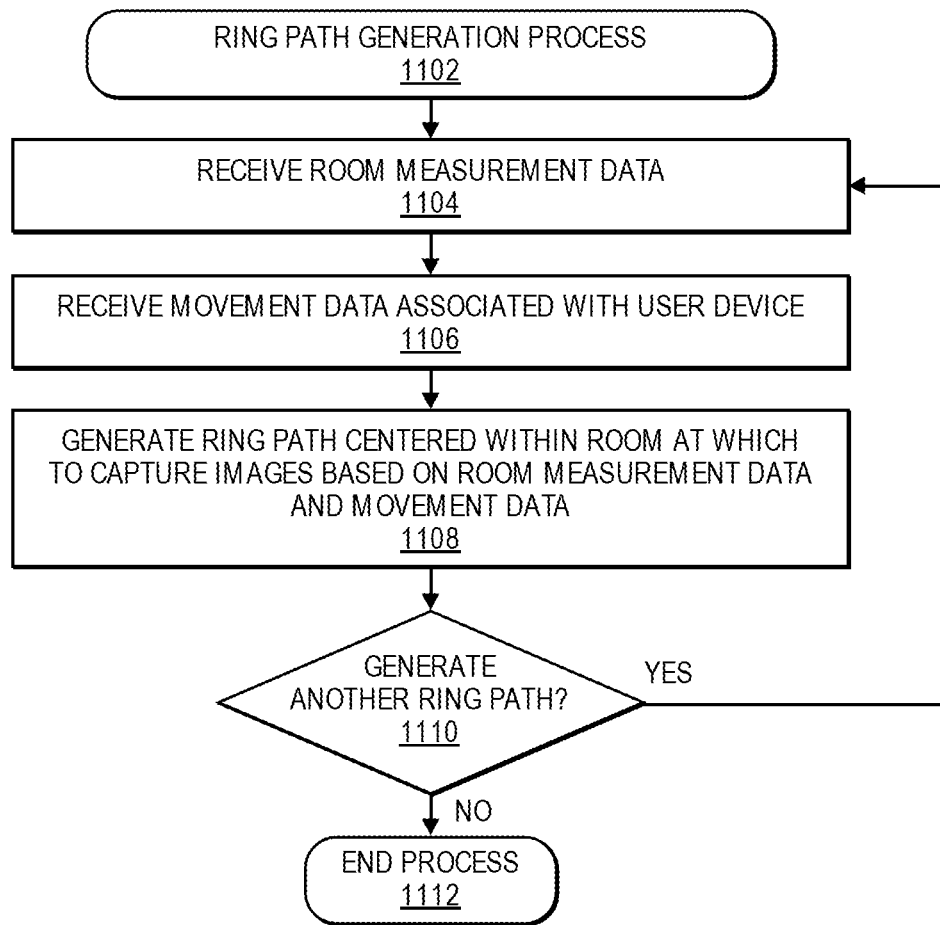
FIG. 11B is a flow diagram illustrating an example ring path generation process, in accordance with disclosed implementations.

FIG. 11B is a flow diagram illustrating an example ring path generation process 1102, in accordance with disclosed implementations.

The process 1102 may begin by receiving room measurement data, as at 1104. For example, the room measurement data may comprise dimensions and/or measurements of a room, such as floor planes, floor dimensions, floor area, wall planes, wall dimensions, wall area, ceiling planes, ceiling dimensions, ceiling area, or other measurement data. In some example embodiments, the room measurement data may be determined using the room measurement process described at least with respect to FIGS. 6A-6E.

The process 1102 may continue by receiving movement data associated with the user device, as at 1106. For example, the movement data may include position and/or orientation data detected by one or more position and orientation sensors, upon receiving user consent, of a user device as the user device moves around the room. In some example embodiments, the movement data may indicate accessible or walkable portions of the room, e.g., walkable paths or areas, hallways, egresses, or other portions, and may also indicate inaccessible or blocked portions of the room, e.g., areas including columns, poles, sofas, chairs, tables, other furniture, fireplaces, permanent fixtures, or other portions.

The process 1102 may then proceed by generating a ring path substantially centered within the room along which images may be captured based on the room measurement data and the movement data, as at 1108. For example, the ring path may be generated for presentation via a display of a user device at particular locations, including particular heights, within the local coordinate frame of the room. In addition, the ring path may have various types of shapes, such as geometric, circular, oval, or other regular or irregular shapes. Further, the ring path may be generally convex along all portions of the ring path, such that no portions overlap or intersect any other portions and no portions are concave. Moreover, the ring path may be a scaled-down version of the walls, with some amount or degree of offset from the walls. Furthermore, corners of the ring path may be rounded in order to facilitate smooth or gradual traversal around the ring path by a user device. In addition, the ring path, or portions thereof, may be presented with various sizes, shapes, thicknesses, colors, levels of transparency, and/or other visual characteristics.

The process 1102 may then continue to determine whether additional ring paths are to be generated, as at 1110. For example, a plurality of ring paths may be generated for a room based on various factors, such as size, dimensions, or measurements of a room, shape of a room, field of view of an imaging sensor, image resolution of an imaging sensor, image capture rate of an imaging sensor, movement rate of an imaging sensor, or various other factors. As an example, for rooms with relatively larger dimensions, a single ring path that may be substantially centered within the room may capture sufficient images of all portions of the room. Likewise, for rooms with relatively smaller dimensions, multiple ring paths may be needed in order to capture sufficient images of all portions of the room, e.g., a center of the floor, a center of the ceiling, as well as all walls and corners of the room, such as a lower ring path closer to the floor and substantially centered within the room and a higher ring path closer to the ceiling and substantially centered with the room.

If it is determined that additional ring paths are to be generated, then the process 1102 may return to step 1104 to receive room measurement data and repeat the process 1102 for additional ring paths. If, however, it is determined that additional ring paths are not to be generated, then the process 1102 may end, as at 1112.

Figure 11C:
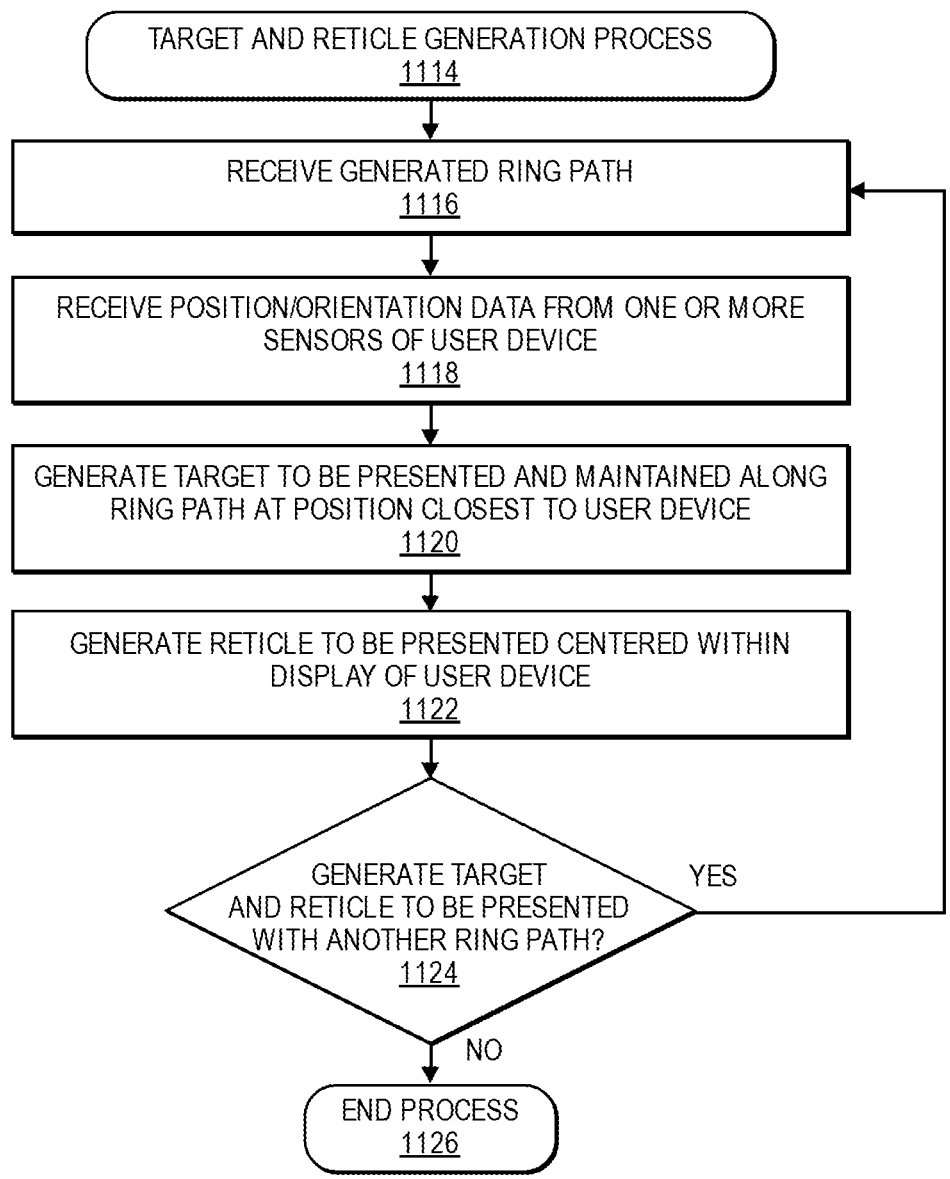
FIG. 11C is a flow diagram illustrating an example target and reticle generation process, in accordance with disclosed implementations.

FIG. 11C is a flow diagram illustrating an example target and reticle generation process 1114, in accordance with disclosed implementations.

The process 1114 may begin by receiving a generated ring path, as at 1116. For example, the ring path may be generated using the process described at least with respect to FIG. 11B.

The process 1114 may proceed by receiving position and orientation data from one or more sensors of a user device, as at 1118. For example, one or more position and orientation sensors, such as an inertial measurement unit, accelerometer, gyroscope, or magnetometer, associated with the user device may detect position and/or orientation data, upon receiving user consent, of the user device within the local coordinate frame of the room. The position and orientation information may identify a position of the user device within the room based on the local coordinate frame, and may also identify an orientation or angle of the user device within the room, e.g., with respect to vertical, horizontal, or some other known or previously determined or designated orientation or angle.

The process 1114 may then continue by generating a target to be presented via a display of the user device and maintained along the ring path at a position closest to the user device, as at 1120. For example, the target may be generated for presentation via the display of the user device with various shapes, such as a two-dimensional shape, three-dimensional shape, a rod, a cone, a hollow cylinder, a sphere, a cube, or various other geometric, regular, irregular, and/or asymmetrical shapes. In addition, the target may be generated for presentation via the display of the user device at a particular location, e.g., a location that is closest to a current position of the user device, based on position and orientation data of the user device within the local coordinate frame, and based on positions or locations of various portions of the ring path within the local coordinate frame. Further, the particular location at which the target is to be presented via the display of the user device may be continually updated based on changes to a current position of the user device within the local coordinate frame.

The process 1114 may further proceed to generate a reticle to be presented substantially centered within a display of the user device, as at 1122. For example, the reticle may be generated for presentation via the display of the user device with various shapes, such as a rectangle, square, circle, cross-hairs, oval, pill, or various other geometric, regular, irregular, and/or asymmetrical shapes. In addition, the reticle may be generated for presentation at any position within the display of the user device, and may preferably be presented substantially centered within the display of the user device.

The process 1114 may then continue to determine whether a target and a reticle are to be generated for presentation with one or more additional ring paths, as at 1124. For example, if one or more additional ring paths have been generated for presentation around which a user and user device may be instructed to traverse to capture images of a room, then one or more additional targets and additional reticles may be generated for presentation with the additional ring paths to facilitate the image capture process.

If a target and a reticle are to be generated for presentation with one or more additional ring paths, then the process 1114 may return to step 1116 to receive an additional ring path and repeat the process 1114 for the additional ring path. If, however, a target and a reticle are not to be generated for presentation with one or more additional ring paths, then the process 1114 may end, as at 1126.

Figures 1, 12:
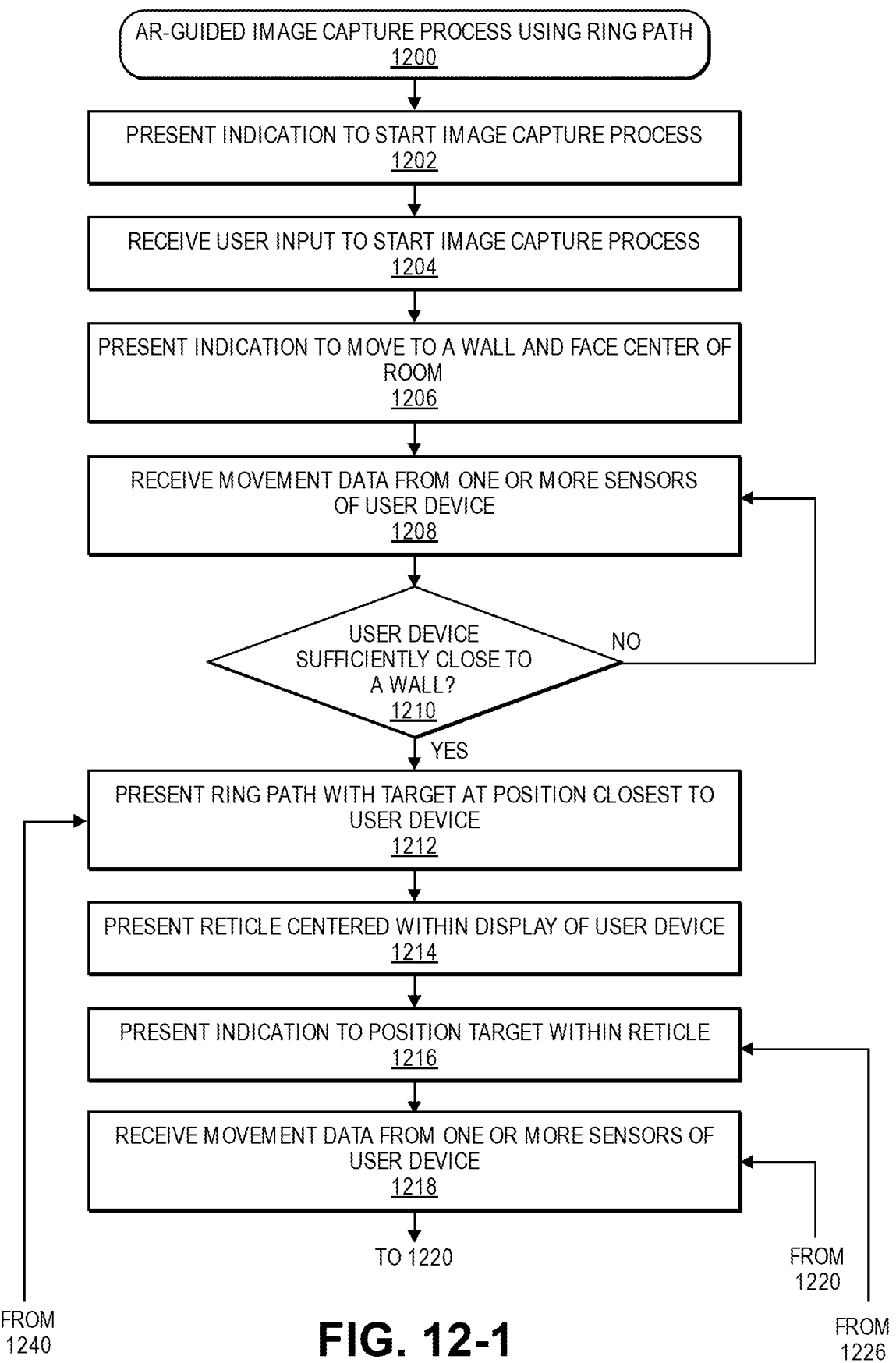
FIG. 12 (including partial FIGS. 12-1, 12-2, and 12-3) is a flow diagram illustrating an example image capture process using ring paths with augmented reality guidance, in accordance with disclosed implementations.
Figures 2, 12:
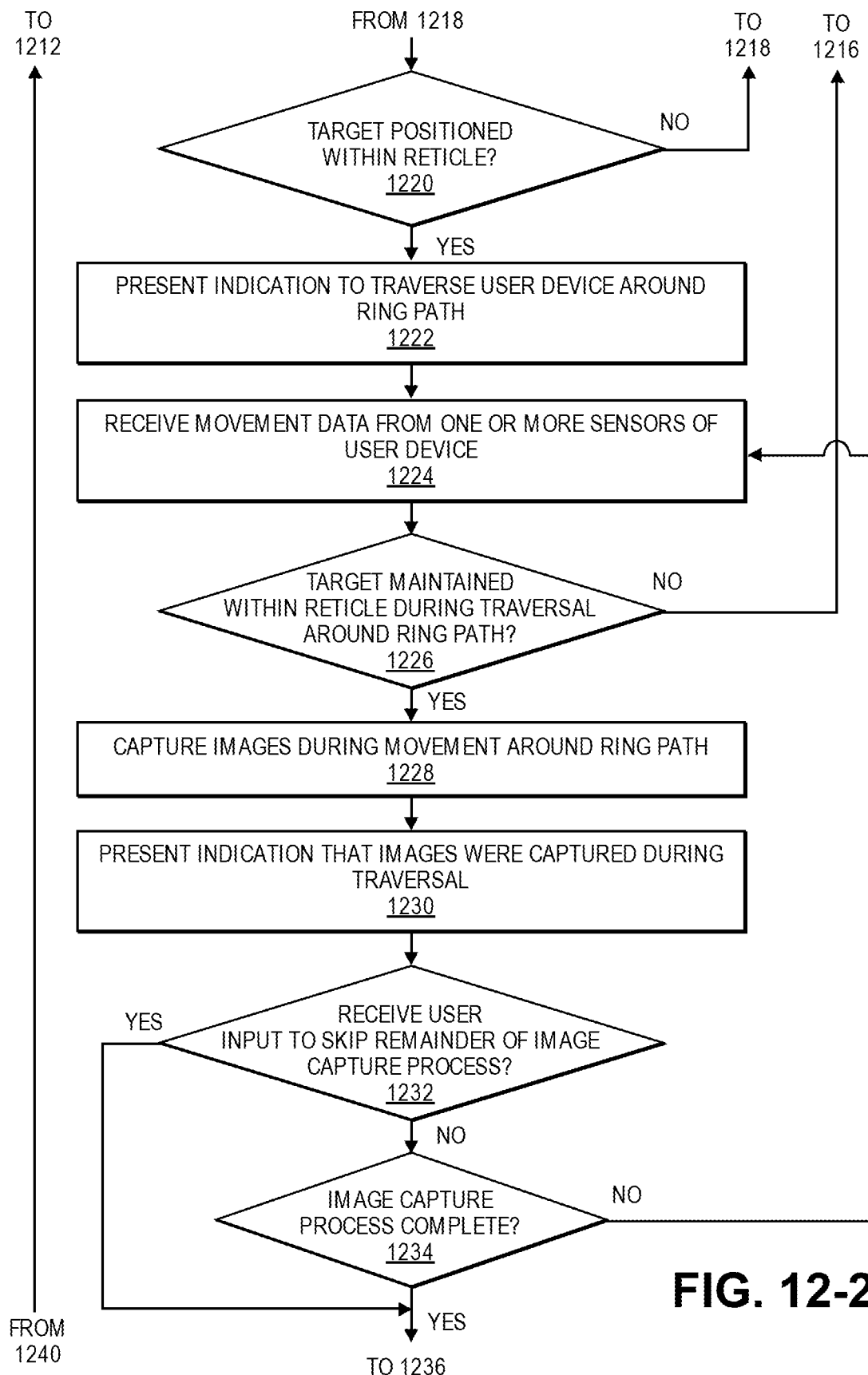
Figures 3, 12:
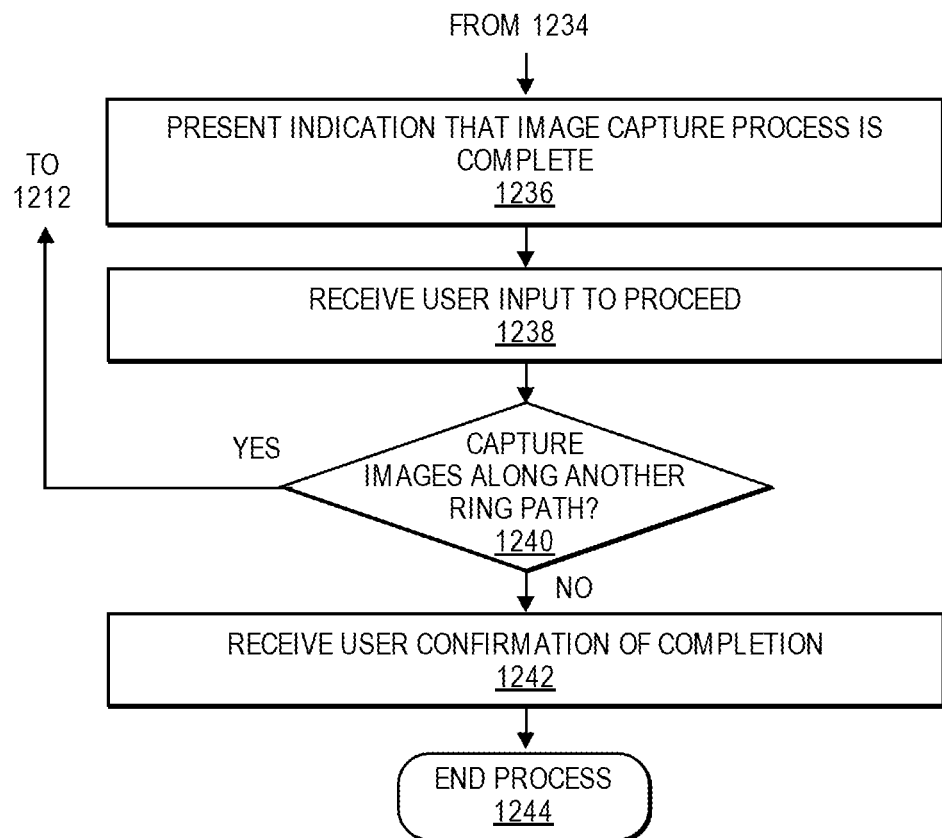

FIG. 12 is a flow diagram illustrating an example image capture process using ring paths with augmented reality guidance 1200, in accordance with disclosed implementations.

The process 1200 may begin by presenting an indication to start an image capture process, as at 1202. For example, the indication may comprise text and visual cues or indications related to the image capture process, as well as a confirmation user interface element that may be selected by a user to proceed.

The process 1200 may proceed by receiving user input to start the image capture process, as at 1204. For example, user input may be received via the confirmation user interface element, e.g., via a touchscreen, stylus, or other user input.

The process 1200 may continue by presenting an indication to move the user device toward an edge, side, corner, or wall within the room or space and face the center of the room, as at 1206. For example, the indication may comprise text and visual cues or indications related to moving the user device toward an edge, side, corner, or wall within the room. In addition, the indication may comprise a first semi-transparent color overlaid on top of imaging data presented via the display of the user device if the user device is not sufficiently close to an edge, side, corner, or wall of the room, e.g., not within a threshold distance of any wall based on the position and orientation data of the user device within the local coordinate frame, and may comprise a second semi-transparent color overlaid on top of imaging data presented via the display of the user device if the user device is determined to be sufficiently close to an edge, side, corner, or wall of the room, e.g., within a threshold distance of a wall based on the position and orientation data of the user device within the local coordinate frame.

Further, the indication may comprise arrows, textual cues, or other guides or indications related to facing the center of the room. For example, an arrow may be presented via the display of the user device that points toward a target generated for presentation along a ring path that is also generated for presentation within the local coordinate frame of the room, based on position and orientation information of the user device relative to the positions of the target and ring path within the local coordinate frame. In addition, various textual cues or guides may be presented via the display of the user device to face the center of the room, and such textual cues or guides may be presented as following or remaining close or adjacent to the arrow that is presented to point toward the target along the ring path.

The process 1200 may then proceed to receiving movement data from one or more sensors of the user device, as at 1208. For example, during movement of the user device toward an edge, side, corner, or wall within the room, position and orientation data of the user device may be received from one or more position and orientation sensors of the user device.

The process 1200 may then continue to determine whether the user device is sufficiently close to a wall, as at 1210. For example, position and orientation data of the user device may be tracked and processed, upon receiving user consent, to determine whether the user device has moved to within a threshold distance of any wall within the local coordinate frame of the room, and/or has moved outside an outer periphery or edge of a ring path to be generated for presentation within the local coordinate frame of the room. In some embodiments, a semi-transparent color that is overlaid on top of imaging data may transition from a first color to a second color upon determining that the user device is sufficiently close to a wall.

If the user device is not sufficiently close to a wall, then the process 1200 may return to step 1208 to continue receiving movement data from one or more sensors of the user device. If, however, the user device is sufficiently close to a wall, then the process 1200 may proceed to present a ring path with a target at a position closest to the user device, as at 1212. For example, as described herein, the ring path may be generated for presentation via the display of the user device substantially centered within the local coordinate frame of the room, and the target may also be generated for presentation via the display of the user device at a position along the ring path that is closest to a current position of the user device, based on position and orientation data of the user device.

The process 1200 may then continue by presenting a reticle substantially centered within the display of the user device, as at 1214. For example, as described herein, the reticle may be generated for presentation substantially centered within the display of the user device.

The process 1200 may proceed by presenting an indication to position the target within the reticle, as at 1216. For example, the indication may comprise arrows, textual cues, or other guides or indications related to aligning the target within the reticle that are presented within the display of the user device. For example, an arrow may be presented via the display of the user device that points toward the target generated for presentation along the ring path that is also generated for presentation within the local coordinate frame of the room, based on position and orientation information of the user device relative to the positions of the target and ring path within the local coordinate frame. In addition, various textual cues or guides may be presented via the display of the user device to align the target within the reticle, and such textual cues or guides may be presented as following or remaining close or adjacent to the arrow that is presented to point toward the target along the ring path. Further, the indication may also comprise various sizes, shapes, thicknesses, colors, levels of transparency, and/or other visual characteristics with which the target and/or reticle may be presented, e.g., a first size, shape, thickness, color, transparency, and/or other visual characteristic of the target and/or reticle indicating that the target is not aligned within the reticle, and a second size, shape, thickness, color, transparency, and/or other visual characteristic of the target and/or reticle indicating that the target is aligned within the reticle.

The process 1200 may then continue to receive movement data from one or more sensors of the user device, as at 1218. For example, during movement of the user device to place the target within the reticle via the display of the user device, position and orientation data of the user device may be received from one or more position and orientation sensors of the user device, e.g., to determine a field of view of an imaging sensor of the user device and to determine whether the target generated for presentation within the local coordinate frame of the room is aligned within the reticle generated for presentation within the display of the user device.

The process 1200 may then proceed to determine whether the target is positioned within the reticle, as at 1220. For example, as described herein, various image processing, feature detection, position tracking, and/or other algorithms or techniques may be utilized to determine relative positions of the target and reticle presented via the display of the user device, and to determine whether the target is aligned or positioned within the reticle.

If the target is not positioned within the reticle, then the process 1200 may return to step 1218 to continue to receive movement data from one or more sensors of the user device. If, however, the target is determined to be positioned within the reticle, then the process 1200 may present an indication to traverse the user device around the ring path, as at 1222. For example, the indication may comprise text and visual cues or indications related to traversal of the user device around the ring path presented via the display of the user device, while maintaining alignment of the target within the reticle presented via the display of the user device. Further, the indication may also comprise various sizes, shapes, thicknesses, colors, levels of transparency, and/or other visual characteristics with which the ring path, target, and/or reticle may be presented, e.g., a first size, shape, thickness, color, transparency, and/or other visual characteristic of the ring path, target, and/or reticle indicating that traversal around a portion of the ring path has not yet been completed and/or sufficient imaging data has not been captured during such traversal, and a second size, shape, thickness, color, transparency, and/or other visual characteristic of the ring path, target, and/or reticle indicating that traversal around a portion of the ring path has been completed and/or sufficient imaging data has been captured during such traversal.

The process 1200 may continue by receiving movement data from one or more sensors of the user device, as at 1224. For example, during traversal or movement of the user device around the ring path while maintaining the target within the reticle via the display of the user device, position and orientation data of the user device may be received from one or more position and orientation sensors of the user device, e.g., to determine a field of view of an imaging sensor of the user device and to determine whether the target generated for presentation within the local coordinate frame of the room is maintained in alignment within the reticle generated for presentation within the display of the user device.

The process 1200 may then proceed by determining whether the target is maintained within the reticle during traversal around the ring path, as at 1226. For example, as described herein, various image processing, feature detection, position tracking, and/or other algorithms or techniques may be utilized to determine relative positions of the target and reticle presented via the display of the user device, and to determine whether the target is maintained in alignment within the reticle.

If it is determined that the target is not maintained within the reticle during traversal around the ring path, then the process 1200 may return to step 1216 to present an indication to position the target within the reticle. If, however, it is determined that the target is maintained within the reticle during traversal around the ring path, then the process 1200 may continue to capture images during movement around the ring path, as at 1228. For example, during traversal or movement of the user device around the ring path while maintaining the target within the reticle, various images may be captured of portions of the room, such as portions of opposing walls, portions of the floor, and/or portions of the ceiling. In addition, as described herein, the image capture rate along different portions of the ring path may vary, e.g., a lower image capture rate along straight portions of the ring path, and a higher image capture rate along curved portions of the ring path. Further, the imaging data captured in this manner may be processed by a photogrammetry processor and/or used to generate a three-dimensional model of the room, as described herein.

The process 1200 may then proceed to present an indication that images were captured during the traversal, as at 1230. For example, the indication may comprise text and visual cues or indications related to traversal of the user device around at least a portion of the ring path presented via the display of the user device, while maintaining alignment of the target within the reticle presented via the display of the user device. Further, the indication may also comprise various sizes, shapes, thicknesses, colors, levels of transparency, and/or other visual characteristics with which the ring path, target, and/or reticle may be presented, e.g., a first size, shape, thickness, color, transparency, and/or other visual characteristic of the ring path, target, and/or reticle indicating that traversal around a portion of the ring path has not yet been completed and/or sufficient imaging data has not been captured during such traversal, and a second size, shape, thickness, color, transparency, and/or other visual characteristic of the ring path, target, and/or reticle indicating that traversal around a portion of the ring path has been completed and/or sufficient imaging data has been captured during such traversal. In addition, the indication may comprise a skip user interface element that may be selected by a user to skip a portion or remainder of the ring path and end or complete image capture during traversal of the ring path.

The process 1200 may then determine whether user input to skip a remainder of the image capture process has been received, as at 1232. For example, user input may be received via the skip user interface element, e.g., via a touchscreen, stylus, or other user input, to skip a remainder of the image capture process. If it is determined that a user input to skip a remainder of the image capture process has not been received, then the process 1200 may proceed to determine whether the image capture process during traversal of the ring path is complete, as at 1234. For example, the image capture process may be considered complete when all, substantially all, or greater than a threshold amount or percent, of the ring path has been traversed by the user device and corresponding images have been captured during traversal of such portions of the ring path.

If it is determined that the image capture process during traversal of the ring path is not complete, then the process 1200 may return to step 1224 to continue to receive movement data from one or more sensors of the user device during traversal of the user device around the ring path.

If, however, it is determined that the image capture process is complete, as at 1234, or if it is determined that user input to skip a remainder of the image capture process has been received, as at 1232, then the process 1200 may continue to present an indication that the image capture process is complete, as at 1236. For example, the indication may comprise text and visual cues or indications related to completion of the image capture process using a ring path. In addition, the indication may comprise a confirmation user interface element that may be selected by a user to confirm completion of the image capture process using the ring path.

The process 1200 may then continue to receive user input to proceed, as at 1238. For example, user input may be received via the confirmation user interface element, e.g., via a touchscreen, stylus, or other user input, to confirm completion of the image capture process using the ring path.

The process 1200 may then proceed by determining whether images are to be captured along another ring path, as at 1240. For example, as described herein, depending on dimensions, measurements, or other characteristics of a room or space, and/or depending on characteristics of an imaging sensor of the user device, one or more ring paths may be generated for presentation within the local coordinate frame of the room in order to capture images of substantially all portions of the floor, walls, and ceiling. If it is determined that images are to be captured along another ring path, then the process 1200 may return to step 1212 to present an additional ring path with an additional target at a position closest to the user device and to perform the image capture process using the additional ring path as described herein.

If, however, it is determined that images are not be captured along another ring path, then the process 1200 may continue by receiving user confirmation of completion, as at 1242. For example, a confirmation user interface element may be presented that may be selected by a user to confirm completion of the image capture process using ring paths, and user input may be received via the confirmation user interface element, e.g., via a touchscreen, stylus, or other user input, to confirm completion of the image capture process using ring paths. The process 1200 may then end, as at 1244.

Figure 13:
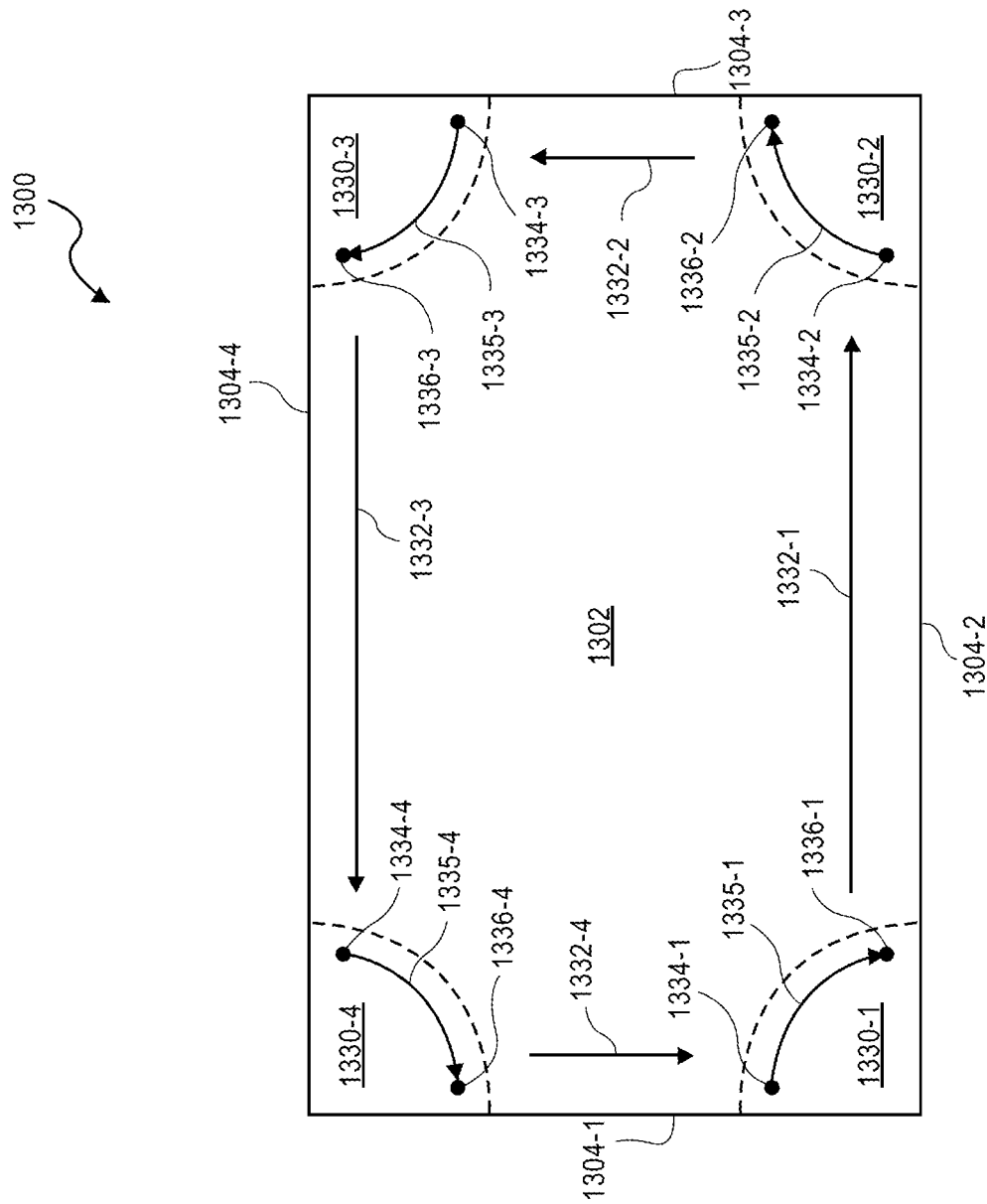
FIG. 13 is a schematic diagram of an example of panorama path generation, in accordance with disclosed implementations.

FIG. 13 is a schematic diagram 1300 of an example of panorama path generation, in accordance with disclosed implementations.

FIG. 13 illustrates a schematic top-down view of an example room or space having a floor 1302, walls 1304-1, 1304-2, 1304-3, 1304-4, and a ceiling (not shown), within which a panorama path comprising a plurality of location image capture locations 1330 and a plurality of image capture paths 1332 may be generated for presentation via a display of a user device. As described herein, the user device may be a mobile computing device, such as a smartphone, and may comprise a processor, a memory having executable instructions and one or more applications, one or more inputs such as buttons, a touchscreen, and/or microphones, one or more outputs such as a display and/or speakers, one or more sensors such as an inertial measurement unit, an imaging sensor, and/or other sensors, and/or any or all features described herein with respect to user devices.

The panorama path may comprise a plurality of image capture locations 1330-1, 1330-2, 1330-3, 1330-4 within the room based at least in part on dimensions or measurements of the room and/or user movement data. For example, the image capture locations 1330 may be associated with corners, edges, sides, and/or portions of walls within the room, and may be generated for presentation at particular locations or positions within the local coordinate frame of the room. In addition, the number and placement of image capture locations 1330 may be selected or determined such that each image capture location 1330 is spaced from at least one other image capture location 1330 by a distance that may be greater than a minimum distance and/or smaller than a maximum distance. Further, in addition to dimensions or measurements of the room, the number, placement, and/or spacing of the plurality of image capture locations 1330 needed to capture sufficient images of all portions of a room may further depend on characteristics associated with an imaging sensor of the user device, e.g., field of view, image resolution, image capture rate, imaging sensor movement rate, or other factors. In addition, the image capture locations 1330 of the panorama path may be generated at least partially based on user movement data within the room, e.g., to match or correspond to one or more portions or areas of the room within or to which a user with the user device may have traveled or moved.

Each of the plurality of image capture locations 1330 may be generated for presentation via a display of the user device based on position and orientation data of the user device within the local coordinate frame of the room, as well as a field of view of an imaging sensor associated with the user device. For example, each image capture location 1330 may be generated with an associated size, area, radius, and/or diameter within the local coordinate frame. In some example embodiments, a boundary, line, circle, or other indication may be presented to indicate particular positions of each image capture location 1330 within the local coordinate frame. In other example embodiments, in addition or alternatively to a boundary, line, circle, or other indication of the bounds of each image capture location 1330, based on position and orientation data of the user device within the local coordinate frame, imaging data from the imaging sensor presented via the display of the user device may be overlaid with a first semi-transparent color if the user device is not associated with an image capture location 1330, e.g., not within the area or bounds of an image capture location 1330, and the imaging data presented via the display of the user device may be overlaid with a second semi-transparent color if the user device is associated with an image capture location 1330, e.g., within the area or bounds of an image capture location 1330. Further, various other indications such as arrows, textual cues, or other visual cues or indications may be presented via the display of the user device to guide a user and user device to each image capture location 1330.

As shown in FIG. 13, an example panorama path may comprise four image capture locations 1330-1, 1330-2, 1330-3, 1330-4 that are each associated with respective corners of the room within the local coordinate frame. In addition, each of the image capture locations 1330 may have an associated size, area, or radius within which a user and user device may be instructed to move or stand in order to capture sufficient images of all portions of the room, including the floor, walls, and ceiling.

In addition, the panorama path may comprise a plurality of image capture paths 1332-1, 1332-2, 1332-3, 1332-4 within the room based at least in part on dimensions or measurements of the room and/or user movement data. For example, the image capture paths 1332 may be associated with edges, sides, and/or portions of walls within the room, and may be generated for presentation between pairs of the image capture locations 1330 within the local coordinate frame of the room. The plurality of image capture paths 1332 may generally connect each of the plurality of image capture locations 1330 in a loop or path such that a user and user device may traverse each of the plurality of image capture locations 1330 and each of the plurality of image capture paths 1332 in order to capture sufficient images of all portions of the room, including the floor, walls, and ceiling. In addition, the image capture paths 1332 of the panorama path may be generated at least partially based on user movement data within the room, e.g., to match or correspond to one or more portions or areas of the room within or to which a user with the user device may have traveled or moved.

Each of the plurality of image capture paths 1332 may be generated for presentation via a display of the user device based on position and orientation data of the user device within the local coordinate frame of the room, as well as a field of view of an imaging sensor associated with the user device. For example, each image capture path 1332 may be generated with an associated length and/or direction within the local coordinate frame. In some example embodiments, an arrow, line, pathway, or other indication may be presented to indicate particular positions and/or directions of each image capture path 1332 within the local coordinate frame. In other example embodiments, in addition or alternatively to an arrow, line, pathway, or other indication of the positions and/or directions of each image capture path 1332, based on position and orientation data of the user device within the local coordinate frame, imaging data from the imaging sensor presented via the display of the user device may be overlaid with a first semi-transparent color if the user device is not associated with an image capture path 1332, e.g., not moving along an image capture path 1332 and/or not moving in a defined direction, and the imaging data presented via the display of the user device may be overlaid with a second semi-transparent color if the user device is associated with an image capture path 1332, e.g., moving along an image capture path 1332 and/or moving in a defined direction. Further, various other indications such as arrows, textual cues, or other visual cues or indications may be presented via the display of the user device to guide a user and user device along each image capture path 1332.

As shown in FIG. 13, an example panorama path may comprise four image capture paths 1332-1, 1332-2, 1332-3, 1332-4 connecting the four image capture locations 1330-1, 1330-2, 1330-3, 1330-4 that are each associated with respective corners of the room within the local coordinate frame. In addition, each of the image capture paths 1332 may extend along an edge, side, or portion of a wall and may have an associated length and/or direction by which a user and user device may be instructed to move between image capture locations 1330 in order to capture sufficient images of all portions of the room, including the floor, walls, and ceiling.

Further, at each of the plurality of image capture locations 1330, a direction of sweep 1335 between a sweep starting point 1334 and a sweep ending point 1336 of an imaging sensor of the user device may be determined for presentation via the display of the user device based at least in part on dimensions or measurements of the room and/or user movement data. For example, the direction of sweep 1335 and corresponding sweep starting point 1334 and sweep ending point 1336 may be generated for presentation at particular locations or positions within the local coordinate frame of the room. In addition, the direction of sweep 1335 may comprise a sweep from left-to-right from a user viewpoint or a sweep from right-to-left from a user viewpoint. Further, depending on the dimensions or measurements of the room, as well as characteristics associated with an imaging sensor of the user device, e.g., field of view, image resolution, image capture rate, imaging sensor movement rate, or other factors, a plurality of directions of sweep 1335 having corresponding sweep starting points 1334 and sweep ending points 1336 may be determined for each image capture location 1330 to capture sufficient images of all portions of a room, e.g., a first direction of sweep 1335 from left-to-right with a first angle generally towards the floor of the room, and a second direction of sweep 1335 from right-to-left with a second angle generally towards the ceiling of the room.

Each of the directions of sweep 1335 may be generated for presentation via a display of the user device based on position and orientation data of the user device within the local coordinate frame of the room, as well as a field of view of an imaging sensor associated with the user device. For example, each direction of sweep 1335 may be generated with an associated size, length, and/or sweep angle within the local coordinate frame. Generally, each direction of sweep 1335 may have a sweep starting point 1334 generally pointed toward (and including within a field of view of an imaging sensor of the user device) a wall adjacent to a first side of the image capture location 1330, and may have a sweep ending point 1336 generally pointed toward (and including within a field of view of an imaging sensor of the user device) a wall adjacent to a second or opposite side of the image capture location 1330. In addition, a field of view of an imaging sensor of the user device may generally extend across the room toward opposing walls during movement along the direction of sweep 1335 from sweep starting point 1334 to sweep ending point 1336. In some example embodiments, an arrow, line, sweep pathway, or other indication may be presented to indicate a direction of sweep 1335 at each image capture location 1330 within the local coordinate frame. In addition, various other indications such as arrows, textual cues, or other visual cues or indications may be presented via the display of the user device to aid orientation of an imaging sensor of a user device toward a sweep starting point 1334, along a direction of sweep 1335, and/or toward a sweep ending point 1336 at each image capture location 1330.

As shown in FIG. 13, an example panorama path may comprise four image capture locations 1330-1, 1330-2, 1330-3, 1330-4 that are each associated with respective sweep starting points 1334-1, 1334-2, 1334-3, 1334-4, directions of sweep 1335-1, 1335-2, 1335-3, 1335-4, and sweep ending points 1336-1, 1336-2, 1336-3, 1336-4 within the local coordinate frame. In addition, each of the directions of sweep 1335 may have an associated size, length, and/or sweep angle over which a user and user device may be instructed to sweep in order to capture sufficient images of all portions of the room, including the floor, walls, and ceiling.

Moreover, the panorama path, and portions thereof, may have respective associated directions or orders of traversal or sweep, in order to facilitate substantially continuous capture of imaging data during traversal of the panorama path. For example, as shown in FIG. 13, a user device may be initially instructed to move to a first image capture location 1330-1, and the imaging sensor of the user device may be swept in the direction of sweep 1335-1 from left-to-right to capture images at the first image capture location 1330-1. Then, upon completing the sweep from sweep starting point 1334-1 to sweep ending point 1336-1, a second image capture location 1330-2 may already be substantially within a field of view of the imaging sensor of the user device. Accordingly, the user device may be instructed to move along first image capture path 1332-1 to the second image capture location 1330-2, and the imaging sensor of the user device may be swept in the direction of sweep 1335-2 from left-to-right to capture images at the second image capture location 1330-2. Likewise, upon completing the sweep from sweep starting point 1334-2 to sweep ending point 1336-2, a third image capture location 1330-3 may already be substantially within a field of view of the imaging sensor of the user device, and the user device may be instructed to move along second image capture path 1332-2 to the third image capture location 1330-3, and so on. Thus, the user device may be instructed to move sequentially to each of the image capture locations 1330 via the image capture paths 1332 in a substantially counterclockwise direction, as illustrated in the top-down view of FIG. 13, and the user device may be instructed to sweep the imaging sensor from left-to-right, from a user viewpoint, at each of the image capture locations 1330.

In other example embodiments, the directions of traversal along the image capture paths 1332 between the image capture locations 1330 and the directions of sweep at each of the image capture locations 1330 may be substantially reversed. For example, the user device may be instructed to move sequentially to each of the image capture locations 1330 via the image capture paths 1332 in a substantially clockwise direction, opposite to that illustrated in the top-down view of FIG. 13, and the user device may be instructed to sweep the imaging sensor from right-to-left, from a user viewpoint, at each of the image capture locations 1330.

In further example embodiments, the panorama path may include various other combinations of directions of traversal along image capture paths 1332 and directions of sweep at image capture locations 1330. For example, if two sweeps of the imaging sensor of the user device are desired at each image capture location 1330, the user device may be instructed to move sequentially to each of the image capture locations 1330 via the image capture paths 1332 in a substantially counterclockwise direction, as illustrated in the top-down view of FIG. 13, and the user device may be instructed to first sweep the imaging sensor from right-to-left and then sweep the imaging sensor from left-to-right, from a user viewpoint, at each of the image capture locations 1330. Further, the direction of traversal along the image capture paths 1332 and the directions of the two sweeps at image capture locations 1330 may be substantially reversed. Various other combinations of directions of traversal along image capture paths 1332 and directions of sweep at image capture locations 1330 are also possible.

In addition, the various arrows, cues, guides, or other indications generated for presentation via the display of the user device may aid in maintaining position and orientation tracking, upon receiving user consent, of the user device by avoiding tracking loss. For example, a user device, such as an imaging sensor of the user device, may generally experience tracking loss responsive to imaging data received from the imaging sensor having too few or little features, e.g., a lack of features associated with a smooth, monotone wall or other surface, that may be identified using image processing, feature detection, and/or other algorithms or techniques. In addition, floors of rooms or spaces, e.g., hardwood floors, carpets, tiles, or other floors, may generally include greater numbers of identifiable features as compared to walls of rooms or spaces, particularly in close proximity.

In other embodiments, however, walls of rooms or spaces covered with textured or patterned wallpaper, coverings, artwork, pictures, or others may include sufficient numbers of identifiable features to avoid tracking loss. Accordingly, to avoid tracking loss during traversal along image capture paths 1332 and during orientation at image capture locations 1330, the various arrows, cues, guides, or other indications may be generated for presentation at locations within the local coordinate frame in order to maintain at least a portion of a floor (or other surfaces having sufficient identifiable features) within a field of view of an imaging sensor of the user device. For example, the various arrows, cues, guides, or other indications may be generated for presentation at locations within the local coordinate frame to guide a user to move, rotate, turn, sweep, and/or otherwise orient a user device in particular directions or with particular orientations in order to maintain sufficient identifiable features within the field of view of the imaging sensor of the user device and thereby avoid tracking loss.

During traversal of the user device along the image capture paths 1332 between image capture locations 1330 of the panorama path, and during sweeps of the user device along directions of sweep 1335 at the image capture locations 1330 of the panorama path in the manner described, imaging data may be captured using an imaging sensor of the user device. In addition, position and orientation data from one or more position and orientation sensors of the user device may also be received and/or stored, and the position and orientation data may be associated with imaging data captured at such positions or orientations.

In example embodiments, the imaging data may be captured for later processing by a photogrammetry processor to generate a photogrammetric mesh of the room. In some embodiments, photogrammetry may require that each image of the imaging data includes at least approximately 30% overlap with at least one other image of the imaging data. In other embodiments, photogrammetry may require that each image of the imaging data include different percentages or amounts of overlap with at least one other image of the imaging data, e.g., at least approximately 20%, 40%, 50%, 60%, 80%, or other percentages or amounts of overlap. For example, a desired amount of overlap between images may be obtained by processing to determine an actual amount of overlap between images, adjusting a frame rate of an imaging sensor, providing guidance or cues related to a rate of movement of an imaging sensor, and/or providing guidance or cues related to capture of additional or supplemental imaging data. Further, the required amount of image overlap for photogrammetry meshes of rooms may depend on various factors, such as room dimensions, fields of view, image resolutions, image capture rates, imaging sensor movement rates, or other factors.

For example, the image capture rate of the imaging sensor of the user device may be determined or tuned to provide the required amount of image overlap between images for photogrammetry. In some example embodiments, the image capture rate may be a first defined capture rate during traversal along image capture paths 1332, and the image capture rate may be a second defined capture rate that is higher (or alternatively, the same or lower) than the first defined capture rate during sweeps of the imaging sensor at image capture locations 1330. This may ensure that sufficient details within and numbers of images are captured during both traversal along image capture paths 1332 and during sweeps at image capture locations 1330 when corners of rooms may generally be within the field of view of the imaging sensor and when portions of rooms, e.g., corners, may be swept across relatively more quickly than other portions of rooms, e.g., straight or flat walls. In some example embodiments, the image capture rate during sweeps at image capture locations 1330 may be determined such that at least one image is captured responsive to approximately every five to ten degrees of change in sweep angle of the imaging sensor of the user device, based on position and orientation data of the user device.

Furthermore, although it may be generally understood that imaging data captured during panoramic sweeps by an imaging sensor from a single location may generally provide insufficient imaging data for generation of photogrammetric meshes of rooms using various photogrammetry processors, according to the present disclosure, the combination of multiple sets of imaging data captured by at least partially overlapping panoramic sweeps by an imaging sensor from multiple locations within a room may provide sufficient imaging data for generation of photogrammetric meshes of rooms. Further, the addition of position and orientation data received from one or more position and orientation sensors of a user device during capture of the imaging data, in which respective position and orientation data of the user device at the time of capture is associated with individual images, may further enable generation of photogrammetric meshes of rooms using imaging data captured by at least partially overlapping panoramic sweeps. Moreover, the further addition of imaging data captured during traversals (as well as similar position and orientation data received from one or more position and orientation sensors of a user device during capture of the imaging data during traversals) between the multiple locations associated with the imaging data captured by the at least partially overlapping panoramic sweeps may still further enable generation of photogrammetric meshes of rooms using imaging data captured by at least partially overlapping panoramic sweeps.

Further, various pre-processing techniques may be implemented in order to determine the quality and/or sufficiency of imaging data for photogrammetry, such as image processing, feature detection, and/or other algorithms or techniques. Accordingly, during or shortly after capture of imaging data during traversal of a panorama path using a user device, the imaging data may be pre-processed to determine whether additional imaging data should be captured to meet the general requirements of various photogrammetry processors.

Furthermore, although the image capture locations 1330 and image capture paths 1332 of the panorama paths are described herein as including some direction or order of traversal, in other example embodiments, the panorama paths may not comprise any pathways having a direction or order. Instead, the panorama paths may comprise a plurality of image capture locations 1330 at which imaging data may be captured of a room or space, and a user and user device may traverse among the plurality of image capture locations 1330 in any desired direction or order, including at random without any defined or particular direction or order.

Moreover, during any of the various operations or processes described herein with respect to capturing images of a room or space using panorama paths, dimensions or measurements of the room or space may also be detected or determined, along with position and orientation data of the user device at the time of such determinations, and the determined dimensions or measurements and position and orientation data may be used as additional inputs to further refine the determined dimensions or measurements to generate a geometric shell of the room or space, as further described herein.

FIGS. 14A-14Q are example user interface screens illustrating steps of an example image capture process using panorama paths with augmented reality guidance, in accordance with disclosed implementations.

As described herein with respect to FIGS. 14A-14Q, upon receiving user consent, a user device may generate and/or present, via a display, various visual guides to facilitate an image capture process based on dimensions or measurements of a room or space, movement data within the room or space, and/or position and orientation data of the user device. In addition, the various visual guides may be presented, via a display, as overlaying a field of view of an imaging sensor and may be presented, via a display, at determined locations within the field of view based on position and orientation data of the user device.

FIG. 14A illustrates an example user interface screen related to initiating the image capture process using panorama paths, upon receiving user consent. For example, the example user interface screen may include an indication 1402 related to initiating the image capture process using panorama paths, and may also include a confirmation user interface element 1404. User input may be received via the confirmation user interface element 1404 to initiate the image capture process using panorama paths, e.g., via a touchscreen, stylus, or other user input.

FIG. 14B illustrates an example user interface screen related to beginning the image capture process using panorama paths, upon receiving user consent. For example, the example user interface screen may include an arrow 1406 and a textual cue 1408 related to moving to an image capture location associated with the panorama path and defined within the local coordinate frame of the room. In some embodiments, an image capture location within the room at which to begin the image capture process may be defined or determined during the panorama path generation process. In other embodiments, an image capture location within the room at which to begin the image capture process may be selected based on position and orientation data of the user device within the local coordinate frame of the room, e.g., an image capture location closest to a current position and orientation of the user device may be selected to begin the image capture process. In addition, imaging data captured via an imaging sensor of the user device may be presented via a display of the user device.

Further, the arrow 1406 and the textual cue 1408 may be presented via the display of the user device to guide the user to move the user device toward the image capture location that is generated for presentation at a particular location within the local coordinate frame. For example, the arrow 1406 may be generated, presented, and updated to point in a particular direction, e.g., toward the image capture location, based on position and orientation data of the user device within the local coordinate frame, and the particular location or position of the image capture location within the local coordinate frame. Further, the textual cue 1408 may be generated, presented, and updated to follow or remain adjacent to the presented arrow 1406. Moreover, the arrow 1406 and the textual cue 1408 may be presented generally closer to the floor of the room (or other surface having identifiable features) in order to avoid tracking loss by the imaging sensor of the user device.

During such movement of the user device toward an image capture location, position and orientation data of the user device within the local coordinate frame may be tracked, upon receiving user consent, in order to determine whether the user device has moved toward the defined or selected image capture location within the room. Further, based on the position and orientation data of the user device within the local coordinate frame, the imaging data presented via the display of the user device may be overlaid with a first semi-transparent color if the user device is not determined to be within the selected image capture location of the room, e.g., not within the bounds of an image capture location, or not within a threshold distance of an image capture location, as shown in FIG. 14B, and the imaging data presented via the display of the user device may be overlaid with a second semi-transparent color if the user device is determined to be within the selected image capture location of the room, e.g., within the bounds of an image capture location, or within a threshold distance of an image capture location.

FIG. 14C illustrates another example user interface screen related to beginning the image capture process using panorama paths, upon receiving user consent. For example, the example user interface screen may include the textual cue 1408 related to moving to an image capture location associated with the panorama path and defined within the local coordinate frame of the room. In some embodiments, an image capture location within the room at which to begin the image capture process may be defined or determined during the panorama path generation process. In other embodiments, an image capture location within the room at which to begin the image capture process may be selected based on position and orientation data of the user device within the local coordinate frame of the room, e.g., an image capture location closest to a current position and orientation of the user device may be selected to begin the image capture process. In addition, imaging data captured via an imaging sensor of the user device may be presented via a display of the user device.

Further, the textual cue 1408 may be presented via the display of the user device to guide the user to move the user device toward the image capture location that is generated for presentation at a particular location within the local coordinate frame. In comparison with FIG. 14B, only the textual cue 1408 may be presented via the display of the user device if at least a portion of the image capture location is within a field of view of an imaging sensor of the user device, as illustrated in FIG. 14C. For example, the textual cue 1408 may be generated, presented, and updated via the display of the user device substantially close to or within the bounds of the image capture location to guide the user and user device thereto, based on position and orientation data of the user device within the local coordinate frame, the particular location or position of the image capture location within the local coordinate frame, and a field of view of the imaging sensor of the user device. Moreover, the textual cue 1408 may be presented generally closer to the floor of the room (or other surface having identifiable features) in order to avoid tracking loss by the imaging sensor of the user device.

During such movement of the user device toward an image capture location, position and orientation data of the user device within the local coordinate frame may be tracked, upon receiving user consent, in order to determine whether the user device has moved toward the defined or selected image capture location within the room. Further, based on the position and orientation data of the user device within the local coordinate frame, the imaging data presented via the display of the user device may be overlaid with a first semi-transparent color if the user device is not determined to be within the selected image capture location of the room, e.g., not within the bounds of an image capture location, or not within a threshold distance of an image capture location, as shown in FIG. 14C, and the imaging data presented via the display of the user device may be overlaid with a second semi-transparent color if the user device is determined to be within the selected image capture location of the room, e.g., within the bounds of an image capture location, or within a threshold distance of an image capture location.

FIG. 14D illustrates a further example user interface screen related to beginning the image capture process using panorama paths, upon receiving user consent. For example, the example user interface screen may include the textual cue 1408 related to moving to an image capture location associated with the panorama path and defined within the local coordinate frame of the room. In some embodiments, an image capture location within the room at which to begin the image capture process may be defined or determined during the panorama path generation process. In other embodiments, an image capture location within the room at which to begin the image capture process may be selected based on position and orientation data of the user device within the local coordinate frame of the room, e.g., an image capture location closest to a current position and orientation of the user device may be selected to begin the image capture process. In addition, imaging data captured via an imaging sensor of the user device may be presented via a display of the user device.

Further, the textual cue 1408 may be presented via the display of the user device to guide the user to move the user device toward the image capture location that is generated for presentation at a particular location within the local coordinate frame. In comparison with FIG. 14B, only the textual cue 1408 may be presented via the display of the user device if at least a portion of the image capture location is within a field of view of an imaging sensor of the user device, as illustrated in FIG. 14D. For example, the textual cue 1408 may be generated, presented, and updated via the display of the user device substantially close to or within the bounds of the image capture location to guide the user and user device thereto, based on position and orientation data of the user device within the local coordinate frame, the particular location or position of the image capture location within the local coordinate frame, and a field of view of the imaging sensor of the user device. Moreover, the textual cue 1408 may be generated, presented, and/or updated generally further closer to the floor of the room (or other surface having identifiable features), particularly when the user device is within proximity to a corner of the room, in order to avoid tracking loss by the imaging sensor of the user device.

During such movement of the user device toward an image capture location, position and orientation data of the user device within the local coordinate frame may be tracked, upon receiving user consent, in order to determine whether the user device has moved toward the defined or selected image capture location within the room. Further, based on the position and orientation data of the user device within the local coordinate frame, the imaging data presented via the display of the user device may be overlaid with a first semi-transparent color if the user device is not determined to be within the selected image capture location of the room, e.g., not within the bounds of an image capture location, or not within a threshold distance of an image capture location, and the imaging data presented via the display of the user device may be overlaid with a second semi-transparent color if the user device is determined to be within the selected image capture location of the room, e.g., within the bounds of an image capture location, or within a threshold distance of an image capture location, as shown in FIG. 14D.

Figure 14G:
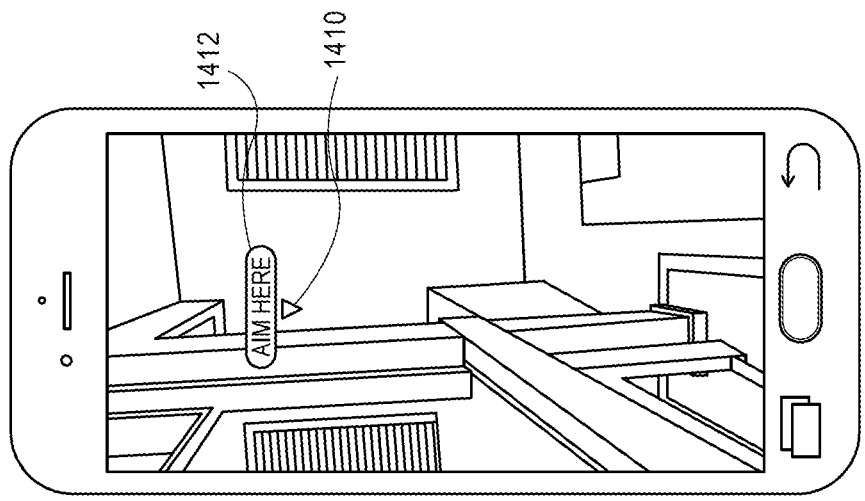
FIGS. 14A-14Q are example user interface screens illustrating steps of an example image capture process using panorama paths with augmented reality guidance, in accordance with disclosed implementations.
Figure 14F:
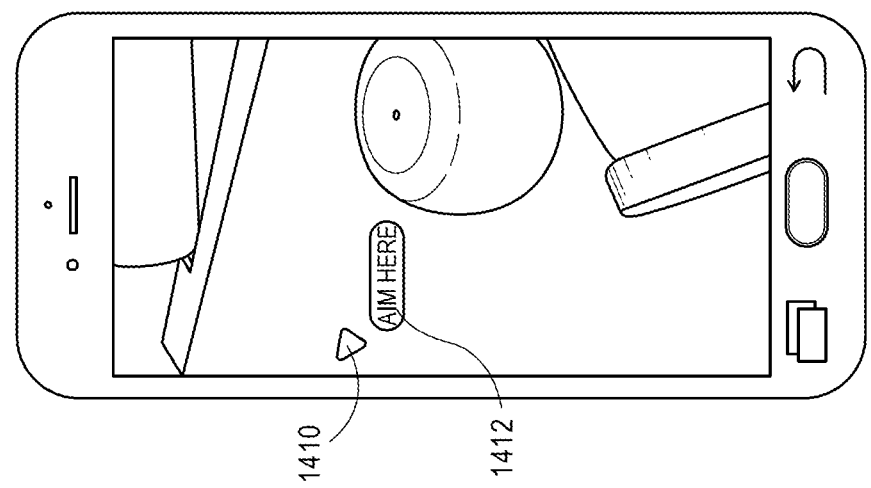
Figure 14E:
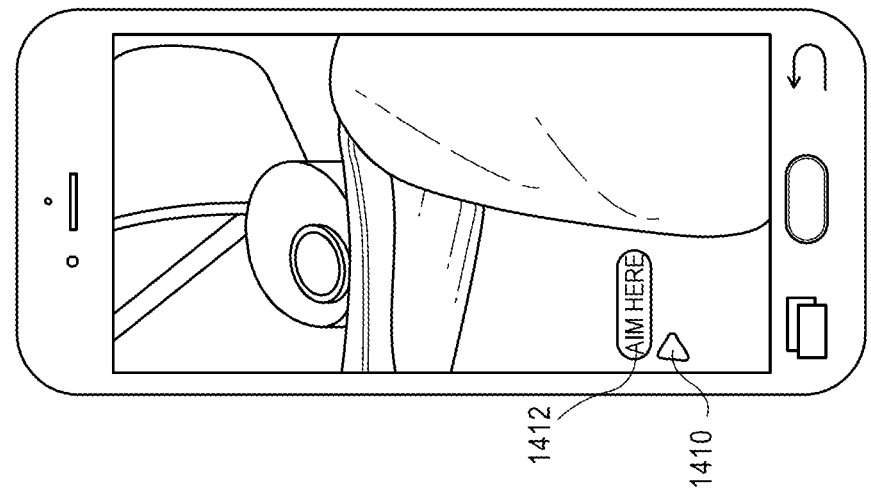

FIG. 14E illustrates an example user interface screen related to further beginning the image capture process using panorama paths, upon receiving user consent. For example, the example user interface screen may include an arrow 1410 and a textual cue 1412 related to orienting a field of view of an imaging sensor of the user device at an image capture location associated with the panorama path and defined within the local coordinate frame of the room. As described herein, a sweep starting point, a direction of sweep, and a sweep ending point may be defined and associated with the image capture location. Thus, the arrow 1410 and the textual cue 1412 may guide the user to orient a field of view of the imaging sensor of the user device toward a sweep starting point to capture images at the image capture location, upon receiving user consent. In addition, imaging data captured via an imaging sensor of the user device may be presented via a display of the user device.

Further, the arrow 1410 and the textual cue 1412 may be presented via the display of the user device to guide the user to orient a field of view of the imaging sensor of the user device toward the sweep starting point that is generated for presentation at a particular location within the local coordinate frame. For example, the arrow 1410 may be generated, presented, and updated to point in a particular direction, e.g., toward the sweep starting point at the image capture location, based on position and orientation data of the user device within the local coordinate frame, and the particular location or position of the sweep starting point at the image capture location within the local coordinate frame. Further, the textual cue 1412 may be generated, presented, and updated to follow or remain adjacent to the presented arrow 1410. Moreover, the arrow 1410 and the textual cue 1412 may be presented generally closer to the floor of the room (or other surface having identifiable features) in order to avoid tracking loss by the imaging sensor of the user device.

FIG. 14F illustrates another example user interface screen related to further beginning the image capture process using panorama paths, upon receiving user consent. For example, the example user interface screen may include the arrow 1410 and the textual cue 1412 related to orienting a field of view of an imaging sensor of the user device at an image capture location associated with the panorama path and defined within the local coordinate frame of the room. As described herein, a sweep starting point, a direction of sweep, and a sweep ending point may be defined and associated with the image capture location. Thus, the arrow 1410 and the textual cue 1412 may guide the user to orient a field of view of the imaging sensor of the user device toward a sweep starting point to capture images at the image capture location, upon receiving user consent. In addition, imaging data captured via an imaging sensor of the user device may be presented via a display of the user device.

Further, the arrow 1410 and the textual cue 1412 may be presented via the display of the user device to guide the user to orient a field of view of the imaging sensor of the user device toward the sweep starting point that is generated for presentation at a particular location within the local coordinate frame. For example, the arrow 1410 may be generated, presented, and updated to point in a particular direction, e.g., toward the sweep starting point at the image capture location, based on position and orientation data of the user device within the local coordinate frame, and the particular location or position of the sweep starting point at the image capture location within the local coordinate frame. Further, the textual cue 1412 may be generated, presented, and updated to follow or remain adjacent to the presented arrow 1410. Moreover, the arrow 1410 and textual cue 1412 may be generated, presented, and/or updated generally closer to the floor of the room (or other surface having identifiable features) and may guide a user device to be moved and/or rotated generally away from walls (or other surfaces lacking sufficient identifiable features), particularly when the user device is within proximity to a corner of the room, in order to avoid tracking loss by the imaging sensor of the user device.

FIG. 14G illustrates a further example user interface screen related to further beginning the image capture process using panorama paths, upon receiving user consent. For example, the example user interface screen may include the arrow 1410 and the textual cue 1412 related to orienting a field of view of an imaging sensor of the user device at an image capture location associated with the panorama path and defined within the local coordinate frame of the room. As described herein, a sweep starting point, a direction of sweep, and a sweep ending point may be defined and associated with the image capture location. Thus, the arrow 1410 and the textual cue 1412 may guide the user to orient a field of view of the imaging sensor of the user device toward a sweep starting point to capture images at the image capture location, upon receiving user consent. In addition, imaging data captured via an imaging sensor of the user device may be presented via a display of the user device.

Further, the arrow 1410 and the textual cue 1412 may be presented via the display of the user device to guide the user to orient a field of view of the imaging sensor of the user device toward the sweep starting point that is generated for presentation at a particular location within the local coordinate frame. For example, the arrow 1410 may be generated, presented, and updated to point to the sweep starting point within a field of view of the imaging sensor, e.g., pointing downward toward the sweep starting point at the image capture location, based on position and orientation data of the user device within the local coordinate frame, and the particular location or position of the sweep starting point at the image capture location within the local coordinate frame. Further, the textual cue 1412 may be generated, presented, and updated to follow or remain adjacent to the presented arrow 1410. Moreover, the arrow 1410 and textual cue 1412 may be generated, presented, and/or updated generally to maintain surfaces having identifiable features within the field of view and may guide a user device to be moved and/or rotated generally away from walls (or other surfaces lacking sufficient identifiable features), particularly when the user device is within proximity to a corner of the room, in order to avoid tracking loss by the imaging sensor of the user device.

During such orientation of the field of view of the imaging sensor of the user device toward a sweep starting point at an image capture location, position and orientation data of the user device within the local coordinate frame may be tracked, upon receiving user consent, in order to determine whether the user device has been oriented toward the sweep starting point at the image capture location.

Figure 14J:
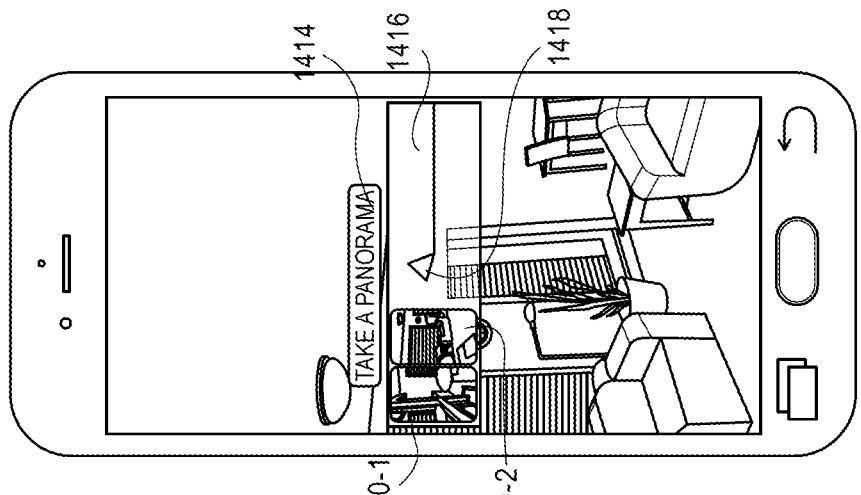
Figure 14I:
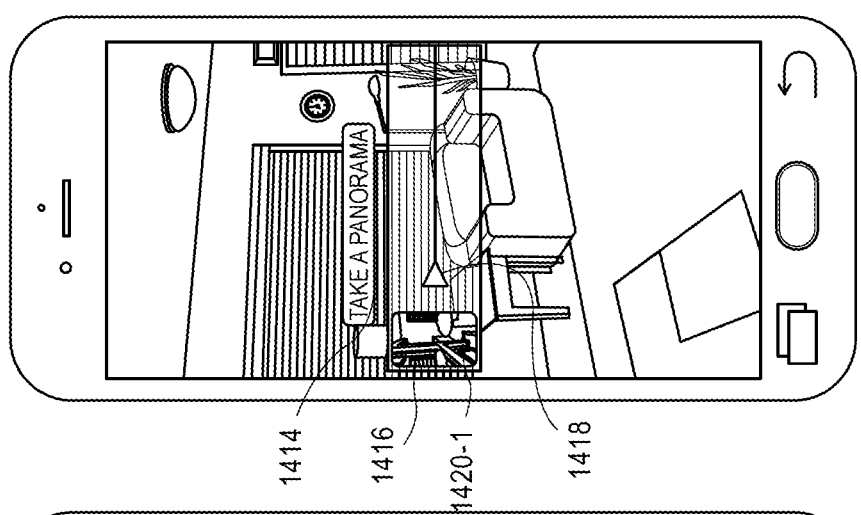
Figure 14H:
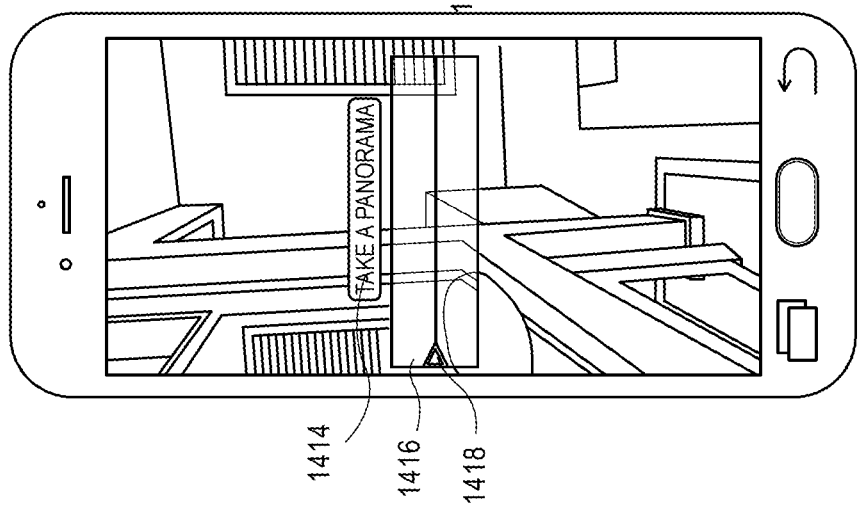

FIG. 14H illustrates an example user interface screen related to sweeping a field of view of an imaging sensor of the user device at the image capture location within the local coordinate frame of the room, upon receiving user consent. For example, the example user interface screen may include an indication related to sweeping the field of view of the imaging sensor from a sweep starting point to a sweep ending point along a direction of sweep. The indication may comprise a textual cue 1414, an image capture progress bar or block 1416, and an arrow 1418. In addition, imaging data captured via an imaging sensor of the user device may be presented via a display of the user device. Further, position and orientation data of the user device may be received, tracked, and/or stored, upon receiving user consent, via position and orientation sensors of the user device during sweep of the user device at the image capture location.

During sweep of the field of view of the imaging sensor, the arrow 1418 may be generated to present a direction of sweep, e.g., left-to-right, as shown in FIG. 14H. In addition, the image capture progress bar or block 1416 may be generated, presented, and updated to indicate progress of image capture during the sweep of the user device at the image capture location, upon receiving user consent. Further, the image capture progress bar or block 1416 and/or the arrow 1418 may be presented with a first size, shape, orientation, thickness, color, transparency, and/or other visual characteristic during successful sweep of the field of view of the imaging sensor and corresponding capture of imaging data, e.g., vertical angle or orientation, sweep rate, sweep movement, and/or other aspects of the sweep movement are within acceptable thresholds or ranges, and the image capture progress bar or block 1416 and/or the arrow 1418 may be presented with a second size, shape, orientation, thickness, color, transparency, and/or other visual characteristic during unsuccessful sweep of the field of view of the imaging sensor and corresponding capture of imaging data, e.g., vertical angle or orientation, sweep rate, sweep movement, and/or other aspects of the sweep movement are outside acceptable thresholds or ranges. As described herein, the imaging data captured during such sweeps at image capture locations may be processed by a photogrammetry processor and/or used to generate a three-dimensional model of the room.

FIG. 14I illustrates another example user interface screen related to continuing sweep of a field of view of an imaging sensor of the user device at the image capture location within the local coordinate frame of the room, upon receiving user consent. For example, the example user interface screen may include an indication related to continuing sweep of the field of view of the imaging sensor from a sweep starting point to a sweep ending point along a direction of sweep. The indication may comprise a textual cue 1414, an image capture progress bar or block 1416, and an arrow 1418. In addition, imaging data captured via an imaging sensor of the user device may be presented via a display of the user device. Further, position and orientation data of the user device may be received, tracked, and/or stored, upon receiving user consent, via position and orientation sensors of the user device during sweep of the user device at the image capture location.

During continuing sweep of the field of view of the imaging sensor, the arrow 1418 may be generated and updated to present a direction of sweep, e.g., left-to-right, as shown in FIG. 14I. For example, the arrow 1418 may be presented as moving across the display of the user device during sweep of the user device to indicate progress. In addition, the image capture progress bar or block 1416 may be generated, presented, and updated to indicate progress of image capture during the sweep of the user device at the image capture location. For example, as shown in FIG. 14I, one or more thumbnail images 1420-1 or other indicators of progress of image capture during the sweep of the user device may be generated and presented within the image capture progress bar or block 1416. As described herein, the imaging data captured during such sweeps at image capture locations may be processed by a photogrammetry processor and/or used to generate a three-dimensional model of the room.

Further, the image capture progress bar or block 1416 and/or the arrow 1418 may be presented with a first size, shape, orientation, thickness, color, transparency, and/or other visual characteristic during successful sweep of the field of view of the imaging sensor and corresponding capture of imaging data, e.g., vertical angle or orientation, sweep rate, sweep movement, and/or other aspects of the sweep movement are within acceptable thresholds or ranges, and the image capture progress bar or block 1416 and/or the arrow 1418 may be presented with a second size, shape, orientation, thickness, color, transparency, and/or other visual characteristic during unsuccessful sweep of the field of view of the imaging sensor and corresponding capture of imaging data, e.g., vertical angle or orientation, sweep rate, sweep movement, and/or other aspects of the sweep movement are outside acceptable thresholds or ranges.

FIG. 14J illustrates a further example user interface screen related to further continuing sweep of a field of view of an imaging sensor of the user device at the image capture location within the local coordinate frame of the room, upon receiving user consent. For example, the example user interface screen may include an indication related to further continuing sweep of the field of view of the imaging sensor from a sweep starting point to a sweep ending point along a direction of sweep. The indication may comprise a textual cue 1414, an image capture progress bar or block 1416, and an arrow 1418. In addition, imaging data captured via an imaging sensor of the user device may be presented via a display of the user device. Further, position and orientation data of the user device may be received, tracked, and/or stored, upon receiving user consent, via position and orientation sensors of the user device during sweep of the user device at the image capture location.

During further continuing sweep of the field of view of the imaging sensor, the arrow 1418 may be generated and updated to present a direction of sweep, e.g., left-to-right, as shown in FIG. 14J. For example, the arrow 1418 may be presented as continuing to move across the display of the user device during sweep of the user device to indicate further progress. In addition, the image capture progress bar or block 1416 may be generated, presented, and updated to indicate further progress of image capture during the sweep of the user device at the image capture location. For example, as shown in FIG. 14J, two or more thumbnail images 1420-1, 1420-2 or other indicators of further progress of image capture during the sweep of the user device may be generated and presented within the image capture progress bar or block 1416. As described herein, the imaging data captured during such sweeps at image capture locations may be processed by a photogrammetry processor and/or used to generate a three-dimensional model of the room.

Further, the image capture progress bar or block 1416 and/or the arrow 1418 may be presented with a first size, shape, orientation, thickness, color, transparency, and/or other visual characteristic during successful sweep of the field of view of the imaging sensor and corresponding capture of imaging data, e.g., vertical angle or orientation, sweep rate, sweep movement, and/or other aspects of the sweep movement are within acceptable thresholds or ranges, and the image capture progress bar or block 1416 and/or the arrow 1418 may be presented with a second size, shape, orientation, thickness, color, transparency, and/or other visual characteristic during unsuccessful sweep of the field of view of the imaging sensor and corresponding capture of imaging data, e.g., vertical angle or orientation, sweep rate, sweep movement, and/or other aspects of the sweep movement are outside acceptable thresholds or ranges. For example, as shown in FIG. 14J, the arrow 1418 may be generated or updated for presentation with a second orientation angled downward and a second color, e.g., red or other color, to indicate that the vertical angle or orientation of the imaging sensor during sweep has moved outside an acceptable threshold or range, e.g., the field of view of the imaging sensor of the user device may be angled too high within the local coordinate frame toward a ceiling of the room.

In addition or alternatively, a text box or textual cue may also be generated and presented to indicate that the vertical angle or orientation, sweep rate, sweep movement, and/or other aspects of the sweep movement of the imaging sensor during sweep has moved outside an acceptable threshold or range. Further, responsive to moving the imaging sensor outside an acceptable threshold or range of movement during sweep, the presentation via the display of the user device may revert back to example user interfaces screens, such as FIGS. 14F, 14G, 14H, or similar, in order to re-orient the user device to restart the image capture process of the user device from the sweep starting point at the image capture location.

Figure 14M:
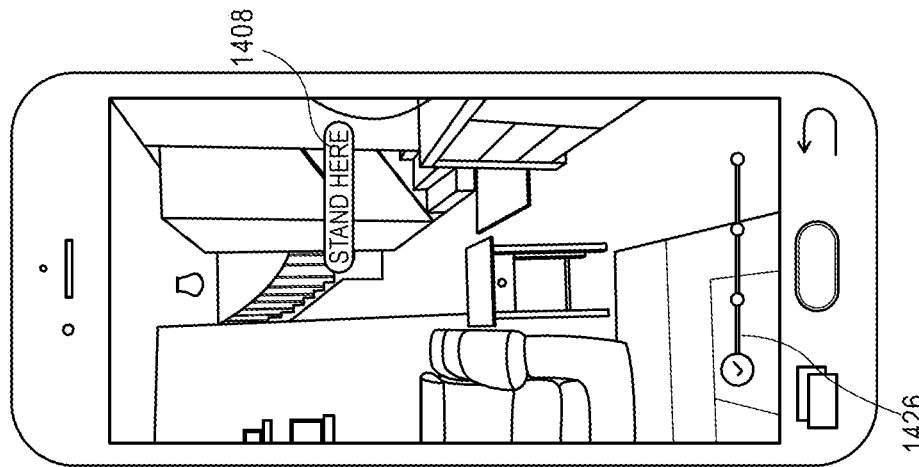
Figure 14L:
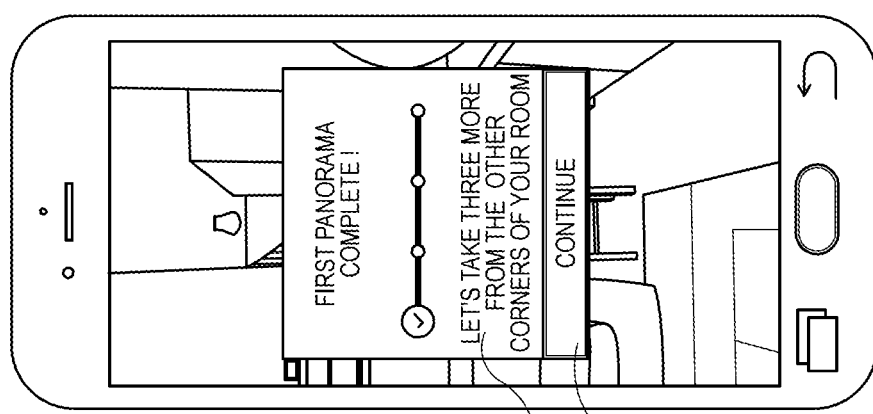
Figure 14K:
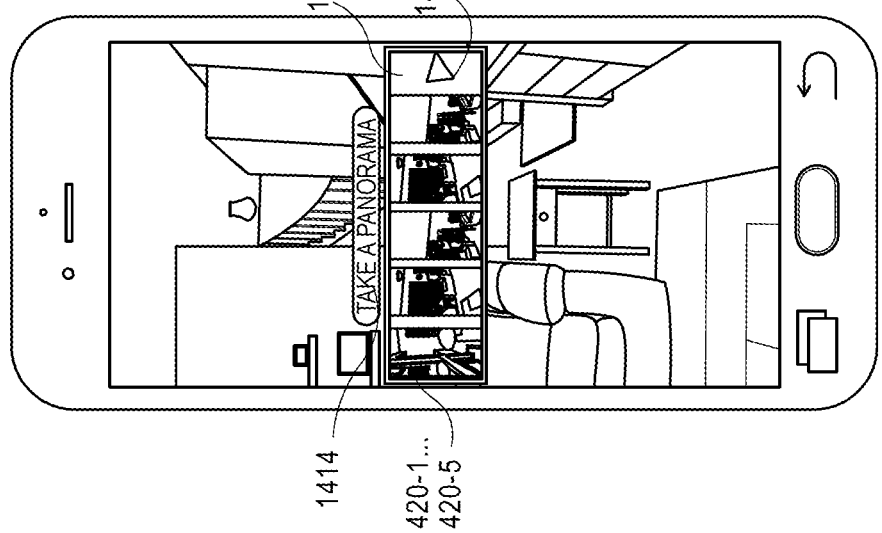

FIG. 14K illustrates a still further example user interface screen related to further continuing sweep of a field of view of an imaging sensor of the user device at the image capture location within the local coordinate frame of the room, upon receiving user consent. For example, the example user interface screen may include an indication related to further continuing sweep of the field of view of the imaging sensor from a sweep starting point to a sweep ending point along a direction of sweep. The indication may comprise a textual cue 1414, an image capture progress bar or block 1416, and an arrow 1418. In addition, imaging data captured via an imaging sensor of the user device may be presented via a display of the user device. Further, position and orientation data of the user device may be received, tracked, and/or stored, upon receiving user consent, via position and orientation sensors of the user device during sweep of the user device at the image capture location.

During still further continuing sweep of the field of view of the imaging sensor, the arrow 1418 may be generated and updated to present a direction of sweep, e.g., left-to-right, as shown in FIG. 14K. For example, the arrow 1418 may be presented as continuing to move across the display of the user device during sweep of the user device to indicate still further progress. In addition, the image capture progress bar or block 1416 may be generated, presented, and updated to indicate still further progress of image capture during the sweep of the user device at the image capture location. For example, as shown in FIG. 14K, five or more thumbnail images 1420-1 . . . 1420-5 or other indicators of still further progress of image capture during the sweep of the user device may be generated and presented within the image capture progress bar or block 1416. As described herein, the imaging data captured during such sweeps at image capture locations may be processed by a photogrammetry processor and/or used to generate a three-dimensional model of the room.

Further, the image capture progress bar or block 1416 and/or the arrow 1418 may be presented with a first size, shape, orientation, thickness, color, transparency, and/or other visual characteristic during successful sweep of the field of view of the imaging sensor and corresponding capture of imaging data, e.g., vertical angle or orientation, sweep rate, sweep movement, and/or other aspects of the sweep movement are within acceptable thresholds or ranges, and the image capture progress bar or block 1416 and/or the arrow 1418 may be presented with a second size, shape, orientation, thickness, color, transparency, and/or other visual characteristic during unsuccessful sweep of the field of view of the imaging sensor and corresponding capture of imaging data, e.g., vertical angle or orientation, sweep rate, sweep movement, and/or other aspects of the sweep movement are outside acceptable thresholds or ranges.

FIG. 14L illustrates an example user interface screen related to continuing the image capture process at additional image capture locations of the panorama path, upon receiving user consent. For example, the example user interface screen may include an indication 1422 related to continuing the image capture process at additional image capture locations of the panorama path, and may also include a confirmation user interface element 1424. User input may be received via the confirmation user interface element 1424 to continue the image capture process using at additional image capture locations of the panorama path, e.g., via a touchscreen, stylus, or other user input. In addition, imaging data captured via an imaging sensor of the user device may be presented via a display of the user device.

FIG. 14M illustrates an example user interface screen related to continuing the image capture process at an additional (or second) image capture location of the panorama path, upon receiving user consent. For example, the example user interface screen may include a textual cue 1408 (and possibly an arrow, as described herein) related to moving to an additional image capture location associated with the panorama path and defined within the local coordinate frame of the room. In some embodiments, an additional image capture location within the room at which to continue the image capture process may be defined or determined according to a direction or order of traversal during the panorama path generation process. Further, the direction or order of traversal may be defined such that an additional image capture location at which to continue the image capture process may generally be within a field of view of the imaging sensor upon completion of an image capture sweep at an immediately prior image capture location. In addition, imaging data captured via an imaging sensor of the user device may be presented via a display of the user device.

Further, the textual cue 1408 may be presented via the display of the user device to guide the user to move the user device toward the additional image capture location that is generated for presentation at a particular location within the local coordinate frame. For example, the textual cue 1408 may be generated, presented, and updated at a particular location or position associated with the additional image capture location, based on position and orientation data of the user device within the local coordinate frame, and the particular location or position of the additional image capture location within the local coordinate frame. Moreover, the textual cue 1408 may be presented generally closer to the floor of the room (or other surface having identifiable features) in order to avoid tracking loss by the imaging sensor of the user device.

In addition, the example user interface screen may also include a panorama path traversal progress indicator 1426, which may be generated to present indications related to the number of image capture locations of the panorama path, and to present indications related to progress of traversal and image capture at each of the image capture locations of the panorama path. As shown in FIG. 14M, image capture may be completed at one image capture location, and three additional image capture locations of the panorama path may remain to be completed, upon receiving user consent.

With respect to the additional (or second) image capture location described with respect to FIG. 14M, the various steps, processes, and operations described herein with respect to FIGS. 14B-14L may be substantially repeated in order to traverse to the additional image capture location, orient a field of view of an imaging sensor of the user device at the additional image capture location, and sweep the field of view of the imaging sensor at the additional image capture location to capture imaging data, upon receiving user consent, which imaging data may be processed by a photogrammetry processor and/or used to generate a three-dimensional model of the room, as described herein.

FIG. 14N illustrates an example user interface screen related to further continuing the image capture process at an additional (or third) image capture location of the panorama path, upon receiving user consent. For example, the example user interface screen may include a textual cue 1408 (and possibly an arrow, as described herein) related to moving to an additional image capture location associated with the panorama path and defined within the local coordinate frame of the room. In some embodiments, an additional image capture location within the room at which to continue the image capture process may be defined or determined according to a direction or order of traversal during the panorama path generation process. Further, the direction or order of traversal may be defined such that an additional image capture location at which to continue the image capture process may generally be within a field of view of the imaging sensor upon completion of an image capture sweep at an immediately prior image capture location. In addition, imaging data captured via an imaging sensor of the user device may be presented via a display of the user device.

Further, the textual cue 1408 may be presented via the display of the user device to guide the user to move the user device toward the additional image capture location that is generated for presentation at a particular location within the local coordinate frame. For example, the textual cue 1408 may be generated, presented, and updated at a particular location or position associated with the additional image capture location, based on position and orientation data of the user device within the local coordinate frame, and the particular location or position of the additional image capture location within the local coordinate frame. Moreover, the textual cue 1408 may be presented generally closer to the floor of the room (or other surface having identifiable features) in order to avoid tracking loss by the imaging sensor of the user device.

In addition, the example user interface screen may also include a panorama path traversal progress indicator 1426, which may be generated and updated to present indications related to the number of image capture locations of the panorama path, and to present indications related to progress of traversal and image capture at each of the image capture locations of the panorama path. As shown in FIG. 14N, image capture may be completed at two image capture locations, and two additional image capture locations of the panorama path may remain to be completed, upon receiving user consent.

With respect to the additional (or third) image capture location described with respect to FIG. 14N, the various steps, processes, and operations described herein with respect to FIGS. 14B-14L may be substantially repeated in order to traverse to the additional image capture location, orient a field of view of an imaging sensor of the user device at the additional image capture location, and sweep the field of view of the imaging sensor at the additional image capture location to capture imaging data, upon receiving user consent, which imaging data may be processed by a photogrammetry processor and/or used to generate a three-dimensional model of the room, as described herein.

FIG. 14O illustrates an example user interface screen related to still further continuing the image capture process at an additional (or fourth) image capture location of the panorama path, upon receiving user consent. For example, the example user interface screen may include a textual cue 1408 (and possibly an arrow, as described herein) related to moving to an additional image capture location associated with the panorama path and defined within the local coordinate frame of the room. In some embodiments, an additional image capture location within the room at which to continue the image capture process may be defined or determined according to a direction or order of traversal during the panorama path generation process. Further, the direction or order of traversal may be defined such that an additional image capture location at which to continue the image capture process may generally be within a field of view of the imaging sensor upon completion of an image capture sweep at an immediately prior image capture location. In addition, imaging data captured via an imaging sensor of the user device may be presented via a display of the user device.

Further, the textual cue 1408 may be presented via the display of the user device to guide the user to move the user device toward the additional image capture location that is generated for presentation at a particular location within the local coordinate frame. For example, the textual cue 1408 may be generated, presented, and updated at a particular location or position associated with the additional image capture location, based on position and orientation data of the user device within the local coordinate frame, and the particular location or position of the additional image capture location within the local coordinate frame. Moreover, the textual cue 1408 may be presented generally closer to the floor of the room (or other surface having identifiable features) in order to avoid tracking loss by the imaging sensor of the user device.

In addition, the example user interface screen may also include a panorama path traversal progress indicator 1426, which may be generated and updated to present indications related to the number of image capture locations of the panorama path, and to present indications related to progress of traversal and image capture at each of the image capture locations of the panorama path. As shown in FIG. 14O, image capture may be completed at three image capture locations, and one additional image capture location of the panorama path may remain to be completed, upon receiving user consent.

With respect to the additional (or fourth) image capture location described with respect to FIG. 14O, the various steps, processes, and operations described herein with respect to FIGS. 14B-14L may be substantially repeated in order to traverse to the additional image capture location, orient a field of view of an imaging sensor of the user device at the additional image capture location, and sweep the field of view of the imaging sensor at the additional image capture location to capture imaging data, upon receiving user consent, which imaging data may be processed by a photogrammetry processor and/or used to generate a three-dimensional model of the room, as described herein.

FIG. 14P illustrates an example user interface screen related to completing the image capture process at all image capture locations of the panorama path, upon receiving user consent. For example, the example user interface screen may include an indication 1428 related to completing the image capture process at all image capture locations of the panorama path, and may also include a confirmation user interface element 1430. User input may be received via the confirmation user interface element 1430 to indicate completion of the image capture process at all image capture locations of the panorama path, e.g., via a touchscreen, stylus, or other user input. In addition, imaging data captured via an imaging sensor of the user device may be presented via a display of the user device.

FIG. 14Q illustrates an example user interface screen related to completion of panorama path traversal and image capture process within the room or space, upon receiving user consent. For example, the example user interface screen may include an indication 1432 related to completion of the panorama path traversal and image capture process within the room and generation of a three-dimensional model of the room. Further, the example user interface screen may also include a confirmation user interface element 1434 to indicate confirmation of completion of the panorama path traversal and image capture process within the room. User input may be received via the confirmation user interface element 1434 to indicate confirmation of completion of the panorama path traversal and image capture process, e.g., via a touchscreen, stylus, or other user input.

Figures 1, 15A:
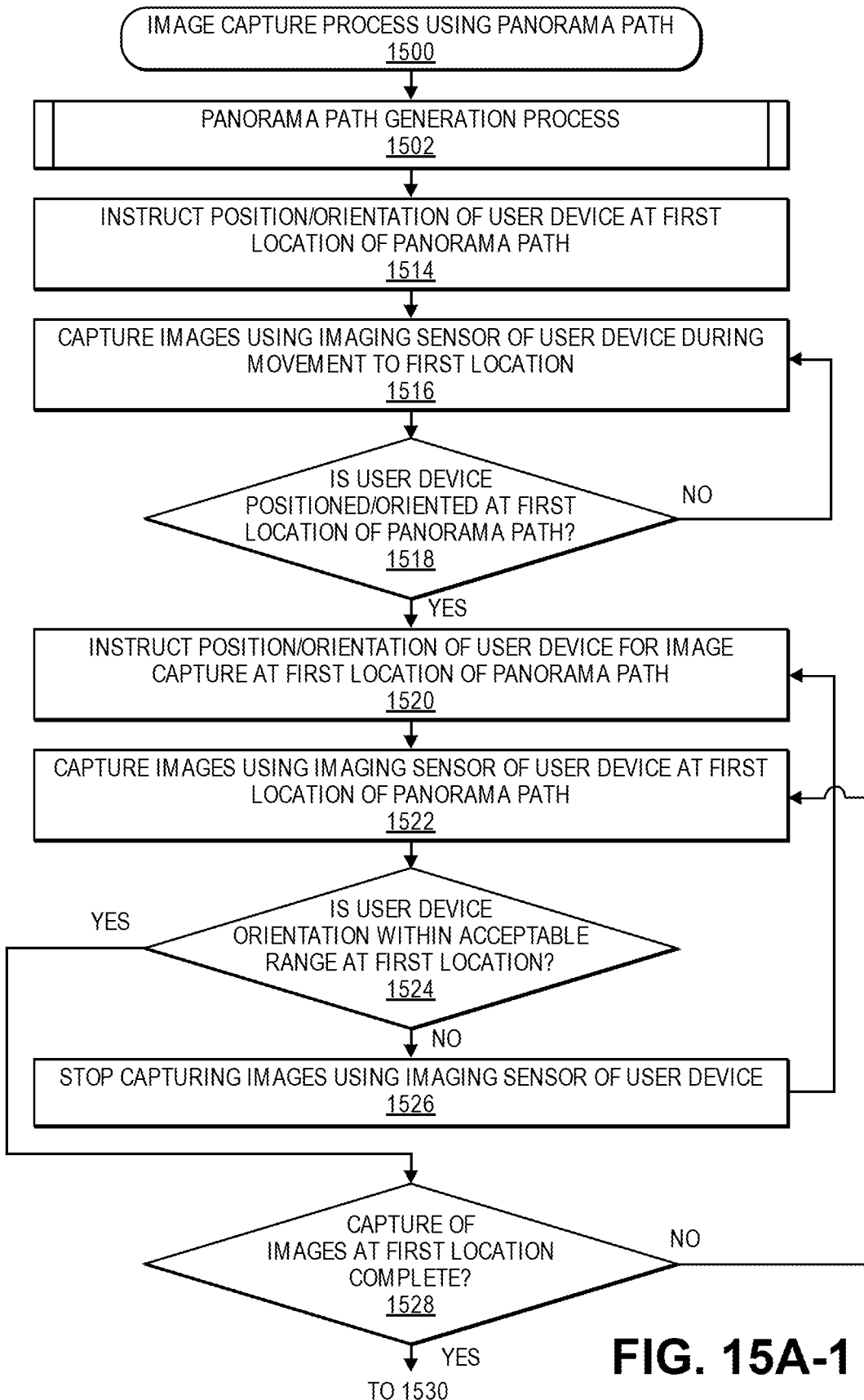
FIG. 15A (including partial FIGS. 15A-1, 15A-2, and 15A-3) is a flow diagram illustrating an example image capture process using panorama paths, in accordance with disclosed implementations.
Figures 2, 15A:
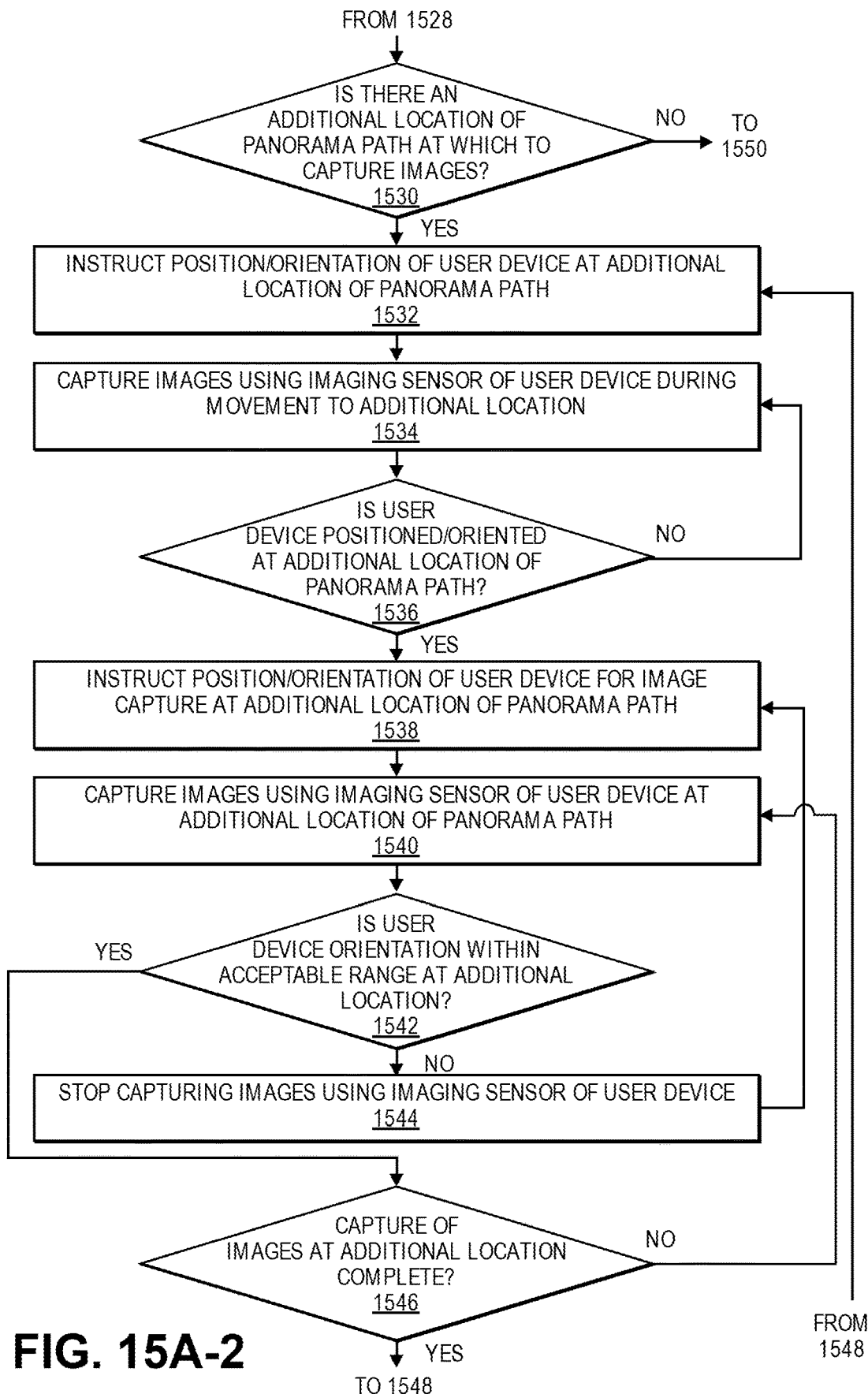
Figures 3, 15A:
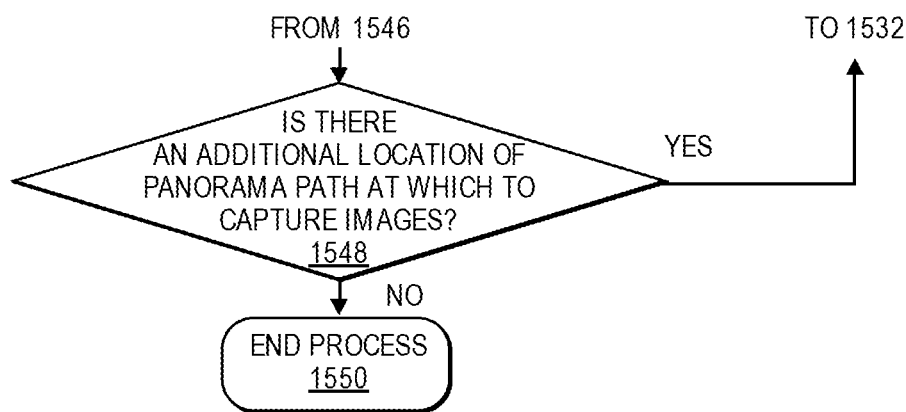

FIG. 15A is a flow diagram illustrating an example image capture process using panorama paths 1500, in accordance with disclosed implementations.

The process 1500 may begin with the panorama path generation process, as at 1502. As described at least with respect to FIG. 15B, the panorama path generation process may comprise receiving room dimensions and measurements, receiving movement data for a user device, generating one or more image capture locations and image capture paths to be presented and traversed as part of the panorama path based on the room dimensions and measurements and/or the movement data, and generating an order or direction of traversal among the one or more image capture locations and generating an order or direction of sweep of an imaging sensor at the one or more image capture locations.

The process 1500 may proceed with instructing position and orientation of the user device at a first location of the panorama path, as at 1514. For example, the user device may be guided to a first image capture location of a panorama path via various indications presented via a display of the user device, such as arrows, textual cues, visual guides, or other indications, based on position and orientation data of the user device within the local coordinate frame of the room, and position information associated with the first image capture location within the local coordinate frame of the room.

The process 1500 may continue with capturing images using an imaging sensor of the user device during movement to the first location, as at 1516. For example, during movement or traversal along an image capture path toward the first image capture location, imaging data may be captured, upon receiving user consent, via the imaging sensor of the user device, as well as position and orientation data of the user device during such movement or traversal, which imaging data may be processed by a photogrammetry processor and/or used to generate a three-dimensional model of the room, as described herein.

The process 1500 may proceed by determining whether the user device is positioned and oriented at the first location of the panorama path, as at 1518. For example, a current position and orientation of the user device within the local coordinate frame as detected by one or more position and orientation sensors of the user device may be compared with position information associated with the first image capture location within the local coordinate frame of the room in order to determine whether the user device is within the bounds of, or within a threshold distance of, the first image capture location. If it is determined that the user device is not positioned or oriented at the first image capture location, then the process 1500 may return to step 1516 and continue to capture images using an imaging sensor of the user device during movement to the first location.

If, however, it is determined that the user device is positioned and oriented at the first image capture location, then the process 1500 may continue by instructing position and orientation of the user device for image capture at the first location of the panorama path, as at 1520. For example, a field of view of the imaging sensor of the user device may be guided to a sweep starting point that is generated and presented to initiate image capture at the first image capture location of a panorama path via various indications presented via a display of the user device, such as arrows, textual cues, visual guides, or other indications, based on position and orientation data of the user device within the local coordinate frame of the room, and position information associated with the sweep starting point at the first image capture location within the local coordinate frame of the room.

The process 1500 may proceed to capture images using an imaging sensor of the user device at the first location of the panorama path, as at 1522. For example, movement, orientation, or sweep of the field of view of the imaging sensor of the user device may be guided in a direction of sweep from a sweep starting point to a sweep ending point that are generated and presented to facilitate image capture at the first image capture location of a panorama path via various indications presented via a display of the user device, such as arrows, textual cues, visual guides, progress bars, blocks, or indicators, or other indications, based on position and orientation data of the user device within the local coordinate frame of the room, and position information associated with the sweep starting point, direction of sweep, and sweep ending point at the first image capture location within the local coordinate frame of the room. In addition, during movement, orientation, or sweep of a field of view of the imaging sensor of the user device in a direction of sweep from a sweep starting point to a sweep ending point presented at the first image capture location, imaging data may be captured, upon receiving user consent, via the imaging sensor of the user device, as well as position and orientation data of the user device during such movement, orientation, or sweep, which imaging data may be processed by a photogrammetry processor and/or used to generate a three-dimensional model of the room, as described herein.

The process 1500 may then continue to determine whether the orientation of the user device is within an acceptable range at the first location, as at 1524. For example, position and orientation data of the user device may be received during sweep of the user device, and aspects such as vertical angle or orientation, sweep rate, sweep movement, and/or other aspects of the sweep movement may be determined and compared with acceptable ranges or thresholds.

If it is determined that the orientation or other aspects of the user device is not within an acceptable range or threshold, the process 1500 may proceed with stopping the capture of images using the imaging sensor of the user device, as at 1526. Then, the process 1500 may return to step 1520 to instruct position and orientation of the user device for image capture at the first location of the panorama path.

If, however, it is determined that the orientation or other aspects of the user device are within an acceptable range or threshold, the process 1500 may continue with determining whether capture of images at the first location is complete, as at 1528. For example, if the user device has completed the movement or sweep from the sweep starting point to the sweep ending point in the direction of sweep at the first image capture location, and successfully captured imaging data during such movement or sweep, then the capture of images at the first location may be complete. However, in some embodiments, multiple sweeps may be associated with a single image capture location, and such multiple sweeps may be instructed at the image capture location until all of the multiple sweeps have been completed, upon receiving user consent.

If it is determined that capture of images at the first location is not complete, then the process 1500 may return to step 1522 to continue capturing images using an imaging sensor of the user device at the first location of the panorama path. If, however, it is determined that capture of images at the first location is complete, then the process 1500 may proceed by determining whether there is an additional location of the panorama path at which to capture images, as at 1530. For example, the traversal, sweep, and image capture processes and operations described herein with respect to the first image capture location may be substantially repeated at one or more additional image capture locations of the panorama path, upon receiving user consent. If it is determined that there are no additional locations of the panorama path at which to capture images, then the process 1500 may proceed to step 1550, and may end.

If, however, it is determined that there is an additional location of the panorama path at which to capture images, then the process 1500 may continue by instructing position and orientation of the user device at an additional location of the panorama path, as at 1532. For example, the user device may be guided to an additional image capture location of a panorama path via various indications presented via a display of the user device, such as arrows, textual cues, visual guides, or other indications, based on position and orientation data of the user device within the local coordinate frame of the room, and position information associated with the additional image capture location within the local coordinate frame of the room.

The process 1500 may continue with capturing images using an imaging sensor of the user device during movement to the additional location, as at 1534. For example, during movement or traversal along an image capture path toward the additional image capture location, imaging data may be captured, upon receiving user consent, via the imaging sensor of the user device, as well as position and orientation data of the user device during such movement or traversal, which imaging data may be processed by a photogrammetry processor and/or used to generate a three-dimensional model of the room, as described herein.

The process 1500 may proceed by determining whether the user device is positioned and oriented at the additional location of the panorama path, as at 1536. For example, a current position and orientation of the user device within the local coordinate frame as detected by one or more position and orientation sensors of the user device may be compared with position information associated with the additional image capture location within the local coordinate frame of the room in order to determine whether the user device is within the bounds of, or within a threshold distance of, the additional image capture location. If it is determined that the user device is not positioned or oriented at the additional image capture location, then the process 1500 may return to step 1534 and continue to capture images using an imaging sensor of the user device during movement to the additional location.

If, however, it is determined that the user device is positioned and oriented at the additional image capture location, then the process 1500 may continue by instructing position and orientation of the user device for image capture at the additional location of the panorama path, as at 1538. For example, a field of view of the imaging sensor of the user device may be guided to a sweep starting point that is generated and presented to initiate image capture at the additional image capture location of a panorama path via various indications presented via a display of the user device, such as arrows, textual cues, visual guides, or other indications, based on position and orientation data of the user device within the local coordinate frame of the room, and position information associated with the sweep starting point at the additional image capture location within the local coordinate frame of the room.

The process 1500 may proceed to capture images using an imaging sensor of the user device at the additional location of the panorama path, as at 1540. For example, movement, orientation, or sweep of the field of view of the imaging sensor of the user device may be guided in a direction of sweep from a sweep starting point to a sweep ending point that are generated and presented to facilitate image capture at the additional image capture location of a panorama path via various indications presented via a display of the user device, such as arrows, textual cues, visual guides, progress bars, blocks, or indicators, or other indications, based on position and orientation data of the user device within the local coordinate frame of the room, and position information associated with the sweep starting point, direction of sweep, and sweep ending point at the additional image capture location within the local coordinate frame of the room. In addition, during movement, orientation, or sweep of a field of view of the imaging sensor of the user device in a direction of sweep from a sweep starting point to a sweep ending point presented at the additional image capture location, imaging data may be captured, upon receiving user consent, via the imaging sensor of the user device, as well as position and orientation data of the user device during such movement, orientation, or sweep, which imaging data may be processed by a photogrammetry processor and/or used to generate a three-dimensional model of the room, as described herein.

The process 1500 may then continue to determine whether the orientation of the user device is within an acceptable range at the additional location, as at 1542. For example, position and orientation data of the user device may be received during sweep of the user device, and aspects such as vertical angle or orientation, sweep rate, sweep movement, and/or other aspects of the sweep movement may be determined and compared with acceptable ranges or thresholds.

If it is determined that the orientation or other aspects of the user device is not within an acceptable range or threshold, the process 1500 may proceed with stopping the capture of images using the imaging sensor of the user device, as at 1544. Then, the process 1500 may return to step 1538 to instruct position and orientation of the user device for image capture at the additional location of the panorama path.

If, however, it is determined that the orientation or other aspects of the user device are within an acceptable range or threshold, the process 1500 may continue with determining whether capture of images at the additional location is complete, as at 1546. For example, if the user device has completed the movement or sweep from the sweep starting point to the sweep ending point in the direction of sweep at the additional image capture location, and successfully captured imaging data during such movement or sweep, then the capture of images at the additional location may be complete. However, in some embodiments, multiple sweeps may be associated with a single image capture location, and such multiple sweeps may be instructed at the image capture location until all of the multiple sweeps have been completed, upon receiving user consent.

If it is determined that capture of images at the additional location is not complete, then the process 1500 may return to step 1540 to continue capturing images using an imaging sensor of the user device at the additional location of the panorama path. If, however, it is determined that capture of images at the additional location is complete, then the process 1500 may proceed by determining whether there is an additional location of the panorama path at which to capture images, as at 1548. For example, the traversal, sweep, and image capture processes and operations described herein with respect to the additional image capture location may be substantially repeated at one or more further additional image capture locations of the panorama path, upon receiving user consent. If it is determined that there is an additional location of the panorama path at which to capture images, then the process 1500 may return to step 1532 to instruct position and orientation of the user device at an additional location of the panorama path. If, however, it is determined that there are no additional locations of the panorama path at which to capture images, then the process 1500 may end, as at 1550.

Figure 15B:
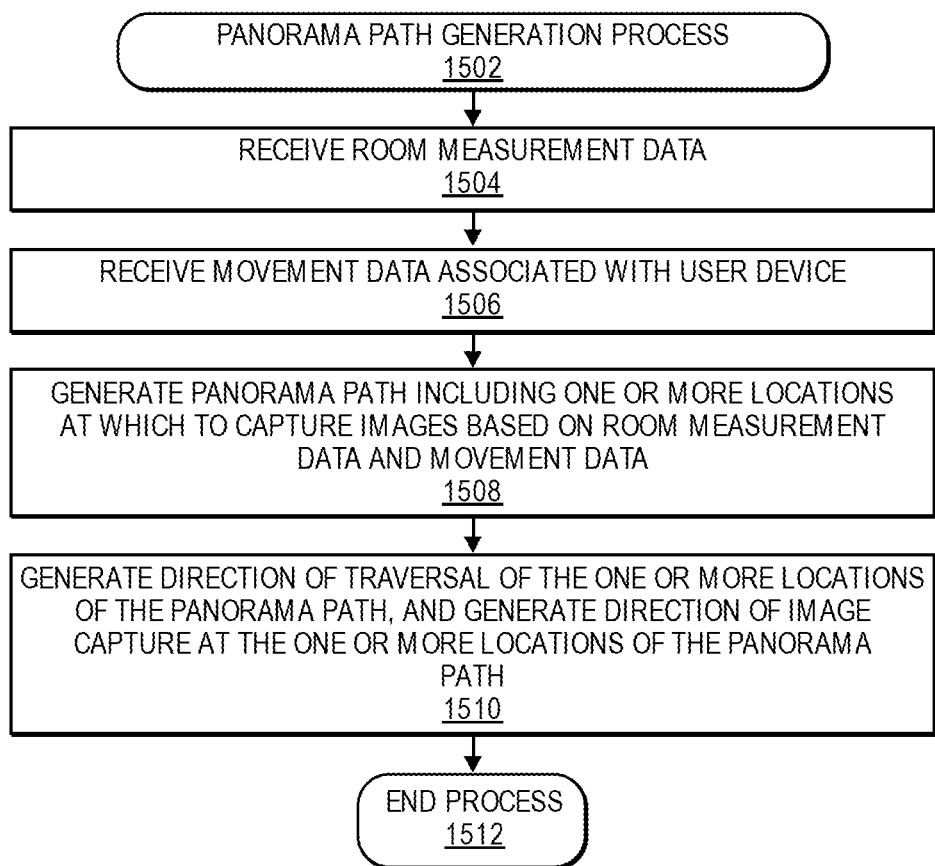
FIG. 15B is a flow diagram illustrating an example panorama path generation process, in accordance with disclosed implementations.

FIG. 15B is a flow diagram illustrating an example panorama path generation process 1502, in accordance with disclosed implementations.

The process 1502 may begin by receiving room measurement data, as at 1504. For example, the room measurement data may comprise dimensions and/or measurements of a room, such as floor planes, floor dimensions, floor area, wall planes, wall dimensions, wall area, ceiling planes, ceiling dimensions, ceiling area, or other measurement data. In some example embodiments, the room measurement data may be determined using the room measurement process described at least with respect to FIGS. 6A-6E.

The process 1502 may continue by receiving movement data associated with the user device, as at 1506. For example, the movement data may include position and/or orientation data detected by one or more position and orientation sensors, upon receiving user consent, of a user device as the user device moves around the room. In some example embodiments, the movement data may indicate accessible or walkable portions of the room, e.g., walkable paths or areas, hallways, egresses, or other portions, and may also indicate inaccessible or blocked portions of the room, e.g., areas including columns, poles, sofas, chairs, tables, other furniture, fireplaces, permanent fixtures, or other portions.

The process 1502 may then proceed by generating a panorama path including one or more locations at which to capture images based on the room measurement data and the movement data, as at 1508. For example, the panorama path may include one or more image capture locations at which images may be captured during movement, orientation, or sweep of an imaging sensor of the user device. In addition, the panorama path may also include one or more image capture paths, e.g., between pairs of image capture locations, along which images may be captured during traversal of an imaging sensor of the user device.

The one or more image capture locations and the one or more image capture paths may be generated for presentation via a display of a user device at particular locations, e.g., at edges, sides, walls, corners, or other portions of walls, within the local coordinate frame of the room. In addition, the one or more image capture locations may have various sizes, shapes, areas, radii, diameters, or other dimensions, boundaries, or aspects. Further, the one or more image capture paths may have various sizes, shapes, lengths, directions, or other dimensions or aspects.

Moreover, although in some embodiments the one or more image capture locations and the one or more image capture paths may be generated and directly presented via a display of a user device, such as visual presentations of points, circles, areas, or other boundaries to indicate image capture locations, or arrows, lines, pathways, or other visual indications of image capture paths, in other embodiments, the one or more image capture locations and the one or more image capture paths may be generated and indirectly presented via a display of a user device, such as visual indications, arrows, textual cues, colors, semi-transparent overlays, or other indicators that may imply or indicate the presence and/or positions of image capture locations or image capture paths at particular positions within the local coordinate frame, without directly presenting any visual indications of the bounds or extents of the image capture locations or image capture paths.

The process 1502 may then continue to generate a direction of traversal of the one or more locations of the panorama path, and generate a direction of image capture at the one or more locations of the panorama path, as at 1510. For example, an order or direction of traversal among the one or more image capture locations may be defined or determined in order to facilitate sequential or intuitive traversal of the image capture locations by a user device. The order of traversal may be, from a top-down view of the room, counterclockwise around the room or clockwise around the room within the local coordinate frame. In addition, an order or direction of sweep of an imaging sensor at the one or more image capture locations may also be defined or determined in order to facilitate smooth and intuitive sweep at the image capture locations by an imaging sensor of the user device. The direction of sweep may be, from a user viewpoint, from left-to-right across the room or from right-to-left across the room. Moreover, in some embodiments, the direction of sweep at the image capture locations and the order of traversal among the image capture locations may be coupled, such that responsive to completing a sweep of the imaging sensor at a first image capture location, a second image capture location may generally be within a field of view of the imaging sensor of the user device. Further, in other embodiments, multiple sweeps may be performed to capture imaging data at one or more image capture locations, and likewise, the direction of sweep at the image capture locations and the order of traversal among the image capture locations may be coupled in such embodiments.

The process 1502 may then end, as at 1512.

Figures 1, 16:
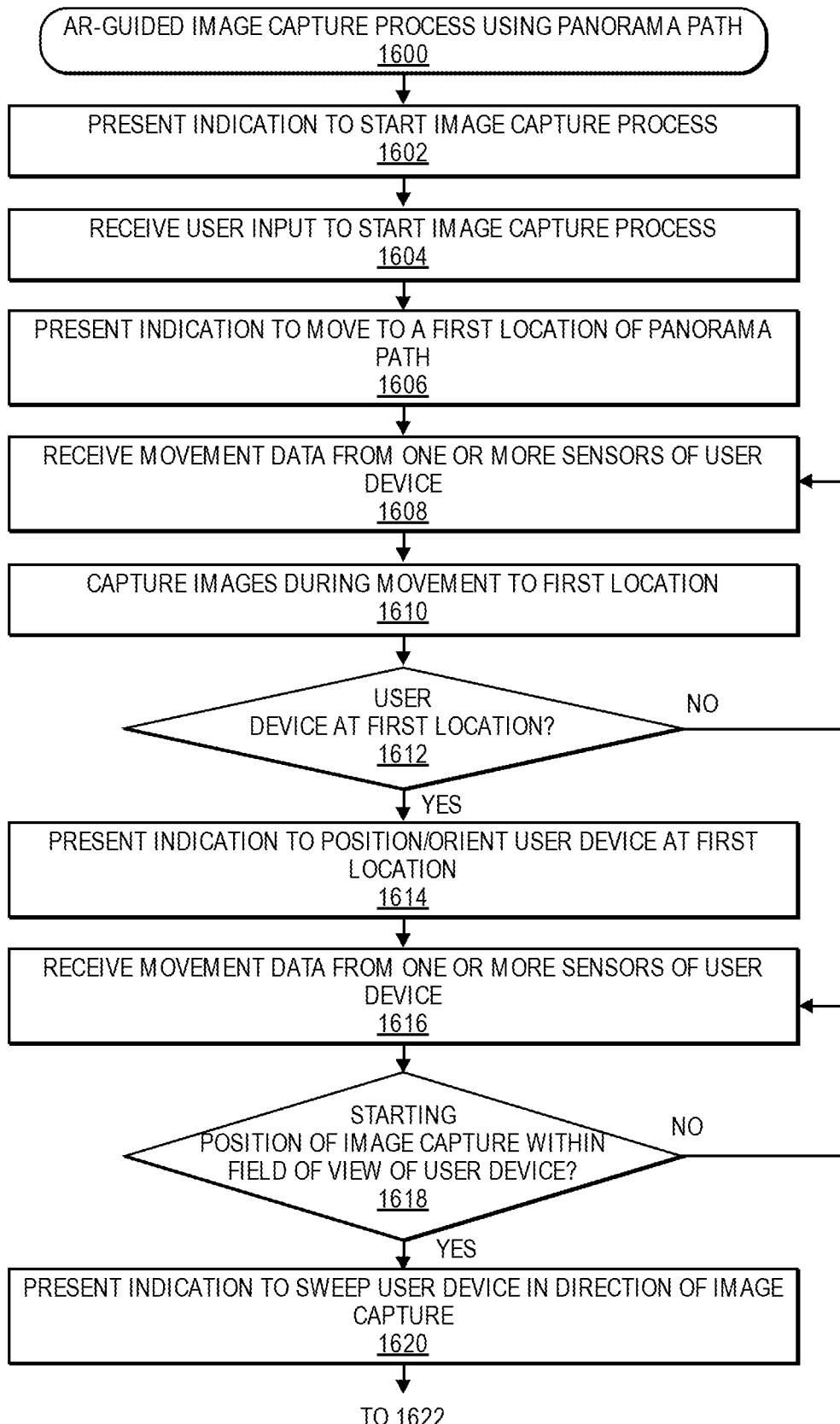
FIG. 16 (including partial FIGS. 16-1, 16-2, 16-3, and 16-4) is a flow diagram illustrating an example image capture process using panorama paths with augmented reality guidance, in accordance with disclosed implementations.
Figures 2, 16:
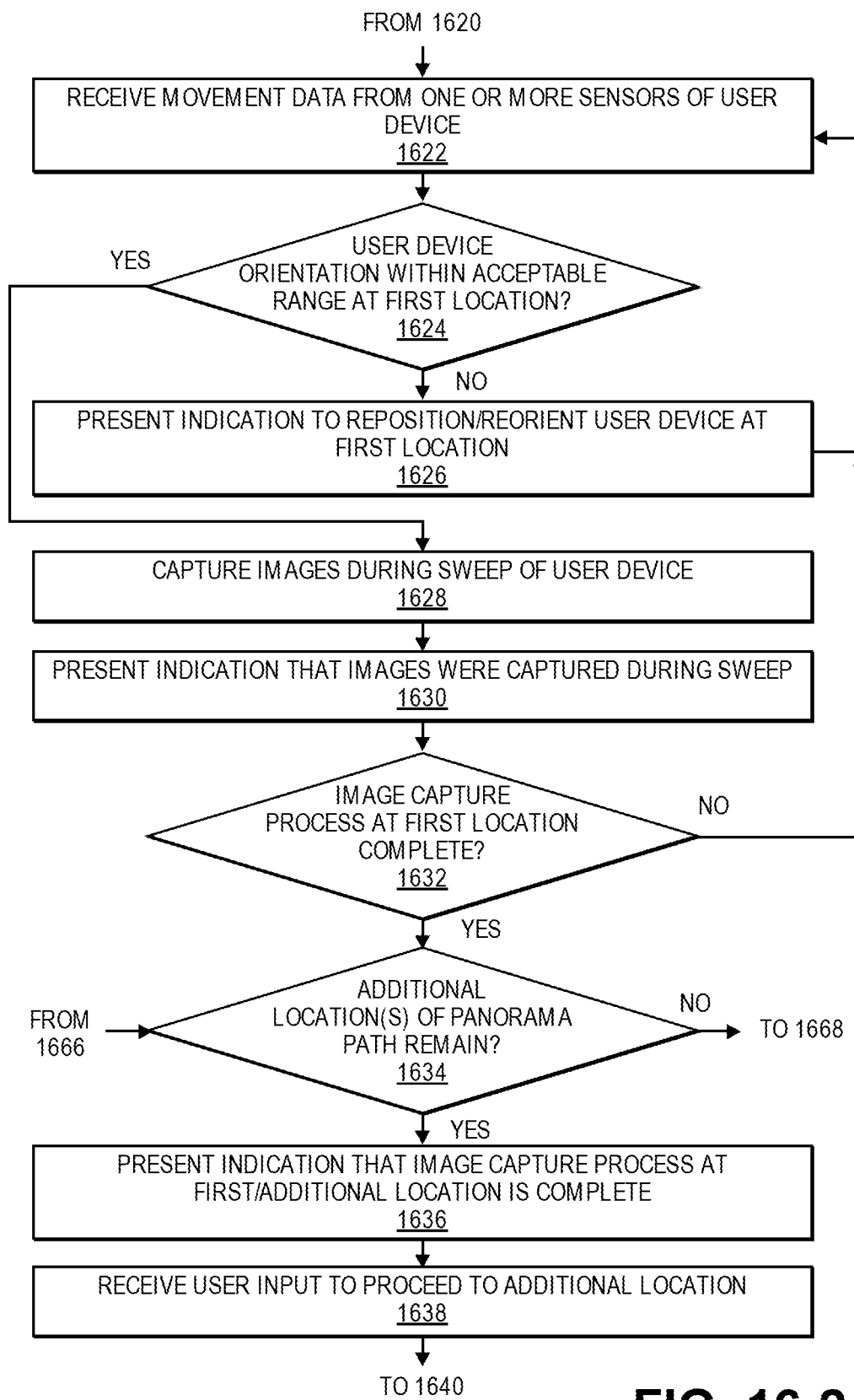
Figures 3, 16:
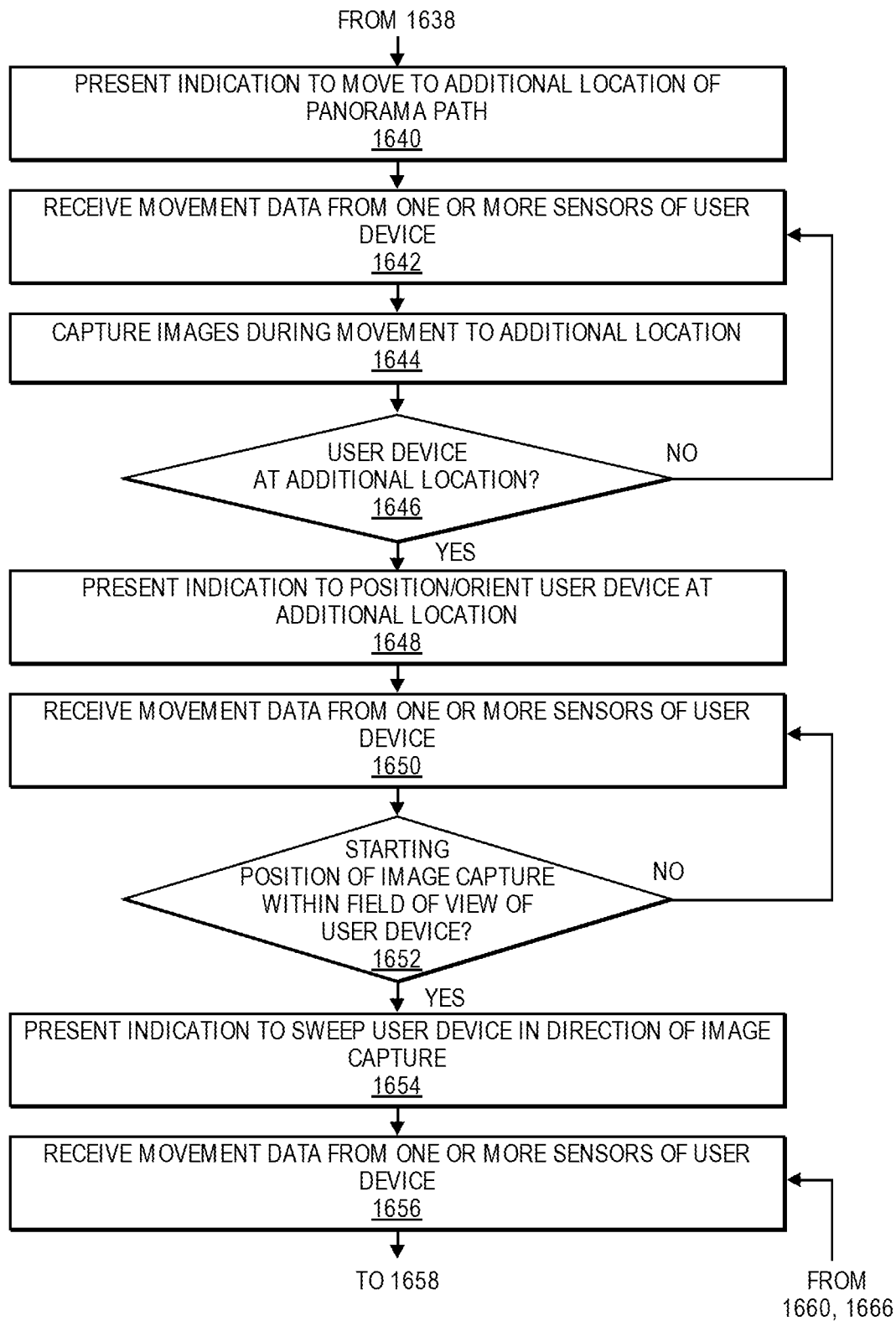
Figures 4, 16:
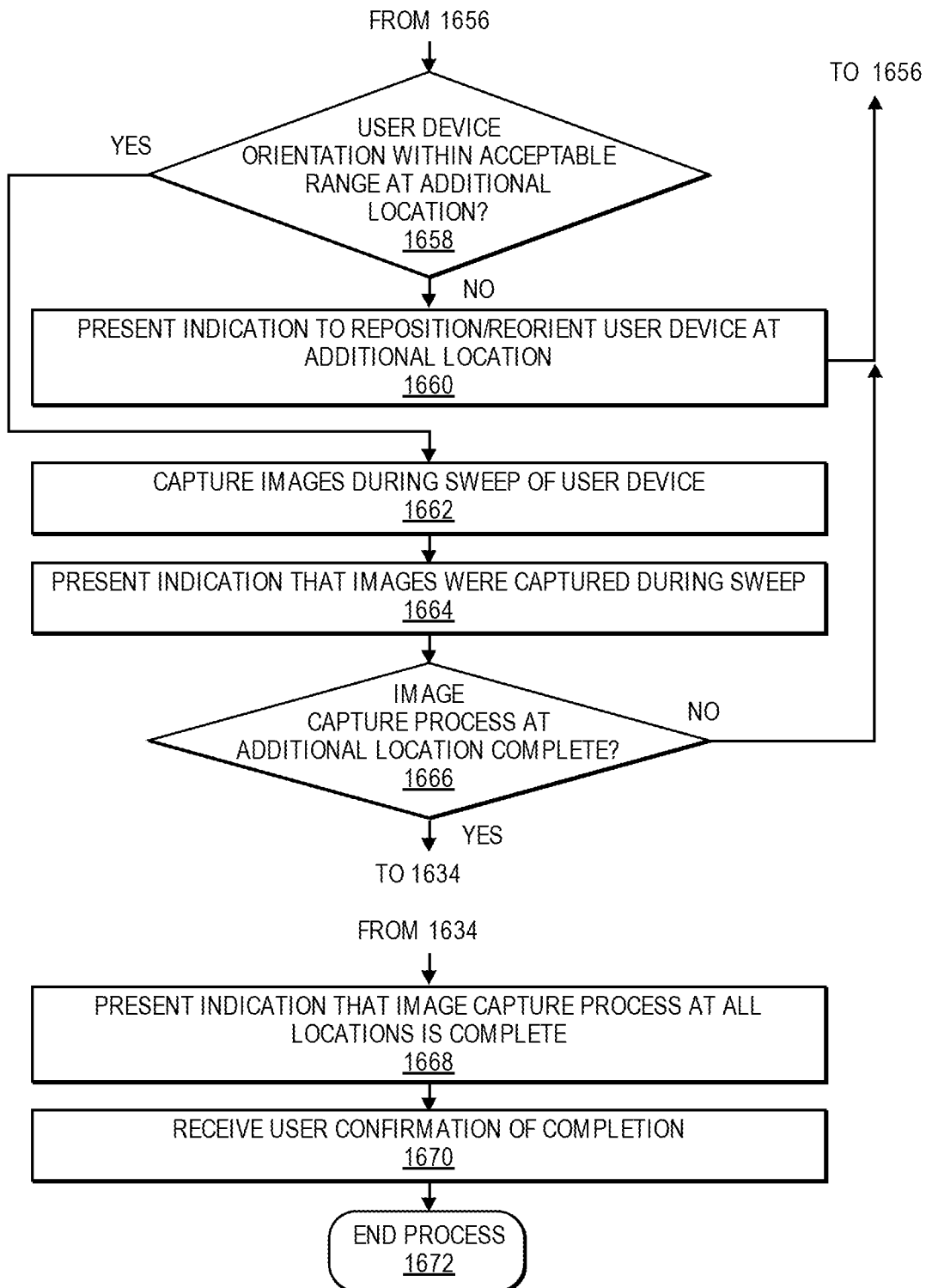

FIG. 16 is a flow diagram illustrating an example image capture process using panorama paths with augmented reality guidance 1600, in accordance with disclosed implementations.

The process 1600 may begin by presenting an indication to start an image capture process, as at 1602. For example, the indication may comprise text and visual cues or indications related to the image capture process, as well as a confirmation user interface element that may be selected by a user to proceed.

The process 1600 may proceed by receiving user input to start the image capture process, as at 1604. For example, user input may be received via the confirmation user interface element, e.g., via a touchscreen, stylus, or other user input.

The process 1600 may continue by presenting an indication to move the user device toward a first location of a panorama path within the room, as at 1606. For example, the indication may comprise arrows, textual cues, visual cues, or other indications related to moving the user device toward a first image capture location of a panorama path. In addition, the indication may comprise a first semi-transparent color overlaid on top of imaging data presented via the display of the user device if the user device is not positioned at the first image capture location, e.g., not within the bounds of or not within a threshold distance of the first image capture location based on the position and orientation data of the user device within the local coordinate frame, and may comprise a second semi-transparent color overlaid on top of imaging data presented via the display of the user device if the user device is positioned at the first image capture location, e.g., within the bounds of or within a threshold distance of the first image capture location based on the position and orientation data of the user device within the local coordinate frame.

Further, an arrow may be presented via the display of the user device that points toward the first image capture location generated for presentation as part of the panorama path within the local coordinate frame of the room, based on position and orientation information of the user device relative to the position of the first image capture location within the local coordinate frame. In addition, various textual cues or guides may be presented via the display of the user device and may be presented as following or remaining close or adjacent to the arrow that is presented to point toward the first image capture location.

The process 1600 may then proceed to receiving movement data from one or more sensors of the user device, as at 1608. For example, during movement of the user device toward the first image capture location within the room, position and orientation data of the user device may be received from one or more position and orientation sensors of the user device.

The process 1600 may then continue by capturing images during movement to the first location, as at 1610. For example, during movement of the user device toward the first image capture location, imaging data may be captured by an imaging sensor of the user device, which imaging data may be processed by a photogrammetry processor and/or used to generate a three-dimensional model of the room, as described herein.

The process 1600 may then continue to determine whether the user device is at the first location, as at 1612. For example, position and orientation data of the user device may be tracked and processed, upon receiving user consent, to determine whether the user device has moved to within the bounds of or within a threshold distance of the first image capture location within the local coordinate frame of the room. In some embodiments, a semi-transparent color that is overlaid on top of imaging data may transition from a first color to a second color upon determining that the user device is at the first location.

If the user device is not at the first location, then the process 1600 may return to step 1608 to continue receiving movement data from one or more sensors of the user device. If, however, the user device is at the first location, then the process 1600 may proceed to present an indication to position or orient the user device at the first location, as at 1614. For example, the indication may comprise arrows, textual cues, visual cues, or other indications related to orienting a field of view of an imaging sensor of the user device toward a sweep starting point generated for presentation at the first image capture location of a panorama path.

Further, an arrow may be presented via the display of the user device that points toward a sweep starting point generated for presentation at the first image capture location of the panorama path within the local coordinate frame of the room, based on position and orientation information of the user device relative to the position of the sweep starting point at the first image capture location within the local coordinate frame. In addition, various textual cues or guides may be presented via the display of the user device and may be presented as following or remaining close or adjacent to the arrow that is presented to point toward the sweep starting point at the first image capture location.

The process 1600 may then proceed to receiving movement data from one or more sensors of the user device, as at 1616. For example, during movement or orientation of the user device toward the sweep starting point generated for presentation at the first image capture location within the room, position and orientation data of the user device may be received from one or more position and orientation sensors of the user device.

The process 1600 may then continue to determine whether the sweep starting point for image capture is within the field of view of the imaging sensor of the user device, as at 1618. For example, position and orientation data of the user device may be tracked and processed, upon receiving user consent, to determine whether the field of view of the imaging sensor of the user device has been moved or oriented such that the sweep starting point is presented within the field of view of the imaging sensor of the user device within the local coordinate frame of the room.

If the sweep starting point for image capture is not within the field of view of the imaging sensor of the user device, then the process 1600 may return to step 1616 to continue receiving movement data from one or more sensors of the user device. If, however, the sweep starting point for image capture is within the field of view of the imaging sensor of the user device, then the process 1600 may proceed to present an indication to sweep the user device in a direction of image capture, as at 1620. For example, the indication may comprise arrows, textual cues, visual cues, progress bars, blocks, or indicators, or other indications related to sweeping the field of view of the imaging sensor in a direction of sweep from a sweep starting point to a sweep ending point in order to capture imaging data of the room.

The process 1600 may then proceed to receiving movement data from one or more sensors of the user device, as at 1622. For example, during movement, orientation, or sweep of the user device for image capture at the first image capture location, position and orientation data of the user device may be received from one or more position and orientation sensors of the user device.

The process 1600 may then continue to determine whether the user device orientation is within an acceptable range at the first location, as at 1624. For example, based on the position and orientation data of the user device during sweep of the imaging sensor for image capture at the first image capture location, it may be determined whether the orientation, e.g., vertical angle or orientation, sweep rate, sweep movement, and/or other aspects of the sweep movement, are within acceptable ranges or thresholds of such movement or orientation.

If it is determined that the user device orientation is not within an acceptable range at the first location, then the process 1600 may proceed by presenting an indication to reposition or reorient the user device at the first location, as at 1626. For example, the indication may comprise arrows, textual cues, visual cues, progress bars, blocks, or indicators, or other indications related to repositioning or reorienting the user device during sweep of the field of view of the imaging sensor in a direction of sweep in order to capture imaging data of the room. In one example, an arrow that is presented to indicate progress of image capture may move or rotate and/or may also change colors based on position or orientation data of the user device, thereby providing a visual indication to a user with respect to repositioning or reorienting the user device during sweep of the user device. The process 1600 may then return to step 1622 to receive movement data from one or more sensors of the user device during sweep of the user device.

If, however, it is determined that the user device orientation is within an acceptable range at the first location, then the process 1600 may then continue by capturing images during sweep of the user device, as at 1628. For example, during sweep of the user device in a direction of sweep at the first image capture location, imaging data may be captured by an imaging sensor of the user device, which imaging data may be processed by a photogrammetry processor and/or used to generate a three-dimensional model of the room, as described herein.

The process 1600 may then proceed to present an indication that images were captured during the sweep, as at 1630. For example, during sweep of the user device, an indication comprising the progress bar or block may be generated or updated to present one or more thumbnails or other visual indications related to the progress of image capture during the sweep of the user device. In addition, an indication comprising an arrow pointing and moving in the direction of sweep may also be generated or updated to present progress of image capture during the sweep of the user device.

The process 1600 may then continue to determine whether the image capture process at the first location is complete, as at 1632. For example, upon successful sweep of the user device from the sweep starting point to the sweep ending point in the direction of sweep, and upon successful capture of imaging data during the sweep, it may be determined that the image capture process at the first image capture location is complete. In addition, responsive to sweeping the user device in the direction of sweep such that the sweep ending point at the first image capture location is presented within a field of view of the imaging sensor, it may be determined that the image capture process at the first image capture location is complete.

If it is determined that the image capture process at the first location is not complete, then the process 1600 may return to step 1622 to receive movement data from one or more sensors of the user device during sweep of the user device, and continue to capture imaging data during sweep of the user device at the first image capture location.

If, however, it is determined that the image capture process at the first location is complete, then the process 1600 may proceed with determining whether any additional locations of the panorama path remain for image capture, as at 1634. If no additional locations of the panorama path remain for image capture, then the process 1600 may proceed to step 1668, as further described herein.

If, however, one or more additional locations of the panorama path remain for image capture, then the process 1600 may continue with presenting an indication that the image capture process at the first location is complete, as at 1636. For example, the indication may comprise text and visual cues or indications related to completion of image capture during sweep of the user device at the first image capture location. Moreover, the indication may comprise a confirmation user interface element that may be selected by a user to confirm completion of the image capture process during sweep at the first image capture location, and to proceed to the image capture process at one or more additional locations of the panorama path.

The process 1600 may then proceed to receive user input to proceed to an additional location, as at 1638. For example, user input may be received via the confirmation user interface element, e.g., via a touchscreen, stylus, or other user input, to confirm completion of the image capture process during sweep at the first image capture location, and to proceed to the image capture process at one or more additional locations of the panorama path.

The process 1600 may continue by presenting an indication to move the user device toward an additional location of a panorama path within the room, as at 1640. For example, the indication may comprise arrows, textual cues, visual cues, or other indications related to moving the user device toward an additional image capture location of a panorama path. In addition, the indication may comprise a first semi-transparent color overlaid on top of imaging data presented via the display of the user device if the user device is not positioned at the additional image capture location, e.g., not within the bounds of or not within a threshold distance of the additional image capture location based on the position and orientation data of the user device within the local coordinate frame, and may comprise a second semi-transparent color overlaid on top of imaging data presented via the display of the user device if the user device is positioned at the additional image capture location, e.g., within the bounds of or within a threshold distance of the additional image capture location based on the position and orientation data of the user device within the local coordinate frame.

Further, an arrow may be presented via the display of the user device that points toward the additional image capture location generated for presentation as part of the panorama path within the local coordinate frame of the room, based on position and orientation information of the user device relative to the position of the additional image capture location within the local coordinate frame. In addition, various textual cues or guides may be presented via the display of the user device and may be presented as following or remaining close or adjacent to the arrow that is presented to point toward the additional image capture location.

The process 1600 may then proceed to receiving movement data from one or more sensors of the user device, as at 1642. For example, during movement of the user device toward the additional image capture location within the room, position and orientation data of the user device may be received from one or more position and orientation sensors of the user device.

The process 1600 may then continue by capturing images during movement to the additional location, as at 1644. For example, during movement of the user device toward the additional image capture location, imaging data may be captured by an imaging sensor of the user device, which imaging data may be processed by a photogrammetry processor and/or used to generate a three-dimensional model of the room, as described herein.

The process 1600 may then continue to determine whether the user device is at the additional location, as at 1646. For example, position and orientation data of the user device may be tracked and processed, upon receiving user consent, to determine whether the user device has moved to within the bounds of or within a threshold distance of the additional image capture location within the local coordinate frame of the room. In some embodiments, a semi-transparent color that is overlaid on top of imaging data may transition from a first color to a second color upon determining that the user device is at the additional location.

If the user device is not at the additional location, then the process 1600 may return to step 1642 to continue receiving movement data from one or more sensors of the user device. If, however, the user device is at the additional location, then the process 1600 may proceed to present an indication to position or orient the user device at the additional location, as at 1648. For example, the indication may comprise arrows, textual cues, visual cues, or other indications related to orienting a field of view of an imaging sensor of the user device toward a sweep starting point generated for presentation at the additional image capture location of a panorama path.

Further, an arrow may be presented via the display of the user device that points toward a sweep starting point generated for presentation at the additional image capture location of the panorama path within the local coordinate frame of the room, based on position and orientation information of the user device relative to the position of the sweep starting point at the additional image capture location within the local coordinate frame. In addition, various textual cues or guides may be presented via the display of the user device and may be presented as following or remaining close or adjacent to the arrow that is presented to point toward the sweep starting point at the additional image capture location.

The process 1600 may then proceed to receiving movement data from one or more sensors of the user device, as at 1650. For example, during movement or orientation of the user device toward the sweep starting point generated for presentation at the additional image capture location within the room, position and orientation data of the user device may be received from one or more position and orientation sensors of the user device.

The process 1600 may then continue to determine whether the sweep starting point for image capture is within the field of view of the imaging sensor of the user device, as at 1652. For example, position and orientation data of the user device may be tracked and processed, upon receiving user consent, to determine whether the field of view of the imaging sensor of the user device has been moved or oriented such that the sweep starting point is presented within the field of view of the imaging sensor of the user device within the local coordinate frame of the room.

If the sweep starting point for image capture is not within the field of view of the imaging sensor of the user device, then the process 1600 may return to step 1650 to continue receiving movement data from one or more sensors of the user device. If, however, the sweep starting point for image capture is within the field of view of the imaging sensor of the user device, then the process 1600 may proceed to present an indication to sweep the user device in a direction of image capture, as at 1654. For example, the indication may comprise arrows, textual cues, visual cues, progress bars, blocks, or indicators, or other indications related to sweeping the field of view of the imaging sensor in a direction of sweep from a sweep starting point to a sweep ending point in order to capture imaging data of the room.

The process 1600 may then proceed to receiving movement data from one or more sensors of the user device, as at 1656. For example, during movement, orientation, or sweep of the user device for image capture at the additional image capture location, position and orientation data of the user device may be received from one or more position and orientation sensors of the user device.

The process 1600 may then continue to determine whether the user device orientation is within an acceptable range at the additional location, as at 1658. For example, based on the position and orientation data of the user device during sweep of the imaging sensor for image capture at the additional image capture location, it may be determined whether the orientation, e.g., vertical angle or orientation, sweep rate, sweep movement, and/or other aspects of the sweep movement, are within acceptable ranges or thresholds of such movement or orientation.

If it is determined that the user device orientation is not within an acceptable range at the additional location, then the process 1600 may proceed by presenting an indication to reposition or reorient the user device at the additional location, as at 1660. For example, the indication may comprise arrows, textual cues, visual cues, progress bars, blocks, or indicators, or other indications related to repositioning or reorienting the user device during sweep of the field of view of the imaging sensor in a direction of sweep in order to capture imaging data of the room. In one example, an arrow that is presented to indicate progress of image capture may move or rotate and/or may also change colors based on position or orientation data of the user device, thereby providing a visual indication to a user with respect to repositioning or reorienting the user device during sweep of the user device. The process 1600 may then return to step 1656 to receive movement data from one or more sensors of the user device during sweep of the user device.

If, however, it is determined that the user device orientation is within an acceptable range at the additional location, then the process 1600 may then continue by capturing images during sweep of the user device, as at 1662. For example, during sweep of the user device in a direction of sweep at the additional image capture location, imaging data may be captured by an imaging sensor of the user device, which imaging data may be processed by a photogrammetry processor and/or used to generate a three-dimensional model of the room, as described herein.

The process 1600 may then proceed to present an indication that images were captured during the sweep, as at 1664. For example, during sweep of the user device, an indication comprising the progress bar or block may be generated or updated to present one or more thumbnails or other visual indications related to the progress of image capture during the sweep of the user device. In addition, an indication comprising an arrow pointing and moving in the direction of sweep may also be generated or updated to present progress of image capture during the sweep of the user device.

The process 1600 may then continue to determine whether the image capture process at the additional location is complete, as at 1666. For example, upon successful sweep of the user device from the sweep starting point to the sweep ending point in the direction of sweep, and upon successful capture of imaging data during the sweep, it may be determined that the image capture process at the additional image capture location is complete. In addition, responsive to sweeping the user device in the direction of sweep such that the sweep ending point at the additional image capture location is presented within a field of view of the imaging sensor, it may be determined that the image capture process at the additional image capture location is complete.

If it is determined that the image capture process at the additional location is not complete, then the process 1600 may return to step 1656 to receive movement data from one or more sensors of the user device during sweep of the user device, and continue to capture imaging data during sweep of the user device at the additional image capture location.

If, however, it is determined that the image capture process at the additional location is complete, then the process 1600 may proceed with determining whether any additional locations of the panorama path remain for image capture, as at 1634.

If one or more additional locations of the panorama path remain for image capture, then the process 1600 may continue with presenting an indication that the image capture process at the additional location is complete, as at 1636. For example, the indication may comprise text and visual cues or indications related to completion of image capture during sweep of the user device at the additional image capture location. Moreover, the indication may comprise a confirmation user interface element that may be selected by a user to confirm completion of the image capture process during sweep at the additional image capture location, and to proceed to the image capture process at one or more additional locations of the panorama path. Then, the process 1600 may proceed to step 1638 and following steps, as described above.

If, however, no additional locations of the panorama path remain for image capture, then the process 1600 may proceed to present an indication that the image capture process at all locations is complete, as at 1668. For example, the indication may comprise text and visual cues or indications related to completion of image capture process at all locations of the panorama path. Moreover, the indication may comprise a confirmation user interface element that may be selected by a user to confirm completion of the image capture process at all image capture locations of the panorama path, and/or to proceed with generation of a three-dimensional model of the room.

The process 1600 may then proceed to receive user input to confirm completion of the image capture process using the panorama path, as at 1670. For example, user input may be received via the confirmation user interface element, e.g., via a touchscreen, stylus, or other user input, to confirm completion of the image capture process at all image capture locations of the panorama path, and/or to proceed with generation of a three-dimensional model of the room. As described herein, the three-dimensional model of the room or space may be generated based at least in part on imaging data captured using the panorama path, as well as position and orientation data of the user device during the image capture process using the panorama path, e.g., using various photogrammetry algorithms or techniques, as well as other processes, algorithms, or techniques described at least with respect to FIGS. 1 and 2 herein. Then, the process 1600 may end, as at 1672.

FIG. 17 is a block diagram illustrating various components of a user device 1702 and server computing device 1732 configured for three-dimensional room model generation using photogrammetry, in accordance with disclosed implementations. In various examples, the block diagram may be illustrative of one or more aspects of the virtual reality, mixed reality, and/or augmented reality systems that may be used to implement the various systems and processes discussed above.

As described above at least with respect to FIG. 1, a user device 1702, such as a personal computing device, mobile computing device, smartphone, tablet computing device, laptop computing device, wearable computing device, headset or head-mounted computing device, eyeglass or eyewear computing device, or other user computing device, may include a processor 1704, a power supply 1705 such as a battery or rechargeable battery, and a memory 1706 having various executable instructions and/or various applications, such as an AR application 1708 and various data processing applications 1710 that may comprise various algorithms or techniques, such as photogrammetry, machine learning, geometric computer vision, image processing, geometric calculation, position and orientation tracking, edge detection, surface detection, feature detection, and/or other algorithms and techniques.

In addition, the user device 1702 may include one or more output devices such as a display 1712, monitor, stereoscopic display, head-mounted or eyeglass-mounted display, screen, speakers 1714, or other outputs, one or more input devices 1716 such as buttons, a touchscreen, microphones 1718, or other inputs, one or more imaging sensors 1720 configured to capture images within respective fields of view of the imaging sensors, and/or one or more position or orientation sensors 1722 such as inertial measurement units, accelerometers, gyroscopes, magnetometers, depth sensors, or other position or orientation sensors configured to receive data associated with position and orientation of the user device 1702.

As described herein, the user device 1702, and various components thereof, may be used in the systems and processes described above, such as room or space measurement processes, image capture processes using one or more paths, and/or three-dimensional model generation processes, upon receiving user consent. In addition, although FIG. 17 shows various components included as part of the user device 1702, in other example embodiments, one or more of the components may be external or separate from the user device 1702 and communicatively and/or operatively coupled or connected to the user device 1702. For example, one or more of the display 1712, speakers 1714, input devices 1716, microphone 1718, imaging sensor 1720, and/or position and orientation sensors 1722 may be external or separate from the user device 1702 and communicatively and/or operatively coupled or connected to the user device 1702, e.g., as peripheral devices connected to the user device.

Further, as described above at least with respect to FIG. 1, a server computing device 1732, such as a personal computing device, mobile computing device, smartphone, tablet computing device, laptop computing device, wearable computing device, headset or head-mounted computing device, eyeglass or eyewear computing device, desktop computing device, server computing device, remote or cloud computing device, or other computing device(s) or computing system(s), may include a processor 1734, a power supply 1735 such as a battery, rechargeable battery, wired power connection, or other power source, and a memory 1736 having various executable instructions and/or various applications, such as an AR application 1738 and various data processing applications 1740 that may comprise various algorithms or techniques, such as photogrammetry, machine learning, geometric computer vision, image processing, geometric calculation, position and orientation tracking, edge detection, surface detection, feature detection, and/or other algorithms and techniques.

In addition, the server computing device 1732 may include one or more output devices such as a display 1742, monitor, stereoscopic display, head-mounted or eyeglass-mounted display, screen, speakers 1744, or other outputs, and/or one or more input devices 1746 such as buttons, a touchscreen, microphones 1748, or other inputs.

As described herein, the server computing device 1732, and various components thereof, may be used in the systems and processes described above, such as room or space measurement processes, image capture processes using one or more paths, and/or three-dimensional model generation processes, upon receiving user consent. In addition, although FIG. 17 shows various components included as part of the server computing device 1732, in other example embodiments, one or more of the components may be external or separate from the server computing device 1732 and communicatively and/or operatively coupled or connected to the server computing device 1732. For example, one or more of the display 1742, speakers 1744, input devices 1746, and/or microphone 1748 may be external or separate from the server computing device 1732 and communicatively and/or operatively coupled or connected to the server computing device 1732, e.g., as peripheral devices connected to the server computing device.

Moreover, the user device 1702 and the server computing device 1732 may be communicatively coupled via a network 1750. The network 1750 may be any wired or wireless general data networks, such as a Wi-Fi network, a local area network (LAN), or a wide area network (WAN). In addition, the network 1750 may include other types of networks, including telecommunications networks, cellular communication networks, satellite networks, the Internet, and the like. Further, one or more e-commerce computing systems 1760 and/or one or more data repositories 1762, such as product catalogs or other data storage related to items or objects of interest, may also be communicatively coupled via the network 1750. The one or more e-commerce computing systems 1760 and/or one or more data repositories 1762 may include one or more processors, one or more memories, and data associated with users, rooms, spaces, items, objects, environments, inputs, guide elements, user interface elements, or any other aspects described herein. The items or objects may represent any products or services that may be rendered for display and/or selection by a user of a user device. For example, the items or objects may be available for rent, download, lease, or purchase.

The processors may process, transmit, receive, store, and/or retrieve data, e.g., in communication with the memories and/or via the network, in which the data may be associated with users, rooms, spaces, items, objects, environments, inputs, guide elements, user interface elements, or any other aspects described herein.

The displays or other visual output components may render for presentation to a user of the user device the rooms, spaces, items, objects, environments, inputs, guide elements, user interface elements, or any other aspects described herein. For example, the displays may be two-dimensional screens that are configured to render a three-dimensional, augmented reality environment to a user, or stereoscopic displays that are configured to render a three-dimensional, virtual reality environment to a user. In addition, the speakers or other audio output components may emit to a user of the user device any audio output associated with the rooms, spaces, items, objects, environments, inputs, guide elements, user interface elements, or any other aspects described herein. Further, the user device may also include haptic output components that may emit haptic signals or feedback associated with the rooms, spaces, items, objects, environments, inputs, guide elements, user interface elements, or any other aspects described herein.

The microphones or other audio input components may receive inputs, e.g., voice inputs, from a user of the user device. For example, a user may provide a search query via a voice input that is received by the microphones and processed to provide visual and/or audio output, e.g., via the displays and speakers, associated with the search query.

The imaging sensors of the user device may capture imaging data during various portions of the example systems and processes described above, upon receiving user consent. In addition, the imaging sensors may have a field of view that is substantially aligned with a field of view of a user of the user device. In some embodiments, the field of view of the imaging sensors may be smaller than a field of view of a user of the user device. Further, the various imaging sensors described herein may capture imaging data, such as still images, wide-angle images, video imagery, or other types of imaging data, in any of various formats, such as GIF, JPEG, TIFF, PNG, MOV, MPG, MP4, or various other imaging or video file formats.

The position and orientation sensors of the user device may include one or more inertial measurement units, accelerometers, gyroscopes, magnetometers, or other sensors. For example, upon receiving user consent, the position and orientation sensors may provide data associated with a position, orientation, movement, rotation, speed, or other action or motion of the user utilizing the user device. In some implementations, the user device may be a virtual reality headset that may sense, using one or more of the position and orientation sensors, various movements of a head of a user, e.g., looking up, down, left, right, or combinations thereof. Further, the position and orientation sensors may also include eye gaze tracking sensors that may identify a direction of eye gaze or focus of the user, and the sensed direction of eye gaze or focus may be used as additional inputs for the systems and processes described herein. For example, a sensed direction of eye gaze toward a presented user interface or input element for a defined amount of time, e.g., 2-5 seconds or longer, may be detected by the eye gaze tracking sensors and recognized as an input such as a selection of the presented user interface or input element. As another example, a sensed blink of an eye by a user for a defined amount of time, together with a sensed direction of eye gaze, may also be detected by the eye gaze tracking sensors and recognized as an input such as a selection of a presented user interface or input element.

The input devices may include buttons, triggers, switches, toggles, trackballs, trackpads, touchpads, touch-sensitive surfaces, or any other elements configured to receive inputs from a user. The inputs received via the input devices may be control or selection inputs specific to one or more aspects or elements rendered by the displays, e.g., selection, placement, removal, movement, manipulation, or other interaction with a particular item, object, input element, guide element, user interface element, or other various aspects described herein.

In various implementations, the various processors described herein with respect to various devices, components, and services may be a uniprocessor system including one processor, or a multiprocessor system including several processors (e.g., two, four, eight, or another suitable number). The processor(s) may be any suitable processor capable of executing instructions. For example, in various implementations, the processor(s) may be general-purpose or embedded processors implementing any of a variety of instruction set architectures (ISAs), such as the x86, PowerPC, SPARC, or MIPS ISAs, or any other suitable ISA. In multiprocessor systems, each processor(s) may commonly, but not necessarily, implement the same ISA.

The various memories, or non-transitory computer readable storage media, described herein with respect to various devices, components, and services may be configured to store executable instructions, input data, sensor data, imaging data, user data, room, space, or environment data, item images, item details, other item data, guide element data, user interface elements, and/or other data items accessible by the processor(s). In various implementations, the memories may be implemented using any suitable memory technology, such as static random access memory (SRAM), synchronous dynamic RAM (SDRAM), nonvolatile/Flash-type memory, or any other type of memory. In various implementations, program instructions and data implementing desired functions, such as those described above, may be stored within any of the memories of various devices, components, and services. In other implementations, program instructions and data may be received, sent or stored upon different types of computer-accessible media, such as non-transitory media, or on similar media separate from the memories or non-transitory computer readable storage medium.

Generally speaking, a non-transitory, computer readable storage medium may include storage media or memory media such as magnetic or optical media, e.g., disk or CD/DVD-ROM, coupled to the components and services. Program instructions and data stored via a non-transitory computer readable medium may be transmitted by transmission media or signals, such as electrical, electromagnetic, or digital signals, which may be conveyed via a communication medium such as a network and/or a wireless link.

In various implementations, one or more input/output (I/O) interfaces or network interfaces may be configured to coordinate I/O or network traffic between the processor(s), the memories, any of the devices, components, or services, and any other devices, components, or services. In some implementations, the I/O or network interfaces may perform any necessary protocol, timing or other data transformations to convert data signals from one component (e.g., memories) into a format suitable for use by another component (e.g., processor(s)). In some implementations, the I/O or network interfaces may include support for devices, components, or services attached through various types of peripheral buses, such as a variant of the Peripheral Component Interconnect (PCI) bus standard or the Universal Serial Bus (USB) standard, for example. In some implementations, the function of the I/O or network interfaces may be split into two or more separate components, such as a north bridge and a south bridge, for example. Also, in some implementations, some or all of the functionality of the I/O or network interfaces, such as interfaces to the memories, may be incorporated directly into the processor(s).

In addition, the network interfaces may enable wired or wireless communication between various components and services. In various implementations, the network interfaces may support communication via wired or wireless general data networks, such as a Wi-Fi network, LAN, or WAN. Further, the network interfaces may support communication via other types of networks, including telecommunications networks, cellular communication networks, satellite networks, the Internet, and the like.

The memories of various devices, components, and services may include program instructions which may be configured to implement the example processes and/or sub-processes described above. The data storage may include various data stores for maintaining data items such as input data including voice inputs, text inputs, or other user inputs, sensor data from sensors associated with the user device, imaging data from imaging sensors associated with the user device, user data including user preferences, user history, user lists, or other user data, item data including images, details, or other item data, guide elements, user interface elements, three-dimensional models, and/or other data items that may be provided for implementing the various systems and processes as described herein.

In various implementations, the parameter values and other data illustrated herein as being included in one or more data stores may be combined with other information not described or may be partitioned differently into more, fewer, or different data structures. In some implementations, data stores may be physically located in one memory or may be distributed among two or more memories.

Each process described herein may be implemented by the architectures described herein or by other architectures. The processes are illustrated as a collection of blocks in a logical flow. Some of the blocks represent operations that can be implemented in hardware, software, or a combination thereof. In the context of software, the blocks represent computer-executable instructions stored on one or more computer readable media that, when executed by one or more processors, perform the recited operations. Generally, computer-executable instructions include routines, programs, objects, components, data structures, and the like that perform particular functions or implement particular abstract data types.

The computer readable media may include non-transitory computer readable storage media, which may include hard drives, floppy diskettes, optical disks, CD-ROMs, DVDs, read-only memories (ROMs), random access memories (RAMs), EPROMs, EEPROMs, flash memory, magnetic or optical cards, solid-state memory devices, or other types of storage media suitable for storing electronic instructions. In addition, in some implementations, the computer readable media may include a transitory computer readable signal (in compressed or uncompressed form). Examples of computer readable signals, whether modulated using a carrier or not, include, but are not limited to, signals that a computer system hosting or running a computer program can be configured to access, including signals downloaded through the Internet or other networks. Finally, the order in which the operations are described is not intended to be construed as a limitation, and any number of the described operations can be combined in any order and/or in parallel to implement the process. Additionally, one or more of the operations may be considered optional and/or not utilized with other operations.

Those skilled in the art will appreciate that the devices, components, and services are merely illustrative and are not intended to limit the scope of the present disclosure. In particular, the devices, components, and services may include any combination of hardware or software that can perform the indicated functions, including computers, network devices, internet appliances, PDAs, wireless phones, pagers, etc. The devices, components, and services may also be connected to other devices, components, or services that are not illustrated, or instead may operate as a stand-alone system. In addition, the functionality provided by the illustrated devices, components, and services may, in some implementations, be combined in fewer devices, components, or services or distributed in additional devices, components, or services. Similarly, in some implementations, the functionality of some of the illustrated devices, components, or services may not be provided and/or other additional functionality may be available.

Those skilled in the art will also appreciate that, while various items are illustrated as being stored in memory or storage while being used, these items or portions of them may be transferred between memory and other storage devices for purposes of memory management and data integrity. Alternatively, in other implementations, some or all of the software components may execute in memory on another device and communicate with the illustrated devices, components, or services. Some or all of the components, services, or data structures may also be stored (e.g., as instructions or structured data) on a non-transitory, computer-accessible medium or a portable article to be read by an appropriate drive, various examples of which are described above. In some implementations, instructions stored on a computer-accessible medium separate from the devices, components, or services may be transmitted to the devices, components, or services via transmission media or signals, such as electrical, electromagnetic, or digital signals, conveyed via a communication medium, such as a network and/or a wireless link. Various implementations may further include receiving, sending or storing instructions and/or data implemented in accordance with the foregoing description upon a computer-accessible medium. Accordingly, the techniques described herein may be practiced with other virtual reality, augmented reality, and/or mixed reality system configurations.

Those skilled in the art will appreciate that, in some implementations, the functionality provided by the processes, systems, devices, components, and services discussed above may be provided in alternative ways, such as being split among more software modules or routines or consolidated into fewer modules or routines. Similarly, in some implementations, illustrated processes, systems, devices, components, and services may provide more or less functionality than is described, such as when other illustrated processes instead lack or include such functionality respectively, or when the amount of functionality that is provided is altered. In addition, while various operations may be illustrated as being performed in a particular manner (e.g., in serial or in parallel) and/or in a particular order, those skilled in the art will appreciate that, in other implementations, the operations may be performed in other orders and in other manners. Those skilled in the art will also appreciate that the data structures discussed above may be structured in different manners, such as by having a single data structure split into multiple data structures or by having multiple data structures consolidated into a single data structure. Similarly, in some implementations, illustrated data structures may store more or less information than is described, such as when other illustrated data structures instead lack or include such information respectively, or when the amount or types of information that is stored is altered. The various processes, systems, devices, components, and services as illustrated in the figures and described herein represent example implementations. The processes, systems, devices, components, and services may be implemented in software, hardware, or a combination thereof in other implementations. Similarly, the order of any process may be changed and various elements may be added, reordered, combined, omitted, modified, etc., in other implementations.

Embodiments of the disclosure can be described in view of the following clauses:

Clause 1: A computer-implemented method, comprising:

presenting, via a display of a user device, an indication to move the user device towards a wall of a room;

receiving, from a sensor of the user device, movement data of the user device towards the wall of the room;

receiving, from an imaging sensor of the user device, imaging data including at least a portion of the room within a field of view of the imaging sensor;

presenting, via the display of the user device, the imaging data including at least the portion of the room within the field of view of the imaging sensor;

presenting, via the display of the user device and overlaying the imaging data including at least the portion of the room, a ring path substantially centered within the room, a target positioned along the ring path, and a reticle substantially centered within the display of the user device;

presenting, via the display of the user device, an indication to place the target within the reticle;

receiving, from the sensor of the user device, movement data of the target being placed within the reticle;

presenting, via the display of the user device and responsive to placing the target within the reticle, an indication to traverse around an outer periphery of the ring path such that the target remains within the reticle;

capturing, via the imaging sensor of the user device, a plurality of images of the room during traversal around the outer periphery of the ring path;

receiving, from the sensor of the user device, position and orientation data of the user device associated with respective ones of the plurality of images captured during traversal around the outer periphery of the ring path; and generating a three-dimensional model of the room based on the plurality of images and the position and orientation data of the user device associated with respective ones of the plurality of images.

Clause 2: The computer-implemented method of clause 1, wherein presenting the target positioned along the ring path further comprises:

presenting, via the display, the target at a position along the ring path closest to the user device.

Clause 3: The computer-implemented method of clauses 1 to 2, further comprising:

receiving, from the sensor of the user device, movement data of the target remaining within the reticle.

Clause 4: The computer-implemented method of clauses 1 to 3, further comprising:

presenting, via the display of the user device, an indication that the plurality of images were captured during the traversal around the outer periphery of the ring path.

Clause 5: A method, comprising:

receiving, from a first sensor associated with a user device, imaging data including at least a portion of a space within a field of view of the first sensor;

presenting, via a display associated with the user device and overlaying at least a portion of the field of view, a path within the space and a target positioned along the path;

presenting, via the display associated with the user device and responsive to placing the target within the field of view, an indication to traverse the user device along the path such that the target remains within the field of view;

capturing, via the first sensor associated with the user device, a plurality of images of the space during traversal along the path;

receiving, from a second sensor associated with the user device, data associated with position and orientation of the user device associated with respective ones of the plurality of images captured during traversal along the path; and causing a three-dimensional model of the space to be generated based on the plurality of images and the data associated with position and orientation of the user device associated with respective ones of the plurality of images.

Clause 6: The method of clause 5, wherein presenting the path further comprises:

presenting, via the display, the path as a convex hull having rounded corners and substantially centered within the space.

Clause 7: The method of clauses 5 to 6, further comprising:

presenting, via the display, the imaging data including at least the portion of the space within the field of view of the first sensor;

wherein presenting the path and the target further comprises presenting the path and the target, via the display, as overlaying the imaging data.

Clause 8: The method of clauses 5 to 7, wherein presenting the target positioned along the path further comprises:

presenting, via the display, the target at a position along the path closest to the user device.

Clause 9: The method of clauses 5 to 8, further comprising:

presenting, via the display associated with the user device, a reticle substantially centered within the display associated with the user device;

wherein presenting the indication to traverse the user device along the path such that the target remains within the field of view further comprises:

presenting, via the display, at least one of an arrow or a textual cue to instruct placement of the target within the reticle.

Clause 10: The method of clauses 5 to 9, wherein presenting the indication to traverse the user device along the path such that the target remains within the field of view further comprises:

presenting, via the display, at least one of the target or the reticle with a first visual characteristic to instruct placement of the target within the reticle.

Clause 11: The method of clauses 5 to 10, further comprising:

responsive to receiving, from the second sensor associated with the user device, movement data of the target being placed within the reticle, presenting, via the display, the at least one of the target or the reticle with a second visual characteristic.

Clause 12: The method of clauses 5 to 11, further comprising:

receiving, from the second sensor, movement data of the target moving at least one of outside the reticle, within a first threshold distance of the reticle, or beyond a second threshold distance from the reticle; and responsive to receiving the movement data of the target moving at least one of outside the reticle, within the first threshold distance of the reticle, or beyond the second threshold distance from the reticle, presenting, via the display, the at least one of the target or the reticle with the first visual characteristic.

Clause 13: The method of clauses 5 to 12, wherein presenting the at least one of the target or the reticle with the first visual characteristic responsive to receiving the movement data of the target moving outside the reticle further comprises:

presenting, via the display, at least one of an arrow or a textual cue to indicate the target.

Clause 14: The method of clauses 5 to 13, wherein at least a portion of the path is presented, via the display, at a vertical position within the space that is determined based at least in part on the data associated with position and orientation of the user device during traversal along the path.

Clause 15: The method of clauses 5 to 14, wherein presenting the path further comprises:

presenting, via the display, the path with a first visual characteristic prior to traversal along the path; and responsive to capture of images during traversal along a portion of the path, presenting, via the display, the portion of the path with a second visual characteristic after traversal along the portion of the path.

Clause 16: The method of clauses 5 to 15, further comprising:

during traversal along the path, presenting, via the display, a skip user interface element configured to indicate completion of the traversal along the path.

Clause 17: A system, comprising:

a user device, comprising:
  a display;
  a first sensor;
  a second sensor; and
  a processor configured to at least:
  receive, from the first sensor, imaging data including at least a portion of a space within a field of view of the first sensor;
  present, via the display and overlaying the field of view, a path within the space and a target positioned along the path;
  present, via the display and responsive to placing the target within the field of view, an indication to traverse the user device along the path such that the target remains within the field of view;
  capture, via the first sensor, a plurality of images of the space during traversal along the path;
  receive, from the second sensor, data associated with position and orientation of the user device associated with respective ones of the plurality of images captured during traversal along the path; and
  cause a three-dimensional model of the space to be generated based on the plurality of images and the data associated with position and orientation of the user device associated with respective ones of the plurality of images.

Clause 18: The system of clause 17, wherein the field of view of the first sensor is configured to extend substantially across the space during traversal along the path.

Clause 19: The system of clauses 17 to 18, wherein the second sensor of the user device comprises an inertial measurement unit comprising at least one of an accelerometer, a gyroscope, or a magnetometer; and wherein the display comprises at least one of a touchscreen of a mobile computing device, a display element of a head-mounted or eyeglass-mounted computing device, or a stereoscopic display.

Clause 20: The system of clauses 17 to 19, wherein the processor is further configured to at least:

present, via the display, the imaging data including at least the portion of the space within the field of view of the first sensor; and present, via the display and overlaying the imaging data, a reticle substantially centered within the display; and wherein presenting the path and the target further comprises presenting the path and the target, via the display, as overlaying the imaging data.

Clause 21: A computer-implemented method, comprising:

receiving, from a user device, measurement data associated with a room;

receiving, from the user device, movement data of the user device within the room;

generating for presentation, via a display of the user device, a ring path substantially centered within the room based on the measurement data and the movement data;

generating for presentation, via the display, a target along the ring path;

generating for presentation, via the display, a reticle substantially centered within the display of the user device;

instructing traversal of the user device around the ring path such that the target remains presented, via the display, within the reticle;

during the traversal of the user device, capturing, via an imaging sensor of the user device, a plurality of images of the room;

receiving, from a sensor of the user device, position and orientation data of the user device associated with respective ones of the plurality of images captured during the traversal around the ring path;

processing the plurality of images of the room using photogrammetry; and generating a three-dimensional model of the room based on the plurality of images and the position and orientation data of the user device associated with respective ones of the plurality of images.

Clause 22: The computer-implemented method of clause 21, wherein generating the ring path further comprises:

scaling down dimensions of the room to generate the ring path within the room.

Clause 23: The computer-implemented method of clauses 21 to 22, wherein instructing traversal of the user device around the ring path further comprises:

instructing movement of the user device such that a field of view of the user device extends substantially across the room.

Clause 24: The computer-implemented method of clauses 21 to 23, wherein capturing the plurality of images of the room further comprises:

capturing images along straight sections of the ring path at a first capture rate; and capturing images along curved sections of the ring path at a second capture rate;

wherein the second capture rate is higher than the first capture rate.

Clause 25: A method, comprising:

generating for presentation, via a display associated with a user device, a path within a space and a target along the path;

instructing traversal of the user device along the path within the space such that the target remains within a field of view of a first sensor associated with the user device;

during the traversal of the user device, capturing, via the first sensor associated with the user device, a plurality of images of the space;

receiving, from a second sensor associated with the user device, data associated with position and orientation of the user device associated with respective ones of the plurality of images captured during the traversal along the path; and causing a three-dimensional model of the space to be generated based on the plurality of images and the data associated with position and orientation of the user device associated with respective ones of the plurality of images.

Clause 26: The method of clause 25, wherein instructing traversal of the user device along the path further comprises:

instructing movement of the user device such that the field of view of the user device extends substantially across the space.

Clause 27: The method of clauses 25 to 26, wherein the path is presented, via the display, substantially centered within the space and overlaying at least a portion of imaging data captured within the field of view of the first sensor and displayed via the display.

Clause 28: The method of clauses 25 to 27, wherein generating the path further comprises:

scaling down dimensions of the space to generate the path within the space.

Clause 29: The method of clauses 25 to 28, further comprising:

receiving, via the second sensor associated with the user device, movement data of the user device within the space;

wherein the path is generated based at least in part on the movement data.

Clause 30: The method of clauses 25 to 29, further comprising:

generating for presentation, via the display, a reticle substantially centered within the display;

wherein instructing traversal of the user device along the path further comprises instructing that the target remain presented, via the display, within the reticle during the traversal of the user device.

Clause 31: The method of clauses 25 to 30, wherein capturing the plurality of images of the space further comprises:

capturing images along straight sections of the path at a first capture rate; and capturing images along curved sections of the path at a second capture rate;

wherein the second capture rate is higher than the first capture rate.

Clause 32: The method of clauses 25 to 31, wherein the traversal of the user device along the path comprises traversal of the user device along a plurality of sections of the path; and wherein the plurality of images are captured during the traversal of the user device along the plurality of sections of the path.

Clause 33: The method of clauses 25 to 32, wherein capturing the plurality of images of the space further comprises:

capturing the plurality of images such that individual ones of the plurality of images include at least approximately 30% overlap with at least one other image by modifying at least one of a frame rate of the first sensor or a rate of movement of the first sensor.

Clause 34: The method of clauses 25 to 33, wherein instructing traversal of the user device along the path further comprises:

instructing traversal of the user device along a plurality of paths including a first path and a second path.

Clause 35: The method of clauses 25 to 34, wherein capturing the plurality of images of the space further comprises:

capturing a first plurality of images during traversal of the user device along the first path; and capturing a second plurality of images during traversal of the user device along the second path.

Clause 36: A system, comprising:
a user device, comprising:
 a display;
 a first sensor;
 a second sensor; and
 a processor configured to at least:
  generate for presentation, via the display, a path within a space and a target along the path;
  instruct traversal of the user device along the path within the space such that the target remains within a field of view of the first sensor;
  during the traversal of the user device, capture, via the first sensor, a plurality of images of the space;
  receive, from the second sensor, data associated with position and orientation of the user device associated with respective ones of the plurality of images captured during the traversal along the path; and
  cause a three-dimensional model of the space to be generated based on the plurality of images and the data associated with position and orientation of the user device associated with respective ones of the plurality of images.

Clause 37: The system of clause 36, wherein the field of view of the first sensor is configured to extend substantially across the space during traversal of the user device.

Clause 38: The system of clauses 36 to 37, wherein the second sensor comprises an inertial measurement unit comprising at least one of an accelerometer, a gyroscope, or a magnetometer; and wherein the display comprises at least one of a touch-screen of a mobile computing device, a display element of a head-mounted or eyeglass-mounted computing device, or a stereoscopic display.

Clause 39: The system of clauses 36 to 38, wherein the processor is further configured to at least:

generate for presentation, via the display, a reticle substantially centered within the display.

Clause 40: The system of clauses 36 to 39, wherein instructing traversal of the user device along the path further comprises instructing that the target remain presented, via the display, within the reticle during the traversal of the user device.

Clause 41: A computer-implemented method, comprising:
receiving, from a user device, measurement data associated with a room;

receiving, from the user device, movement data of the user device within the room;

generating for presentation, via a display of the user device, a panorama path comprising a plurality of locations within the room based on the measurement data and the movement data;

instructing traversal of the user device in a defined order among the plurality of locations of the panorama path;

during traversal of the user device, capturing, via an imaging sensor of the user device, a first plurality of images of the room;

receiving, from a sensor of the user device, position and orientation data of the user device associated with respective ones of the first plurality of images captured during the traversal of the user device;

at individual locations of the plurality of locations, instructing sweep of the user device in a defined direction;

during sweep of the user device, capturing, via the imaging sensor of the user device, a second plurality of images of the room;

receiving, from the sensor of the user device, position and orientation data of the user device associated with respective ones of the second plurality of images captured during the sweep of the user device;

processing the first plurality of images and the second plurality of images of the room using photogrammetry; and generating a three-dimensional model of the room based on the first plurality of images, the second plurality of images, the position and orientation data of the user device associated with respective ones of the first plurality of images, and the position and orientation data of the user device associated with respective ones of the second plurality of images.

Clause 42: The computer-implemented method of clause 41, further comprising:
receiving dimensions associated with the room;
wherein the plurality of locations are generated based at least in part on the dimensions associated with the room.

Clause 43: The computer-implemented method of clauses 41 to 42, wherein the defined order for traversal of the user device among the plurality of locations is, from a top-down view of the room, a counterclockwise order; and
wherein the defined direction for sweep of the user device is, from a user viewpoint, a left-to-right direction.

Clause 44: The computer-implemented method of clauses 41 to 43, further comprising:
at individual locations of the plurality of locations, instructing a plurality of sweeps of the user device.

Clause 45: A method, comprising:
generating for presentation, via a display associated with a user device, a plurality of locations within a space;
instructing traversal of the user device among the plurality of locations;
during traversal of the user device among the plurality of locations, capturing, via a first sensor associated with the user device, a first plurality of images of the space;
receiving, from a second sensor associated with the user device, data associated with position and orientation of the user device associated with respective ones of the first plurality of images captured during the traversal of the user device among the plurality of locations;
at individual locations of the plurality of locations, capturing, via the first sensor associated with the user device, a second plurality of images of the space during sweep of the user device at individual locations; and
causing a three-dimensional model of the space to be generated based on the first plurality of images, the second plurality of images, and the data associated with position and orientation of the user device associated with respective ones of the first plurality of images.

Clause 46: The method of clause 45, wherein generating the plurality of locations within the space further comprises:
receiving dimensions associated with the space; and
generating the plurality of locations based at least in part on the dimensions associated with the space.

Clause 47: The method of clauses 45 to 46, wherein generating the plurality of locations within the space further comprises:
generating a defined order for traversal of the user device among the plurality of locations;
wherein the defined order is at least one of, from a top-down view of the space, a counterclockwise order or a clockwise order.

Clause 48: The method of clauses 45 to 47, wherein individual locations of the plurality of locations are associated with at least one of an edge, a corner, a side, or a vertical boundary of the space.

Clause 49: The method of clauses 45 to 48, further comprising:
at individual locations of the plurality of locations, instructing sweep of the user device to capture the second plurality of images.

Clause 50: The method of clauses 45 to 49, further comprising:
at individual locations of the plurality of locations, receiving, from the second sensor associated with the user device, data associated with position and orientation of the user device associated with respective ones of the second plurality of images captured during the sweep of the user device; and
wherein the three-dimensional model of the space is further generated based on the data associated with position and orientation of the user device associated with respective ones of the second plurality of images.

Clause 51: The method of clauses 45 to 50, wherein generating the plurality of locations within the space further comprises:
generating a defined direction for sweep of the user device at individual locations of the plurality of locations;
wherein the defined direction is at least one of, from a user viewpoint, a left-to-right direction or a right-to-left direction.

Clause 52: The method of clauses 45 to 51, wherein capturing the second plurality of images of the space during sweep of the user device further comprises:
capturing the second plurality of images between a first adjacent vertical boundary in a first direction and a second adjacent vertical boundary in a second, opposite direction.

Clause 53: The method of clauses 45 to 52, wherein capturing the second plurality of images of the space during sweep of the user device further comprises:
capturing the second plurality of images such that individual ones of the second plurality of images includes at least approximately 30% overlap with at least one other image by modifying at least one of a frame rate of the first sensor or a rate of movement of the first sensor.

Clause 54: The method of clauses 45 to 53, wherein capturing the second plurality of images of the space during sweep of the user device further comprises:
receiving, from the second sensor associated with the user device, movement data associated with the sweep of the user device; and
capturing individual ones of the second plurality of images at angular orientations that are at least approximately five degrees different from at least one other image of the second plurality of images.

Clause 55: The method of clauses 45 to 54, wherein instructing sweep of the user device further comprises:
at individual locations of the plurality of locations, instructing a plurality of sweeps of the user device.

Clause 56: The method of clauses 45 to 55, further comprising:
determining a number of the plurality of sweeps of the user device at individual locations based at least in part on dimensions associated with the space.

Clause 57: The method of clauses 45 to 56, wherein capturing the second plurality of images of the space during sweep of the user device further comprises:
capturing, via the first sensor associated with the user device, respective second pluralities of images of the space associated with respective ones of the plurality of sweeps of the user device.

Clause 58: A method, comprising:
generating for presentation, via a display associated with a user device, a plurality of locations within a space;
instructing traversal of the user device among the plurality of locations;
at individual locations of the plurality of locations, instructing sweep of the user device;

during sweep of the user device, capturing, via a first sensor associated with the user device, a first plurality of images of the space during sweep of the user device at individual locations; and receiving, from a second sensor associated with the user device, data associated with position and orientation of the user device associated with respective ones of the first plurality of images captured during sweep of the user device at individual locations;

wherein the first plurality of images of the space are processed using photogrammetry; and wherein a three-dimensional model of the space is generated based on the first plurality of images, and the data associated with position and orientation of the user device associated with respective ones of the first plurality of images.

Clause 59: The method of clause 58, further comprising:

during traversal of the user device among the plurality of locations, capturing, via the first sensor associated with the user device, a second plurality of images of the space; and receiving, from the second sensor associated with the user device, data associated with position and orientation of the user device associated with respective ones of the second plurality of images captured during the traversal of the user device among the plurality of locations; and wherein the three-dimensional model of the space is further generated based on the second plurality of images, and the data associated with position and orientation of the user device associated with respective ones of the second plurality of images.

Clause 60: The method of clauses 58 to 59, wherein capturing the first plurality of images of the space during sweep of the user device further comprises at least one of:

capturing the first plurality of images such that individual ones of the first plurality of images includes at least approximately 30% overlap with at least one other image by modifying at least one of a frame rate of the first sensor or a rate of movement of the first sensor, or capturing individual ones of the first plurality of images at angular orientations that are at least approximately five degrees different from at least one other image of the first plurality of images.

Clause 61: A computer-implemented method, comprising:

receiving, from an imaging sensor of a user device, imaging data including at least a portion of a room within a field of view of the imaging sensor;

presenting, via a display of the user device, the imaging data including at least the portion of the room within the field of view of the imaging sensor;

presenting, via the display of the user device and overlaying the imaging data including at least the portion of the room, an indication to move the user device towards individual locations of a plurality of locations of a panorama path within the room in a defined order, wherein the indication to move comprises at least one of an arrow or a textual cue associated with individual locations;

receiving, from a sensor of the user device, movement data of the user device towards individual locations of the room in the defined order;

capturing, via the imaging sensor and during movement of the user device towards individual locations in the defined order, a first plurality of images of the room during the movement of the user device towards individual locations;

receiving, from the sensor of the user device, position and orientation data of the user device associated with respective ones of the first plurality of images captured during the movement of the user device towards individual locations;

at individual locations of the plurality of locations, presenting, via the display of the user device and overlaying the imaging data including at least the portion of the room, an indication to orient the user device to place a starting point for image capture within the field of view of the imaging sensor of the user device, wherein the indication to orient comprises at least one of an arrow or a textual cue associated with the starting point;

at individual locations of the plurality of locations, receiving, from the sensor of the user device, movement data of the user device to orient the user device to place the starting point for image capture within the field of view of the imaging sensor of the user device;

responsive to placing the starting point for image capture within the field of view of the imaging sensor, at individual locations of the plurality of locations, presenting, via the display of the user device and overlaying the imaging data including at least the portion of the room, an indication to sweep the user device in a defined direction, wherein the indication to sweep comprises at least one of an arrow, a textual cue, or a progress bar;

at individual locations of the plurality of locations, capturing, via the imaging sensor of the user device, a second plurality of images of the room during sweep of the user device in the defined direction;

receiving, from the sensor of the user device, position and orientation data of the user device associated with respective ones of the second plurality of images captured during sweep of the user device; and generating a three-dimensional model of the room based on the first plurality of images, the second plurality of images, the position and orientation data of the user device associated with respective ones of the first plurality of images, and the position and orientation data of the user device associated with respective ones of the second plurality of images.

Clause 62: The computer-implemented method of clause 61, further comprising:

at individual locations of the plurality of locations, receiving, from the sensor of the user device, movement data of the user device during sweep of the user device in the defined direction; and responsive to the movement data indicating a vertical movement beyond a first threshold, presenting, via the display of the user device, an indication to correct the vertical movement during sweep of the user device.

Clause 63: The computer-implemented method of clauses 61 to 62, further comprising:

responsive to the movement data indicating the vertical movement beyond the first threshold, stopping capture, via the imaging sensor of the user device, of the second plurality of images of the room during sweep of the user device in the defined direction.

Clause 64: The computer-implemented method of clauses 61 to 63, further comprising:

at individual locations of the plurality of locations, presenting, via the display of the user device, an indication that the second plurality of images were captured during sweep of the user device.

Clause 65: A method, comprising:

receiving, from a first sensor associated with a user device, imaging data including at least a portion of a space within a field of view of the first sensor;

presenting, via a display associated with the user device and overlaying at least a portion of the field of view, an indication to move the user device towards a first location of a plurality of locations within the space, wherein the indication to move comprises at least one of an arrow or a textual cue associated with the first location;

receiving, from a second sensor associated with the user device, movement data of the user device towards the first location;

capturing, via the first sensor and during movement of the user device towards the first location, a first plurality of images of the space during the movement of the user device towards the first location;

receiving, from the second sensor associated with the user device, data associated with position and orientation of the user device associated with respective ones of the first plurality of images captured during the movement of the user device towards the first location;

capturing, via the first sensor and responsive to the user device being positioned at the first location, a second plurality of images of the space during sweep of the user device at the first location; and causing a three-dimensional model of the space to be generated based on the first plurality of images, the second plurality of images, and the data associated with position and orientation of the user device associated with respective ones of the first plurality of images.

Clause 66: The method of clause 65, further comprising:

responsive to the user device being positioned at the first location, presenting, via the display associated with the user device and overlaying the field of view, an indication to orient the user device to place a starting point for image capture at the first location within the field of view of the first sensor associated with the user device;

responsive to placing the starting point for image capture at the first location within the field of view of the first sensor, presenting, via the display associated with the user device and overlaying the field of view, an indication to sweep the user device to capture the second plurality of images at the first location; and receiving, from the second sensor associated with the user device, data associated with position and orientation of the user device associated with respective ones of the second plurality of images captured during sweep of the user device; and wherein the three-dimensional model of the space is further generated based on the data associated with position and orientation of the user device associated with respective ones of the second plurality of images.

Clause 67: The method of clauses 65 to 66, further comprising:

presenting, via the display associated with the user device, the imaging data including at least the portion of the space within the field of view of the first sensor; and wherein presenting the indication to move the user device towards the first location further comprises presenting, via the display, the indication to move as overlaying the imaging data.

Clause 68: The method of clauses 65 to 67, wherein presenting the indication to move the user device towards the first location of the plurality of locations within the space further comprises:

presenting, via the display, the first location with a first semi-transparent color.

Clause 69: The method of clauses 65 to 68, further comprising:

receiving, from the second sensor associated with the user device, the movement data of the user device towards the first location indicating that the user device is within a threshold distance of the first location; and responsive to receiving the movement data of the user device indicating that the user device is within the threshold distance of the first location, presenting, via the display, the first location with a second semi-transparent color.

Clause 70: The method of clauses 65 to 69, wherein presenting the indication to orient the user device to place the starting point for image capture at the first location within the field of view of the first sensor associated with the user device further comprises:

presenting, via the display, at least one of an arrow or a textual cue to indicate the starting point for image capture at the first location.

Clause 71. The method of clauses 65 to 70, wherein presenting the indication to sweep the user device further comprises:

presenting, via the display, at least one of an arrow, a textual cue, or a progress bar to indicate a direction of sweep for image capture at the first location.

Clause 72: The method of clauses 65 to 71, further comprising:

presenting, via the display associated with the user device, an indication of progress for image capture at the first location, the indication of progress comprising at least one captured image presented within the progress bar.

Clause 73: The method of clauses 65 to 72, further comprising:

receiving, from the second sensor associated with the user device, movement data of the user device during sweep of the user device; and responsive to the movement data indicating a vertical movement beyond a first threshold, presenting, via the display associated with the user device, an indication to correct the vertical movement during sweep of the user device.

Clause 74: The method of clauses 65 to 73, further comprising:

responsive to the movement data indicating the vertical movement beyond the first threshold, stopping capture, via the first sensor associated with the user device, of the second plurality of images of the space during sweep of the user device.

Clause 75: The method of clauses 65 to 74, further comprising:

presenting, via the display associated with the user device, an indication that the second plurality of images were captured during sweep of the user device at the first location.

Clause 76: The method of clauses 65 to 75, further comprising:

presenting, via the display associated with the user device, respective indications to move the user device towards additional locations of the plurality of locations within the space;

wherein respective third pluralities of images are captured, via the first sensor associated with the user device, during respective movements of the user device towards additional locations of the plurality of locations; and wherein respective fourth pluralities of images are captured, via the first sensor associated with the user device, during respective sweeps of the user device associated with additional locations of the plurality of locations; and wherein the three-dimensional model of the space is further generated based on the respective third pluralities of images captured during respective movements of the user device towards additional locations of the plurality of locations, and the respective fourth pluralities of images captured during respective sweeps of the user device at additional locations of the plurality of locations.

Clause 77: A system, comprising:
a user device, comprising:
- a display;
- a first sensor;
- a second sensor; and
- a processor configured to at least:
  - receive, from the first sensor, imaging data including at least a portion of a space within a field of view of the first sensor;
  - present, via the display and overlaying the field of view, an indication to move the user device towards a first location of a plurality of locations within the space, wherein the indication to move comprises at least one of an arrow or a textual cue associated with the first location;
  - receive, from the second sensor, movement data of the user device towards the first location;
  - capture, via the first sensor and during movement of the user device towards the first location, a first plurality of images of the space during the movement of the user device towards the first location;
  - receive, from the second sensor, data associated with position and orientation of the user device associated with respective ones of the first plurality of images captured during the movement of the user device towards the first location;
  - capture, via the first sensor and responsive to the user device being positioned at the first location, a second plurality of images of the space during sweep of the user device at the first location; and
  - cause a three-dimensional model of the space to be generated based on the first plurality of images, the second plurality of images, and the data associated with position and orientation of the user device associated with respective ones of the first plurality of images.

Clause 78: The system of clause 77, wherein the second sensor of the user device further comprises an inertial measurement unit comprising at least one of an accelerometer, a gyroscope, or a magnetometer; and
wherein the display comprises at least one of a touchscreen of a mobile computing device, a display element of a head-mounted or eyeglass-mounted computing device, or a stereoscopic display.

Clause 79: The system of clauses 77 to 78, wherein the processor is further configured to at least:
responsive to the user device being positioned at the first location, present, via the display and overlaying the field of view, an indication to orient the user device to place a starting point for image capture at the first location within the field of view of the first sensor of the user device;
responsive to placing the starting point for image capture at the first location within the field of view of the first sensor, present, via the display and overlaying the field of view, an indication to sweep the user device to capture the second plurality of images at the first location; and
receive, from the second sensor, data associated with position and orientation of the user device associated with respective ones of the second plurality of images captured during sweep of the user device; and
wherein the three-dimensional model of the space is further generated based on the data associated with position and orientation of the user device associated with respective ones of the second plurality of images.

Clause 80: The system of clauses 77 to 79, wherein the processor is further configured to at least:
present, via the display, the imaging data including at least the portion of the space within the field of view of the first sensor; and
wherein presenting the indication to move the user device towards the first location further comprises presenting, via the display, the indication to move as overlaying the imaging data.

Clause 81: A computer-implemented method, comprising:
generating, using a user device within a room, a local coordinate frame;
receiving, from a sensor of the user device, movement data of the user device within the room;
receiving, from an imaging sensor of the user device, imaging data including at least a portion of a floor of the room within a field of view of the imaging sensor during movement of the user device;
determining, using the user device, a floor plane based on the local coordinate frame, the imaging data including at least the portion of the floor, and the movement data of the user device;
receiving, from the imaging sensor of the user device, imaging data including at least a first portion of the room within the field of view of the imaging sensor;
receiving, using the user device, a plurality of identifications of respective edges between a plurality of wall planes and the floor plane;
receiving, from the sensor of the user device, position and orientation data of the user device associated with respective ones of the plurality of identifications of respective edges between the plurality of wall planes and the floor plane;
determining, using the user device, the plurality of wall planes based on the local coordinate frame, floor plane, the plurality of identifications of respective edges between a plurality of wall planes and the floor plane, and the position and orientation data of the user device associated with respective ones of the plurality of identifications of respective edges between the plurality of wall planes and the floor plane;
receiving, from the imaging sensor of the user device, imaging data including at least a second portion of the room within the field of view of the imaging sensor;
receiving, using the user device, an identification of an edge between at least one wall plane and a ceiling plane;
receiving, from the sensor of the user device, position and orientation data of the user device associated with the identification of the edge between the at least one wall plane and the ceiling plane;
determining, using the user device, the ceiling plane based on the local coordinate frame, the floor plane, the at least one wall plane, the identification of the edge between the at least one wall plane and the ceiling plane, and the position and orientation data of the user device associated with the identification of the edge between the at least one wall plane and the ceiling plane;
receiving, from the sensor associated with the user device, additional movement data; and
generating a geometric shell of the room based on the local coordinate frame, the floor plane, the plurality of wall planes, the ceiling plane, and the additional movement data.

Clause 82: The computer-implemented method of clause 81, wherein generating the local coordinate frame further comprises:
designating a position associated with initiation of the user device as a home position.

Clause 83: The computer-implemented method of clauses 81 to 82, wherein determining the floor plane further comprises:

capturing, using the imaging sensor associated with the user device, a plurality of images including at least one feature associated with the floor plane;

determining, from the movement data of the user device, a position and an orientation of the user device associated with individual ones of the plurality of images; and determining the floor plane based at least in part on the plurality of images and the position and the orientation of the user device associated with individual ones of the plurality of images.

Clause 84: The computer-implemented method of clauses 81 to 83, wherein determining the plurality of wall planes further comprises:

receiving, via the user device, an identification of a first edge between a first wall plane and the floor plane;

determining, from the position and orientation data of the user device, a position and an orientation of the user device associated with the identification of the first edge between the first wall plane and the floor plane; and determining the first wall plane based at least in part on the floor plane and the position and the orientation of the user device associated with the identification of the first edge between the first wall plane and the floor plane.

Clause 85: A method, comprising:

receiving, from a first sensor associated with a user device, imaging data including at least a first portion of a space within a field of view of the first sensor;

receiving, using the user device, an identification of an edge between a first boundary and a second boundary within the imaging data including at least the first portion of the space;

receiving, from a second sensor associated with the user device, data associated with position and orientation of the user device associated with the identification of the edge between the first boundary and the second boundary;

determining, using the user device, the first boundary based on a local coordinate frame of the user device, the second boundary, the identification of the edge between the first boundary and the second boundary, and the data associated with position and orientation of the user device associated with the identification of the edge between the first boundary and the second boundary; and causing a geometric shell of the space to be generated based on the local coordinate frame, the second boundary, and the first boundary.

Clause 86: The method of clause 85, further comprising:

generating, using the user device, the local coordinate frame.

Clause 87: The method of clauses 85 to 86, wherein generating the local coordinate frame further comprises:

designating a position associated with initiation of the user device as a home position; and tracking movement of the user device relative to the home position.

Clause 88: The method of clauses 85 to 87, further comprising:

receiving, from the first sensor associated with the user device, imaging data including at least a portion of the second boundary of the space within the field of view of the first sensor;

receiving, from the second sensor associated with the user device, movement data of the user device within the space;

capturing, using the first sensor associated with the user device, a first image including at least one feature associated with the second boundary from the imaging data including at least the portion of the second boundary of the space; and determining, from the movement data of the user device, at least one of a first position or a first orientation of the user device associated with the first image.

Clause 89: The method of clauses 85 to 88, further comprising:

capturing, using the first sensor associated with the user device, a second image including the at least one feature associated with the second boundary from the imaging data including at least the portion of the second boundary of the space;

determining, from the movement data of the user device, at least one of a second position or a second orientation of the user device associated with the second image; and determining the second boundary based at least in part on the first image, the at least one of the first position or the first orientation of the user device associated with the first image, the second image, and the at least one of the second position or the second orientation of the user device associated with the second image.

Clause 90: The method of clauses 85 to 89, wherein determining the first boundary further comprises:

determining a distance between the user device and the second boundary associated with the identification of the edge between the first boundary and the second boundary; and determining the first boundary further based at least in part on the distance between the user device and the second boundary.

Clause 91: The method of clauses 85 to 90, wherein receiving the identification of the edge between the first boundary and the second boundary further comprises:

receiving, via the user device, an identification of a line extending along the edge between the first boundary and the second boundary; and determining the line extending along the edge between the first boundary and the second boundary as the indication of the edge between the first boundary and the second boundary.

Clause 92: The method of clauses 85 to 91, wherein receiving the identification of the edge between the first boundary and the second boundary further comprises:

receiving, via the user device, an identification of a first plane associated with the edge between the first boundary and the second boundary.

Clause 93: The method of clauses 85 to 92, wherein determining the first boundary further comprises:

determining a plurality of first boundaries associated with the space based on identifications of respective edges between respective first boundaries and the second boundary, and respective position and orientation data of the user device associated with the identifications of respective edges between the respective first boundaries and the second boundary.

Clause 94: The method of clauses 85 to 93, further comprising:

receiving, from the first sensor associated with the user device, imaging data including at least a second portion of the space within the field of view of the first sensor;

receiving, using the user device, an identification of an edge between the first boundary and a third boundary within the imaging data including at least the second portion of the space; and receiving, from the second sensor associated with the user device, data associated with position and orientation of the user device associated with the identification of the edge between the first boundary and the third boundary.

Clause 95: The method of clauses 85 to 94, further comprising:

determining, using the user device, the third boundary based on the local coordinate frame, the second boundary, the identification of the edge between the first boundary and the third boundary, and the position and orientation data of the user device associated with the identification of the edge between the first boundary and the third boundary; and wherein the geometric shell of the space is further generated based on the third boundary.

Clause 96: The method of clauses 85 to 95, wherein determining the third boundary further comprises:

determining a distance between the user device and the second boundary associated with the identification of the edge between the first boundary and the third boundary;

determining a distance between the user device and the first boundary associated with the identification of the edge between the first boundary and the third boundary; and determining the third boundary further based on the distance between the user device and the second boundary, and the distance between the user device and the first boundary.

Clause 97: A system, comprising:
a user device, comprising:
  a first sensor;
  a second sensor; and
  a processor configured to at least:
  receive, from the first sensor, imaging data including at least a first portion of a space within a field of view of the first sensor;
  receive, via the user device, an identification of an edge between a first boundary and a second boundary within the imaging data including at least the first portion of the space;
  receive, from the second sensor, data associated with position and orientation of the user device associated with the identification of the edge between the first boundary and the second boundary;
  determine the first boundary based on a local coordinate frame, the second boundary, the identification of the edge between the first boundary and the second boundary, and the data associated with position and orientation of the user device associated with the identification of the edge between the first boundary and the second boundary; and
  cause a geometric shell of the space to be generated based on the local coordinate frame, the second boundary, and the first boundary.

Clause 98: The system of clause 97, wherein the second sensor comprises an inertial measurement unit including at least one of an accelerometer, a gyroscope, or a magnetometer.

Clause 99: The system of clauses 97 to 98, wherein the user device further comprises a display;

wherein the display comprises at least one of a touchscreen of a mobile computing device, a display element of a head-mounted or eyeglass-mounted computing device, or a stereoscopic display; and wherein the display is configured to present imaging data captured via the first sensor.

Clause 100: The system of clauses 97 to 99, wherein the user device further includes at least one of an edge detection algorithm, a surface detection algorithm, a feature detection algorithm, or an image recognition algorithm configured to aid determinations of at least one of the second boundary or the first boundary.

Clause 101: A computer-implemented method, comprising:

presenting, via a display of a user device, an indication to move the user device within a room;

receiving, from a sensor of the user device, movement data of the user device;

receiving, from an imaging sensor of the user device, imaging data including at least a portion of a floor of the room within a field of view of the imaging sensor during movement of the user device to determine the floor of the room;

receiving, from the imaging sensor of the user device, imaging data including at least a first portion of the room within the field of view of the imaging sensor;

presenting, via the display of the user device, the imaging data including at least the first portion of the room within the field of view of the imaging sensor;

presenting, via the display of the user device and overlaying the imaging data including at least the first portion of the room, an indication to identify a plurality of walls of the room, wherein the indication comprises a substantially horizontal line at a substantially constant position within the display of the user device and projected onto the floor within the imaging data including at least the first portion of the room;

receiving, via the user device and responsive to aligning the substantially horizontal line with respective bases of the plurality of walls within the imaging data including at least the first portion of the room, a plurality of inputs identifying respective ones of the plurality of walls of the room;

receiving, from the sensor of the user device, position and orientation data of the user device associated with respective ones of the plurality of inputs identifying respective ones of the plurality of walls of the room;

receiving, from the imaging sensor of the user device, imaging data including at least a second portion of the room within the field of view of the imaging sensor;

presenting, via the display of the user device, the imaging data including at least the second portion of the room within the field of view of the imaging sensor;

presenting, via the display of the user device and overlaying the imaging data including at least the second portion of the room, an indication to identify a ceiling of the room, wherein the indication comprises the substantially horizontal line at a substantially constant position within the display of the user device and projected onto a wall within the imaging data including at least the second portion of the room;

receiving, via the user device and responsive to aligning the substantially horizontal line with a top of the wall within the imaging data including at least the second portion of the room, an input identifying the ceiling of the room;

receiving, from the sensor of the user device, position and orientation data of the user device associated with the input identifying the ceiling of the room; and generating a geometric shell of the room based on the determined floor, the plurality of inputs associated with the plurality of walls, the position and orientation data of the user device associated with respective ones of the plurality of inputs identifying respective ones of the plurality of walls of the room, the input associated with the ceiling, and the position and orientation data of the user device associated with the input identifying the ceiling of the room.

Clause 102: The computer-implemented method of clause 101, further comprising:

presenting, via the display of the user device and overlaying at least a portion of the imaging data including at least the portion of the floor of the room, a semi-transparent grid to indicate the floor of the room.

Clause 103: The computer-implemented method of clauses 101 to 102, wherein presenting the indication to identify a plurality of walls of the room further comprises:

presenting, via the display, a wall placement user interface element configured to receive an input identifying a base of a wall being aligned with the substantially horizontal line presented within the display of the user device.

Clause 104: The computer-implemented method of clauses 101 to 103, wherein presenting the indication to identify a ceiling of the room further comprises:

presenting, via the display, a ceiling placement user interface element configured to receive the input identifying the top of the wall being aligned with the substantially horizontal line presented within the display of the user device.

Clause 105: A method, comprising:

receiving, from a first sensor associated with a user device, imaging data including at least a first portion of a space within a field of view of the first sensor;

presenting, via a display associated with the user device and overlaying at least a portion of the field of view, an indication to identify a first boundary of the space, wherein the indication comprises an alignment guide projected onto a second boundary of the first portion of the space and overlaying the field of view;

receiving, via the user device and responsive to aligning the alignment guide with a base of the first boundary within the field of view, an input identifying the first boundary of the space;

receiving, from a second sensor associated with the user device, data associated with position and orientation of the user device associated with the input identifying the first boundary of the space; and causing a geometric shell of the space to be generated based on the second boundary, the input identifying the first boundary, and the data associated with position and orientation of the user device associated with the input identifying the first boundary.

Clause 106: The method of clause 105, further comprising:

presenting, via the display associated with the user device, an indication to move the user device within the space;

receiving, from the second sensor associated with the user device, movement data of the user device;

receiving, from the first sensor associated with the user device, imaging data including at least a portion of the second boundary of the space within the field of view of the first sensor during movement of the user device to determine the second boundary of the space; and presenting, via the display associated with the user device and overlaying at least a portion of the imaging data including at least the portion of the second boundary of the space, a semi-transparent overlay to indicate the second boundary of the space.

Clause 107: The method of clauses 105 to 106, further comprising:

presenting, via the display associated with the user device, the imaging data including at least the first portion of the space within the field of view of the first sensor;

wherein the alignment guide is presented, via the display associated with the user device, as overlaying the imaging data including at least the first portion of the space; and wherein the input identifying the first boundary of the space is received, via the user device, responsive to aligning the alignment guide with the base of the first boundary within the imaging data including at least the first portion of the space.

Clause 108: The method of clauses 105 to 107, wherein the alignment guide comprises a substantially horizontal line presented at a substantially constant position within the display associated with the user device; and wherein presenting the indication to identify the first boundary of the space further comprises:

presenting, via the display, a first boundary placement user interface element configured to receive the input identifying the base of the first boundary responsive to being aligned with the substantially horizontal line presented within the display associated with the user device.

Clause 109: The method of clauses 105 to 108, wherein presenting the indication to identify the first boundary of the space further comprises:

presenting, via the display and overlaying at least a portion of the imaging data including at least the first portion of the space, a semi-transparent overlay to indicate the first boundary of the space;

wherein the first boundary placement user interface element is positioned within the semi-transparent overlay.

Clause 110: The method of clauses 105 to 109, further comprising:

responsive to receiving the input identifying the first boundary of the space, presenting, via the display and overlaying at least a portion of the imaging data including at least the first portion of the space, a semi-transparent line to indicate the base of the first boundary of the space;

wherein the semi-transparent line fades towards opposite ends of the line.

Clause 111: The method of clauses 105 to 110, further comprising:

responsive to receiving the input identifying the first boundary of the space, presenting, via the display and overlaying at least a portion of the imaging data including at least the first portion of the space, a semi-transparent overlay to indicate the first boundary of the space.

Clause 112: The method of clauses 105 to 111, wherein the semi-transparent overlay fades towards outer edges of the overlay.

Clause 113: The method of clauses 105 to 112, further comprising:

presenting, via the display associated with the user device and overlaying at least a portion of the imaging data including at least the first portion of the space, an indication to remove the first boundary of the space, wherein the indication comprises the alignment guide presented overlaying the field of view; and receiving, via the user device and responsive to aligning the alignment guide with the base of the first boundary within the imaging data including at least the first portion of the space, an input identifying the first boundary of the space to be removed.

Clause 114: The method of clauses 105 to 113, wherein the alignment guide comprises a substantially horizontal line presented at a substantially constant position within the display associated with the user device; and wherein presenting the indication to remove the first boundary of the space further comprises:

presenting, via the display, a first boundary removal user interface element configured to receive the input identifying the base of the first boundary to be removed responsive to being aligned with the substantially horizontal line presented within the display associated with the user device.

Clause 115: The method of clauses 105 to 114, wherein presenting the indication to remove the first boundary of the space further comprises:

presenting, via the display and overlaying at least a portion of the imaging data including at least the first portion of the space, a semi-transparent overlay to indicate the first boundary of the space to be removed;

wherein the first boundary removal user interface element is positioned within the semi-transparent overlay.

Clause 116: The method of clauses 105 to 115, further comprising:

receiving, from the first sensor associated with the user device, imaging data including at least a second portion of the space within the field of view of the first sensor;

presenting, via the display associated with the user device, the imaging data including at least the second portion of the space within the field of view of the first sensor;

presenting, via the display associated with the user device and overlaying the imaging data including at least the second portion of the space, an indication to identify a third boundary of the space, wherein the indication comprises the alignment guide projected onto the first boundary within the imaging data including at least the second portion of the space and presented within the display associated with the user device;

receiving, via the user device and responsive to aligning the alignment guide with a top of the first boundary within the imaging data including at least the second portion of the space, an input identifying the third boundary of the space; and receiving, from the second sensor associated with the user device, data associated with position and orientation of the user device associated with the input identifying the third boundary of the space; and wherein the indication to identify the third boundary of the space further comprises a third boundary placement user interface element configured to receive the input identifying the third boundary of the space responsive to the top of the first boundary being aligned with the alignment guide presented within the display associated with the user device; and wherein the geometric shell of the space is further generated based on the input identifying the third boundary, and the data associated with position and orientation of the user device associated with the input identifying the third boundary.

Clause 117: The method of clauses 105 to 116, wherein presenting the indication to identify the third boundary of the space further comprises:

presenting, via the display and overlaying at least a portion of the imaging data including at least the second portion of the space, a semi-transparent overlay to indicate the first boundary of the space;

wherein the third boundary placement user interface element is positioned within the semi-transparent overlay; and wherein the semi-transparent overlay extends or retracts with movement of the alignment guide relative to the imaging data including at least the second portion of the space.

Clause 118: A system, comprising:
a user device, comprising:
a first sensor;
a second sensor;
a display; and
a processor configured to at least:
receive, from the first sensor, imaging data including at least a first portion of a space within a field of view of the first sensor;
present, via the display and overlaying the field of view, an indication to identify a first boundary of the space, wherein the indication comprises an alignment guide projected onto a second boundary of the first portion of the space and overlaying the field of view;
receive, via the user device and responsive to aligning the alignment guide with a base of the first boundary within the field of view, an input identifying the first boundary of the space;
receive, from the second sensor, data associated with position and orientation of the user device associated with the input identifying the first boundary of the space; and
cause a geometric shell of the space to be generated based on the second boundary, the input identifying the first boundary, and the data associated with position and orientation associated with the input identifying the first boundary.

Clause 119: The system of clause 118, wherein the second sensor comprises an inertial measurement unit including at least one of an accelerometer, a gyroscope, or a magnetometer; and wherein the display comprises at least one of a touchscreen of a mobile computing device, a display element of a head-mounted or eyeglass-mounted computing device, or a stereoscopic display.

Clause 120: The system of clauses 118 to 119, wherein the processor is further configured to at least:

present, via the display, the imaging data including at least the first portion of the space within the field of view of the first sensor; and wherein the alignment guide is presented as a substantially horizontal line at a substantially constant position within the display and overlaid onto the imaging data.

The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art. Persons having ordinary skill in the field of computers, communications, and virtual reality, mixed reality, and/or augmented reality systems and processes should recognize that components and process steps described herein may be interchangeable with other components or steps, or combinations of components or steps, and still achieve the benefits and advantages of the present disclosure. Moreover, it should be apparent to one skilled in the art that the disclosure may be practiced without some or all of the specific details and steps disclosed herein.

Aspects of the disclosed systems and processes may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage media may be implemented by a volatile computer memory, non-volatile computer memory, hard drive, solid-state memory, flash drive, removable disk and/or other media. In addition, components of one or more of the modules and engines may be implemented in firmware or hardware.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

Language of degree used herein, such as the terms "about," "approximately," "generally," "nearly" or "substantially" as used herein, represent a value, amount, or characteristic close to the stated value, amount, or characteristic that still performs a desired function or achieves a desired result. For example, the terms "about," "approximately," "generally," "nearly" or "substantially" may refer to an amount that is within less than 10% of, within less than 5% of, within less than 1% of, within less than 0.1% of, and/or within less than 0.01% of the stated amount.

As used throughout this application, the word "may" is used in a permissive sense (i.e., meaning having the potential to), rather than the mandatory sense (i.e., meaning must). Similarly, the words "include," "including," and "includes" mean including, but not limited to.

From the foregoing, it will be appreciated that, although specific implementations have been described herein for purposes of illustration, various modifications may be made without deviating from the spirit and scope of the appended claims and the features recited therein. In addition, while certain aspects are presented below in certain claim forms, the inventors contemplate the various aspects in any available claim form. For example, while only some aspects may currently be recited as being embodied in a computer readable storage medium, other aspects may likewise be so embodied. Various modifications and changes may be made as would be obvious to a person skilled in the art having the benefit of this disclosure. It is intended to embrace all such modifications and changes and, accordingly, the above description is to be regarded in an illustrative rather than a restrictive sense.

What is claimed is:

1. A computer-implemented method, comprising:
   generating, using a user device within a room, a local coordinate frame;
   receiving, from a sensor of the user device, movement data of the user device within the room;
   receiving, from an imaging sensor of the user device, imaging data including at least a portion of a floor of the room within a field of view of the imaging sensor during movement of the user device;
   determining, using the user device, a floor plane based on the local coordinate frame, the imaging data including at least the portion of the floor, and the movement data of the user device;
   receiving, from the imaging sensor of the user device, imaging data including at least a first portion of the room within the field of view of the imaging sensor;
   receiving, using the user device, a plurality of identifications of respective edges between a plurality of wall planes and the floor plane;
   receiving, from the sensor of the user device, position and orientation data of the user device associated with respective ones of the plurality of identifications of respective edges between the plurality of wall planes and the floor plane;
   determining, using the user device, the plurality of wall planes based on the local coordinate frame, floor plane, the plurality of identifications of respective edges between a plurality of wall planes and the floor plane, and the position and orientation data of the user device associated with respective ones of the plurality of identifications of respective edges between the plurality of wall planes and the floor plane;
   receiving, from the imaging sensor of the user device, imaging data including at least a second portion of the room within the field of view of the imaging sensor;
   receiving, using the user device, an identification of an edge between at least one wall plane and a ceiling plane;
   receiving, from the sensor of the user device, position and orientation data of the user device associated with the identification of the edge between the at least one wall plane and the ceiling plane;
   determining, using the user device, the ceiling plane based on the local coordinate frame, the floor plane, the at least one wall plane, the identification of the edge between the at least one wall plane and the ceiling plane, and the position and orientation data of the user device associated with the identification of the edge between the at least one wall plane and the ceiling plane;
   receiving, from the sensor associated with the user device, additional movement data; and
   generating a geometric shell of the room based on the local coordinate frame, the floor plane, the plurality of wall planes, the ceiling plane, and the additional movement data.

2. The computer-implemented method of claim 1, wherein generating the local coordinate frame further comprises:
   designating a position associated with initiation of the user device as a home position.

3. The computer-implemented method of claim 1, wherein determining the floor plane further comprises:
   capturing, using the imaging sensor associated with the user device, a plurality of images including at least one feature associated with the floor plane;
   determining, from the movement data of the user device, a position and an orientation of the user device associated with individual ones of the plurality of images; and
   determining the floor plane based at least in part on the plurality of images and the position and the orientation of the user device associated with individual ones of the plurality of images.

4. The computer-implemented method of claim 1, wherein determining the plurality of wall planes further comprises:
   receiving, via the user device, an identification of a first edge between a first wall plane and the floor plane;
   determining, from the position and orientation data of the user device, a position and an orientation of the user device associated with the identification of the first edge between the first wall plane and the floor plane; and
   determining the first wall plane based at least in part on the floor plane and the position and the orientation of the user device associated with the identification of the first edge between the first wall plane and the floor plane.

5. A method, comprising:
   receiving, from a first sensor associated with a user device, imaging data including at least a first portion of a space within a field of view of the first sensor;

receiving, using the user device, an identification of an edge between a first boundary and a second boundary within the imaging data including at least the first portion of the space;

receiving, from a second sensor associated with the user device, data associated with position and orientation of the user device associated with the identification of the edge between the first boundary and the second boundary;

determining, using the user device, the first boundary based on a local coordinate frame of the user device, the second boundary, the identification of the edge between the first boundary and the second boundary, and the data associated with position and orientation of the user device associated with the identification of the edge between the first boundary and the second boundary; and causing a geometric shell of the space to be generated based on the local coordinate frame, the second boundary, and the first boundary.

6. The method of claim 5, further comprising:
generating, using the user device, the local coordinate frame.

7. The method of claim 6, wherein generating the local coordinate frame further comprises:
designating a position associated with initiation of the user device as a home position; and
tracking movement of the user device relative to the home position.

8. The method of claim 5, further comprising:
receiving, from the first sensor associated with the user device, imaging data including at least a portion of the second boundary of the space within the field of view of the first sensor;
receiving, from the second sensor associated with the user device, movement data of the user device within the space;
capturing, using the first sensor associated with the user device, a first image including at least one feature associated with the second boundary from the imaging data including at least the portion of the second boundary of the space; and
determining, from the movement data of the user device, at least one of a first position or a first orientation of the user device associated with the first image.

9. The method of claim 8, further comprising:
capturing, using the first sensor associated with the user device, a second image including the at least one feature associated with the second boundary from the imaging data including at least the portion of the second boundary of the space;
determining, from the movement data of the user device, at least one of a second position or a second orientation of the user device associated with the second image; and
determining the second boundary based at least in part on the first image, the at least one of the first position or the first orientation of the user device associated with the first image, the second image, and the at least one of the second position or the second orientation of the user device associated with the second image.

10. The method of claim 5, wherein determining the first boundary further comprises:
determining a distance between the user device and the second boundary associated with the identification of the edge between the first boundary and the second boundary; and determining the first boundary further based at least in part on the distance between the user device and the second boundary.

11. The method of claim 5, wherein receiving the identification of the edge between the first boundary and the second boundary further comprises:
receiving, via the user device, an identification of a line extending along the edge between the first boundary and the second boundary; and
determining the line extending along the edge between the first boundary and the second boundary as the indication of the edge between the first boundary and the second boundary.

12. The method of claim 11, wherein receiving the identification of the edge between the first boundary and the second boundary further comprises:
receiving, via the user device, an identification of a first plane associated with the edge between the first boundary and the second boundary.

13. The method of claim 5, wherein determining the first boundary further comprises:
determining a plurality of first boundaries associated with the space based on identifications of respective edges between respective first boundaries and the second boundary, and respective position and orientation data of the user device associated with the identifications of respective edges between the respective first boundaries and the second boundary.

14. The method of claim 5, further comprising:
receiving, from the first sensor associated with the user device, imaging data including at least a second portion of the space within the field of view of the first sensor;
receiving, using the user device, an identification of an edge between the first boundary and a third boundary within the imaging data including at least the second portion of the space; and
receiving, from the second sensor associated with the user device, data associated with position and orientation of the user device associated with the identification of the edge between the first boundary and the third boundary.

15. The method of claim 14, further comprising:
determining, using the user device, the third boundary based on the local coordinate frame, the second boundary, the identification of the edge between the first boundary and the third boundary, and the position and orientation data of the user device associated with the identification of the edge between the first boundary and the third boundary; and
wherein the geometric shell of the space is further generated based on the third boundary.

16. The method of claim 15, wherein determining the third boundary further comprises:
determining a distance between the user device and the second boundary associated with the identification of the edge between the first boundary and the third boundary;
determining a distance between the user device and the first boundary associated with the identification of the edge between the first boundary and the third boundary; and
determining the third boundary further based on the distance between the user device and the second boundary, and the distance between the user device and the first boundary.

17. A system, comprising:
a user device, comprising:
 a first sensor;
 a second sensor; and
 a processor configured to at least:
  receive, from the first sensor, imaging data including at least a first portion of a space within a field of view of the first sensor;
  receive, via the user device, an identification of an edge between a first boundary and a second boundary within the imaging data including at least the first portion of the space;
  receive, from the second sensor, data associated with position and orientation of the user device associated with the identification of the edge between the first boundary and the second boundary;
  determine the first boundary based on a local coordinate frame, the second boundary, the identification of the edge between the first boundary and the second boundary, and the data associated with position and orientation of the user device associated with the identification of the edge between the first boundary and the second boundary; and
  cause a geometric shell of the space to be generated based on the local coordinate frame, the second boundary, and the first boundary.

18. The system of claim 17, wherein the second sensor comprises an inertial measurement unit including at least one of an accelerometer, a gyroscope, or a magnetometer.

19. The system of claim 17, wherein the user device further comprises a display;
 wherein the display comprises at least one of a touchscreen of a mobile computing device, a display element of a head-mounted or eyeglass-mounted computing device, or a stereoscopic display; and
 wherein the display is configured to present imaging data captured via the first sensor.

20. The system of claim 17, wherein the user device further includes at least one of an edge detection algorithm, a surface detection algorithm, a feature detection algorithm, or an image recognition algorithm configured to aid determinations of at least one of the second boundary or the first boundary.

* * * * *